United States Patent
McBride et al.

(10) Patent No.: US 12,515,092 B2
(45) Date of Patent: Jan. 6, 2026

(54) METHODS AND APPARATUS FOR BODY WEIGHT SUPPORT SYSTEM

(71) Applicant: Bioness Medical Inc., Valencia, CA (US)

(72) Inventors: Keith McBride, Ventura, CA (US); Arkady Glukhovsky, Valencia, CA (US); Augustine Smith, Santa Clarita, CA (US)

(73) Assignee: Bioness Medical Inc., Valencia, CA (US)

( * ) Notice: Subject to any disclaimer, the term of this patent is extended or adjusted under 35 U.S.C. 154(b) by 116 days.

(21) Appl. No.: 18/458,583

(22) Filed: Aug. 30, 2023

(65) Prior Publication Data
US 2024/0252878 A1 Aug. 1, 2024

Related U.S. Application Data

(63) Continuation of application No. 17/188,714, filed on Mar. 1, 2021, now Pat. No. 11,779,795, which is a
(Continued)

(51) Int. Cl.
*A63B 21/00* (2006.01)
*A63B 21/068* (2006.01)
(Continued)

(52) U.S. Cl.
CPC .... *A63B 21/4001* (2015.10); *A63B 21/00181* (2013.01); *A63B 21/068* (2013.01);
(Continued)

(58) Field of Classification Search
CPC .......... A63B 21/4001; A63B 21/00181; A63B 21/068; A63B 23/0464; A63B 24/0087;
(Continued)

(56) References Cited

U.S. PATENT DOCUMENTS

| | | | |
|---|---|---|---|
| 18,249 A | 9/1857 | Robertson | |
| 143,198 A | 9/1873 | Taylor | |

(Continued)

FOREIGN PATENT DOCUMENTS

| | | | |
|---|---|---|---|
| CH | 669780 A5 | 4/1989 | |
| CN | 104308861 A | 1/2015 | |

(Continued)

OTHER PUBLICATIONS

Amendment and Response to Non-Final Office Action and Information Disclosure Statement filed Dec. 6, 2019 in U.S. Appl. No. 15/896,731, 608 pages.
(Continued)

*Primary Examiner* — Garrett K Atkinson
(74) *Attorney, Agent, or Firm* — John Maldjian, Esq.; Stevens & Lee PC

(57) ABSTRACT

A body weight support system includes a tether configured to be coupled to an attachment device worn by a user to couple the user to the body weight support system. A method of providing gait training includes defining a reference length of the tether when the attachment device is in an initial position and defining a threshold length of the tether. A first amount of body weight support is provided during the gait training as the user moves relative to a surface and the length of the tether is less than the threshold length. A second amount of body weight support is provided during the gait training as the user moves relative to the surface and the length of the tether is greater than the threshold length. The method further includes displaying data associated with the gait training on a display of an electronic device.

11 Claims, 69 Drawing Sheets

Related U.S. Application Data continuation of application No. 17/025,558, filed on Sep. 18, 2020, now abandoned, which is a continuation of application No. 16/845,510, filed on Apr. 10, 2020, now abandoned, which is a continuation of application No. 15/896,731, filed on Feb. 14, 2018, now Pat. No. 10,668,316.

(60) Provisional application No. 62/458,648, filed on Feb. 14, 2017.

(51) Int. Cl.
  *A63B 22/00* (2006.01)
  *A63B 22/02* (2006.01)
  *A63B 23/04* (2006.01)
  *A63B 24/00* (2006.01)
  *A63B 69/00* (2006.01)
  *A63B 71/00* (2006.01)
  *A63B 71/06* (2006.01)

(52) U.S. Cl.
  CPC ...... *A63B 23/0464* (2013.01); *A63B 24/0087* (2013.01); *A63B 69/0002* (2013.01); *A63B 69/0064* (2013.01); *A63B 21/4007* (2015.10); *A63B 2022/0092* (2013.01); *A63B 2022/0094* (2013.01); *A63B 22/0235* (2013.01); *A63B 23/0458* (2013.01); *A63B 2024/0093* (2013.01); *A63B 2071/0018* (2013.01); *A63B 71/0622* (2013.01); *A63B 2208/0204* (2013.01); *A63B 2220/10* (2013.01); *A63B 2220/30* (2013.01); *A63B 2220/40* (2013.01); *A63B 2220/51* (2013.01); *A63B 2220/54* (2013.01); *A63B 2220/805* (2013.01); *A63B 2225/20* (2013.01); *A63B 2225/50* (2013.01)

(58) Field of Classification Search
  CPC ............ A63B 69/0002; A63B 69/0064; A63B 21/4007; A63B 22/0235; A63B 23/0458; A63B 71/0622; A63B 2022/0092; A63B 2022/0094; A63B 2024/0093; A63B 2071/0018; A63B 2208/0204; A63B 2220/10; A63B 2220/30; A63B 2220/40; A63B 2220/51; A63B 2220/54; A63B 2220/805; A63B 2225/20; A63B 2225/50
  See application file for complete search history.

(56) References Cited

U.S. PATENT DOCUMENTS

| | | | |
|---|---|---|---|
| 229,167 A | 6/1880 | Morse | |
| 764,781 A | 7/1904 | Sumner | |
| 895,055 A | 8/1908 | Spooner | |
| 1,536,766 A | 5/1925 | Cammann | |
| 1,648,930 A | 11/1927 | Zouck | |
| 1,971,294 A | 8/1934 | Bunker | |
| 2,211,220 A | 8/1940 | Verplanck | |
| 2,360,505 A | 10/1944 | Medenwald et al. | |
| 2,519,165 A | 8/1950 | Weise et al. | |
| 2,688,933 A | 9/1954 | Spafford | |
| 2,819,755 A | 1/1958 | Berger et al. | |
| 2,871,915 A | 2/1959 | Hogan | |
| 3,408,067 A * | 10/1968 | Armstrong | A63B 22/02 |
| | | | 472/91 |
| 3,424,458 A | 1/1969 | John | |
| 3,720,172 A | 3/1973 | Dehne | |
| 3,780,663 A | 12/1973 | Pettit | |
| 3,985,082 A | 10/1976 | Barac | |
| 4,164,350 A | 8/1979 | Teunissen et al. | |
| 4,204,673 A * | 5/1980 | Speer, Sr. | A63B 22/0292 |
| | | | 601/40 |
| 4,243,147 A | 1/1981 | Twitchell et al. | |
| 4,360,307 A | 11/1982 | Larsson | |
| 4,372,452 A | 2/1983 | Mccord | |
| 4,423,864 A * | 1/1984 | Wiik | A63B 22/203 |
| | | | 472/91 |
| 4,427,398 A | 1/1984 | Eisbrecher et al. | |
| 4,445,502 A | 5/1984 | Swan et al. | |
| 4,606,082 A | 8/1986 | Kuhlman | |
| 4,627,119 A | 12/1986 | Hachey et al. | |
| 4,639,955 A | 2/1987 | Carminati et al. | |
| 4,706,782 A | 11/1987 | Spoeler et al. | |
| 4,733,858 A * | 3/1988 | Lan | A63B 21/4047 |
| | | | 482/53 |
| 4,911,426 A | 3/1990 | Scales | |
| 4,944,056 A | 7/1990 | Schroeder et al. | |
| 5,048,822 A | 9/1991 | Murphy | |
| 5,138,953 A | 8/1992 | Horcher et al. | |
| 5,314,390 A * | 5/1994 | Westing | A63B 21/4034 |
| | | | 601/36 |
| 5,337,908 A | 8/1994 | Beck, Jr. | |
| 5,490,293 A | 2/1996 | Nilsson | |
| 5,511,486 A | 4/1996 | Pollard et al. | |
| 5,626,540 A | 5/1997 | Hall | |
| 5,632,206 A | 5/1997 | Summa et al. | |
| 5,638,755 A | 6/1997 | Love et al. | |
| 5,695,432 A | 12/1997 | Soederlund | |
| 5,809,591 A | 9/1998 | Capaldi et al. | |
| 5,830,162 A * | 11/1998 | Giovannetti | A61B 5/1038 |
| | | | 482/69 |
| 5,850,928 A | 12/1998 | Kahlman et al. | |
| 5,904,099 A | 5/1999 | Danneker | |
| 5,997,444 A | 12/1999 | Mcbride | |
| 6,035,465 A | 3/2000 | Rogozinski | |
| 6,079,578 A | 6/2000 | Dyson | |
| 6,080,087 A | 6/2000 | Bingham | |
| 6,192,803 B1 | 2/2001 | Nishino | |
| 6,315,138 B1 | 11/2001 | Dyson | |
| 6,389,618 B1 | 5/2002 | Flynn | |
| 6,464,208 B1 | 10/2002 | Smith | |
| 6,520,484 B1 | 2/2003 | Shimizu et al. | |
| 6,645,126 B1 | 11/2003 | Martin et al. | |
| 6,679,185 B2 | 1/2004 | Sullivan et al. | |
| 6,880,487 B2 * | 4/2005 | Reinkensmeyer | A61B 5/112 |
| | | | 119/728 |
| 6,890,288 B2 | 5/2005 | Bingham | |
| 7,125,388 B1 * | 10/2006 | Reinkensmeyer | |
| | | | A63B 69/0064 |
| | | | 601/5 |
| 7,137,771 B2 | 11/2006 | Maurer et al. | |
| 7,240,621 B2 | 7/2007 | Chepurny et al. | |
| 7,291,097 B1 | 11/2007 | Dace et al. | |
| 7,303,049 B1 | 12/2007 | Greenlee | |
| 7,377,377 B2 | 5/2008 | Christiansson | |
| 7,381,163 B2 * | 6/2008 | Gordon | A63B 24/0006 |
| | | | 482/69 |
| 7,462,138 B2 | 12/2008 | Shetty et al. | |
| 7,618,223 B1 | 11/2009 | Begley | |
| 7,621,850 B2 * | 11/2009 | Piaget | A63B 21/154 |
| | | | 482/54 |
| 7,883,450 B2 | 2/2011 | Hidler | |
| 7,938,757 B1 | 5/2011 | Cockrell | |
| 7,980,856 B2 * | 7/2011 | Grabiner | A63B 22/0292 |
| | | | 434/258 |
| 7,993,248 B1 | 8/2011 | Rasmussen | |
| 7,998,040 B2 * | 8/2011 | Kram | A63B 21/055 |
| | | | 482/54 |
| 8,002,674 B2 * | 8/2011 | Piaget | A63B 23/0429 |
| | | | 482/52 |
| 8,397,320 B2 | 3/2013 | Capaldi | |
| 8,550,962 B2 * | 10/2013 | Piaget | A63B 22/04 |
| | | | 482/52 |
| 8,584,274 B2 | 11/2013 | Hushek | |
| 8,777,819 B1 | 7/2014 | Quintana | |
| 8,789,682 B2 | 7/2014 | Fisher | |
| 8,978,905 B2 | 3/2015 | Bergenstraale et al. | |
| 9,510,991 B2 * | 12/2016 | Stockmaster | A61H 3/008 |
| 9,682,000 B2 | 6/2017 | Glukhovsky et al. | |
| 9,713,439 B1 * | 7/2017 | Wu | A61B 5/221 |

(56) References Cited

U.S. PATENT DOCUMENTS

| | | | |
|---|---|---|---|
| 9,801,775 B2* | 10/2017 | Vallery | A63B 21/4009 |
| 9,839,569 B2 | 12/2017 | Behnke et al. | |
| 9,855,177 B2* | 1/2018 | Erturk | A61H 3/008 |
| 10,080,885 B2 | 9/2018 | Nathan et al. | |
| 10,219,960 B2 | 3/2019 | Behnke et al. | |
| 10,463,563 B2 | 11/2019 | Mcbride et al. | |
| 10,500,123 B2 | 12/2019 | Glukhovsky et al. | |
| 10,537,486 B2 | 1/2020 | Behnke et al. | |
| 10,668,316 B2 | 6/2020 | Mcbride et al. | |
| 10,688,316 B2 | 6/2020 | Butson | |
| 10,864,393 B2 | 12/2020 | Burke et al. | |
| 11,246,780 B2 | 2/2022 | Behnke et al. | |
| 11,253,416 B2 | 2/2022 | Mcbride et al. | |
| 11,324,651 B2 | 5/2022 | Behnke et al. | |
| 11,400,004 B2 | 8/2022 | Behnke et al. | |
| 11,406,549 B2 | 8/2022 | Behnke et al. | |
| 11,464,696 B2 | 10/2022 | Glukhovsky et al. | |
| 11,779,795 B2 | 10/2023 | McBride et al. | |
| 2001/0027149 A1 | 10/2001 | Bingham | |
| 2003/0084508 A1 | 5/2003 | Faucher et al. | |
| 2003/0146069 A1 | 8/2003 | Kaiser | |
| 2003/0153438 A1 | 8/2003 | Gordon et al. | |
| 2003/0200607 A1 | 10/2003 | Faucher et al. | |
| 2003/0201374 A1 | 10/2003 | Faucher et al. | |
| 2004/0074414 A1 | 4/2004 | Phillips | |
| 2004/0143198 A1* | 7/2004 | West | A61H 1/0262 601/5 |
| 2004/0200795 A1 | 10/2004 | Summa | |
| 2005/0115914 A1 | 6/2005 | Chepurny et al. | |
| 2006/0189453 A1 | 8/2006 | Leblond | |
| 2006/0229167 A1* | 10/2006 | Kram | A63B 21/4015 482/54 |
| 2006/0240952 A1 | 10/2006 | Schlosser | |
| 2007/0004567 A1 | 1/2007 | Shetty et al. | |
| 2008/0287268 A1 | 11/2008 | Hidler | |
| 2009/0077737 A1 | 3/2009 | Dyhr et al. | |
| 2009/0308828 A1 | 12/2009 | Hansen | |
| 2010/0000546 A1 | 1/2010 | Park | |
| 2010/0312152 A1 | 12/2010 | Sarkodie-Gyan et al. | |
| 2011/0000015 A1 | 1/2011 | Faucher et al. | |
| 2011/0072580 A1 | 3/2011 | Imhoff | |
| 2011/0100249 A1 | 5/2011 | Ipsen | |
| 2011/0265260 A1 | 11/2011 | Darrow | |
| 2012/0000876 A1 | 1/2012 | Bergenstraale et al. | |
| 2012/0018249 A1* | 1/2012 | Mehr | A63B 69/0064 182/5 |
| 2012/0198612 A1 | 8/2012 | Tindall | |
| 2012/0325586 A1 | 12/2012 | Meggs et al. | |
| 2014/0201905 A1* | 7/2014 | Glukhovsky | A61H 3/008 5/81.1 R |
| 2014/0201906 A1* | 7/2014 | Erturk | A61G 7/1015 5/81.1 R |
| 2014/0206503 A1* | 7/2014 | Stockmaster | A61H 3/008 482/4 |
| 2014/0303705 A1 | 10/2014 | Nathan et al. | |
| 2015/0143627 A1* | 5/2015 | McBride | A61G 7/1044 5/81.1 R |
| 2015/0283921 A1 | 10/2015 | Zimmerman et al. | |
| 2015/0320632 A1* | 11/2015 | Vallery | A61G 7/1042 482/69 |
| 2016/0256346 A1* | 9/2016 | Stockmaster | G16H 40/63 |
| 2017/0027803 A1* | 2/2017 | Agrawal | A61B 5/1122 |
| 2017/0128313 A1 | 5/2017 | Glukhovsky et al. | |
| 2017/0135893 A1* | 5/2017 | Stockmaster | A61H 3/008 |
| 2017/0196752 A1 | 7/2017 | Behnke et al. | |
| 2017/0232279 A1* | 8/2017 | Strohman | A62B 35/0056 182/36 |
| 2018/0036196 A1 | 2/2018 | Behnke et al. | |
| 2018/0055715 A1* | 3/2018 | Vallery | A63B 21/4009 |
| 2018/0071159 A1 | 3/2018 | Glukhovsky et al. | |
| 2019/0216664 A1 | 7/2019 | Behnke et al. | |
| 2020/0038281 A1 | 2/2020 | Mcbride et al. | |
| 2020/0155399 A1 | 5/2020 | Behnke et al. | |
| 2021/0401648 A1 | 12/2021 | Behnke et al. | |
| 2021/0401649 A1 | 12/2021 | Behnke et al. | |
| 2022/0218545 A1 | 7/2022 | Behnke et al. | |
| 2023/0000712 A1 | 1/2023 | Mcbride et al. | |
| 2024/0058192 A1 | 2/2024 | Behnke et al. | |

FOREIGN PATENT DOCUMENTS

| | | |
|---|---|---|
| DE | 102008015879 A1 | 4/2009 |
| EP | 0088061 A2 | 9/1983 |
| EP | 0564177 A1 | 10/1993 |
| EP | 1296595 B1 | 8/2007 |
| EP | 2402279 A1 | 1/2012 |
| EP | 2730266 A1 | 5/2014 |
| JP | S5020727 B | 3/1975 |
| JP | S5020727 B1 | 7/1975 |
| JP | S5686854 A | 7/1981 |
| JP | S58152784 A | 9/1983 |
| JP | S5944428 U | 8/1989 |
| JP | H02131435 A | 5/1990 |
| JP | H0899792 A | 4/1996 |
| JP | H0615658 U | 12/1999 |
| JP | 2000237250 A | 9/2000 |
| JP | 2001299842 A | 10/2001 |
| JP | 2003047635 A | 2/2003 |
| JP | 2003276593 A | 10/2003 |
| JP | 2004329278 A | 11/2004 |
| JP | 2005040563 A | 2/2005 |
| JP | 2010063256 A | 3/2010 |
| JP | 2017011924 A | 1/2017 |
| JP | 2020507360 A | 3/2020 |
| WO | 2009104096 A2 | 8/2009 |
| WO | 2013117750 A1 | 8/2013 |
| WO | 2014113683 A1 | 7/2014 |
| WO | 2016042498 A1 | 3/2016 |
| WO | 2016126681 A1 | 8/2016 |
| WO | 2016126851 A1 | 8/2016 |
| WO | 2017083666 A1 | 5/2017 |
| WO | 2018049031 A1 | 3/2018 |
| WO | 2018152190 A1 | 8/2018 |

OTHER PUBLICATIONS

Australian Examination Report for Australian Application No. 2016215484, mailed Apr. 23, 2020, 5 pages.
Australian Examination Report for Australian Application No. 2016354524, mailed Sep. 11, 2020, 4 pages.
Australian Office Action for Application No. AU20180220931 dated Aug. 9, 2022, 5 pages.
Canadian Examination Report for Canadian Application No. 2,897,620, mailed Feb. 5, 2020, 4 pages.
Canadian Examination Report for Canadian Application No. 2,974,391, mailed Mar. 29, 2022, 6 pages.
Canadian Examination Report for Canadian Application No. 2,974,391 mailed Nov. 30, 2022, 5 pages.
Canadian Examination Report for Canadian Application No. 2,987,620, mailed Sep. 10, 2020, 4 pages.
Canadian Examination Report for Canadian Application No. 3,035,450, mailed Nov. 8, 2023, 4 pages.
Decision of Rejection for Japanese Application No. 2018-521405, mailed Sep. 16, 2021, 13 pages.
Decision of Rejection for Japanese Application No. 2019-021357, mailed Aug. 21, 2020, 6 pages.
Decision of Rejection for Japanese Application No. 2019-539192, mailed Aug. 24, 2022, 5 pages.
European Examination Report for European Application No. 14740676.3, mailed Jun. 14, 2019, 5 pages.
European Office Action for European Application No. 14740676.3, mailed Jan. 17, 2022, 6 pages.
European Office Action for European Application No. 16747097.0, mailed Mar. 2, 2020, 8 pages.
European Office Action for European Application No. 16865093.5, mailed Jul. 28, 2021, 4 pages.
European Office Action for European Application No. 16865093.5, mailed Nov. 28, 2022, 4 pages.

(56) References Cited

OTHER PUBLICATIONS

European Office Action for European Application No. 18753980.4, mailed Feb. 10, 2022, 8 pages.
Examination Report for Australian Patent Application No. 2017322238, dated Sep. 20, 2021, 4 pages.
Exhibit 1008—"Declaration of Dr. David Reinkensmeyer", as filed in IPR Proceeding Case No. IPR2023-00428 (U.S. Pat. No. 10,668,316) on Jan. 10, 2023, 238 pages.
Exhibit 1022—"Declaration of Keith McBride to the Trademark Office", dated Apr. 10, 2014, as filed in IPR Proceeding Case No. IPR2023-00428 (U.S. Pat. No. 10,668,316) on Jan. 10, 2023, 12 pages.
Exhibit 1025—"Example Pathway to Download Vector on Patent Owner's Website", dated Feb. 7, 2014-Jun. 6, 2015, as filed in IPR Proceeding Case No. IPR2023-00428 (U.S. Pat. No. 10,668,316) on Jan. 10, 2023, 4 pages.
Exhibit 1029—"Getahun Web Capture" dated Aug. 25, 2014, as filed in IPR Proceeding Case No. IPR2023-00428 (U.S. Pat. No. 10,668,316) on Jan. 10, 2023, 1 page.
Extended European Search Report for European Application No. 14740676.3, mailed Aug. 18, 2016, 6 pages.
Extended European Search Report for European Application No. 16747097.0, mailed Jul. 27, 2018, 8 pages.
Extended European Search Report for European Application No. 16865093.5, mailed Apr. 2, 2019, 6 pages.
Extended European Search Report for European Application No. 17849531.3, mailed May 4, 2020, 8 pages.
Extended European Search Report for European Application No. 18753980.4, mailed Oct. 29, 2020, 8 pages.
Extended European Search Report for European Application No. 21200795.9, mailed Mar. 21, 2022, 7 pages.
File History for U.S. Appl. No. 62/458,648, filed Feb. 14, 2017, 173 pages.
File History portion including Notice of Allowance mailed Jan. 10, 2020, et al., for U.S. Appl. No. 15/896,731, 91 pages.
Final Notice of Reasons for Rejection for Japanese Application No. 2017-052240, mailed Jul. 19, 2018, 4 pages.
Final Notice of Reasons for Rejection for Japanese Application No. 2019-539192, mailed May 12, 2022, 5 pages.
International Search Report and Written Opinion for International Application No. PCT/US2014/012064, mailed May 9, 2014, 6 pages.
International Search Report and Written Opinion for International Application No. PCT/US2016/016131, mailed Apr. 21, 2016, 10 pages.
International Search Report and Written Opinion for International Application No. PCT/US2016/061552, mailed Jan. 31, 2017, 10 pages.
International Search Report and Written Opinion for International Application No. PCT/US2017/050482, mailed Dec. 21, 2017, 9 pages.
International Search Report and Written Opinion for International Application No. PCT/US2018/018166, mailed Jul. 2, 2018, 11 pages.
Non Final Office Action for U.S. Appl. No. 17/473,690, dated May 24, 2022, 6 pages.
Non Final Office Action for U.S. Appl. No. 17/708,879, dated Jun. 8, 2022, 9 pages.
Non-Final Office Action for U.S. Appl. No. 17/677,138 dated Oct. 11, 2023, 10 pages.
Non-Final Office Action for U.S. Appl. No. 18/186,010 dated Dec. 27, 2023, 15 pages.
Non-Final Office Action mailed on Aug. 3, 2021 for U.S. Appl. No. 15/698,184 filed Sep. 7, 2017, 14 pages.
Notice of Reasons for Rejection for Japanese Application No. 2015-553851, mailed Jul. 4, 2016, 5 pages.
Notice of Reasons for Rejection for Japanese Application No. 2017-052240, mailed Jan. 15, 2018, 9 pages.
Notice of Reasons for Rejection for Japanese Application No. 2017-534701, mailed Oct. 16, 2019, 16 pages.
Notice of Reasons for Rejection for Japanese Application No. 2019-021357, mailed Feb. 26, 2020, 6 pages.
Notice of Reasons for Rejection for Japanese Application No. 2019-508223, mailed April 1, 2021, 13 pages.
Notice of Reasons for Rejection for Japanese Application No. 2019-508223, mailed Feb. 17, 2022, 5 pages.
Notice of Reasons for Rejection for Japanese Application No. 2019-539192, mailed Aug. 27, 2021, 11 pages.
Notice of Reasons for Rejection for Japanese Application No. 2022-009324, mailed Jan. 5, 2023, 11 pages.
Notice of Reasons for Rejection for Japanese Application No. 2022-206819, mailed Sep. 26, 2023, 15 pages.
Notice of Reasons for Rejection for Japanese Patent Application No. 2020-0211145, mailed Aug. 3, 2021, with English translation, 7 pages.
Office Action for Japanese Patent Application No. JP2022-206819 dated Mar. 11, 2024, 10 pages.
Office Action for U.S. Appl. No. 13/745,830, mailed Dec. 17, 2015, 9 pages.
Office Action for U.S. Appl. No. 13/745,830, mailed Jun. 15, 2015, 9 pages.
Office Action for U.S. Appl. No. 13/745,830, mailed Jun. 2, 2016, 11 pages.
Office Action for U.S. Appl. No. 14/226,021, mailed Feb. 22, 2017, 11 pages.
Office Action for U.S. Appl. No. 14/226,021, mailed Sep. 14, 2016, 13 pages.
Office Action for U.S. Appl. No. 14/613,140, mailed Aug. 28, 2017, 25 pages.
Office Action for U.S. Appl. No. 14/613,140, mailed Mar. 26, 2018, 28 pages.
Office Action for U.S. Appl. No. 14/613,140, mailed Oct. 30, 2018, 28 pages.
Office Action for U.S. Appl. No. 15/349,390, mailed Jan. 17, 2019, 15 pages.
Office Action for U.S. Appl. No. 15/698,184, mailed Jan. 19, 2021, 14 pages.
Office Action for U.S. Appl. No. 15/698,184, mailed Mar. 12, 2020, 11 pages.
Office Action for U.S. Appl. No. 15/783,755, mailed May 7, 2018, 13 pages.
Office Action for U.S. Appl. No. 15/896,731, mailed Aug. 8, 2019, 17 pages.
Office Action for U.S. Appl. No. 16/599,793, mailed Mar. 16, 2021, 19 pages.
Office Action for U.S. Appl. No. 17/188,714, filed Aug. 18, 2022, 18 pages.
Pannurat, N. et al. "Automatic Fall Monitoring: a Review", Sensors. Sensors. (Jul. 1, 20148); 14(7): 12900-36.
Petition for Inter Partes Review of U.S. Pat. No. 10,668,316, Aretech, LLC v. Bioness, Inc. IPR2023-00428, filed Jan. 10, 2023, 94 pages.
Petitioner Aretech LLC's Power of Attorney dated Jan. 4, 2023, as filed in IPR Proceeding Case No. IPR2023-00428 (U.S. Pat. No. 10,668,316) on Jan. 10, 2023, 4 pages.
Prosecution File History for U.S. Pat. No. 10,668,316 issued Jun. 2, 2020, 978 pages.
U.S. Appl. No. 15/896,731, filed Feb. 14, 2018, 194 pages.
Vahle Electrification Systems, "Enclosed Conductor System KBH," Catalogue, 2014, 28 pages.
Vallery, H. et al., "Multidirectional Transparent Support for Overground Gait Training," 2013 IEEE International Conference on Rehabilitation Robotics, Seattle, WA (Jun. 2013), 7 pages.
"Aretech LLC's First Amended Answer, Affirmative Defenses, and Counterclaims to Bioness Inc.'s Complaint", filed in *Bioness, Inc. v. Aretech, LLC*, Civil Action No. 1:22-cv-00679 on Oct. 19, 2022 in the United States District Court for the Eastern District of Virginia, Alexandria Division, pp. 1-110.
"Aretech LLC's Answer, Affirmative Defenses, and Counterclaims to Bioness Inc.'s Complaint" filed in *Bioness, Inc. v. Aretech, LLC*, Civil Action No. 1:22-cv-00679 on Aug. 8, 2022 in the United States District Court for the Eastern District of Virginia, Alexandria Division, pp. 1-71.

(56) References Cited

OTHER PUBLICATIONS

"*Bioness Inc.* v. *Aretech, LLC* Complaint for Patent Infringement" filed in *Bioness, Inc.* v. *Aretech, LLC*, Civil Action No. 1:22-cv-00679 on Jun. 15, 2022 in the United States District Court for the Eastern District of Virginia, Alexandria Division, 63 pages.

Bioness Vector Elite Clinician's Guide, Revision B, Sep. 2013, 56 pages.

Exhibit 1008—"Declaration of Dr. David Reinkensmeyer", as filed in IPR Proceeding Case No. IPR2023-00428 (U.S. Pat. No. 10,668,316) Jan. 10, 2023, 238 pages.

Exhibit 1022—"Declaration of Keith McBride to the Trademark Office", dated Apr. 10, 2014, as filed in IPR Proceeding Case No. IPR2023-00428 (U.S. Pat. No. 10,668,316) Jan. 10, 2023, 12 pages.

Exhibit 1025—"Example Pathway to Download Vector on Patent Owner's Website", dated Feb. 7, 2014-Jun. 6, 2015, as filed in IPR Proceeding Case No. IPR2023-00428 (U.S. Pat. No. 10,668,316) Jan. 10, 2023, 4 pages.

Exhibit 1030—"Exhibit U to Bioness Complaint" dated Jun. 15, 2022, as filed in IPR Proceeding Case No. IPR2023-00428 (U.S. Pat. No. 10,668,316) Jan. 10, 2023, 59 pages.

Frey, M. et al. "A Novel Mechatronic Body Weight Support System", IEEE Transactions on Neural Systems and Rehabilitation Engineering, 14(3), Sep. 2006, pp. 311-321.

Getahun, T. A. "Ceilbot Development and Integration", Thesis, Aalto University, School of Electrical Engineering, Aug. 18, 2014, 68 pages.

Exhibit 1029—"Getahun Web Capture" dated Aug. 25, 2014, as filed in IPR Proceeding Case No. IPR2023-00428 (U.S. Pat. No. 10,668,316) on Jan. 10, 2023.

Exhibit 1038—"Internet Archive Declaration—Part 2" Declaration of Nathaniel E Frank-White, dated Jan. 3, 2022, as filed in IPR Proceeding Case No. IPR2023-00428 (U.S. Pat. No. 10,668,316) on Jan. 10, 2023, 74 pages.

Hidler, J. et al. "ZeroG: Overground gait and balance training system", Journal of Rehabilitation Research & Development, 48(4), 2011, pp. 287-298.

Pannurat, N. et al. "Automatic Fall Monitoring: a Review", Sensors, 14(7) (Jul. 1, 20148), pp. 12900-12936.

Exhibit 1015—"Internet Archive Declaration—Part 1", Declaration of Nathaniel E. Frank-White, dated Jan. 10, 2023, filed in IPR Proceeding Case No. IPR2023-00428 (U.S. Pat. No. 10,668,316) on Jan. 10, 2023, 67 pages.

Exhibit 1023—"Specimen submitted for Vector Gait and Safety System (Reg No. 85822129) Trademark", as filed in IPR Proceeding Case No. IPR2023-00428 (U.S. Pat. No. 10,668,316) on Jan. 10, 2023, 7 pages.

Exhibit 1037—"Vector YouTube Upload Screenshot", dated Sep. 24, 2015, as filed in IPR Proceeding Case No. IPR2023-00428 (U.S. Pat. No. 10,668,316) on Jan. 10, 2023, 1 page.

Exhibit 1024—Wayback Machine Web Capture of Google Search of Body Weight Support System—dated Feb. 15, 2014, filed in IPR Proceeding Case No. IPR2023-00428 (U.S. Pat. No. 10,668,316) on Jan. 10, 2023, 1 page.

Exhibit 1026—"Wayback Machine Web Capture of Pannurat" dated Sep. 21, 2015, as filed in IPR Proceeding Case No. IPR2023-00428 (U.S. Pat. No. 10,668,316) on Jan. 10, 2023, 1 page.

Exhibit 1027—"Wayback Machine Web Capture of Vector Elite Clinician's Guide" dated Jun. 6, 2015, filed in IPR Proceeding Case No. IPR2023-00428 (U.S. Pat. No. 10,668,316) on Jan. 10, 2023, 56 pages.

Japanese Office action mailed Jul. 29, 2025, issued in connection with corresponding Japanese Patent Application No. 2024-192634 with English translation (6 pages total).

\* cited by examiner

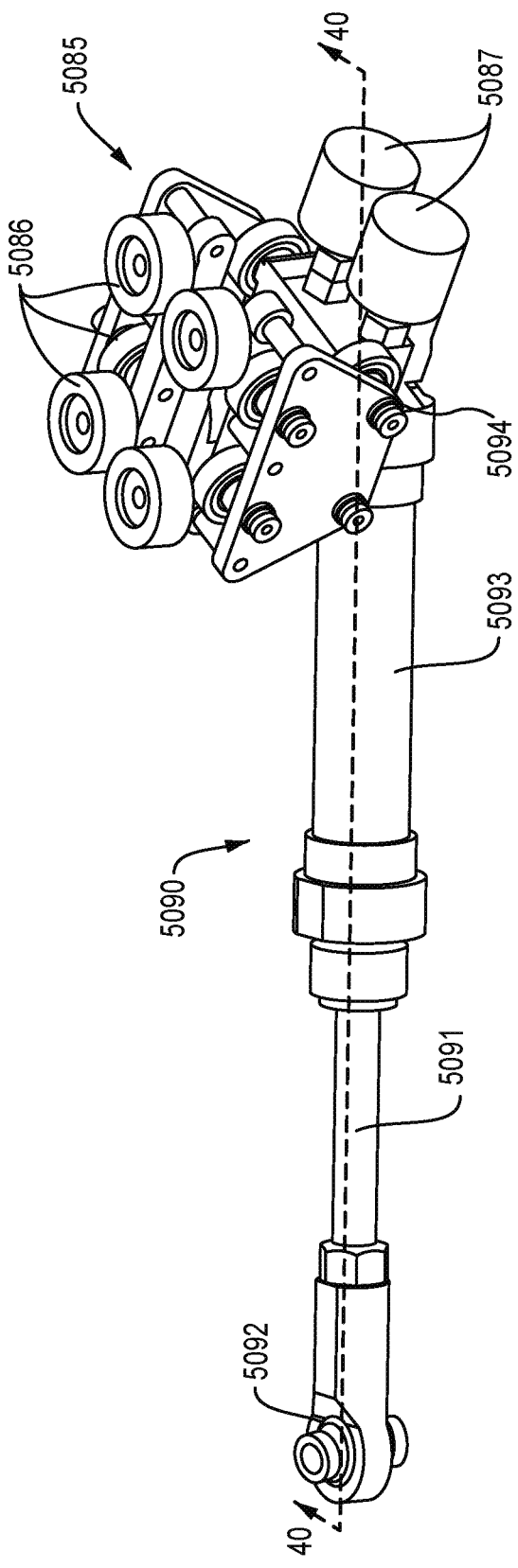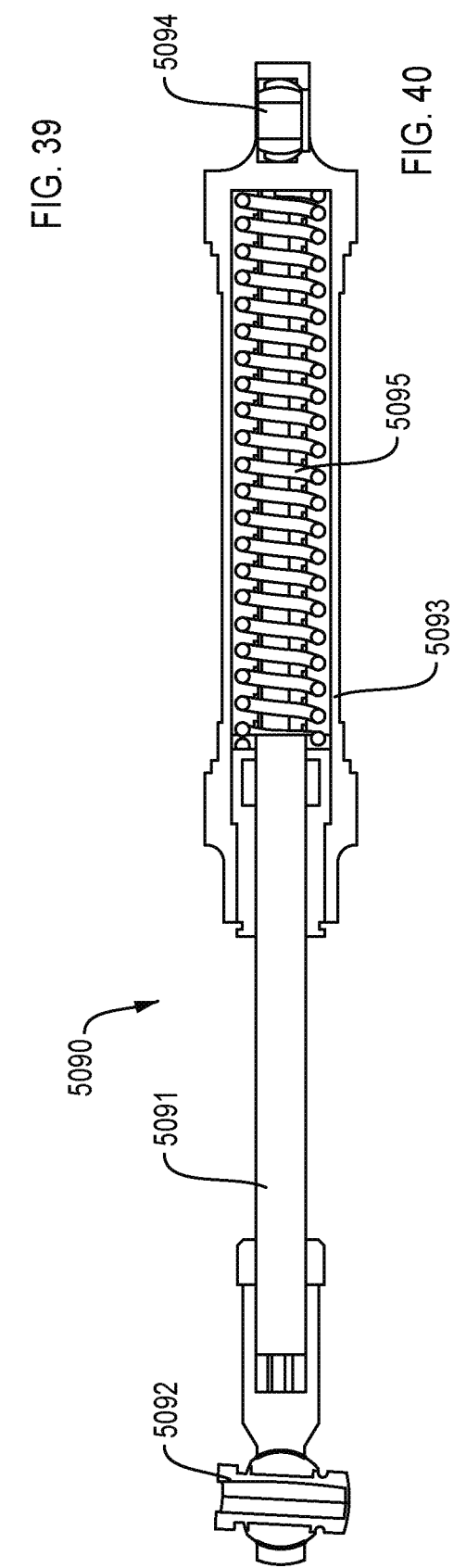
FIG. 39
FIG. 40

FIG. 68

METHODS AND APPARATUS FOR BODY WEIGHT SUPPORT SYSTEM

CROSS-REFERENCE TO RELATED APPLICATIONS

This application is a continuation of U.S. patent application Ser. No. 17/188,714, entitled "Methods and Apparatus for Body Weight Support System", filed Mar. 1, 2021, which is a continuation of U.S. patent application Ser. No. 17/025,558, entitled "Methods and Apparatus for Body Weight Support System," filed Sep. 18, 2020, which is a continuation of U.S. patent application Ser. No. 16/845,510 entitled, "Methods and Apparatus for Body Weight Support System," filed Apr. 10, 2020, which is a continuation of U.S. patent application Ser. No. 15/896,731, now U.S. Pat. No. 10,668,316, entitled, "Methods and Apparatus for Body Weight Support System," filed Feb. 14, 2018, which claims priority to and the benefit of U.S. Provisional Patent Application No. 62/458,648 entitled, "Methods and Apparatus for Body Weight Support System," filed Feb. 14, 2017, the disclosure of each of which is incorporated herein by reference in its entirety.

This application is related to U.S. Pat. No. 10,463,563 entitled, "Methods and Apparatus for Body Weight Support System," filed Feb. 3, 2015, which is a continuation-in-part of U.S. Pat. No. 9,855,177 entitled, "Methods and Apparatus for Body Weight Support System," filed Mar. 26, 2014, which is a continuation-in-part of U.S. Pat. No. 9,682,000 entitled, "Methods and Apparatus for Body Weight Support System," filed Jan. 20, 2013, the disclosure of each of which is incorporated herein by reference in its entirety.

BACKGROUND

The embodiments described herein relate to apparatus and methods for supporting the body weight of a user. More particularly, the embodiments described herein relate to apparatus and methods for supporting the body weight of a user during gait therapy.

Successfully delivering intensive yet safe gait therapy to individuals with significant walking deficits can present challenges to skilled therapists. In the acute stages of many neurological injuries such as stroke, spinal cord injury, traumatic brain injury, or the like individuals often exhibit highly unstable walking patterns and poor endurance, making it difficult to safely practice gait for both the user (e.g., patient) and therapist. Because of this, rehabilitation centers often move over-ground gait training to a treadmill where body-weight support systems can help minimize falls while raising the intensity of the training.

In some instances, body-weight supported treadmill training can promote gains in walking ability similar to or greater than conventional gait training. Unfortunately, there are few systems for transitioning patients from training on a treadmill to safe, weight-supported over-ground gait training. Furthermore, since a primary goal of most individuals with walking impairments is to walk in their homes and in their communities rather than on a treadmill, it is often desirable that therapeutic interventions targeting gait involve over-ground gait training (e.g., not on a treadmill).

Some known support systems involve training individuals with gait impairments over smooth, flat surfaces. In some systems, however, therapists may be significantly obstructed from interacting with the patient, particularly the lower legs of the patient. For patients that require partial assistance to stabilize their knees and/or hips or that need help to propel their legs, the systems present significant barriers between the patient and the therapist.

Some known gait support systems are configured to provide static unloading to a patient supported by the system. That is, under static unloading, the length of shoulder straps that support the patient are set to a fixed length such that the patient either bears substantially all of their weight when the straps are slack or substantially no weight when the straps are taught. Static unloading systems have been shown to result in abnormal ground reaction forces and altered muscle activation patterns in the lower extremities. In addition, static unloading systems may limit the vertical excursions of a patient that prevent certain forms of balance and postural therapy where a large range of motion is necessary. As a result, some known systems may not be able to raise a patient from a wheelchair to a standing position, thereby restricting the use of the system to individuals who are not relegated to a wheelchair (e.g., those patients with minor to moderate gait impairments).

In some known static support systems, there may be a limitation on the amount of body-weight support. In such a system, the body-weight support cannot be modulated continuously, but rather is adjusted before the training session begins and remains substantially fixed at that level during training. Furthermore, the amount of unloading cannot be adjusted continuously since it requires the operator to manually adjust the system.

In other known systems, a patient may be supported by a passive trolley and rail system configured to support the patient while the patient physically drags the trolley along the overhead rail during gait therapy. While the trolley may have a relatively small mass, the patient may feel the presence of the mass. Accordingly, rather than being able to focus on balance, posture, and walking ability, the patient may have to compensate for the dynamics of the trolley. For example, on a smooth flat surface, if the subject stops abruptly, the trolley may continue to move forward and potentially destabilize the subject, thereby resulting in an abnormal compensatory gait strategy that could persist when the subject is removed from the device.

Some known over-ground gait support systems include a motorized trolley and rail system. In such known systems, the motorized trolley can be relatively bulky, thereby placing height restrictions on system. For example, in some known systems, there may be a maximum suitable height for effective support of a patient. In some known systems, a minimum ceiling height may be needed for the system to provide support for patients of varying height.

While the trolley is motorized and programmed to follow the subject's movement, the mechanics and overall system dynamics can result in significant delays in the response of the system such that the patient has the feeling that they are pulling a heavy, bulky trolley in order to move. Such system behavior may destabilize impaired patients during walking. Moreover, some known motorized systems include a large bundle of power cables and/or control cables to power and control the trolley. Such cable bundles present significant challenges in routing and management as well as reducing the travel of the trolley. For example, in some known systems, the cable bundle is arranged in a bellows configuration such that the cable bundle collapses as the trolley moves towards the power supply and expands as the trolley moves away from the power supply. In this manner, the travel of the trolley is limited by the space occupied by the collapsed cable bundle. In some instances, the bundle of cables can constitute a varying inertia that presents significant challenges in the performance of control systems and thus, reduces the efficacy of the overall motorized support system.

Thus, a need exists for improved apparatus and methods for supporting the body-weight of a patient during gate therapy.

SUMMARY

Apparatus and methods for supporting the body weight of a patient during gait therapy are described herein. In some embodiments, a method of using the body weight support system to provide body weight support during gait training includes defining a reference length of a tether included in the body weight support system. The tether is configured to be coupled to an attachment device worn by a user to couple the user to the body weight support system. The reference length of the tether is defined when the attachment device is in an initial position. A threshold length of the tether is defined. A first amount of body weight support is provided during the gait training as the user moves relative to a surface and the length of the tether is less than the threshold length of the tether. A second amount of body weight support is provided during the gait training as the user moves relative to the surface and the length of the tether is greater than the threshold length of the tether. The method further includes displaying data associated with the gait training on a display of an electronic device included in the body weight support system.

BRIEF DESCRIPTION OF THE DRAWINGS

FIG. 39 is a perspective view of a push cart included in the support system of FIG. 38.

FIG. 40 is a cross-sectional view of a connection member included in the push cart of FIG. 39, taken along the line 40-40.

FIGS. 64-69 are various screen shots of a display showing graphical representations of data associated with the use of a body weight support system while a patient uses a treadmill, according to an embodiment.

DETAILED DESCRIPTION

Figure 1:
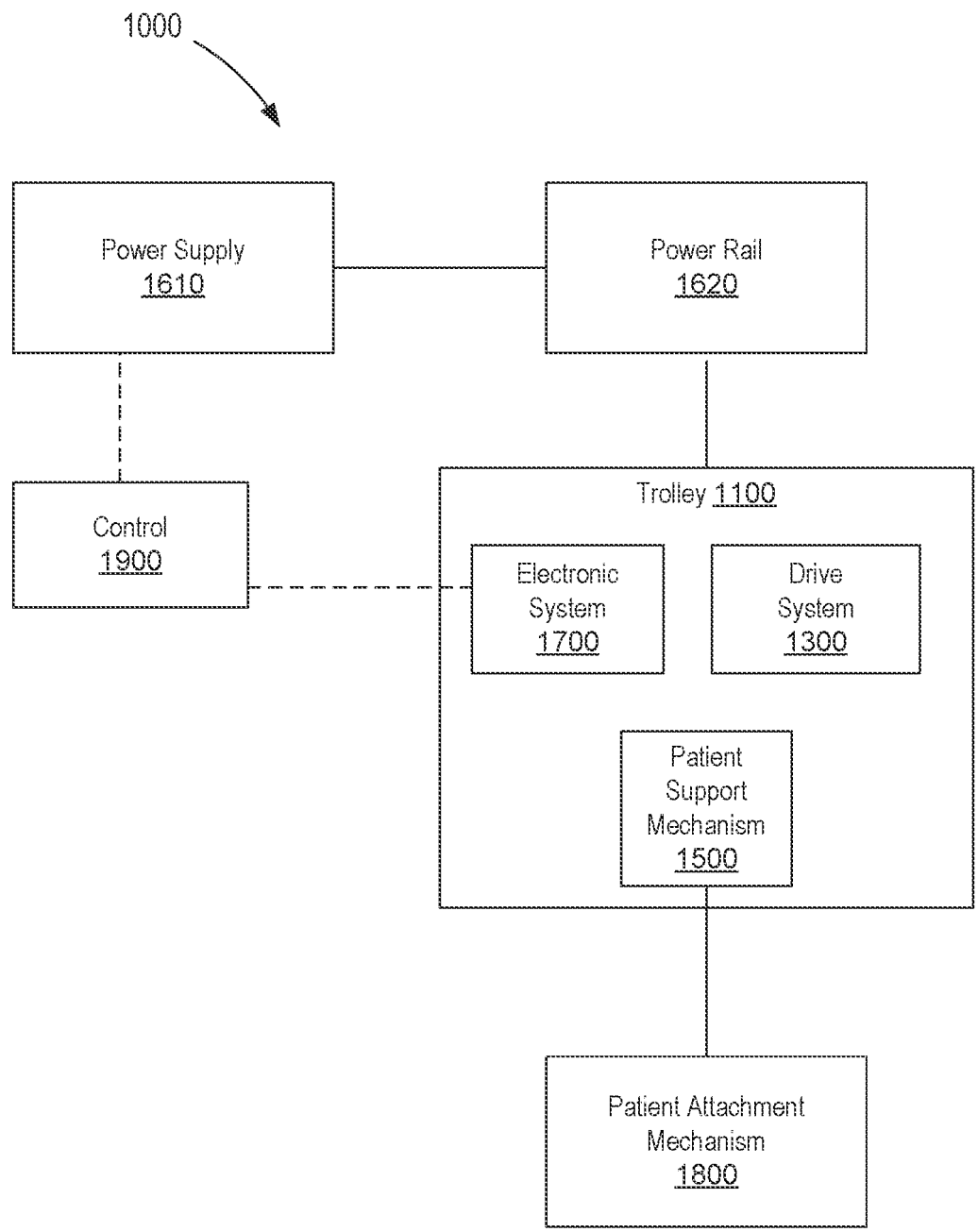
FIG. 1 is a schematic illustration of a body weight support system according to an embodiment.

In some embodiments, a method of using the body weight support system to provide body weight support during gait training includes defining a reference length of a tether included in the body weight support system. The tether is configured to be coupled to an attachment device worn by a user to couple the user to the body weight support system. The reference length of the tether is defined when the attachment device is in an initial position. A threshold length of the tether is defined. A first amount of body weight support is provided during the gait training as the user moves relative to a surface and the length of the tether is less than the threshold length of the tether. A second amount of body weight support is provided during the gait training as the user moves relative to the surface and the length of the tether is greater than the threshold length of the tether. The method further includes displaying data associated with the gait training on a display of an electronic device included in the body weight support system.

In some embodiments, a method of using a body weight support system to provide body weight support during gait training includes defining a reference length of a tether included in the body weight support system. The tether is configured to be coupled to an attachment device worn by a user to couple the user to the body weight support system. The reference length of the tether is defined when the attachment device is in an initial position. A first criterion associated with a change in a length of the tether is defined and a second criterion associated with a change in a length of the tether is defined. An amount of the body weight support to provide in response to the user falling during the gait training is defined. The method includes determining a fall has occurred based on the first criterion and the second criterion being satisfied and the amount of body weight support is provided in response to the first criterion and the second criterion being satisfied.

In some embodiments, a method of using a body weight support system to provide body weight support during gait training includes defining a reference length of a tether included in the body weight support system. The tether is configured to be coupled to an attachment device worn by a user to couple the user to the body weight support system. The reference length of the tether is defined when the attachment device is in an initial position. A threshold length of the tether is defined. The threshold length of the tether is associated with the user falling during the gait training. A threshold number of falls during the gait training is defined. The method includes providing a predetermined amount of body weight support during the gait training as the user moves relative to a surface and the number of falls is less than the threshold number of falls. The predetermined amount of body weight support to be provided to the user during the gait training is increased in response to the threshold number of falls being met. The method further includes displaying data associated with the gait training on a display of an electronic device included in the body weight support system.

In some embodiments, an apparatus includes a trolley having a drive mechanism, a patient support mechanism, and an electronic system. The drive mechanism is configured to movably suspend the trolley from a support track. The drive mechanism includes a first sensor configured to sense an operating condition of the drive mechanism. The patient support mechanism includes a tether and a second sensor. The second sensor is configured to sense an operating condition of the patient support mechanism. The tether can be operatively coupled to a patient such that the patient support mechanism supports the patient. The electronic system is configured update at least one operating condition of the drive mechanism or the patient support mechanism in response to receiving a signal from the first sensor and a signal from the second sensor such that the patient support mechanism supports a predetermined amount of the patient's body weight.

In some embodiments, an apparatus includes a drive mechanism, a patient support mechanism, and an electronic system. The drive mechanism is included in a trolley and is configured to suspend the trolley from a support track. The drive mechanism includes a first sensor configured to sense an operating condition of the drive mechanism. The patient support mechanism couples to the trolley and includes a tether and a second sensor. The tether is configured to be operatively coupled to a patient such that the patient support mechanism supports at least a portion of a weight of the patient. The second sensor is configured to sense an operating condition of the patient support mechanism. The electronic system is included in the trolley and has at least a processor and a memory. The processor is configured to define a gait characteristic of the patient based at least in part on a signal received from the first sensor and a signal received from the second sensor.

In some embodiments, a method includes receiving a signal associated with a first operating condition of at least one of a drive mechanism or a patient support mechanism. The patient support mechanism is coupled to an active trolley and configured to support a patient. The drive mechanism is coupled to the active trolley and configured to move the trolley along a support track in response to a movement of the patient. A signal associated with a second operating condition of the at least one of the drive mechanism or the patient support mechanism is received. A difference between the first operating condition and the second operating condition is determined. Based at least in part on the determining, a gait characteristic of the patient supported by the patient support mechanism is defined.

In some embodiments, a method includes receiving a first signal from a first sensor. The first signal is associated with an operating condition of a patient support mechanism included in a patient support system. The patient support mechanism includes a tether configured to tether a patient to the patient support mechanism so that the patient support system supports at least a portion of a weight of the patient. A second signal is received from a second sensor. The second signal is associated with an operating condition of a drive mechanism included in the patient support system. The drive mechanism is configured to (1) suspend the patient support system from a support track and (2) move along the support track in response to a movement of the patient. At least one gait characteristic associated with the movement of the patient is determined based at least in part on the operating condition of the patient support mechanism and the operating condition of the drive mechanism. A third signal is sent to an output device. The third signal is indicative of an instruction to output data associated with the at least one gait characteristic via the output device.

In some embodiments, a system includes a first trolley and a second trolley movably suspended from a support track. The first trolley includes a patient attachment mechanism configured to support a first patient. The first trolley is configured to move relative to the support track. The second trolley includes a patient attachment mechanism configured to support a second patient. The second trolley is configured to move relative to the support track such that the movement of the second trolley is independent of the movement of the first trolley. A collision management assembly is configured to be coupled to one of the first trolley and the second trolley. The collision management assembly includes a bumper that is configured to prevent the first trolley from directly contacting the second trolley.

In some embodiments, an apparatus includes a coupling portion and a trolley portion. The coupling portion is coupled to an end portion of a support track. The coupling portion includes a first member and a second member. The second member is maintained in a fixed position relative to the support track, while the first member is configured to move relative to the support track to transition the coupling portion between a first configuration and a second configuration. The trolley portion is movably suspended from the support track and is coupled to an end portion of the first member. The trolley portion includes a bumper that is configured to be placed in contact with a portion of a patient support system such that when the bumper is in contact with the portion of the patient support system and the patient support system moves along the support track towards the end portion, the trolley portion is moved from a first position to a second position relative to the support track. The first member of the coupling portion is moved relative to the second member of the coupling portion as the trolley portion is moved from the first position to the second position, thereby placing the coupling portion in the second configuration. The trolley portion and the coupling portion collectively limit movement of the patient support system towards the end portion of the support track when the coupling portion is in the second configuration.

In some embodiments, an apparatus includes a trolley, a patient attachment mechanism, and a tracking member. The trolley is movably suspended from a support track. The trolley includes an electronic system having an imaging device. The electronic system is configured to control a movement of the trolley along a length of the support track. The patient attachment mechanism is coupled to the trolley and is configured to support a patient as the patient moves from a first position to a second position. The tracking member is coupled to the patient attachment mechanism and is configured to be moved relative to the trolley from a first position, associated with the first position of the patient, to a second position, associated with the second position of the patient. The imaging device of the trolley is configured to capture an image of the tracking member in its first position and an image of the tracking member in its second position the electronic system is configured to control the movement of the trolley along the length of the support track based at least in part on the image of the tracking member in its first position and the image of the tracking member in its second position.

In some embodiments, a body weight support system includes a trolley, a power rail operative coupled to a power supply, and a patient attachment mechanism. The trolley can include a drive system, a control system, and a patient support system. The drive system is movably coupled to a support rail. At least a portion of the control system is physically and electrically coupled to the power rail. The patient support mechanism is at least temporarily coupled to the patient attachment mechanism. The control system can control at least a portion of the patient support mechanism based at least in part on a force applied to the patient attachment mechanism.

In some embodiments, a body weight support system includes a closed loop tack, a powered conductor coupled to the closed loop track, an actively controlled trolley, and a patient support assembly. The actively controlled trolley is movably suspended from the closed loop track and is electrically coupled to the powered conductor. The patient support assembly is coupled to the trolley and is configured to dynamically support a body weight of a patient.

In some embodiments, a body weight support device includes a housing, a drive element, a wheel assembly, and a patient support assembly. At least a portion of the drive element and at least portion of the wheel assembly is disposed within the housing. The patient support assembly is coupled to the drive element and is configured to dynamically support a body weight of a patient.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the value stated. For example, about 0.5 would include 0.45 and 0.55, about 10 would include 9 to 11, about 1000 would include 900 to 1100.

As used herein, the term "set" can refer to multiple features or a singular feature with multiple parts. For example, when referring to set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. For example, a monolithically constructed wall can include a set of detents can be said to form a set of walls. A set of walls can also be fabricated from multiple items that are produced separately and are later joined together (e.g., via a weld, an adhesive, or any suitable method).

As used herein, the term "parallel" generally describes a relationship between two geometric constructions (e.g., two lines, two planes, a line and a plane or the like) in which the two geometric constructions are substantially non-intersecting as they extend substantially to infinity. For example, as used herein, a line is said to be parallel to another line when the lines do not intersect as they extend to infinity. Similarly, when a planar surface (i.e., a two-dimensional surface) is said to be parallel to a line, every point along the line is spaced apart from the nearest portion of the surface by a substantially equal distance. Two geometric constructions are described herein as being "parallel" or "substantially parallel" to each other when they are nominally parallel to each other, such as for example, when they are parallel to each other within a tolerance. Such tolerances can include, for example, manufacturing tolerances, measurement tolerances or the like.

As used herein, the term "tension" is related to the internal forces (i.e., stress) within an object in response to an external force pulling the object in an axial direction. For example, an object with a mass being hung from a rope at one end and fixedly attached to a support at the other end exerts a force to place the rope in tension. The stress within an object in tension can be characterized in terms of the cross-sectional area of the object. For example, less stress is applied to an object having a cross-sectional area greater than another object having a smaller cross-sectional area. The maximum stress exerted on an object in tension prior to plastic deformation (e.g., permanent deformation such as, for example, necking and/or the like) is characterized by the object's tensile strength. The tensile strength is an intensive property of (i.e., is intrinsic to) the constituent material. Thus, the maximum amount of stress of an object in tension can be increased or decreased by forming the object from a material with a greater tensile strength or lesser tensile strength, respectively.

As used herein, the term "kinematics" describes the motion of a point, object, or system of objects without considering a cause of the motion. For example, the kinematics of an object can describe a translational motion, a rotational motion, or a combination of both translational motion and rotational motion. When considering the kinematics of a system of objects, known mathematical equations can be used to describe to the motion of an object relative to a plane or set of planes, an axis or set of axes, and/or relative to one or more other objects included in the system of objects.

As used herein, the terms "feedback", "feedback system", and/or "feedback loop" relate to a system wherein past or present characteristics influence current or future actions. For example, a thermostat is said to be a feedback system wherein the state of the thermostat (e.g., in an "on" configuration or an "off" configuration) is dependent on a temperature being fed back to the thermostat. Feedback systems can include a control scheme such as, for example, a proportional-integral-derivative (PID) controller. Expanding further, an output of some feedback systems can be described mathematically by the sum of a proportional term, an integral term, and a derivative term. PID controllers are often implemented in one or more electronic devices. In such controllers, the proportional term, the integral term, and/or the derivative term can be actively "tuned" to alter characteristics of the feedback system.

Electronic devices often implement feedback systems to actively control the kinematics of mechanical systems in order to achieve and/or maintain a desired system state. For example, a feedback system can be implemented to control a force within a system (e.g., a mass-spring system and/or the like) by changing the kinematics and/or the position of one or more components relative to any other components included in the system. Expanding further, the feedback system can determine current and/or past states (e.g., position, velocity, acceleration, force, torque, tension, electrical power, etc.) of one or more components included in the mechanical system and return the past and/or current state values to, for example, a PID control scheme. In some instances, an electronic device can implement any suitable numerical method or any combination thereof (e.g., Newton's method, Gaussian elimination, Euler's method, LU decomposition, etc.). Thus, based on the past and/or current state of the one or more components, the mechanical system can be actively changed to achieve a desired system state.

FIG. 1 is a schematic illustration of a body weight support system 1000 according to an embodiment. The body weight support system 1000 (also referred to herein as "support system") includes at least a trolley 1100, a patient attachment mechanism 1800 (also referred to herein as "attachment mechanism"), a power supply 1610, a powered conductor or rail 1620, and a control 1900. The support system 1000 can be used, for example, in intensive gait therapy to support patients with walking deficiencies brought on by neurological injuries such as stroke, spinal cord injury, traumatic brain injury, or the like. In such instances, the support system 1000 can be used to support at least a portion of the patient's body weight to facilitate the gait therapy. In other instances, the support system 1000 can be used to simulate, for example, low gravity scenarios for the training of astronauts or the like. In some embodiments, the support system 1000 can be used to support a patient over a treadmill or stairs instead of or in addition to supporting a patient over and across level ground.

The trolley 1100 included in the support system 1000 can be any suitable shape, size, or configuration and can include one or more systems, mechanisms, assemblies, or subassemblies (not shown in FIG. 1) that can perform any suitable function associated with, for example, supporting at least a portion of the body weight of a patient. The trolley 1100 can include at least a drive system 1300, a patient support mechanism 1500, and an electronic system 1700. In some embodiments, the drive system 1300 can be movably coupled to a support track (not shown in FIG. 1) and configured to move (e.g., slide, roll, or otherwise advance) along a length of the support track. The support track can be any suitable shape, size, or configuration. For example, in some embodiments, the support track can be substantially linear or curvilinear. In other embodiments, the support track can be a closed loop such as, for example, circular, oval, oblong, rectangular (e.g., with or without rounded corners), or any other suitable shape. In some embodiments, the support track can be a beam (e.g., an I-beam or the like) included in a roof or ceiling structure from which at least a portion of the trolley 1100 can "hang" (e.g., at least a portion of the trolley 1100 can extend away from the beam). In other embodiments, at least one end portion of the support track can be coupled to a vertical wall or the like. In still other embodiments, the support track can be included in a free-standing structure such as, for example, a gantry or an A-frame.

The drive system 1300 of the trolley 1100 can include one or more wheels configured to roll along a surface of the support track such that the weight of the trolley 1100 and a portion of the weight of a patient utilizing the support system 1000 (e.g., the patient is temporarily coupled to the trolley 1100 via the patient attachment mechanism 1800, as described in further detail herein) are supported by the support track. Similarly stated, one or more wheels of the drive system 1300 can be disposed adjacent to and on top of a horizontal surface of the support track; thus, the trolley 1100 can be "hung" from or suspended from the support track. In other embodiments, the surface from which the trolley 1100 is hung need not be horizontal. For example, at least a portion of the support track can define a decline (and/or an incline) wherein a first end portion of the support track is disposed at a first height and a second end portion of the support track is disposed at a second height, different from the first height. In such embodiments, the trolley 1100 can be hung from a surface of the support track that is parallel to a longitudinal centerline (not shown) of the trolley 1100. In such embodiments, the trolley can be used to support a patient moving across an inclined/declined surface, up or down stairs, etc.

In some embodiments, the trolley 1100 can have or define a relatively small profile (e.g., height) such that the space between a surface of the trolley 1100 and a portion of the patient can be sufficiently large to allow the patient to move between a seated position to a standing position such as, for example, when a patient rises out of a wheelchair. Furthermore, with the trolley 1100 being hung from the support track, the weight of the trolley 1100 and the weight of the patient utilizing the support system can increase the friction (e.g., traction) between the one or more wheels of the drive system and the surface of the support track from which the trolley 1100 is hung. Thus, the one or more wheels of the drive system 1300 can roll along the surface of the support track without substantially slipping.

In some embodiments, the trolley 1100 can be motorized. For example, in some embodiments, the trolley 1100 can include one or more motors configured to power (e.g., drive, rotate, spin, engage, activate, etc.) the drive system 1300. In some embodiments, the motor(s) can be configured to rotate the wheels of the drive system 1300 at any suitable rate and/or any suitable direction (e.g., forward or reverse) such that the trolley 1100 can pace a patient utilizing the support system 1000, as described in further detail herein. In some embodiments, the electronic system 1700 and/or the control 1900 can be operatively coupled (e.g., electrically connected) to the one or more motors such that the electronic system 1700 and/or the control 1900 can send an electronic signal associated with operating the motor(s). In some embodiments, the motor(s) can include a clutch, a brake, or the like configured to substantially lock the motor(s) in response to a power failure or the like. Similarly stated, the motor(s) can be placed in a locked configuration to limit movement of the trolley 1100 (e.g., limit movement of the drive system 1300 and/or the patient support mechanism 1500) in response to a power failure (e.g., a partial power failure and/or a total power failure).

The patient support mechanism 1500 (also referred to herein as "support mechanism") can be any suitable configuration and can be at least temporarily coupled to the attachment mechanism 1800. For example, in some embodiments, the support mechanism 1500 can include a tether that can be temporarily coupled to a coupling portion of the attachment mechanism 1800. Moreover, the attachment mechanism 1800 can further include a patient coupling portion (not shown in FIG. 1) configured to receive a portion of a harness or the like worn by or coupled to the patient. Thus, the attachment mechanism 1800 and the support mechanism 1500 can support a portion of the body weight of a patient and temporarily couple the patient to the trolley 1100.

In some embodiments, an end portion of the tether can be coupled to, for example, a winch. In such embodiments, the winch can include a motor that can rotate a drum to coil or uncoil the tether. Similarly stated, the tether can be wrapped around the drum and the motor can rotate the drum in a first direction to wrap more of the tether around the drum and can rotate the drum in a second direction, opposite the first direction, to unwrap more of the tether from around the drum. In some embodiments, the support mechanism 1500 can include one or more pulleys that can engage the tether such that the support mechanism 1500 gains a mechanical advantage. Similarly stated, the pulleys can be arranged such that the force exerted by the winch to coil or uncoil the tether around the drum while a patient is coupled to the attachment mechanism 1800 is reduced.

The horizontal drive system/motor that is configured to allow for movement of the trolley along the track, and the vertical drive system configured to move to control the tether can be simultaneously controlled and operated or not. For example, when a patient is walking over a treadmill, there is little or no horizontal movement, but the vertical (weight bearing) drive system is operational to compensate for the changes during the gait, falls, etc.

In some embodiments, the pulley system can include at least one pulley that is configured to move (e.g., pivot, translate, swing, or the like). For example, the pulley can be included in or coupled to a cam mechanism (not shown) that is configured to define a range of motion of the pulley. In such embodiments, the movement of the at least one pulley can coincide and/or be caused by a force exerted on the attachment mechanism 1800. For example, in some instances, the patient can move relative to the trolley 1100 such that the force exerted on the tether by the weight of the patient is changed (e.g., increased or decreased). In such instances, the pulley can be moved according to the change in the force such that the tension within the tether is substantially unchanged. Moreover, with the pulley included in or coupled to the cam mechanism, the movement of the pulley can move the cam through a predetermined range of motion. In some embodiments, the electronic system 1700 can include a sensor or encoder operatively coupled to the pulley and/or the cam that is configured to determine the amount of movement of the pulley and/or the cam. In this manner, the electronic system 1700 can send a signal to the motor included in the winch associated with coiling or uncoiling the tether around the drum in accordance with the movement of the pulley. For example, the pulley can be moved in a first direction in response to an increase in force exerted on the tether and the electronic system 1700 can send a signal to the motor of the winch associated with rotating the drum to uncoil a portion of the tether from the drum. Conversely, the pulley can be moved in a second direction, opposite the first direction, in response to a decrease in force exerted on the tether and the electronic system 1700 can send a signal to the motor of the winch associated with rotating the drum to coil a portion of the tether about the drum. Thus, the support mechanism 1500 can be configured to exert a reaction force in response to the force exerted by the patient such that the portion of the body weight supported by the support system 1000 remains substantially unchanged. Moreover, by actively supporting the portion of the body weight of the patient, the support system 1000 can limit the likelihood and/or the magnitude of a fall of the patient supported by the support system 1000. Similarly stated, the support mechanism 1500 and the electronic system 1700 can respond to a change in force exerted on the tether in a relatively short amount of time (e.g., much less than a second) to actively limit the magnitude of the fall of the patient.

As described above, the electronic system 1700 included in the trolley 1100 can control at least a portion of the trolley 1100. The electronic system 1700 includes at least a processor and a memory. The memory can be, for example, a random access memory (RAM), a memory buffer, a hard drive, a read-only memory (ROM), an erasable programmable read-only memory (EPROM), and/or the like. In some embodiments, the memory stores instructions to cause the processor to execute modules, processes, and/or functions associated with controlling one or more mechanical and/or electrical systems included in the patient support system 1000, as described above. In some embodiments, control signals are delivered through the powered rail using, for example, a broadband over power-line (BOP) configuration.

The processor of the electronic device can be any suitable processing device configured to run or execute a set of instructions or code. For example, the processor can be a general-purpose processor (GPU), a central processing unit (CPU), an accelerated processing unit (APU), and/or the like. The processor can be configured to run or execute a set of instructions or code stored in the memory associated with controlling one or more mechanical and/or electrical systems included in a patient support system 1000. For example, the processor can run or execute a set of instructions or code associated with controlling one or more motors, sensors, communication devices, encoders, or the like, as described above. More specifically, the processor can execute a set of instructions in response to receiving a signal from one or more sensors and/or encoders associated with a portion of the drive system 1300 and/or the support mechanism 1500. Similarly stated, the processor can be configured to execute a set of instructions associated with a feedback loop (e.g., based on a proportional-integral-derivative (PID) control method) wherein the electronic system 1700 can control the subsequent action of the drive system 1300 and/or the support system 1500 based at least in part on current and/or previous data (e.g., position, velocity, force, acceleration, angle of the tether, or the like) received from the drive system 1300 and/or the support system 1500, as described in further detail herein.

In some embodiments, the electronic system 1700 can include a communication device (not shown in FIG. 1) that can be in communication with the control 1900. For example, in some embodiments, the communication device can include one or more network interface devices (e.g., a network interface card). The communication device can be configured to transmit data over a wired and/or wireless network (not shown in FIG. 1) associated with sending data to and/or receiving data from the control 1900. The control 1900 can be any suitable device or module (e.g., hardware module or software module stored in the memory and executed in the process). For example, in some embodiments, the control 1900 can be an electronic device that includes at least a processor and a memory (not shown in FIG. 1) and is configured to run, for example, a personal computer application, a mobile application, a web page, and/or the like. In this manner, a user can engage the control 1900 to establish a set of system parameters associated with the support system 1000, as described in further detail herein. In some embodiments, the control 1900 can be implemented as a handheld controller.

In some embodiments, control of the trolley 1100 can be accomplished using one or more controllers. In embodiments in which multiple controllers are utilized (e.g., a personal computer control and a handheld control), only one controller can be used at a time. In other embodiments, one of the controllers (e.g., the handheld controller) can override the personal computer controller. In other embodiments, a user can designate which controller is utilized by actuating the relevant controller. In other words, the user either can take control using a controller or can pass control to the other controller by actuating the controller.

In some embodiments, the patient support system 1000 is configured to improve gait and stability rehabilitation training by adding visual and audio feedback to a gait and stability assistance device. The trolley 1100 coordinates the feedback with heuristic patient data from past training sessions, and stores the data for each therapy/training As shown in FIG. 1, the trolley 1100 is operatively coupled to the power rail 1620. The power rail 1620 is further coupled to the power source 1610 that is configured to provide a flow of electrical current (e.g., electrical power) to the power rail 1620. More specifically, the power rail 1620 can include any suitable transformer, converter, conditioner, capacitor, resistor, insulator, and/or the like (not shown in FIG. 1) such that the power rail 1620 can receive the flow of electrical current from the power source 1610 and transfer at least a portion of the flow of electrical current to the trolley 1100. The power rail 1620 can include one or more electrical conductors to deliver, for example, single or multiphase electrical power to one or more trolleys 1100. For example, in some embodiments, the power rail 1620 is a substantially tubular rail configured to receive a conductive portion of the electronic system 1600 of the trolley 1100. In such embodiments, the power rail 1620 can include one or more conductive surfaces disposed within an inner portion of the tubular rail along which a conductive member of the electronic system 1700 can move (e.g., slide, roll, or otherwise advance). In other embodiments, the power rail 1620 can be and/or can have a substantially open configuration (e.g., is not substantially tubular). In such embodiments, the power rail 1620 can include one or more conductive members disposed on any suitable surface or combination of surfaces of the power rail 1620.

The power rail 1620 is configured to transmit a flow of electrical current from the power source 1610 to the electronic system 1700 of the trolley 1100, as described in further detail herein. The power rail 1620 can be any suitable shape, size, or configuration. For example, the power rail 1620 can extend in a similar shape as the support track (not shown in FIG. 1) and can be arranged such that the power rail 1620 is substantially parallel to the support track. In this manner, the trolley 1100 can advance along a length of the support track while remaining in electrical contact with the power rail 1620. Furthermore, the arrangement of the power rail 1620 and the trolley 1100 is such that movement of the trolley 1100 along the length of the support track is not hindered or limited by a bundle of cables, as described above with reference to known support systems. In other embodiments, the power rail 1620 and/or a portion thereof can be coupled to, disposed along, and/or otherwise at least partially integrated with the support track or a portion thereof. In still other embodiments, the power rail 1620 can be and/or can have a telescoping configuration in which the power rail 1620 extends, for example, from a central power source to the trolley 1100.

Although described above as being coupled to a power rail 1620, in some embodiments, the trolley 1100 can be battery powered. In such embodiments, the trolley 1100 can include one or more batteries or a battery system that is suitable for providing the trolley 1100 with a flow of electrical current. In such embodiments, the battery or batteries can be configured to provide electric power in addition to and/or instead of electric power received from the power rail 1620. In some embodiments, the battery or batteries included in such embodiments can be rechargeable. For example, at least a portion of the flow of electric power or electric current received from the power rail 1620 can be delivered to the battery or batteries (e.g., to charge or re-charge the battery). In some embodiments, the power rail 1620 and/or support track can include one or more charging station(s) located in certain location(s) on or along the support track. In such embodiments, the trolley 1100 can, for example, automatically dock to the charging station(s) according to a predetermined or desired algorithm, schedule, and/or condition. For example, the trolley may travel to and dock with such a charging station when a power level of one or more batteries is below predetermined and/or desired level or during the break periods (for example when the system is not in use for a given time, at night, or at predetermined times).

While the trolley 1100 is described above as receiving electric power from one or more of the power rail 1620 or a battery or battery system, in some embodiments, the support system 1000 can include an uninterruptible power supply (or any other suitable energy capacitor or energy storage device) that can provide electric power to at least a portion of the support system 1000. For example, in some embodiments, an uninterruptible power supply (UPS) can be included to provide a backup to the power supply 1610 and/or one or more batteries included in the trolley 1100. That is to say, the UPS can be electrically connected between the power source 1610 and the power rail 1620 or the power source 1610 and the trolley 1100. In other embodiments, the UPS can be configured to provide electric power to the power supply 1610, for example, in response to a power grid failure and/or interruption. That is to say, the UPS can be electrically connected between the power grid and the power source 1610. In still other embodiments, the trolley 1100 can include a UPS that can provide electric power to the trolley 1100 if a flow of electric power from the power rail 1620 or from one or more batteries is interrupted or otherwise stops. In some embodiments, the support system 1000 can include a UPS configured to provide primary or backup power to the trolley 1100 and one or more additional devices included in the support system 1000 (e.g., a secondary training device such as a treadmill, one or more compute devices such as a personal computer, server, etc., and/or any other suitable device).

In some embodiments, electric power and/or energy can be transferred from the power rail 1620 (or one or more portions of the power rail 1620) to the trolley 1100 via any suitable mode of transfer. For example, in some embodiments, a conductive member of the trolley 1100 (e.g., a collector or the like) can be in physical and/or electrical contact with a conductor or conductive portion of the power rail 1620. In other embodiments, the trolley 1100 can include one or more induction coils along which a flow of electric current is induced in response to an alternating electromagnetic field generated by or along at least a portion the power rail 1620 and/or a conductive portion or surface of the track 1050. In such embodiments, electric power received via induction can be used to provide electric power for the trolley 1100 and/or can be used to, for example, charge one or more batteries of the trolley 1100.

Moreover, the control 1900 can also be operatively coupled to the power supply 1610 and can be configured to control the amount of power delivered to the power rail 1620 and/or the trolley 1100. For example, the control 1900 can be configured to begin a flow of electrical current from the power supply 1610 to the power rail 1620 to turn on or power up the support system 1000. Conversely, the control 1900 can be configured to stop a flow of electrical current from the power supply 1610 to the power rail 1620 to turn off or power down the support system 1000.

While the control 1900 is shown in FIG. 1 as being independent from and operatively coupled to the trolley 1100, in some embodiments, the control 1900 can be included in the electronic system 1700 of the trolley 1100. For example, in some embodiments, the control 1900 can be a hardware module and/or a software module that can be executed by the processor of the electronic system 1700. In such embodiments, the electronic system 1700 can include a user interface (e.g., a touch screen and/or one or more dials, buttons, switches, toggles, or the like). Thus, a user (e.g., a physical therapist, a doctor, a nurse, a technician, etc.) can engage the user interface associated with the control 1900 to establish a set of system parameters for the support system 1000.

Although not shown in FIG. 1, in some embodiments, more than one trolley 1100 can be coupled to the same support track. In such embodiments, the trolleys 1100 hung from the support track can include, for example, sensors (e.g., ultrasonic proximity sensors and/or the like) that can send a signal to the electronic system 1700 associated with the proximity of one or more trolleys 1100 relative to a specific trolley 1100. In this manner, the electronic system 1700 of the trolleys 1100 can control, for example, a motor included in the drive system 1300 to prevent collision of the trolleys 1100. Thus, the support system 1000 can be used to support more than one patient (e.g., a number of patients corresponding to a number of trolleys 1100 disposed about the support track) while keeping the patients at a desired distance from one another.

In some embodiments, the support system is configured to provide feedback to a patient during use. In some embodiments, a laser or culminated light source is coupled to the trolley 1100 to create a light path for a patient to follow during a session. The light path allows the patient to look ahead or look at their feet while attempting to train their brain to properly control the leg/foot/hip motion. In some embodiments, a second light source is configured to illuminate a "target" location at which the patient can aim to plant their foot in a proper location. In some embodiments, the size of the target can be varied depending upon the dexterity of the user. In other words, for a user with greater muscle control, the target can be smaller. The light path and target location can be modified using a user interface as described in greater detail herein.

In some embodiments, audible feedback is provided to the patient when the patient's gate is incorrect. In some embodiments, audible feedback can be provided when the patient begins to fall. Different audible tones can be provided for different issues/purposes.

In some embodiments, a CCD camera interface is configured for video monitoring for future analysis and can be correlated to sensed rope position, speed, tension, etc. In some embodiments, monitors can be coupled to a patient's body to monitor muscle usage (e.g., leg muscles, torso muscles, etc.). Such information can be wirelessly transmitted to the electronic system 1700 and coordinated in the feedback provided to the patient during and after a therapy/rehabilitation session. Said another way, all of the data collected by the various sensors, cameras, etc. can be coordinated to provided dynamic, real-time feedback and/or post-session feedback.

Figure 2:
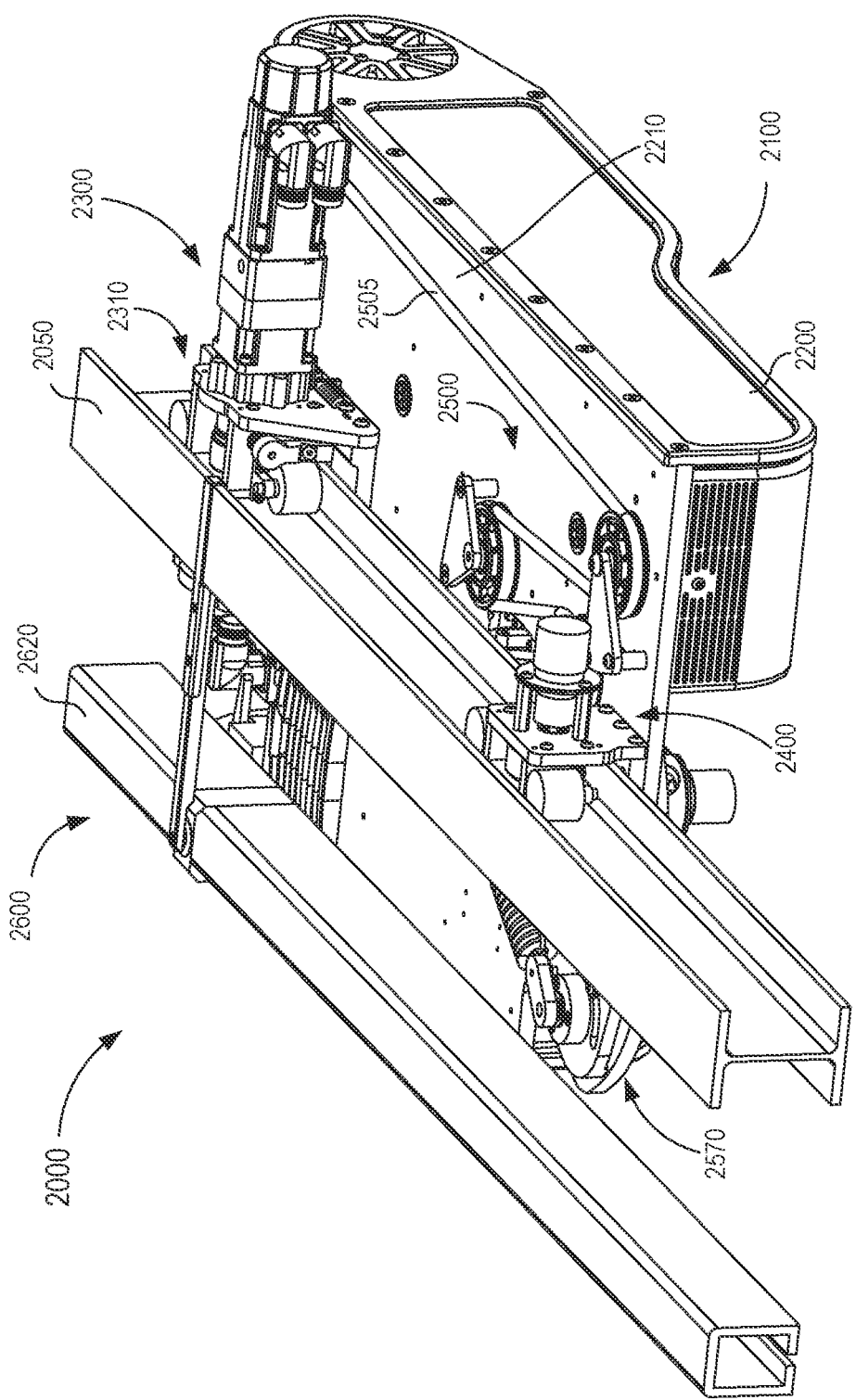
FIGS. 2 and 3 are perspective views of a body weight support system according to an embodiment.
Figure 3:
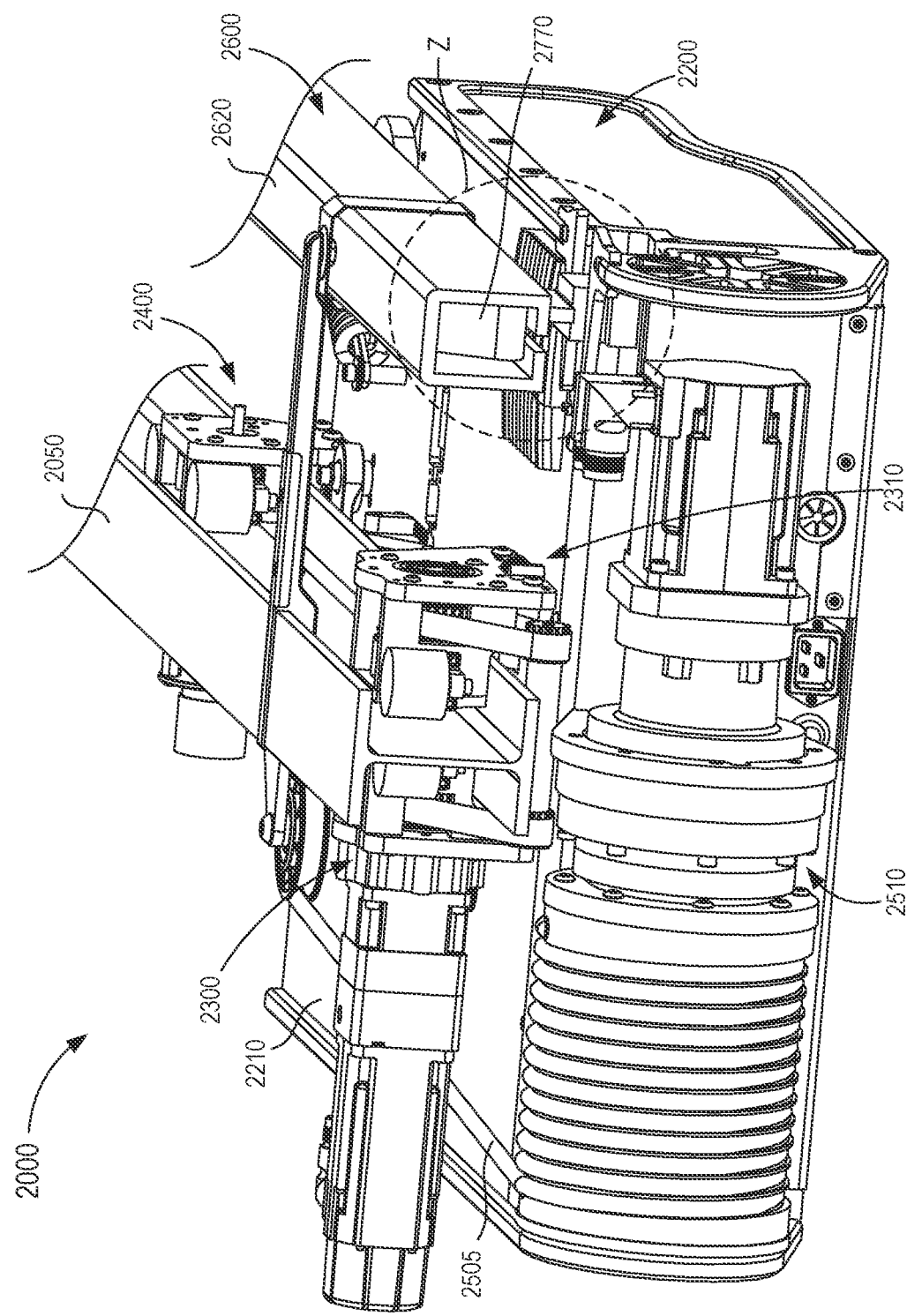
Figure 4:
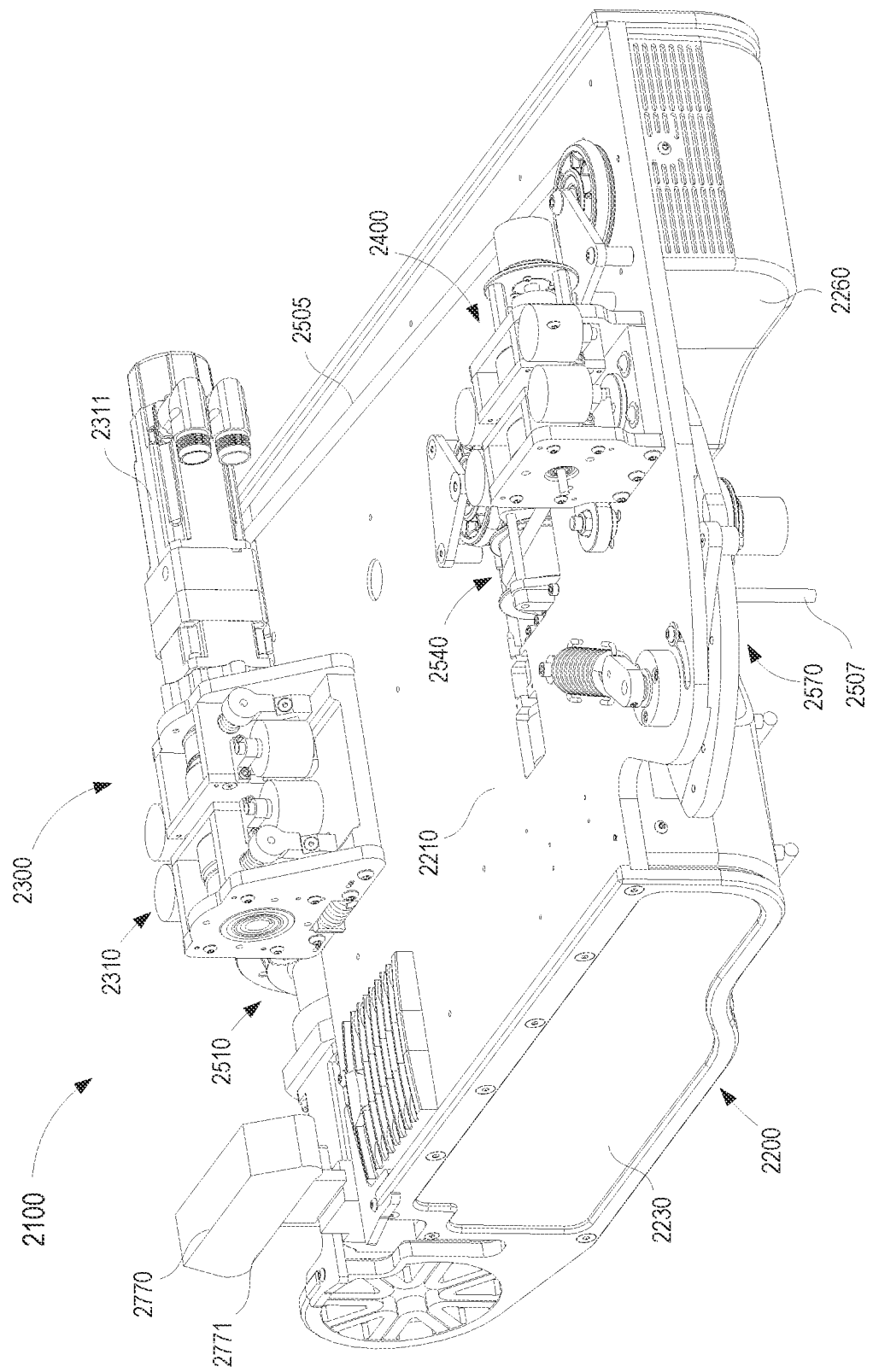
FIGS. 4-7 are various perspective views of a trolley included in the body weight support system of FIG. 2.
Figure 5:
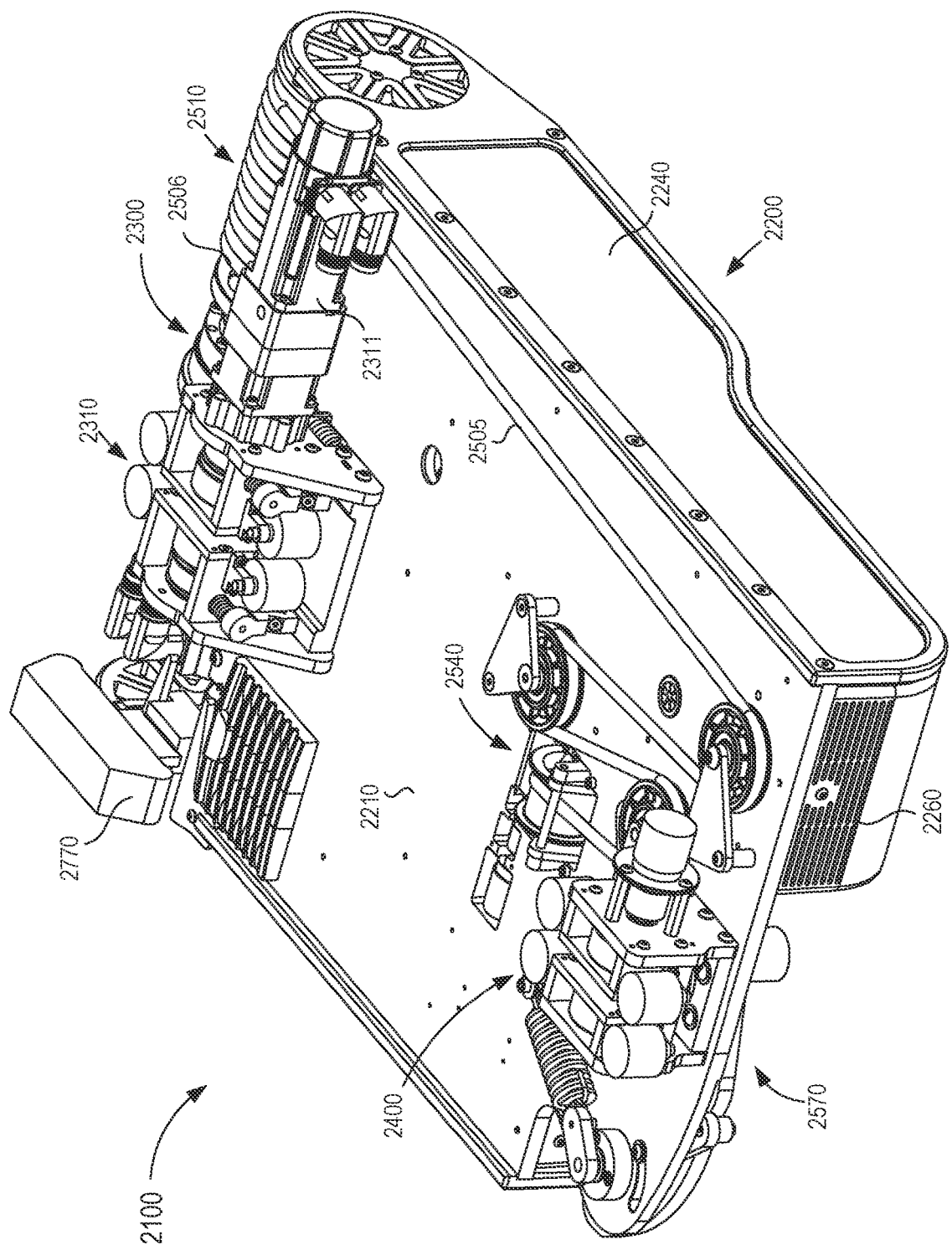
Figure 6:
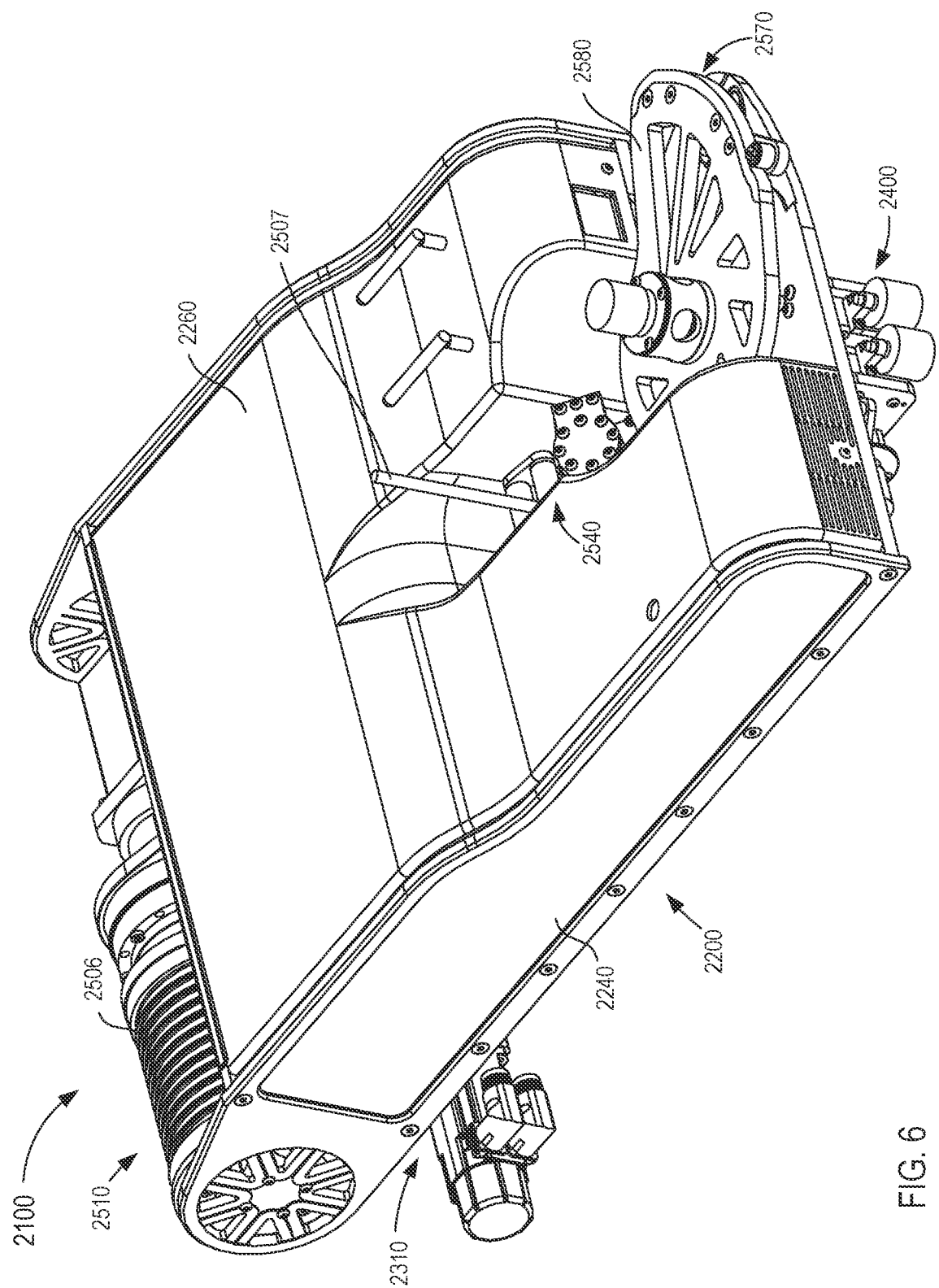
Figure 7:
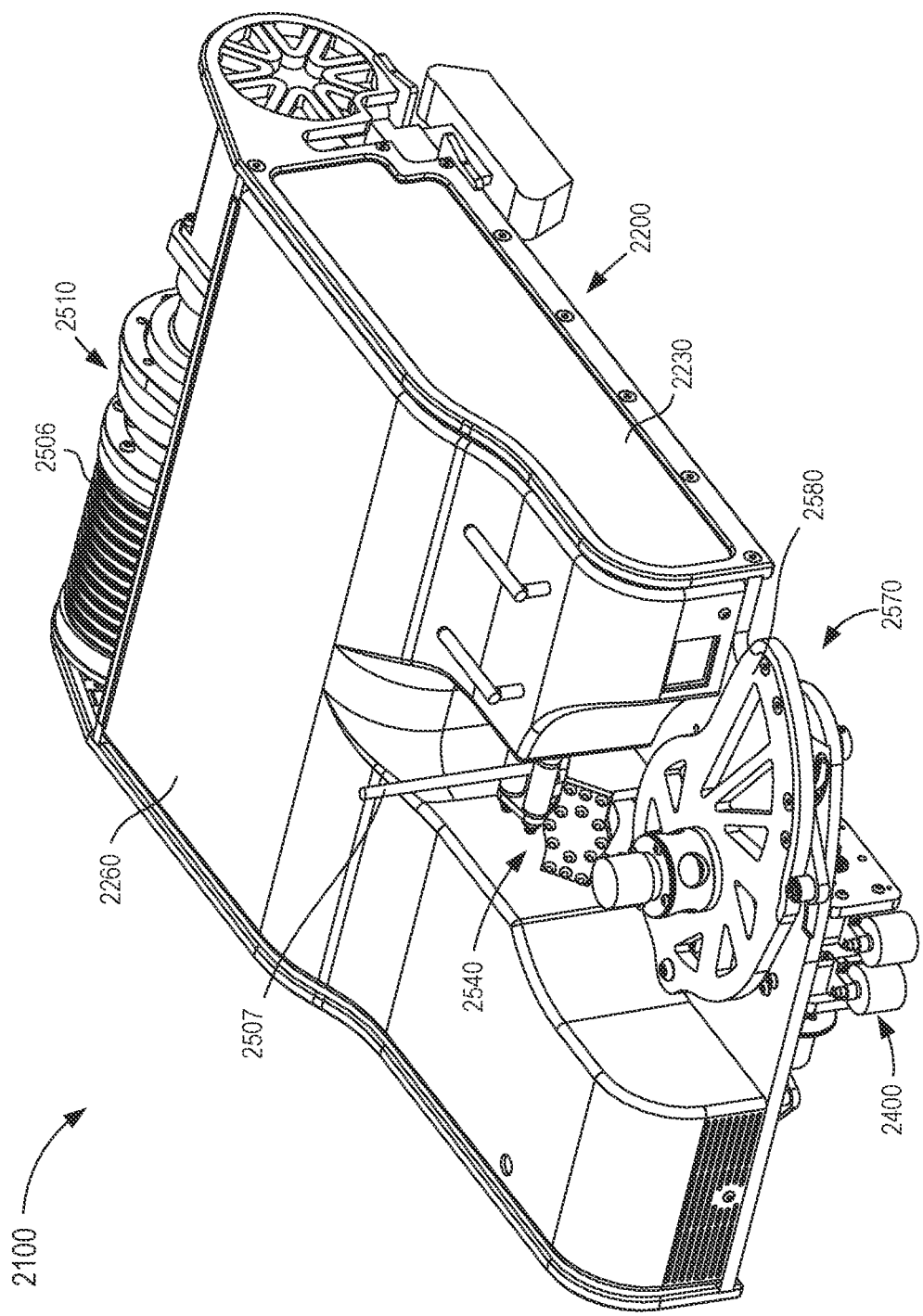

FIGS. 2-33 illustrate a body weight support system 2000 according to an embodiment. The body weight support system 2000 (also referred to herein as "support system") can be used to support a portion of a patient's body weight, for example, during gait therapy or the like. FIGS. 2 and 3 are perspective views of the support system 2000. The support system 2000 includes a trolley 2100, a power system 2600, and a patient attachment mechanism 2800 (see e.g., FIG. 34). As shown in FIGS. 2 and 3, the trolley 2100 is movably coupled to a support track 2050 that is configured to support the weight of the trolley 2100 and the weight of the patient utilizing the support system 2000. Although the support track 2050 is shown as having an I-shape, the support track 2050 can be any suitable shape. Furthermore, while the support track 2050 is shown as being substantially linear, the support track 2050 can extend in a curvilinear direction. In other embodiments, the support track 2050 can be arranged in a closed loop such as, for example, circular, oval, oblong, square, or the like. As described in further detail herein, the power system 2600 can include a power rail 2620 that extends substantially parallel to the support track 2050 and is at least electrically coupled to the trolley 2100 to transfer a flow of electrical current from a power source (not shown in FIGS. 2-32) to the trolley 2100.

FIGS. 4-7 are perspective views of the trolley 2100. The trolley 2100 can be any suitable shape, size, or configuration. For example, the trolley 2100 can suspended from the support track 2050 (as described in further detail herein) and can have or define a relatively small profile (e.g., height) such that the space between the trolley 2100 and a patient can be maximized. In this manner, the support system 2000 can be used to support patients of varying heights as well as supporting a patient rising from a sitting position to a standing position as is common in assisting patient at least partially relegated to a wheelchair. The trolley 2100 includes a housing 2200 (see e.g., FIGS. 8 and 9), an electronic system 2700 (see e.g., FIGS. 10 and 11), a drive system 2300 (see e.g., FIGS. 12-26), and a patient support mechanism 2500 (see e.g., FIGS. 27-33).

Figure 8:
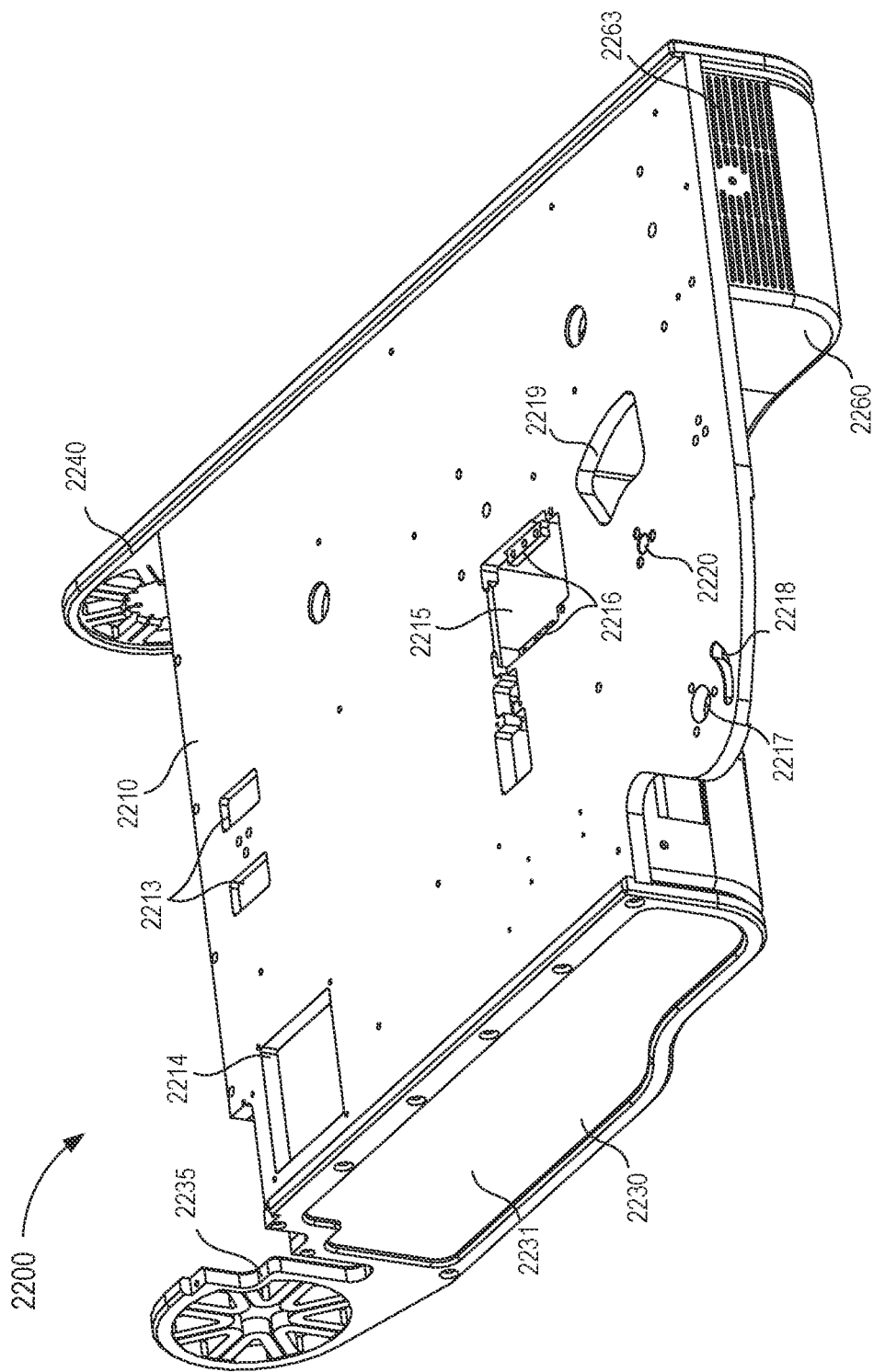
FIG. 8 is a top perspective view of a housing included in the trolley of FIG. 4.
Figure 9:
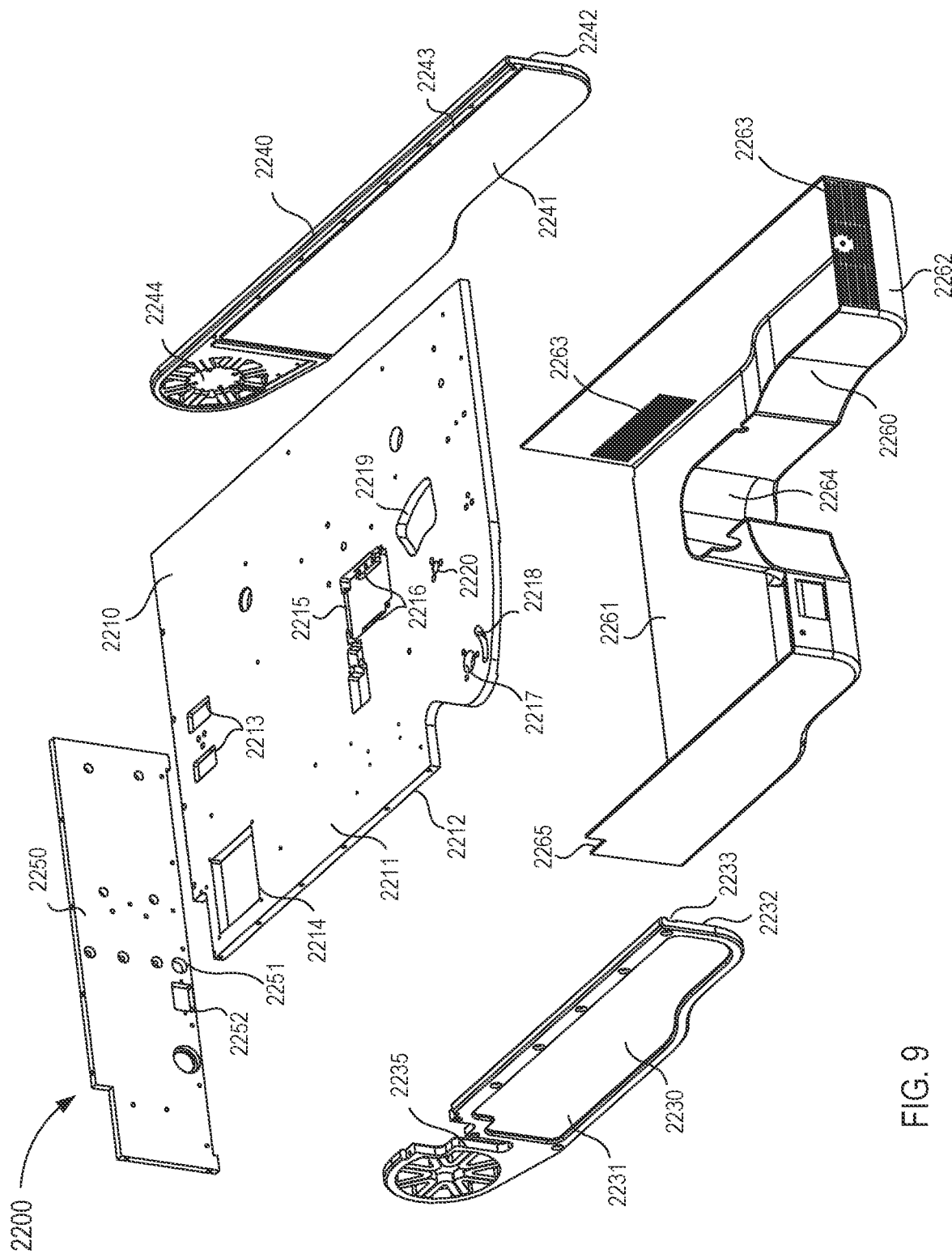
FIG. 9 is an exploded view of the housing of FIG. 8.

As shown in FIGS. 8 and 9 the housing 2200 includes a base 2210, a first side member 2230, a second side member 2240, a third side member 2250, and a cover 2260. The housing 2200 is configured to enclose and/or cover at least a portion of the electronic system 2700, as described in further detail herein. As shown in FIG. 9, the base 2210 has a first side 2211 and a second side 2212. The base 2210 defines a set of drive mechanism openings 2213, a fan opening 2214, a guide mechanism opening 2215, a bias mechanism opening 2217, a guide member opening 2218, and a cam pulley opening 2219, a cam pivot opening 2220. As described in further detail herein, the drive mechanism openings 2213 receive at least a portion of a first drive assembly 2310 included in the drive mechanism 2300 such that a set of wheels included therein can rotate without contacting the base 2210. The fan opening 2214 is receives a portion of a fan 2740 included in the electronic system 2700. More specifically, a portion of the fan 2740 can extend through the opening such that the fan can remove heat from within the housing 2200 produced by the electronic system 2700. The guide mechanism opening 2215 receives a portion of a guide mechanism 2540 included in the patient support mechanism 2500 (also referred to herein as "support mechanism"). More specifically, the base 2210 includes a set of mounting tabs 2216 configured to extend from a surface of the base 2210 that defines the guide mechanism opening 2215. In this manner, the guide mechanism 2540 can be coupled to the mounting tabs 2216. The bias mechanism opening 2217, the guide member opening 2218, the cam pulley opening 2219, and the cam pivot opening 2220 can each movably receive a portion of a cam mechanism 2570 included in the support mechanism 2500, as described in further detail herein.

The first side member 2230 has a first side 2231 and a second side 2232. The second side 2232 defines a slot 2233 that receives a portion of the base 2210 to couple the base 2210 thereto. The first side member 2230 also includes a mounting portion 2235 that is coupled to a portion of a collector 2770 included in the electronic system 2700, as described in further detail herein. The second side member 2240 has a first side 2241 and a second side 2242. The second side 2242 defines a slot 2243 that receives a portion of the base 2210 to couple the base 2210 thereto. The second side 2242 also includes a recessed portion 2244 that is coupled to a portion of a winch assembly 2510 included in the support mechanism 2500. The third side member 2250 is coupled to the first side member 2230, the second side member 2240, and the base 2210 and defines a light opening 2251 that receives an indicator light and a power outlet opening that receives a power outlet module.

The cover 2260 is disposed adjacent to the second side 2212 of the base 2210. More specifically, the cover 2260 can be removably coupled to the second side 2212 of the base 2210 such that the portion of the electronic system 2700 enclosed therein can be accessed. The cover 2260 has a first end portion 2261 and a second end portion 2262. The first end portion 2261 is open-ended and defines a notch 2265 configured to receive a portion of the collector 2770, as described in further detail herein. The second end portion 2262 of the cover 2260 is substantially enclosed and is configured to include a recessed region 2264. In this manner, a portion of the support mechanism 2500 can extend into and/or through the recessed region 2264 to couple to the patient attachment mechanism 2800, as described in further detail herein. The cover 2260 also defines a set of vents 2263 that can be arranged to provide a flow of air into the area enclosed by the cover 2260 such that at least a portion of the electronic system 2700 disposed therein can be cooled.

Figure 10:
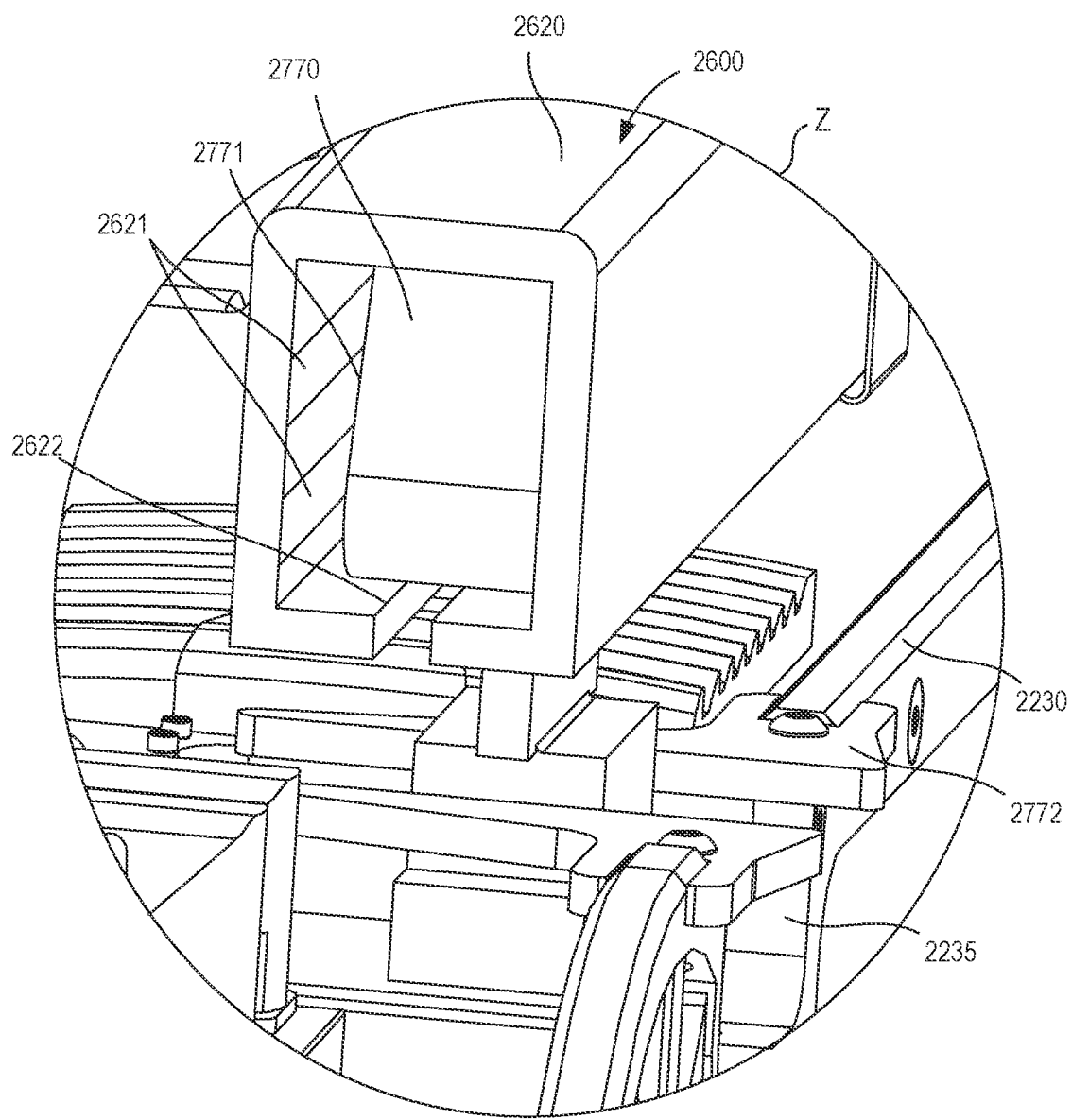
FIG. 10 is an enlarged view of a portion of the trolley of FIG. 4 identified as region Z.
Figure 11:
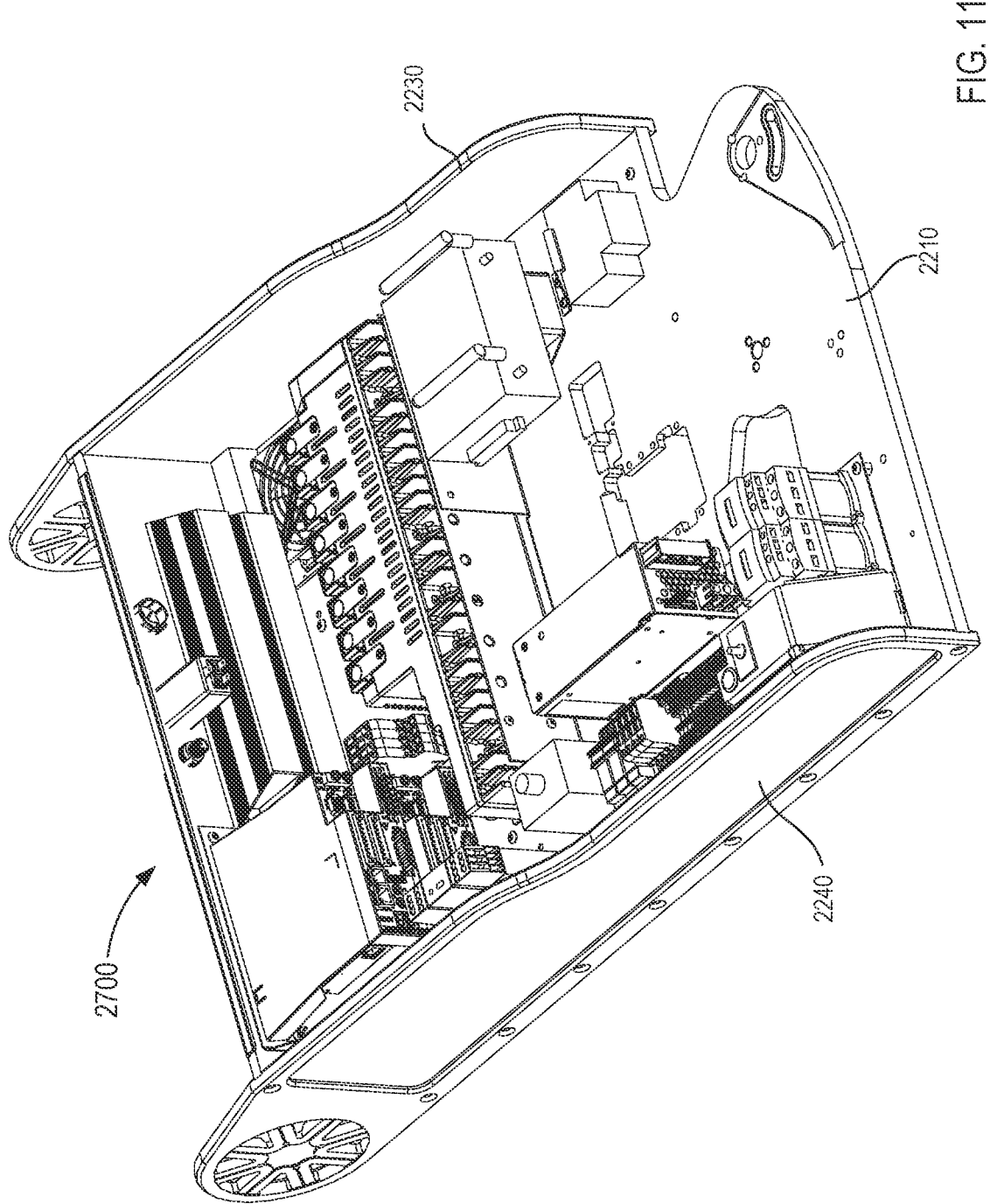
FIG. 11 is a bottom perspective view of an electronic system included in the trolley of FIG. 4.

FIGS. 10 and 11 illustrate the electronic system 2700 of the trolley 2100. The electronic system 2700 includes a set of electronic devices that are collectively operated to control at least a portion of the trolley 2100. As described above, the electronic system 2700 includes the collector 2770 that is coupled to a portion of the housing 2200 and that is placed in physical and/or electrical contact with the power rail 2620. The collector 2770 can be any suitable shape, size, or configuration and can be formed from any suitable conductive material, such as, for example, iron, steel, or the like. In this manner, the collector 2770 can receive a flow of electrical current from the power rail 2620. For example, as shown in FIG. 10, the power rail 2620 is a substantially hollow tube that houses or substantially encloses one or more conductive portions 2621 (e.g., individual conductors or surfaces) that are electrically coupled to a power source (not shown). In this manner, the collector 2770 can be disposed within the hollow tube of the power rail 2620 such that a conductive portion 2771 (e.g., individual conductors, a conductive surface, or the like) of the collector 2770 is placed in electrical communication with the one or more conductive portions 2621 of the power rail 2620. Thus, the collector 2770 receives a flow of current from the power source and transferred by the power rail 2620. Moreover, the collector 2770 can be disposed within the power rail 2620 such that a coupling portion 2772 of the collector 2770 extends through a slot 2622 defined by the power rail 2620 to be coupled to the mounting portion 2235 of the housing 2200. The coupling portion 2772 can further be coupled to a power module (not shown) of the trolley 2100. Thus, the trolley 2100 receives power from the power source via the power rail 2620.

While the power rail 2620 is shown and described as being a substantially hollow tube, in other embodiments, a power rail can be any suitable configuration. For example, in some embodiments, a power rail can be one or more conductive portions on any suitable surface such as a surface of a relative flat or open power rail. In some embodiments, the power rail can be one or more conductive portions of, for example, the support track 2050 (e.g., one or more inner surface and/or one or more outer surface). As described in further detail herein, a conductive portion of the trolley 2100 (e.g., the collector 2770) can be in electric contact with the power rail 2620 and/or any other suitable conductive surface providing a flow of electric power, which in turn, powers one or more portions of the trolley 2100.

While not shown in FIGS. 10 and 11, the electronic system 2700 includes at least a processor, a memory, and a communication device. The memory can be, for example, a random access memory (RAM), a memory buffer, a hard drive, a read-only memory (ROM), an erasable programmable read-only memory (EPROM), and/or the like. In some embodiments, the memory stores instructions to cause the processor to execute modules, processes, and/or functions associated with controlling one or more mechanical and/or electrical systems included in the patient support system 2000. For example, the memory can store instructions, information, and/or data associated with a proportion-integral-derivative (PID) control system. In some embodiments, the PID control system can be included in, for example, a software package. In some embodiments, the PID control can be a set of user controlled instructions executed by the processor that allow the user to "tune" the PID control, as described in further detail herein.

The processor of the electronic device can be any suitable processing device configured to run or execute a set of instructions or code. For example, the processor can be a general-purpose processor (GPU), a central processing unit (CPU), an accelerated processing unit (APU), and/or the like. The processor can be configured to run or execute a set of instructions or code stored in the memory associated with controlling one or more mechanical and/or electrical systems included in a patient support system. For example, the processor can run or execute a set of instructions or code associated with the PID control stored in the memory and further associated with controlling with a portion of the drive system 2300 and/or the patient support mechanism 2500. More specifically, the processor can execute a set of instructions in response to receiving a signal from one or more sensors and/or encoders (shown and described below) that can control one or more subsequent actions of the drive system 2300 and/or the support mechanism 2500. Similarly stated, the processor can execute a set of instructions associated with a feedback loop that includes one or more sensors or encoders that send a signal that is at least partially associated with current and/or previous data (e.g., position, velocity, force, acceleration, or the like) received from the drive system 2300 and/or the support mechanism 2500, as described in further detail herein.

The communication device can be, for example, one or more network interface devices (e.g., network cards) configured to communicate with an electronic device over a wired or wireless network. For example, in some embodiments, a user can manipulate a remote control device that sends one or more signals to and/or receives one or more signals from the electronic system 2700 associated with the operation of the trolley 2100. The remote control can be any suitable device or module (e.g., hardware module or software module stored in the memory and executed in the process). For example, in some embodiments, the remote control can be an electronic device that includes at least a processor and a memory and that runs, for example, a personal computer application, a mobile application, a web page, and/or the like. In this manner, a user can engage the remote control to establish a set of system parameters associated with the support system 2000 such as, for example, the desired amount of body weight supported by the support system 2000.

Figure 12:
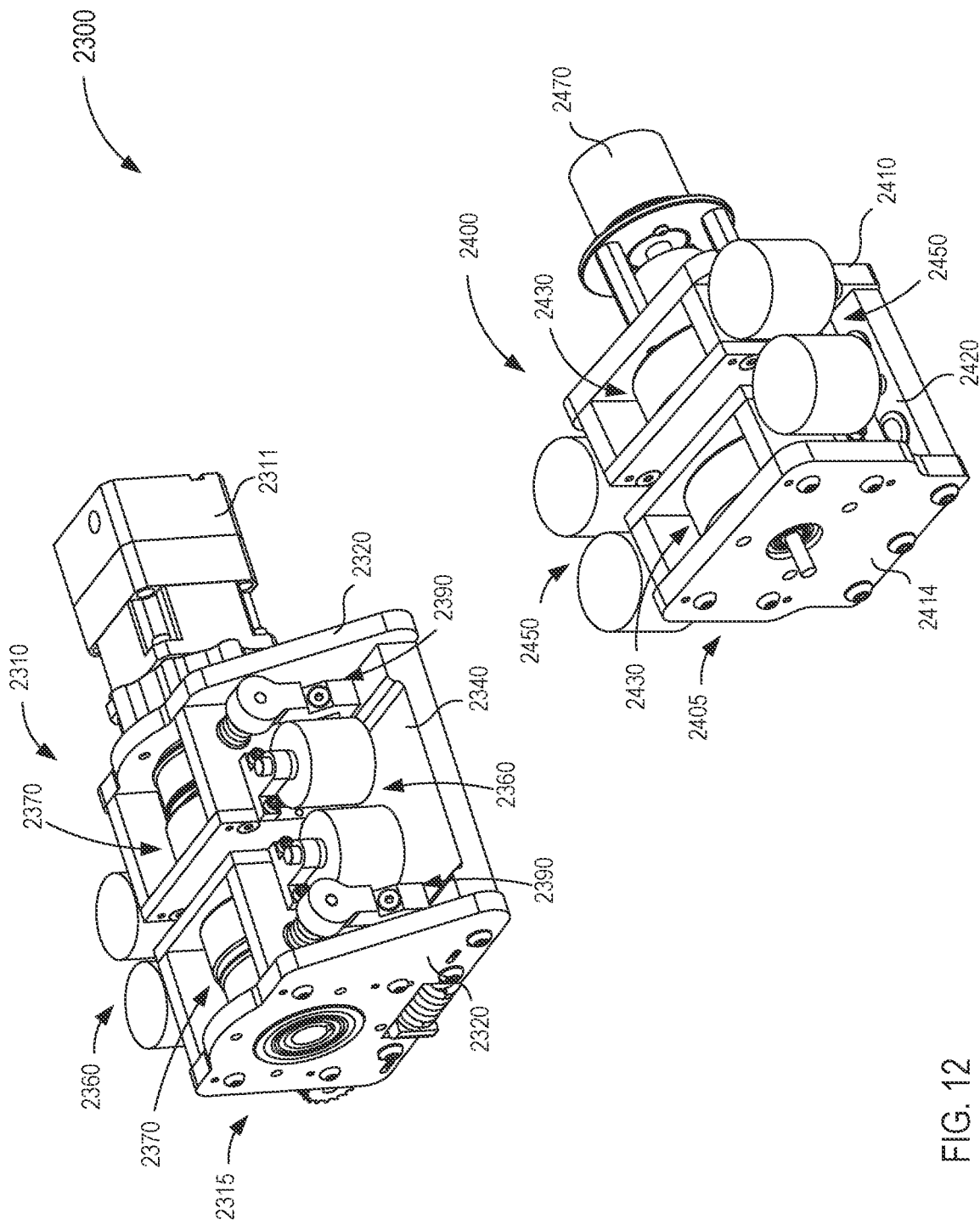
FIG. 12 is a perspective view of a drive mechanism included in the trolley of FIG. 4.

As shown in FIG. 12, the drive system 2300 includes a first drive assembly 2310 and a second drive assembly 2400. The drive system 2300 is coupled to the first side 2211 of the base 2210 (see e.g., FIGS. 2 and 3) and arranged such that the first drive assembly 2310 and the second drive assembly 2400 are aligned (e.g., coaxial). In this manner, the first drive assembly 2310 and the second drive assembly 2400 can receive a portion of the support track 2050, as described in further detail herein.

Figure 13:
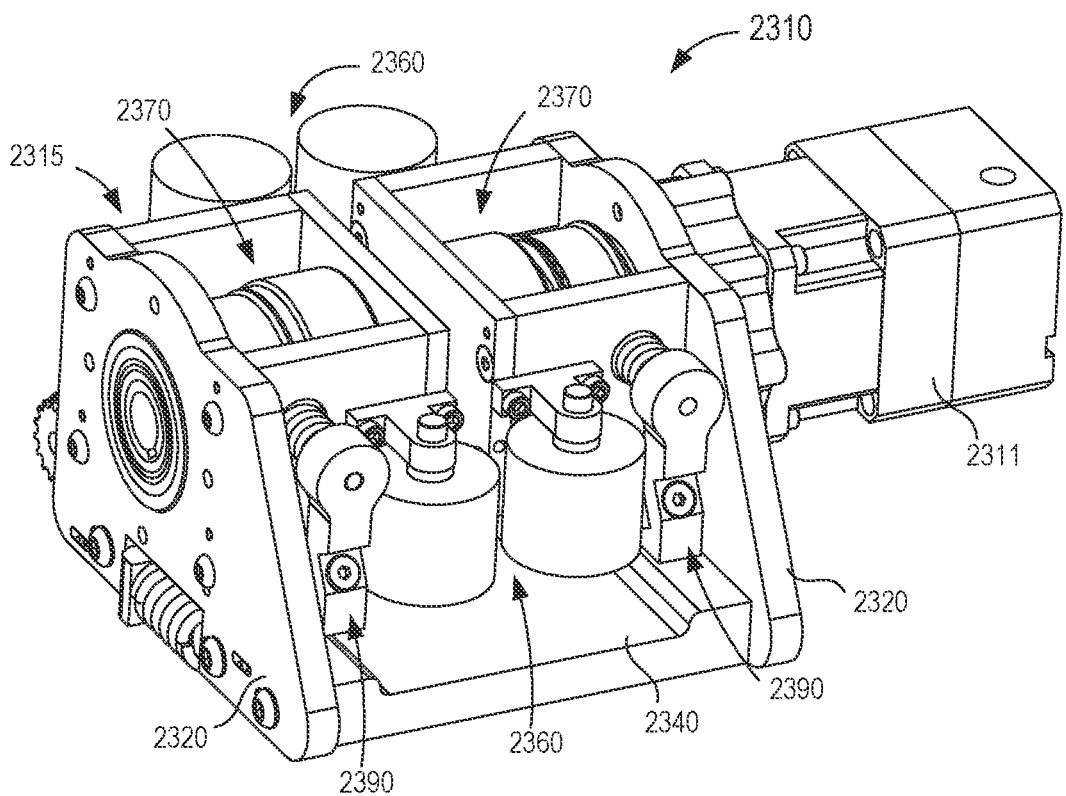
FIGS. 13 and 14 are perspective views of a first drive assembly included in the drive mechanism of FIG. 12.
Figure 14:
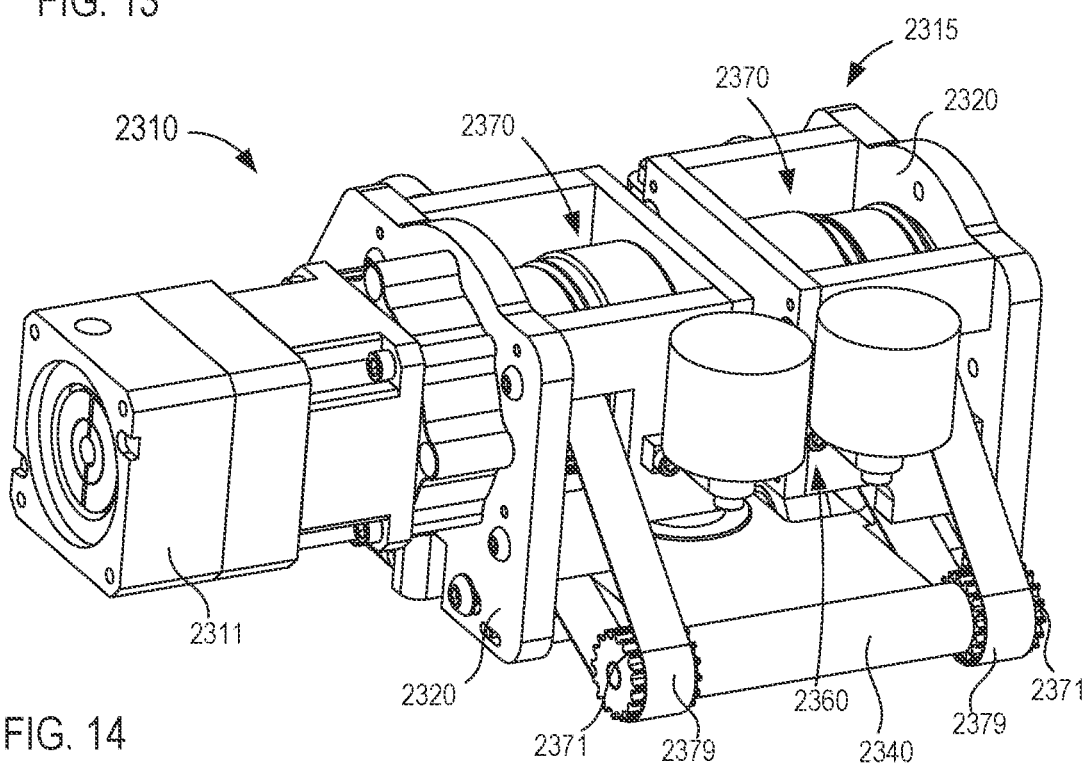

FIGS. 13-23 illustrate the first drive assembly 2310. The first drive assembly 2310 includes a motor 2311, a support structure 2315, a set of guide wheel assemblies 2360, a set of drive wheel assemblies 2370, and a set of secondary wheel assemblies 2390. The motor 2311 is coupled to a side member 2320 of the support structure 2315 and is in electrical communication with a portion of the electronic system 2700. The motor 2311 includes an output shaft 2312 (see e.g., FIGS. 15 and 16) that engages a portion of one of the drive wheel assemblies 2370 to rotate a drive wheel 2385 included therein. More specifically, the motor 2311 receives an activation signal (e.g., a flow of electrical current) from the electronic system 2700 to cause the motor 2311 to rotate the output shaft 2312, which, in turn, rotates the drive wheel 2385. As shown in FIGS. 13 and 14, at least a portion of the first drive assembly 2310 is substantially symmetrical about a longitudinal plane (not shown) defined by the first drive assembly 2310. In this manner, each side of the first drive assembly 2310 includes similar components, thereby increasing versatility and decreasing manufacturing costs. For example, while the first drive assembly 2310 is shown including two side members 2320 with the motor 2311 being coupled to a particular side member 2320, in other embodiments, the motor 2311 can be coupled to the other side member 2320.

The support structure 2315 includes two side members 2320, a base 2340, two leading support members 2350, two trailing support members 2354, and two transverse support members 2358. As shown in FIGS. 13-16, the side members 2320 are the same (e.g., due to the symmetry of the first drive assembly 2310). The side members 2320 each define a bearing opening 2321, a notch 2322, and a set of slots 2325. The bearing opening 2321 of each side member 2320 receives a drive bearing 2376 (FIG. 20) included in the drive wheel assembly 2370. More specifically, the drive bearing 2376 can be disposed within the bearing opening 2321 such that an outer surface of the drive bearing 2376 forms a friction fit with a surface of the side member 2320 that defines the bearing opening 2321. Similarly stated, the drive bearing 2376 and the surface of the side 2320 defining the bearing opening 2321 form a press fit to retain the drive bearing 2376 within the bearing opening 2321.

The notch 2322 defined by each of the side members 2320 receives a spring rod 2323 and a spring 2324. The spring 2324 is disposed about the spring rod 2323 such that the spring rod 2323 substantially limits the motion of the spring 2324. More specifically, the spring rod 2323 is configured to allow the spring 2324 to move in an axial direction (e.g., compress and/or expand) while substantially limiting movement of the spring 2324 in a transverse direction. As described in further detail herein, the spring rod 2323 and the spring 2324 extend from a surface of the notch 2322 to engage a spring protrusion 2344 of the base 2340. The set of slots 2325 is configured such that each slot 2325 receives mounting hardware (e.g., a mechanical fastener, a pin, a dowel, etc.) configured to movably couple the side members 2320 to the base 2340, as described in further detail herein.

As described above, the base 2340 is movably coupled to the side members 2320. The base 2340 includes a set of sidewalls 2342, and an axle portion 2346. The axle portion 2346 of the base 2340 defines an opening 2347 that receives a transfer axle 2388 included in the drive wheel assembly 2370. More specifically, the transfer axle 2388 can rotate within the opening 2347 of the axle portion 2346 such that a rotational motion can be transferred from one of the drive assemblies 2370 to the other drive assembly 2370, as described in further detail herein.

The sidewalls 2342 each define a notch 2343 and include the spring protrusion 2344. More specifically, the spring protrusions 2344 each extend in a substantially perpendicular direction from the sidewalls 2342. As shown in FIGS. 13 and 14, when the side members 2320 are coupled to the base 2340, the notches 2322 of the side members 2320 each receive one of the spring protrusions 2344 of the base 2340. Similarly, when the side members 2320 are coupled to the base 2340, the notches 2343 defined by the base 2340 each receive a portion of one of the springs 2324. In this manner, the spring rod 2323 and the spring 2324 of each side member 2320 are aligned with the spring protrusion 2344 extending from the side walls 2342 of the base 2340 such that the spring 2324 is placed in contact with a surface of the corresponding spring protrusion 2344. With the side members 2320 movably coupled to the base 2340 (e.g., by disposing the mounting hardware in the slots 2325), the spring 2324 of each side member 2320 can dampen a movement of the side member 2320 relative to the base 2340. Similarly stated, the spring 2324 of each side member 2320 can engage the surface of the corresponding spring protrusion 2344 to exert a reaction force (e.g., brought on by a compression of the spring) in response to an external force (e.g., operational vibration, torque exerted by the motor, or the like) applied to one or both of the side members 2320.

Figure 17:
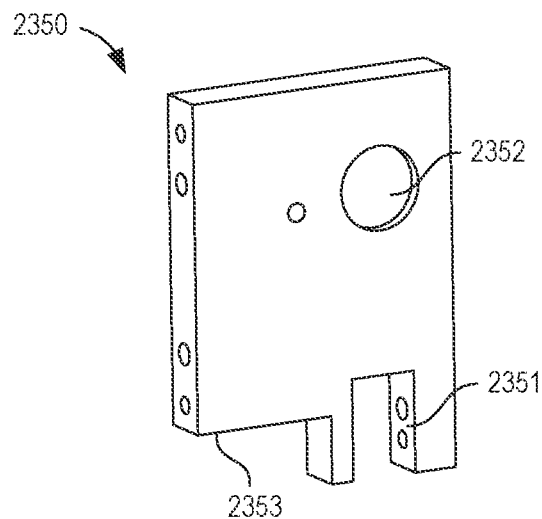
FIGS. 17-19 are perspective views of a first support member, a second support member, and a third support member, respectively, included in the first drive assembly of FIG. 13.
Figure 18:
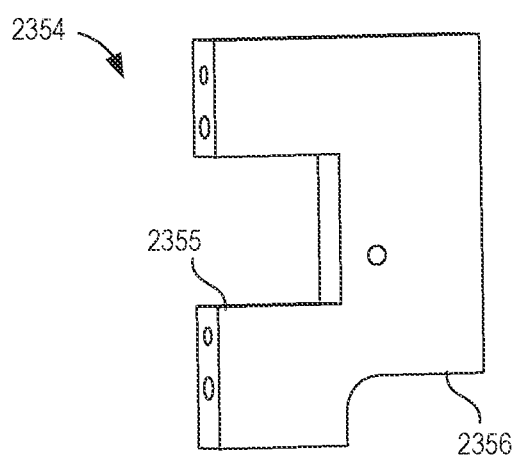
Figure 19:
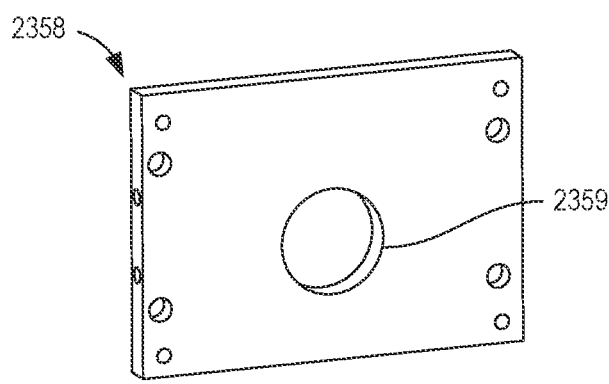

FIGS. 17-19 illustrate one of each of the leading support members 2350, the trailing support members 2354, and the transverse support members 2358, respectively. As described above, the symmetry of the first drive assembly 2310 is such that the two leading support member 2350 are the same, the two trailing support members 2354 are the same, and the two transverse support members 2358 are the same. The leading support members 2350 are each fixedly coupled to one of the side members 2320. As shown in FIG. 17, the leading support members 2350 each define a lever arm notch 2355 that receives a lever arm 2391 of the secondary wheel assembly 2390, a spring recess 2352 that receives a spring 2394 of the secondary wheel assembly 2390, and a support track notch 2353 that receives, for example, a horizontal portion 2051 of the support track 2050 (see e.g., FIG. 23).

The trailing support members 2354 are each fixedly coupled to one of the side members 2320 and are disposed in a rearward position relative to the leading support members 2354. Expanding further, the trailing support members 2354 are spaced apart from the leading support members 2354 at a distance sufficiently large to allow a portion of the drive wheel assemblies 2370 to be disposed therebetween. As shown in FIG. 18, the trailing support members 2354 each define a belt notch 2355 configured to receive a drive belt 2389 of the drive wheel assembly 2370 and a support track notch 2353 configured to receive the horizontal portion 2051 of the support track 2050 (e.g., as described with reference to the leading support member 2350).

The transverse support members 2358 are each fixedly coupled to one of the leading support members 2350 and one of the trailing support members 2354. Therefore, with the leading support members 2350 and the trailing support members 2354 each coupled to the corresponding side member 2320, the transverse support member 2358 substantially encloses a space configured to house or receive a portion of the drive wheel assemblies 2370. Furthermore, the arrangement of the support structure 2315 is such that a space defined between adjacent surfaces of the transverse support member 2358 is sufficiently large to receive, for example, a vertical portion 2052 of the support track 2050.

As shown in FIG. 19, the transverse support member 2358 defines a bearing opening 2359 that receives a support bearing 2377 of the drive wheel assemblies 2370. More specifically, the support bearing 2377 is disposed within the bearing opening 2359 such that an outer surface of the support bearing 2377 forms a friction fit with a surface of the transverse support member 2358 that defines the bearing opening 2359. Similarly stated, the outer surface of the support bearing 2377 and the surface of the transverse support member 2358 form a press fit to retain the support bearing 2377 within the bearing opening 2359.

Referring back to FIGS. 13-15, the first drive assembly 2310 includes four guide wheel assemblies 2360. The guide wheel assemblies 2360 each include a mounting bracket 2361 and a guide wheel 2363. More specifically, each of the guide wheels 2363 are rotatably coupled to one of the mounting brackets 2361 such that the guide wheels 2363 can rotate relative to the mounting brackets 2361.

The guide wheel assemblies 2360 are each configured to be coupled to a portion of the support structure 2315. Expanding further, as shown in FIGS. 13-16, the mounting bracket 2361 of each guide wheel assembly 2360 is coupled to one of the leading support members 2350 or one of the trailing support members 2354. Similarly stated, both of the leading support members 2350 are coupled to the mounting bracket 2361 included in one of the guide wheel assemblies 2360 and both of the trailing support members 2354 are coupled to the mounting bracket 2361 included in one of the guide wheel assemblies 2360. The guide wheel assemblies 2360 are coupled to the support structure 2315 such that a portion of the guide wheel 2363 extends into the space defined between the transverse members 2358. In this manner, the guide wheels 2363 can roll along a surface of the vertical portion 2052 of the support track 2050 when the first drive assembly 2310 is coupled thereto (see e.g., FIG. 23).

Figure 15:
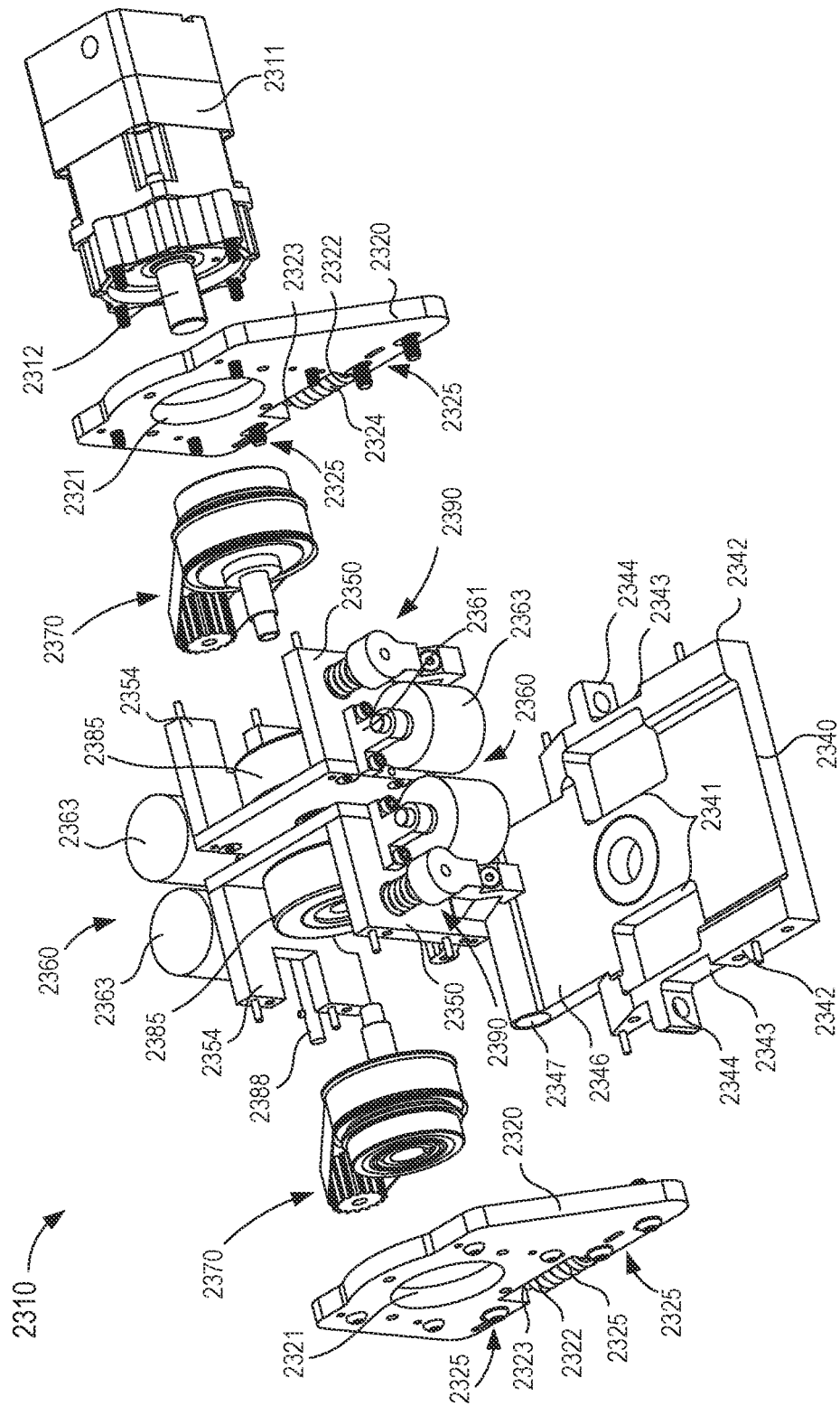
FIGS. 15 and 16 are exploded views of the first drive assembly of FIG. 13.
Figure 16:
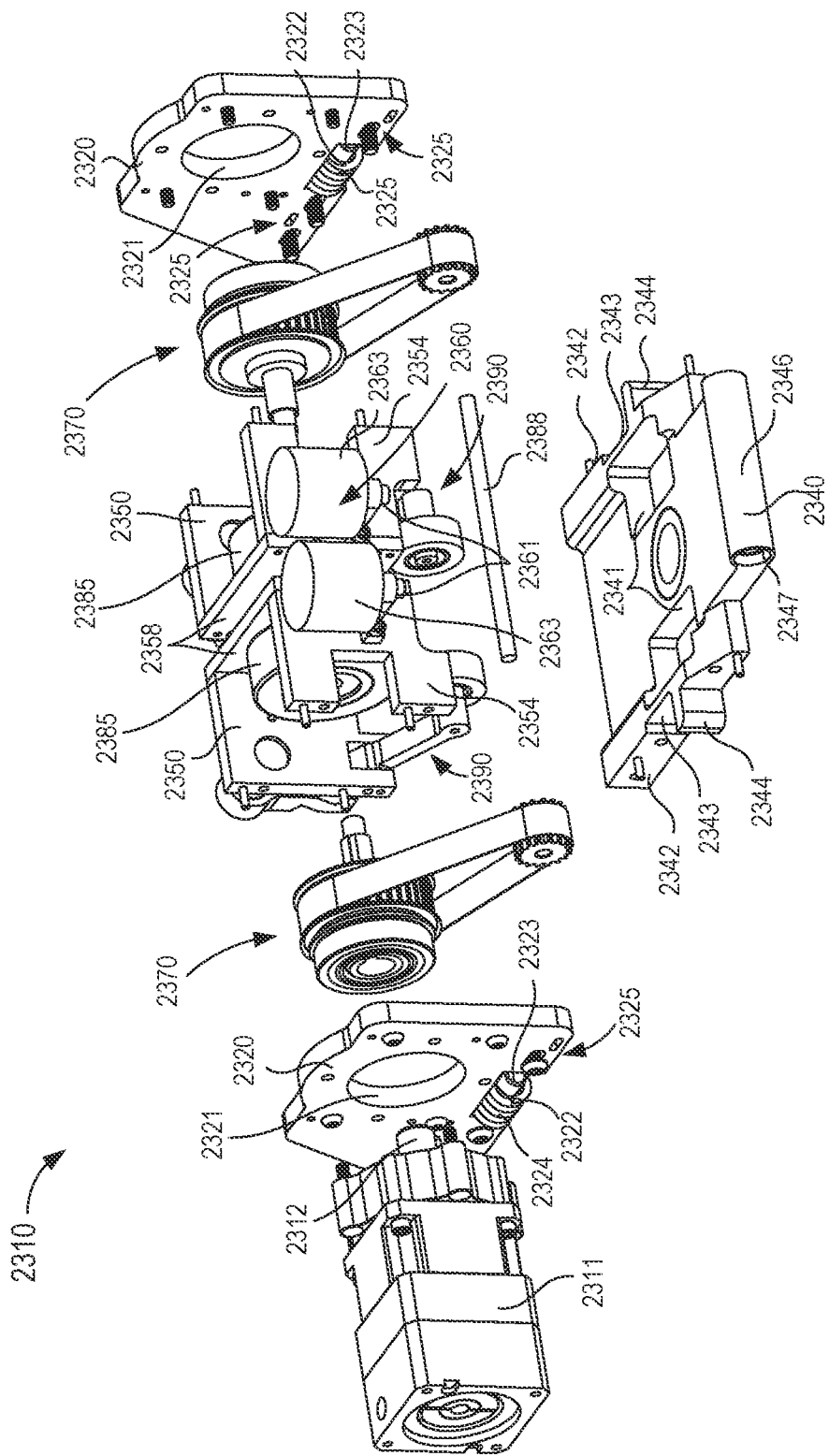

As shown in FIGS. 13-15, the guide wheel assemblies 2360 can be arranged relative to the support structure 2315 such that the guide wheels 2363 included in the guide wheel assemblies 2360 that are coupled to the leading support member 2350 are disposed substantially below the mounting bracket 2361. Conversely, the guide wheels 2363 included in the guide wheel assemblies 2360 that are coupled to the trailing support member 2350 are disposed substantially above the mounting bracket 2361. This arrangement can increase the surface area of the vertical portion 2051 of the support track 2050 that is in contact with at least one guide wheel 2360. In this manner, a rotational motional about a longitudinal centerline (not shown) of the support track 2050 can be minimized or eliminated. While shown in as being in a particular arrangement, in other embodiments, the guide wheels 2363 can be arranged in any suitable manner. For example, in some embodiments, all the guide wheels 2363 can be mounted below the mounting brackets 2361. In other embodiments, all the guide wheels 2363 can be mounted above the mounting brackets 2361. In still other embodiments, the guide wheels 2363 can be mounted to the mounting brackets 2361 in any combination of configurations (e.g., mounted above or below the mounting brackets 2361 in any suitable arrangement).

Figure 20:
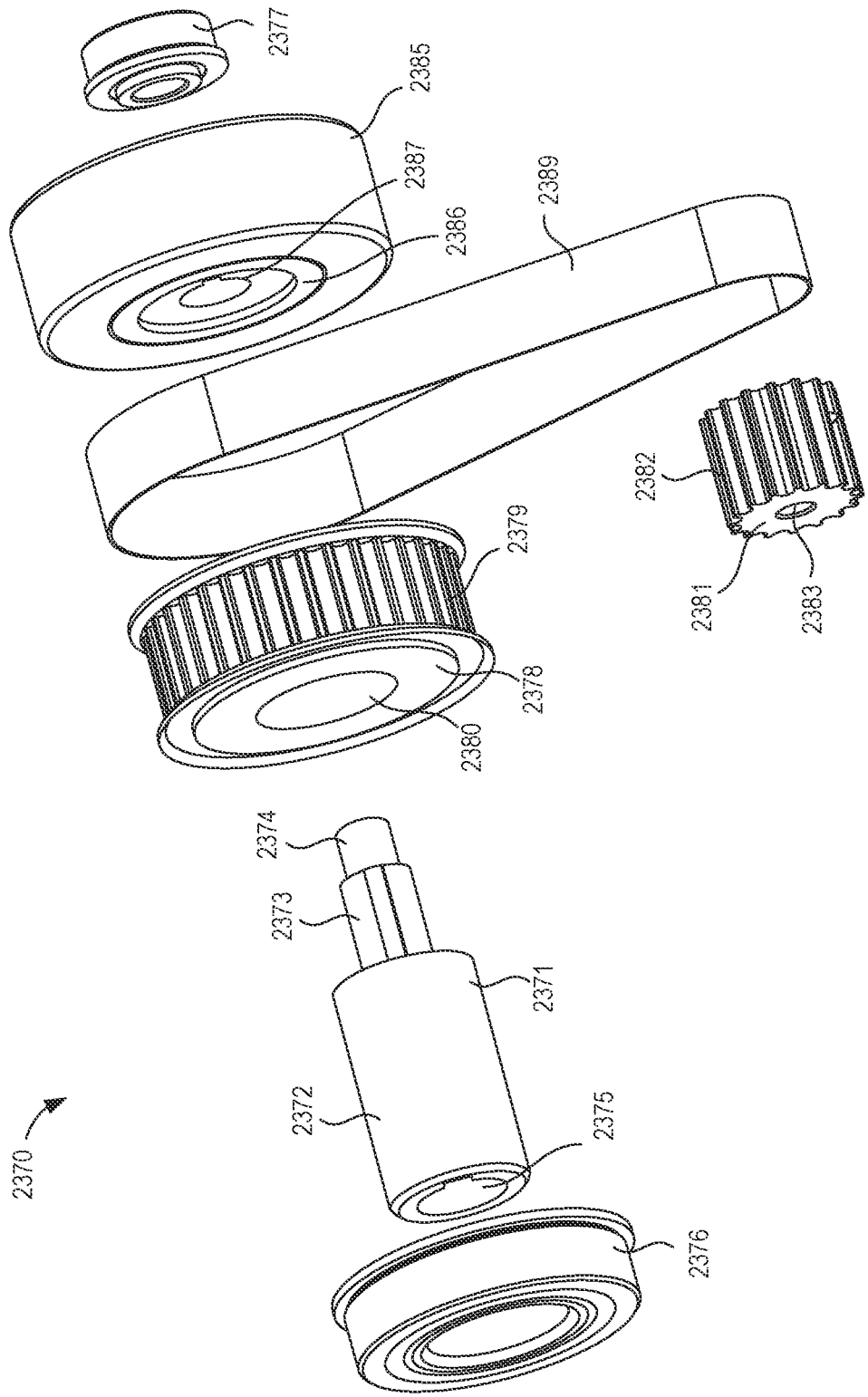
FIG. 20 is an exploded view of a drive wheel subassembly included in the first drive assembly of FIG. 13.

FIG. 20 is an exploded view of the drive wheel assembly 2370. As described above, the symmetry of the first drive assembly 2310 is such that the drive wheel assemblies are the same. Thus, a discussion of the drive wheel assembly 2370 shown in FIG. 20 applies to both drive wheel assemblies 2370. The drive wheel assembly 2370 includes a drive shaft 2371, the drive bearing 2376, the support bearing 2377, a drive sprocket 2379, a transfer sprocket 2381, a drive wheel 2385, the transfer axle 2388 (not shown in FIG. 20), and a drive belt 2389. The drive shaft 2371 has a first portion 2372, a second portion 2373, and a third portion 2374 and defines an opening 2375. The first portion 2372 has a first diameter that is at least partially associated with the drive sprocket 2378. Expanding further, the drive sprocket 2378 defines an opening 2380 that has a diameter that is associated with the diameter of the first portion 2372 of the drive shaft 2371. In this manner, the drive sprocket 2378 is disposed about the first portion 2372 of the drive shaft 2371 such that a surface of the drive sprocket 2378 defining the opening 2380 forms a friction fit with an outer surface of the first portion 2372 of the drive shaft 2371. Similarly, the drive bearing 2376 is disposed about the first portion 2372 such that an inner surface of the bearing forms a friction fit with the outer surface of the second portion 2372 of the drive shaft 2371. Thus, a rotation of the drive shaft 2371 within the drive bearing 2376 rotates the drive sprocket 2378. Moreover, with the drive bearing 2376 being retained with the bearing opening 2321 of one of the side member 2370, the drive shaft 2371 can be rotated relative to the corresponding side member 2370, as described in further detail herein.

The second portion 2373 of the drive shaft 2371 has a second diameter that is smaller than the diameter of the first portion 2372 and that is at least partially associated with the drive wheel 2385. Expanding further, the drive wheel 2385 includes a hub 2386 that defines an opening 2387 with a diameter that is associated with the diameter of the second portion 2373 of the drive shaft 2371. As shown in FIG. 20, the opening 2387 of the drive wheel 2385 includes a keyway configured to receive a key that extends from an outer surface of the second portion 2373 of the drive shaft 2371. In this manner, the drive wheel 2385 is fixedly disposed about the second portion 2373 of the drive shaft 2373.

The third portion 2374 of the drive shaft 2371 has a third diameter that is smaller than the diameter of the second portion 2372 and that is at least partially associated with the support bearing 2377. Expanding further, the support bearing 2377 is disposed about the third portion 2374 of the drive shaft 2371 such that an outer surface of the third portion 2374 forms a friction fit with an inner surface of the support bearing 2377. Moreover, with the support bearing 2377 being disposed within the bearing opening 2359 of the transverse support member 2358, the third portion 2374 of the drive shaft 2371 can be at least partially supported.

The opening 2375 defined by the drive shaft 2371 receives the output shaft 2312 of the motor 2311. More specifically, the drive shaft 2371 can be fixedly coupled, at least temporarily, to the output shaft 2312 of the motor 2311; thus, when the output shaft 2312 is rotated (e.g., in response to an activation signal from the electronic system 2700), the drive shaft 2371 is concurrently rotated. With the drive bearing 2376 and the support bearing 2377 being disposed within the bearing opening 2321 of the side member 2320 and the bearing opening 2359 of the transverse support member 2358, respectively, the drive shaft 2371 can rotate relative to the support structure 2315. Moreover, the rotation of the drive shaft 2371 rotates both the drive sprocket 2378 and the drive wheel 2385.

The drive sprocket 2378 is configured to engage the belt 2389. More specifically, the drive sprocket 2389 includes a set of teeth 2379 that engage a set of teeth (not shown) that extend from an inner surface of the belt 2389. The belt 2389 is further coupled the transfer sprocket 2381. The transfer sprocket 2381 includes a set of teeth 2382 that engage the teeth of the belt 2389. In this manner, the rotation of the drive sprocket 2378 (described above) rotates the belt 2389, which, in turn, rotates the transfer sprocket 2381. The transfer sprocket 2381 defines an opening 2383 configured to receive the transfer axle 2388 (see e.g., FIG. 16). More specifically, the transfer axle 2388 can be fixedly coupled to the transfer sprockets 2381 of each drive wheel assembly 2370 such that a rotation of the transfer sprocket 2381 of the first drive wheel assembly 2370 (e.g., the drive wheel assembly 2370 coupled to the output shaft 2312 of the motor 2311) rotates the transfer sprocket 2381 of the second drive wheel assembly 2370. Thus, when the motor 2311 is activated to rotate the output shaft 2312, both the drive wheels 2385 of both the drive wheel assemblies 2370 are urged to rotate.

In some embodiments, the side members 2320 and the base 2340 of the support structure 2315 can be arranged such that the spring 2324 of the side members 2320 is in a preloaded configuration (e.g., partially compressed without an additional external force being applied to one or both of the side members 2320). More specifically, each spring 2324 can exert a force (e.g., due to the preload) on the surface of the corresponding spring protrusion 2344 of the base 2340 to place the corresponding side member 2320 in a desired position relative to the base 2340. Moreover, with the drive bearings 2376 fixedly disposed within the bearing opening 2321 of the corresponding side members 2320 and with the transfer axle 2388 being disposed within the opening 2347 defined by the axle portion 2346 of the base 2340, the belt 2379 disposed about the drive sprocket 2378 and the transfer sprocket 2381 can be placed in tension. Thus, the arrangement of the side members 2320 being movably coupled to the base 2340 can retain the belt 2379 in a suitable amount tension such that the belt 2379 does not substantially slip along the teeth 2379 of the drive sprocket 2378 and/or along the teeth 2382 of the transfer sprocket 2381.

Figure 21:
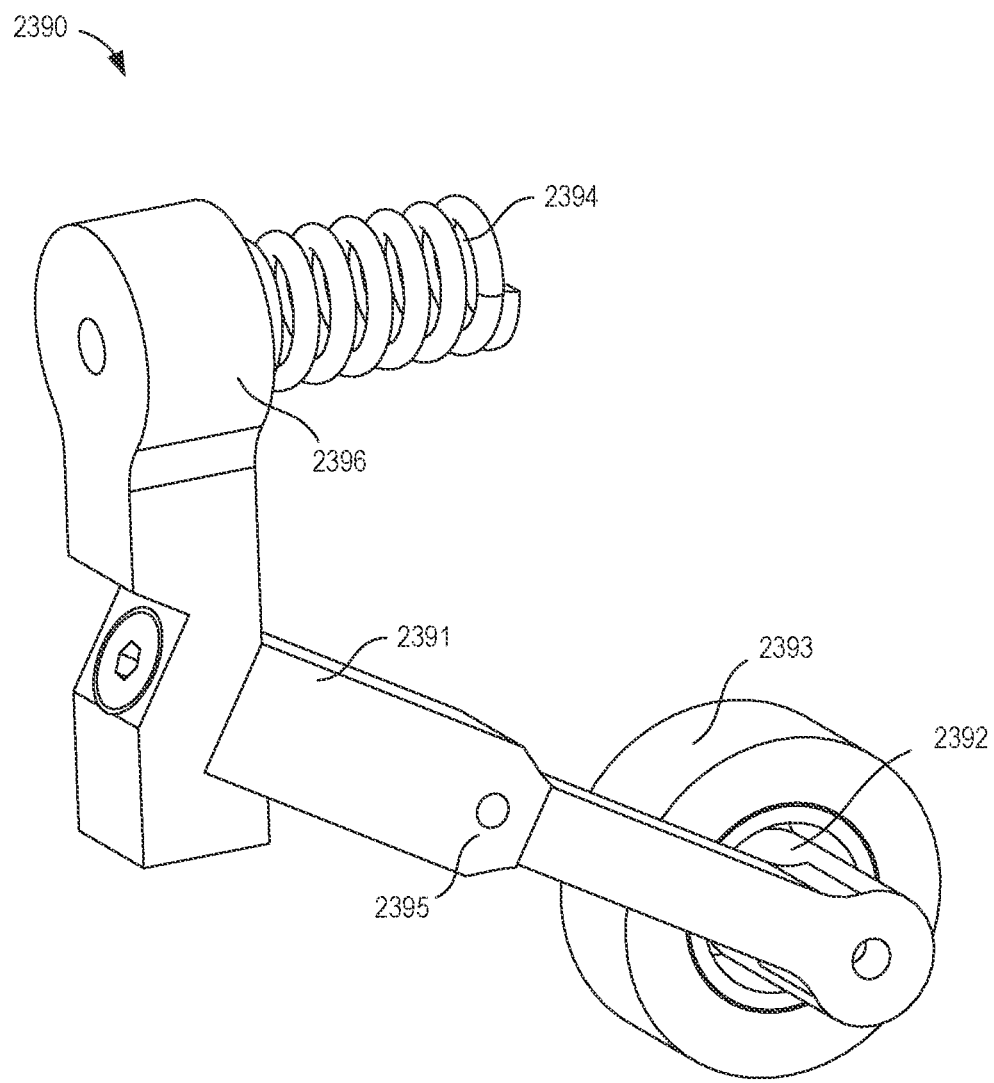
FIG. 21 is a perspective view of a secondary wheel subassembly included in the first drive assembly of FIG. 13.

As shown in FIG. 21, the first drive assembly 2310 includes the secondary wheel assembly 2390. The secondary wheel assembly 2390 includes a lever arm 2391, a secondary wheel 2393, and a spring 2394. The lever arm 2391 is a substantially angled member that includes an axle portion 2392, a pivot portion 2395, and an engagement portion 2396. The axle portion 2392 is disposed at a first end of the lever arm 2391 and is movably coupled to the secondary wheel 2393 such that the secondary wheel 2393 rotates about the axle portion 2392. The pivot portion 2395 is movably coupled to a portion of the leading support member 2350 that defines the lever arm notch 2351. For example, in some embodiments, the pivot portion 2395 of the lever arm 2391 can include an opening configured to receive, for example, a pivot pin (not shown) included in the leading support member 2350. In this manner, the pivot pin can define an axis about which the pivot portion 2395 can pivot or rotate.

Figure 22:
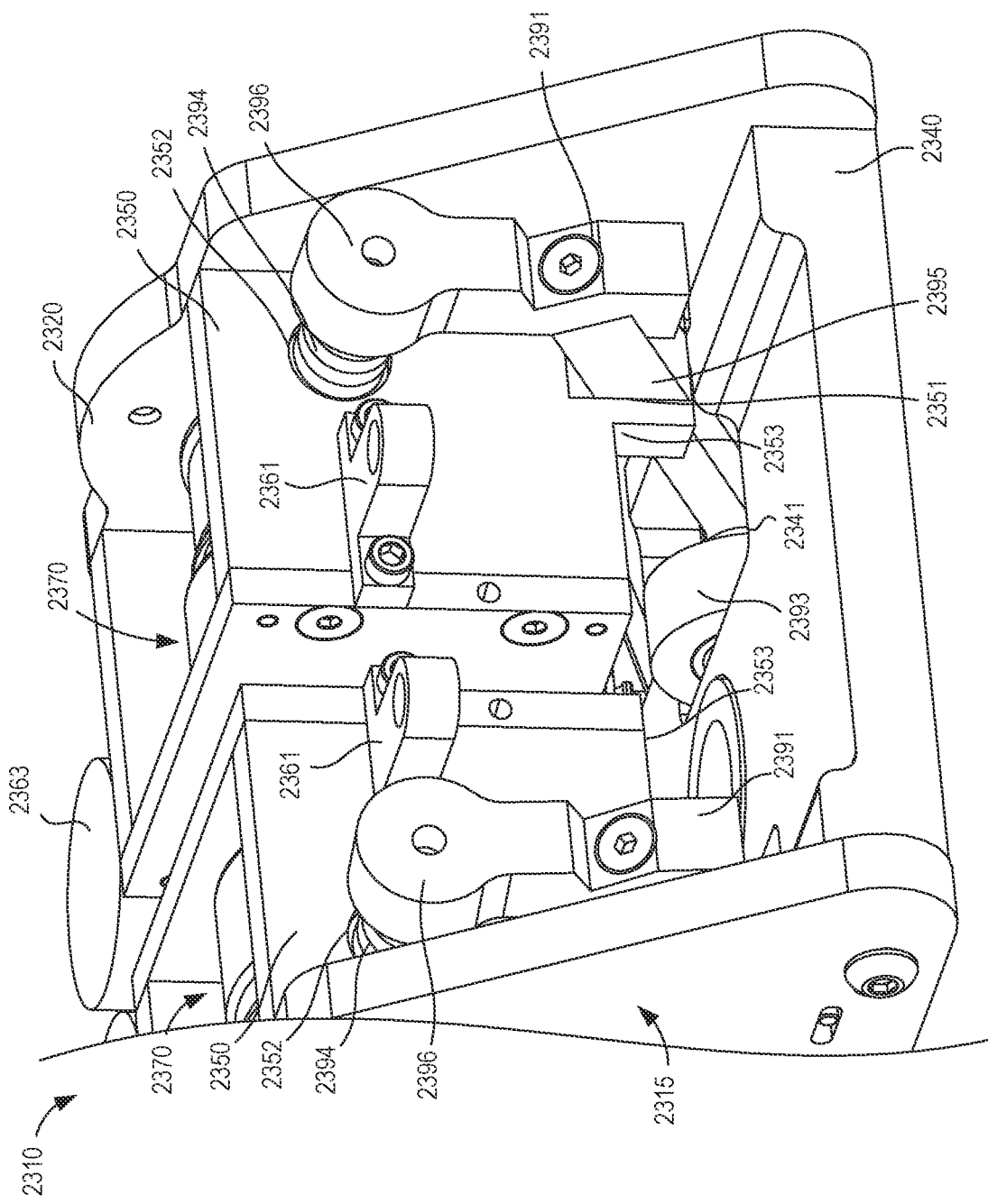
FIG. 22 is a perspective view of a portion of the first drive assembly of FIG. 13, illustrating the secondary wheel subassembly of FIG. 21 coupled to the second support member of FIG. 18.
Figure 23:
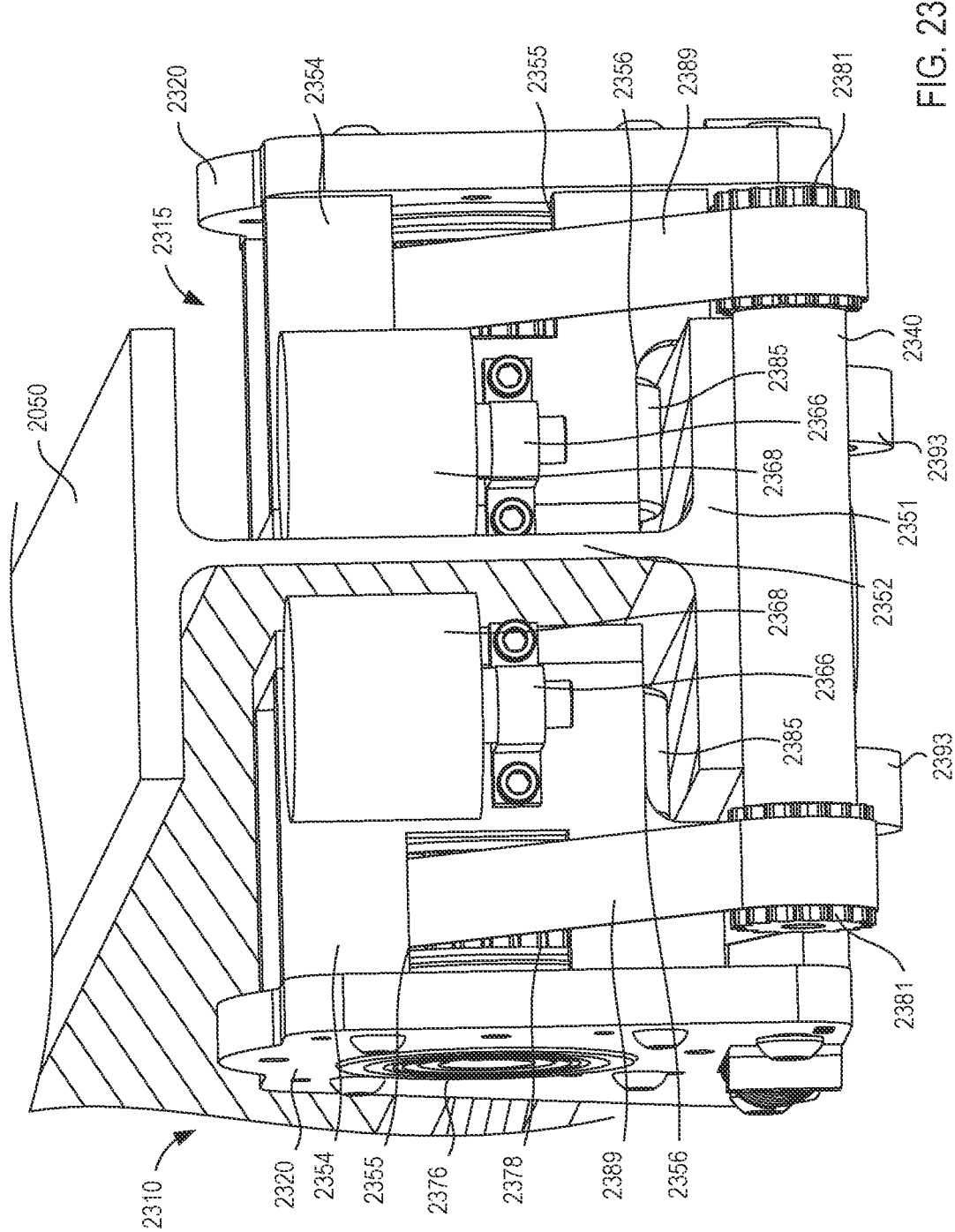
FIG. 23 is a perspective view of the first drive assembly of FIG. 13 in contact with a support track.

The engagement portion 2396 is configured to engage a portion of the spring 2394. More specifically, as shown in FIG. 22, a first end portion of the spring 2394 is in contact with the spring recess 2352 defined by the leading support member 2350 and a second end portion of the spring 2394 is in contact with the engagement portion 2396. In this manner, the spring 2394 can exert a force on the engagement portion 2396 to pivot the lever arm 2391 about the pivot portion 2395. Expanding further, as shown in FIGS. 22, the force exerted by the spring 2394 can pivot the lever arm 2391 such that the secondary wheel 2393 is pivoted towards the drive wheel 2385. Therefore, when the first drive assembly 2310 is disposed about the support track 2050, the secondary wheel 2393 can be placed in contact with a bottom surface of the horizontal portion 2051 of the support track 2050. Moreover, the force exerted by the spring 2394 can be such that the drive wheel 2385 and the secondary wheel 2393 exert a compressive force on a top surface and the bottom surface, respectively, of the horizontal portion 2051 of the support track 2051. This arrangement can, for example, increase the friction between the drive wheel 2385 and the horizontal portion 2051 of the support track 2050.

Figure 24:
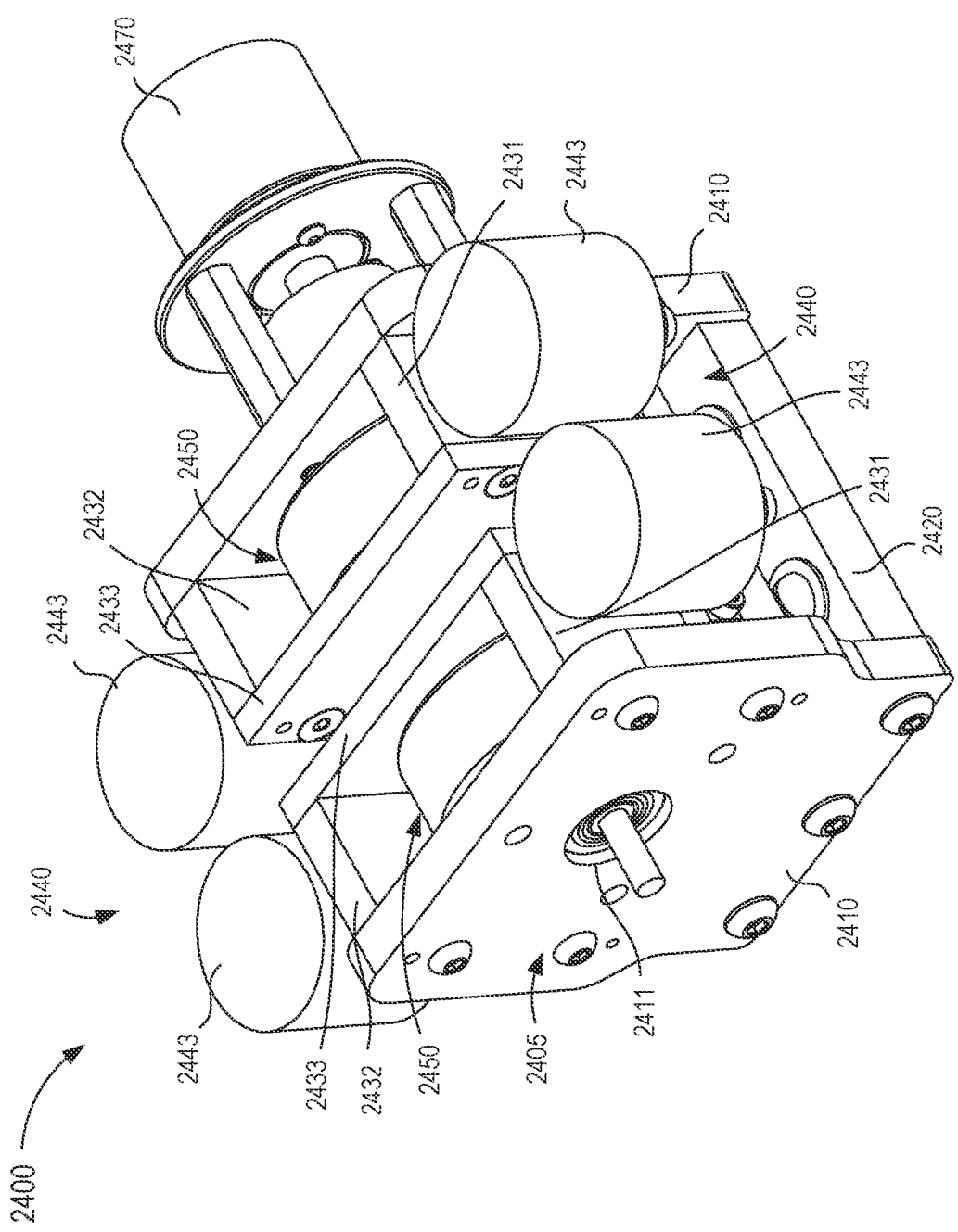
FIG. 24 is a perspective view of a second drive assembly included in the drive mechanism of FIG. 12.
Figure 25:
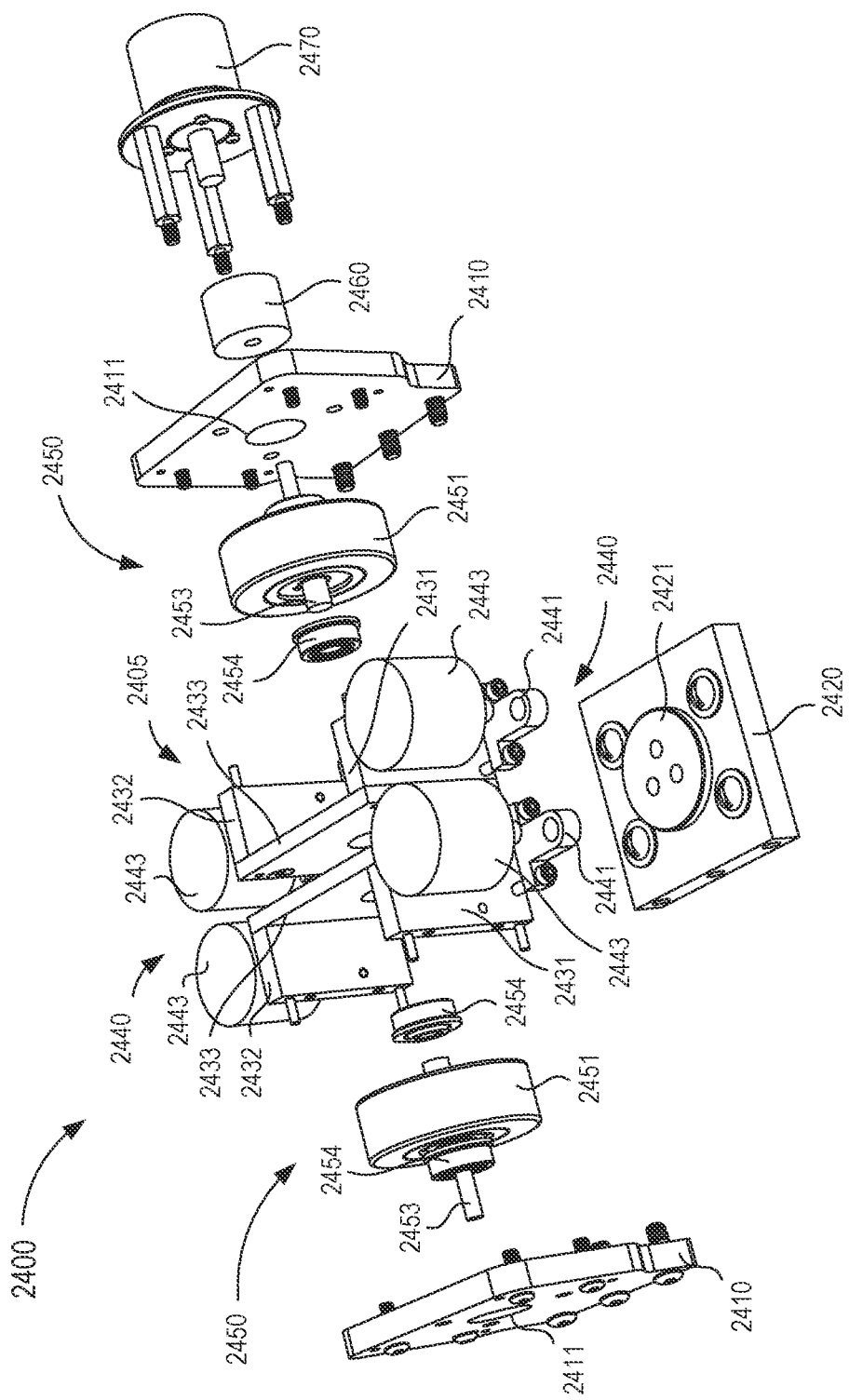
FIG. 25 is an exploded view of the second drive assembly of FIG. 24.
Figure 26:
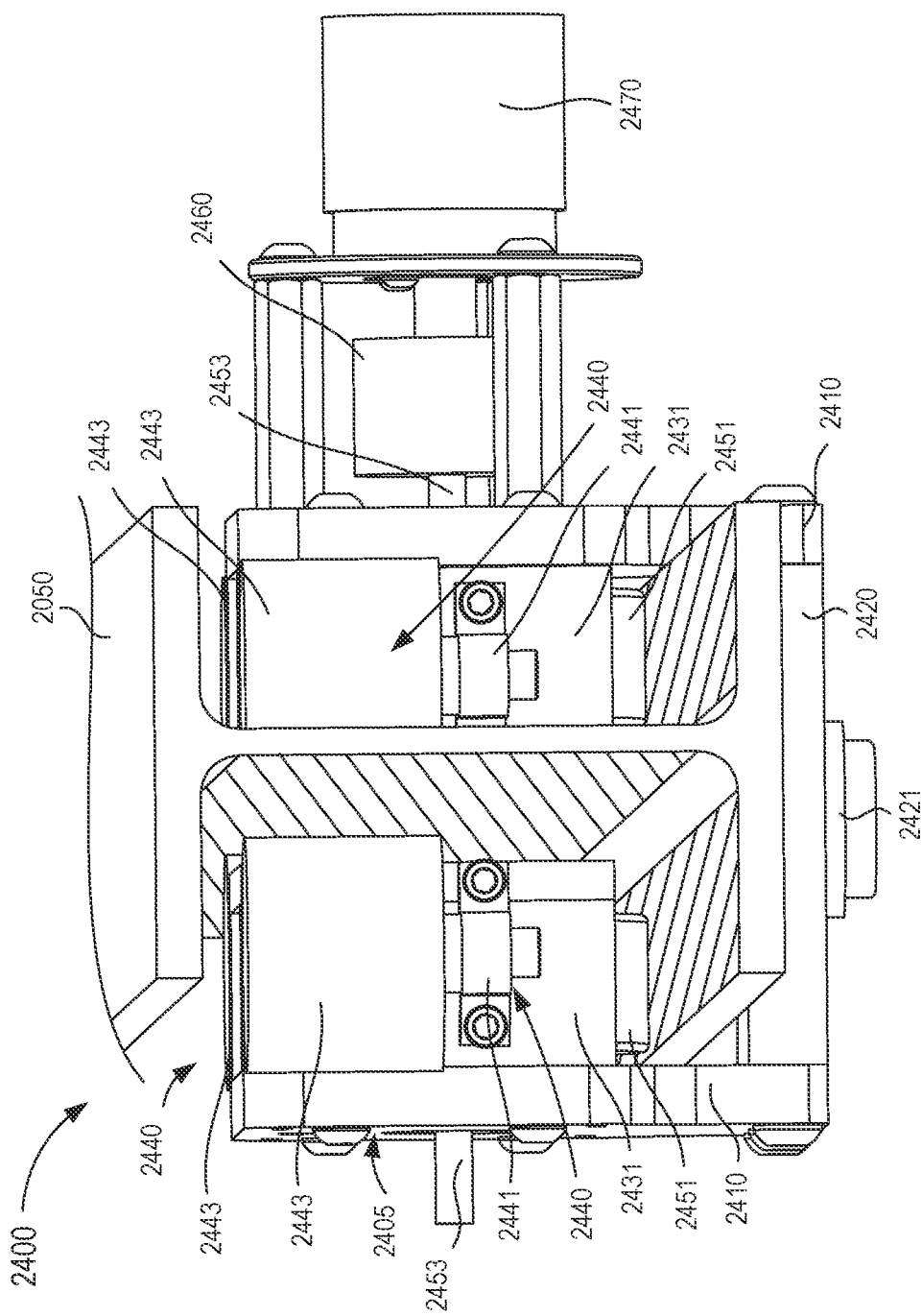
FIG. 26 is a perspective view of the second drive assembly of FIG. 24 in contact with the support track of FIG. 20.

FIGS. 24-26 illustrate the second drive assembly 2400. The second drive assembly 2400 can function similarly to the first drive assembly 2310, thus, some portions of the second drive assembly 2400 are not described in further detail herein. The second drive assembly 2400 includes a support structure 2405, a set of guide wheel assemblies 2430, a set of primary wheel assemblies 2440, a coupler 2460, and an encoder 2470. As shown, at least a portion of the second drive assembly 2400 is substantially symmetrical about a longitudinal plane (not shown) defined by the second drive assembly 2400. In this manner, each side of the second drive assembly 2400 includes similar components, thereby increasing versatility and decreasing manufacturing costs. For example, while the second drive assembly 2400 is shown including two side members 2420 with the coupler 2460 and encoder 2470 being coupled to a particular side member 2420, in other embodiments, the coupler 2460 and encoder 2470 can be coupled to the other side member 2420.

The support structure 2405 includes two side members 2410, a base 2420, a set of leading support members 2431, a set of trailing support members 2432, and a set of transverse support members 2433. As shown in FIGS. 24-26, the side members 2410 are the same (e.g., due to the symmetry of the first drive assembly 2400). The side members 2410 each define a bearing opening 2411 that receives a bearing 2454 (FIG. 25) included in the drive wheel assembly 2470. More specifically, the bearing 2454 can be disposed within the bearing opening 2411 such that an outer surface of the drive bearing 2454 forms a friction fit with a surface of the side member 2410 that defines the bearing opening 2411. Similarly stated, the drive bearing 2454 and the surface of the side 2410 defining the bearing opening 2411 form a press fit to retain the drive bearing 2454 within the bearing opening 2411.

The base 2420 is configured to be fixedly coupled to the side members 2410. The base 2420 includes a mounting plate 2421 configured to extend from a top surface and from a bottom surface of the base 2420 to couple the second drive assembly 2400 to the base 2210 of the housing 2200 (e.g., via any suitable mounting hardware such as, for example, mechanical fasteners or the like). The arrangement of the mounting plate 2421 can be such that when the second drive assembly 2400 is disposed about the support track 2050, the mounting plate 2421 can substantially limit a movement of the second drive mechanism 2400 in transverse direction relative to the longitudinal centerline (not shown) of the support track 2050. In some embodiments, the mounting plate 2421 can include any suitable surface finish that can be sufficiently smooth to slide along a bottom surface of the horizontal portion 2051 of the support track 2050. In other embodiments, the mounting plate 2421 can be formed from a material such as, for example, nylon or the like that facilitates the sliding of the mounting plate 2421 along the bottom surface of the support track 2050.

The leading support members 2431, the trailing support members 2432, and the transverse support members 2433 can be arranged similar to the leading support members 2350, the trailing support members 2354, and the transverse support members 2358 described above with reference to FIGS. 17-19. In this manner, the side members 2410 and the support members 2431, 2432, and 2433 can define a space configured to substantially enclose at least a portion of the primary wheel assemblies 2440. Moreover, the transverse support members 2433 can define an opening configured to receive a bearing 2454 of the primary wheel assembly 2350 in a similar manner as the transverse member 2333 described above. As shown in FIGS. 24-26, the leading support members 2431, the trailing support members 2432, and the transverse support members 2433 can differ, however, in that the leading support members 2431, the trailing support members 2432, and the transverse support members 2433 need not include one or more notches and/or recesses to accommodate any portion of the second drive assembly 2400.

The second drive assembly 2400 includes four guide wheel assemblies 2440. The guide wheel assemblies 2440 each include a mounting bracket 2441 and a guide wheel 2443. More specifically, each of the guide wheels 2443 are rotatably coupled to one of the mounting brackets 2441 such that the guide wheels 2443 can rotate relative to the mounting brackets 2441. The guide wheel assemblies 2440 are each configured to be coupled to a portion of the support structure 2405. Expanding further, as shown in FIGS. 24-26, the mounting bracket 2441 of each guide wheel assembly 2440 is coupled to one of the leading support members 2431 or one of the trailing support members 2432. Similarly stated, both of the leading support members 2431 are coupled to the mounting bracket 2441 included in one of the guide wheel assemblies 2440 and both of the trailing support members 2432 are coupled to the mounting bracket 2441 included in one of the guide wheel assemblies 2440. The guide wheel assemblies 2440 are coupled to the support structure 2405 such that a portion of the guide wheel 2443 extends into the space defined between the transverse members 2433. In this manner, the guide wheels 2443 can roll along a surface of the vertical portion 2052 of the support track 2050 when the second drive assembly 2400 is coupled thereto (see e.g., FIG. 26). As described above with reference to the first drive assembly 2310, the guide wheel assemblies 2440 can be arranged in any suitable configuration to limit a rotational movement of the second drive assembly 2400 about the longitudinal centerline of the support track 2050.

The primary wheel assemblies 2450 each include a primary wheel 2451 having a hub 2452 and an axle 2453, and the bearings 2454. As described above, the axle 2453 can be disposed within the bearings 2354 while the bearings 2354 are coupled to the side members 2410 and the transverse members 2433. In this manner, each primary wheel 2451 can rotate about the corresponding axle 2453 relative to the support structure 2405. As shown in FIG. 26, the second drive assembly 2400 is disposed about the support track 2050 such that the primary wheels 2451 roll along the top surface of the horizontal portion 2051. Similarly, the guide wheels 2443 roll along a surface of the vertical portion 2052 of the support track 2050.

As shown in FIGS. 24 and 26, the axle 2453 is configured to extend through the bearing 2454 disposed within the opening 2411 of the side members 2410. In this manner, the coupler 2460 can couple to the axle 2453 to couple the axle 2453 to the encoder 2470. Thus, the encoder 2470 can receive and/or determine information associated with the rotation of the primary wheel 2451. For example, the encoder 2470 can determine position, rotational velocity, rotational acceleration, or the like. Furthermore, the encoder 2470 can be in electrical communication (e.g., via a wired communication or a wireless communication) with a portion of the electronic system 2700 and can send information associated with the second drive assembly 2400 to the portion of the electronic system 2700. Upon receiving the information from the encoder 2470, a portion of the electronic system 2700 can send a signal to any other suitable system associated with performing an action (e.g., increasing or decreasing the power of one or more motors or the like), as described in further detail herein. In some instances, the electronic system 2700 can determine the position of the trolley 2100 relative to the support track 2050 based at least in part on the information sent from the encoder 2470 associated with the second drive assembly 2400. In such instances, a user (e.g., doctor, physician, nurse, technician, or the like) can input a set of parameters associated with a portion of the support track 2050 along which the trolley 2100 moves. In this manner, the user can define a desired path along the support track 2050 for a therapy session.

Figure 27:
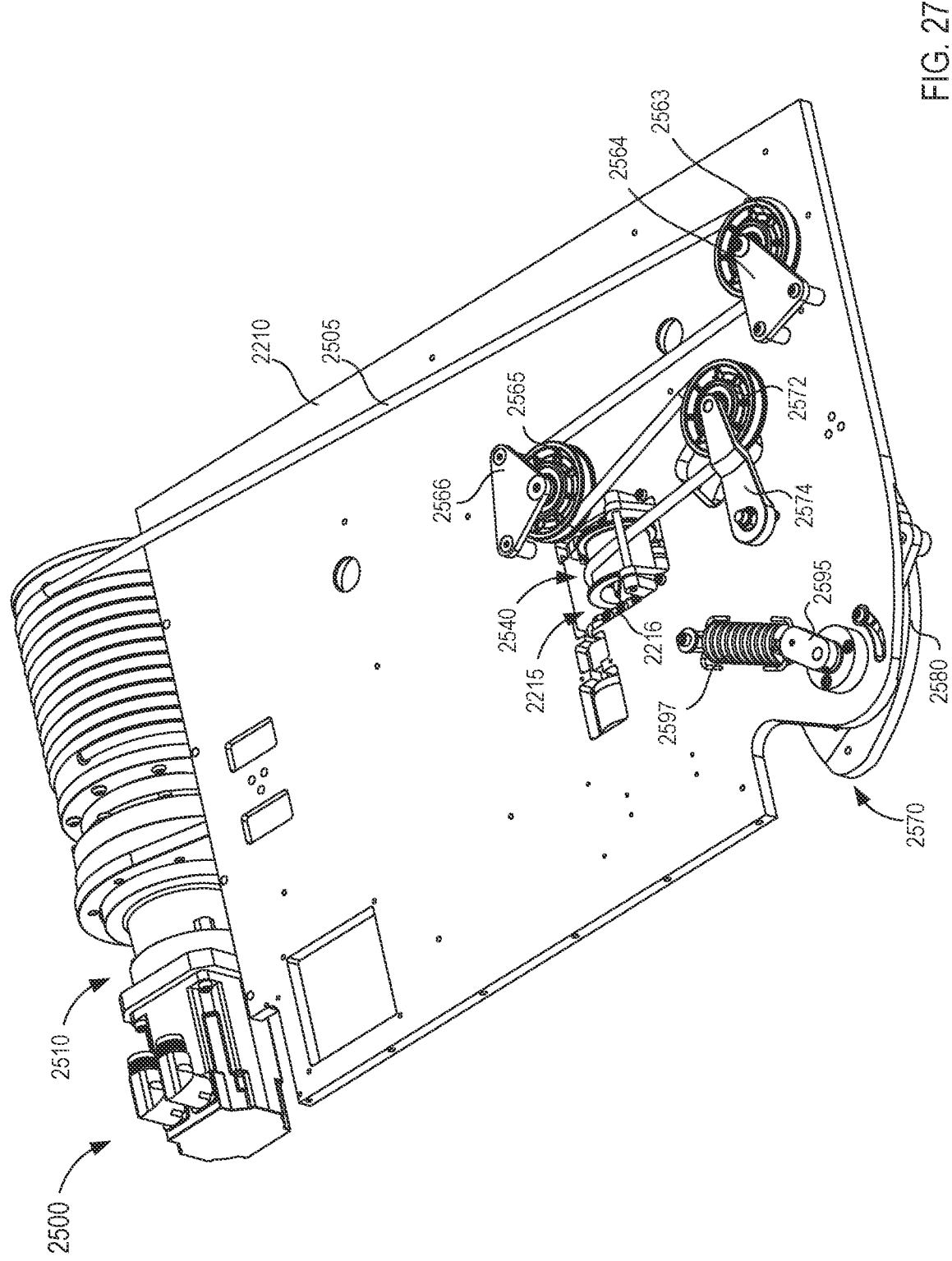
FIG. 27 is a perspective view of a support mechanism and a base included in the housing of FIG. 8 both of which are included in the trolley of FIG. 4.

FIGS. 27-33 illustrate the support mechanism 2500 included in the trolley 2100. As shown in FIG. 27, the support mechanism 2500 includes a tether 2505, a winch assembly 2510, a guide mechanism 2540, a first pulley 2563, a second pulley 2565, and a cam mechanism 2570. The tether 2505 can be, for example, a rope or other long flexible member that can be formed from any suitable material such as nylon or other suitable polymer. The tether 2505 includes a first end portion 2506 that is coupled to a portion of the winch assembly 2510 and a second end portion 2507 that can be coupled to any suitable patient attachment mechanism such as, for example, the patient attachment mechanism 2800 shown in FIG. 34. The tether 2505 is configured to engage a portion of the winch assembly 2510, the guide mechanism 2540, the cam mechanism 2570, the first pulley 2563, and the second pulley 2565 such that the support mechanism 2500 actively supports at least a portion of the body weight of a patient, as described in further detail herein.

Figure 29:
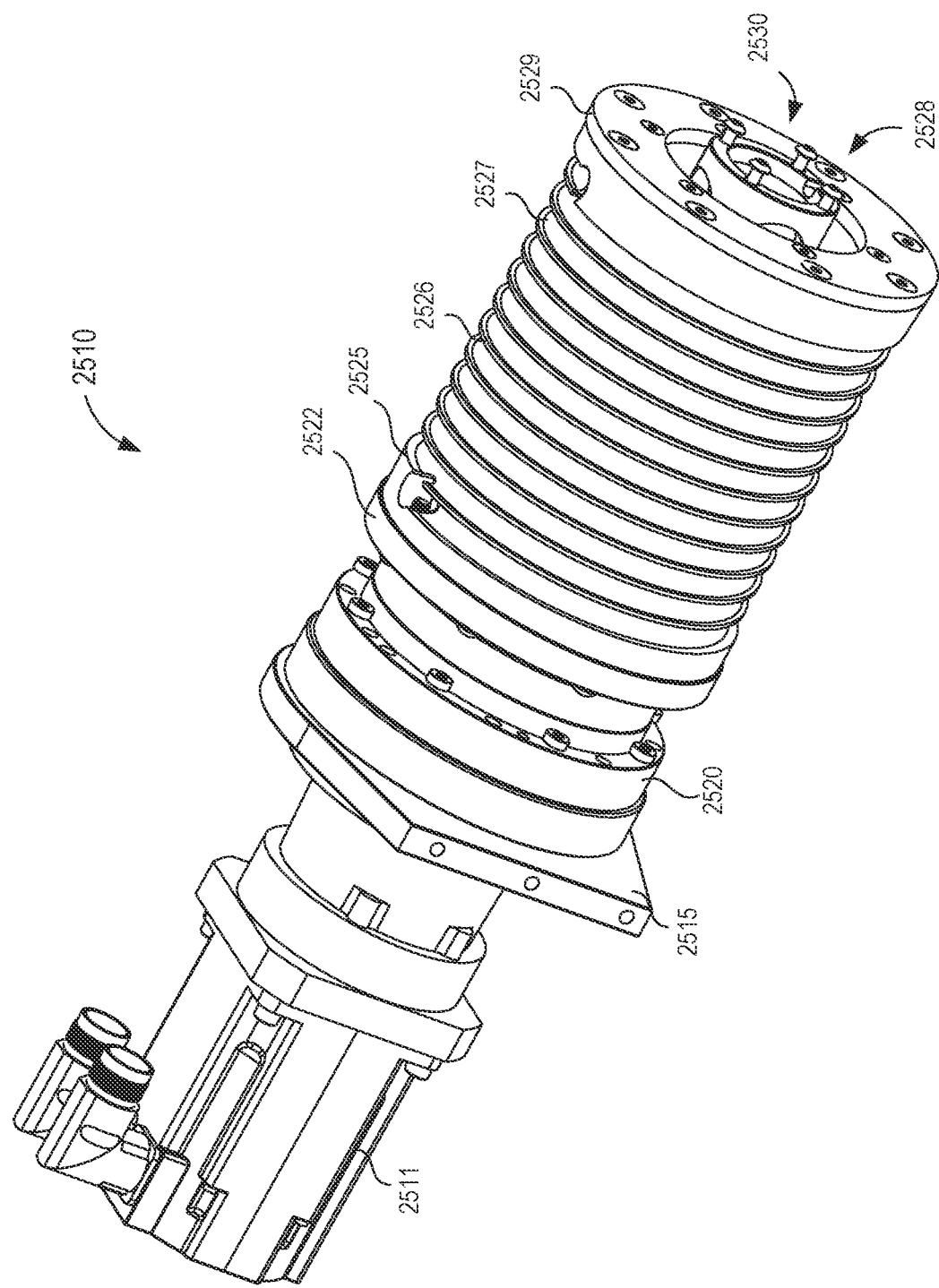
FIG. 29 is a perspective view of a winch assembly included in the support mechanism of FIG. 27.
Figure 30:
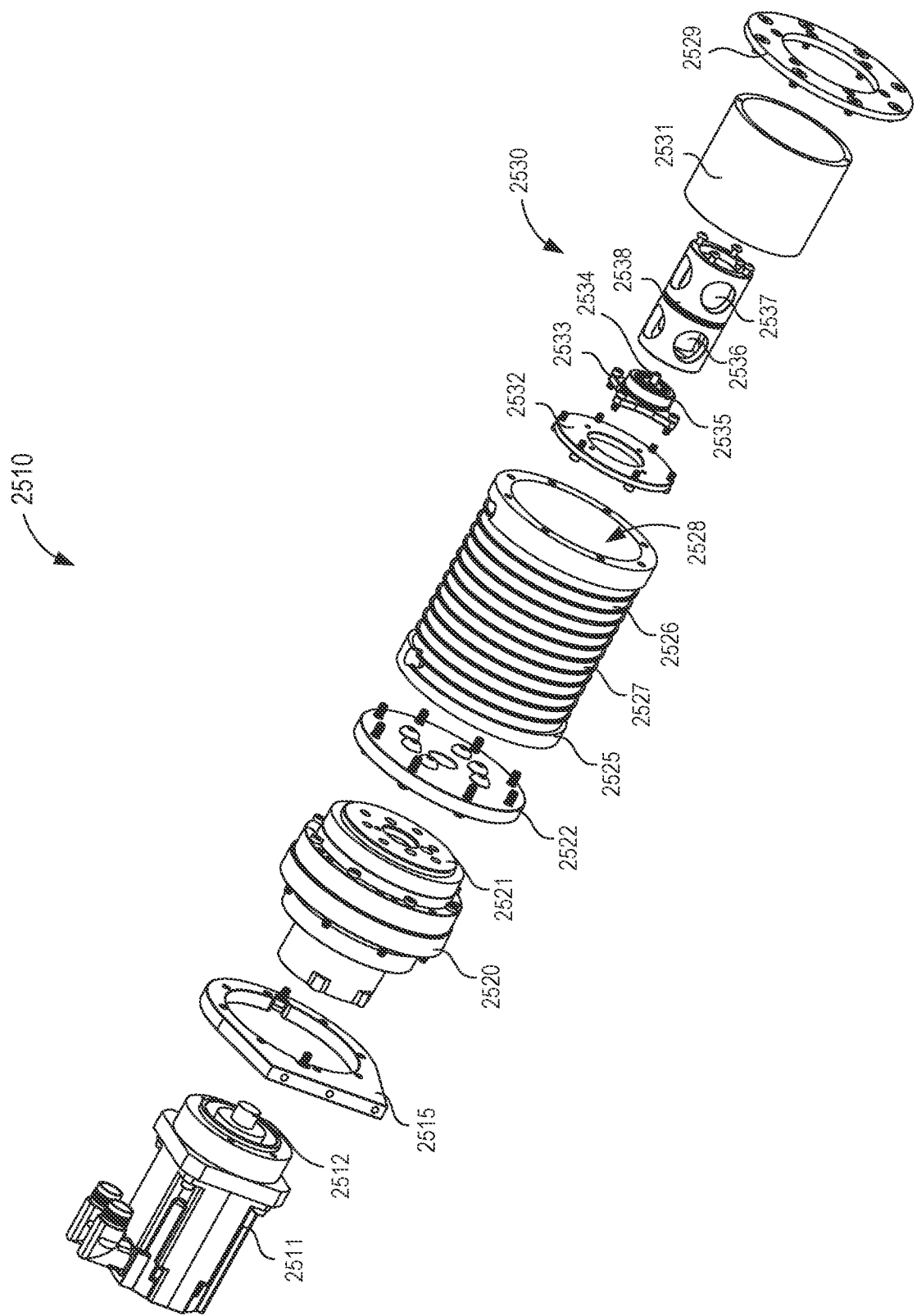
FIG. 30 is an exploded view of the winch assembly of FIG. 29.

As shown in FIGS. 29 and 30, the winch assembly 2510 includes a motor 2511, a mounting flange 2515, a coupler 2520, a drum 2525, and encoder assembly 5230. The motor 2511 is coupled to the coupler 2520 and is in electrical communication with a portion of the electronic system 2700. The motor 2511 includes an output shaft 2512 that engages an input portion (not shown) of the coupler 2520 such that rotation of the output shaft 2512 of the motor 2511 rotates an output member 2521 of the coupler 2520. More specifically, the motor 2511 receives an activation signal (e.g., a flow of electrical current) from the electronic system 2700 to cause the motor 2511 to rotate the output shaft 2512 in a first rotational direction or in a second rotational direction, opposite the first rotational direction. The output shaft 2512, in turn, rotates the output member 2521 of the coupler 2520 in the first rotational direction or the second rotational direction, respectively.

The mounting flange 2515 is disposed about a portion of the coupler 2520 and includes a portion that can be coupled to the third side member 2250 of the housing 2200. In this manner, the motor 2511 is supported by the mounting flange 2515 and the housing 2200. The output member 2521 of the coupler 2520 is coupled to a mounting plate 2522 of the drum 2525 such that when the output shaft 2512 of the motor 2511 is rotated in the first direction or the second direction, the drum 2525 is rotated in first direction or the second direction, respectively. While not shown, in some embodiments, the coupler 2520 can include one or more gears that can be arranged in any suitable manner to define a desirable gear ratio. In this manner, the rotation of the output shaft 2512 can be in the first direction or the second direction with a first rotational velocity and the rotation of the drum 2525 can be in the first direction or the second direction, respectively, with a second rotational velocity that is different from the first rotational velocity of the output shaft 2525 (e.g., a greater or lesser rotational velocity). In some embodiments, the coupler 2520 can include one or more clutches that can be configured to reduce and/or dampen an impulse (i.e., a force) that can result from the electronic system 2700 sending a signal to the motor 2511 that is associated with changing the rotational direction of the output shaft 2512.

The drum 2525 is disposed between the mounting plate 2522 and an end plate 2529. As described in further detail herein, an encoder drum 2531 of the encoder assembly 2530 is coupled to the end flange 2529 such that a least a portion of the encoder assembly 2530 is disposed within an inner volume 2528 defined by the drum 2525. The drum 2525 has an outer surface 2526 that defines a set of helical grooves 2527. The helical grooves 2527 receive a portion of the tether 2505 and define a path along which the tether 2505 can wrap to coil and/or uncoil around the drum 2525. For example, the motor 2511 can receive a signal from the electronic system 2700 to rotate the output shaft 2512 in the first direction. In this manner, the drum 2525 is rotated in the first direction and the tether 2505 can be, for example, coiled around the drum 2525. Conversely, the motor 2511 can receive a signal from the electronic system 2700 to rotate the output shaft 2512 in the second direction, thus, the drum is rotated in the second direction and the tether 2505 can be, for example, uncoiled from the drum 2525.

Figure 28:
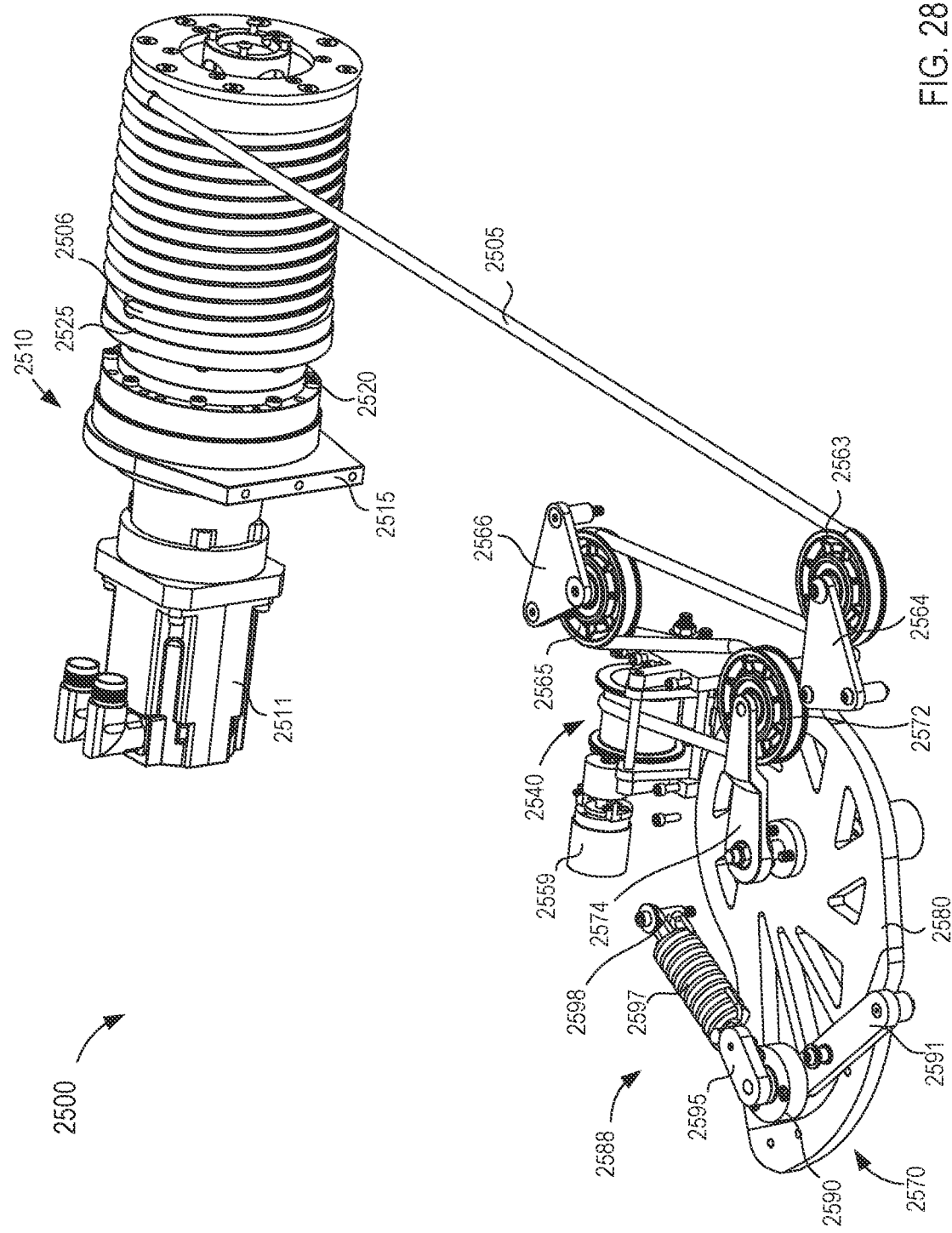
FIG. 28 is a perspective view of the support mechanism of FIG. 27.

The encoder assembly 2530 includes the encoder drum 2531, a mounting flange 2532, a bearing bracket 2533, a bearing 2535, a coupler 2536, an encoder 2537, and an encoder housing 2538. As described above, a first end portion of the encoder drum 2531 is coupled to the end flange 2529 of the drum 2525 such that a portion of the encoder assembly 2530 is disposed within the inner volume 2528 of the drum 2525. The mounting flange 2532 is coupled to a second end portion of the encoder drum 2531 and is further coupled to the bearing bracket 2533. The bearing bracket 2533 includes an axle 2534 about which the bearing 2535 is disposed. The coupler 2536 is coupled to the axle 2534 of the bearing bracket 2533 and is configured to couple the encoder 2537 to the bearing bracket 2533. As shown in FIG. 28, the coupler 2536 and the encoder 2537 are disposed within the encoder housing 2538. More specifically, the coupler 2536 is movably disposed within the encoder housing 2538 and the encoder 2537 is fixedly coupled to the encoder housing 2538. Moreover, a first end portion of the encoder housing 2538 is disposed about the bearing 2535 and a second end portion of the encoder housing 2538 is in contact with and fixedly coupled to the recessed portion 2244 of the second side member 2240 of the housing 2240. In this manner, the encoder drum 2531, the mounting flange 2532, the bearing bracket 2533, and the coupler 2536 are configured to rotate concurrently with the drum 2525, relative to the encoder 2537 and the encoder housing 2538. Thus, the encoder 2537 can receive and/or determine information associated with the rotation of the drum 2525. For example, the encoder 2537 can determine position, rotational velocity, rotational acceleration, feed rate of the tether 2505, or the like. Furthermore, the encoder 2537 can be in electrical communication (e.g., via a wired communication or a wireless communication) with a portion of the electronic system 2700 and can send information associated with the winch assembly 2510 to the portion of the electronic system 2700. Upon receiving the information from the encoder 2537, a portion of the electronic system 2700 can send a signal to any other suitable system associated with performing an action (e.g., increasing or decreasing the power of one or more motors or the like), as described in further detail herein.

Figure 31:
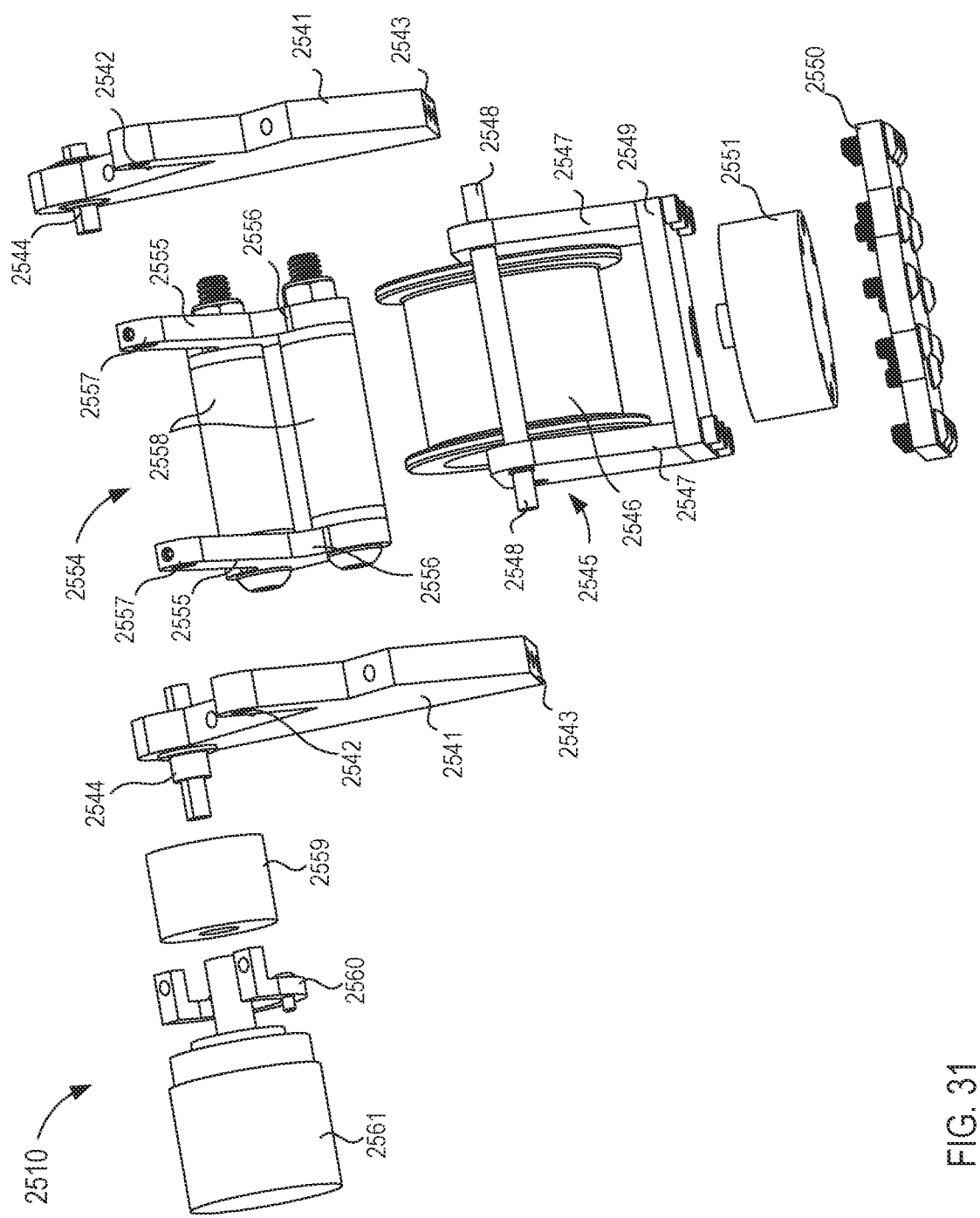
FIG. 31 is an exploded view of a guide assembly included in the support mechanism of FIG. 27.

Referring back to FIG. 27, the guide mechanism 2540 of the support mechanism 2500 is at least partially disposed within the guide mechanism opening 2215 of the base 2210 included in the housing 2200. More specifically, the guide mechanism 2540 includes a set of mounting brackets 2541 that are coupled to the mounting tabs 2216 of the base 2210. In this manner, at least a portion of the guide mechanism 2540 is suspended within the guide mechanism opening 2215. As shown in FIG. 31, the guide mechanism 2540 includes the mounting brackets 2541, a guide drum assembly 2545, a stopper bracket 2550, a stopper 2551, a roller assembly 2554, a coupler 2559, a support bracket 2560, and an encoder 2561. As described above, the mounting brackets 2541 are coupled to the mounting tabs 2216 of the base 2210. The mounting brackets 2541 each include a first mounting portion 2542 that is movably coupled to a portion of the guide drum assembly 2545, a second mounting portion 2543 that is fixedly coupled to the stopper bracket 2550, and a pivot portion 2544 that is movably coupled to a portion of the roller assembly 2554. The stopper bracket 2550 is further coupled to the stopper 2551 and is configured to limit a movement of the guide drum assembly 2545 relative to the mounting brackets 2541.

The guide drum assembly 2545 includes a guide drum 2546, a set of pivot plates 2547, and a stopper plate 2549. The guide drum 2546 is movably coupled to the pivot plates 2547. For example, while not shown in FIG. 31, the pivot plates 2547 can each include an opening configured to receive an axle about which the guide drum 2546 can rotate. The pivot plates 2547 each include a pivot axle 2548 that can be disposed within an opening (not shown) defined by the first mounting portion 2542 of the mounting brackets 2541. In this manner, the guide drum assembly 2545 can pivot about the pivot axles 2548 relative to the mounting brackets 2541. The stopper plate 2549 is coupled to the pivot plates 2547 and is configured to engage a portion of the stopper 2551 to limit the pivoting motion of the guide drum assembly 2545 relative to the mounting brackets 2541. More specifically, with the stopper bracket 2550 fixedly coupled to the mounting brackets 2541 and to the stopper 2551, the guide drum assembly 2545 can pivot toward the stopper bracket 2550 (e.g., in response to a force exerted on tether 2505, as described in further detail herein) such that the stopper plate 2549 is placed in contact with the stopper 2551. The stopper 2551 can be any suitable shape, size, or configuration. For example, in some embodiments, the stopper 2551 can be an elastomeric member configured to absorb a portion of a force exerted by the guide drum assembly 2545 when the stopper plate 2549 is placed in contact with the stopper 2551.

The roller assembly 2554 includes a set of swing arms 2555 and a set of rollers 2558. The swing arms 2555 include a first end portion 2556 and a second end portion 2557. The first end portion 2556 of the swing arms 2555 are movably coupled to the rollers 2558. More specifically, the rollers 2558 can be arranged such that a spaced defined between the rollers 2558 can receive a portion of the tether 2505. Thus, when the tether 2505 is moved relative to the rollers 2558, the rollers 2558 can rotate relative to the swing arms 2555. The second end portion 2557 of the swing arms 2555 are coupled to the pivot portion 2543 of the mounting brackets 2541. For example, as shown in FIG. 31, the pivot portion 2543 can include a set of axles disposed within a bearing. In this manner, the second end portion 2557 of the swing arms 2555 can couple to the axles such that the roller assembly 2554 and the axles can pivot relative to the mounting brackets 2541 (e.g., in response to a force exerted on tether 2505, as described in further detail herein).

The coupler 2559 included in the guide mechanism 2540 is coupled to the axle of the pivot portion 2543 of one of the mounting brackets 2541. The coupler 2559 is further coupled to an input shaft of the encoder 2561. More specifically, the support bracket 2560 is coupled to the base 2210 of the housing 2200 and is also coupled to a portion of the encoder 2561 to limit the movement of a portion of the encoder 2561 relative to the base 2210. Thus, the encoder 2561 can receive and/or determine information associated with the pivoting motion of the roller assembly 2554 relative to the mounting brackets 2541. For example, the encoder 2561 can determine position, rotational velocity, rotational acceleration, feed rate of the tether 2505, or the like. Furthermore, the encoder 2561 can be in electrical communication (e.g., via a wired communication or a wireless communication) with a portion of the electronic system 2700 and can send information associated with the guide mechanism 2540 to the portion of the electronic system 2700. Upon receiving the information from the encoder 2561, a portion of the electronic system 2700 can send a signal to any other suitable system associated with performing an action (e.g., increasing or decreasing the power of one or more motors 2311 and 2511, changing the direction of one or more of the motors 2311 and 2511, or the like).

Figure 32:
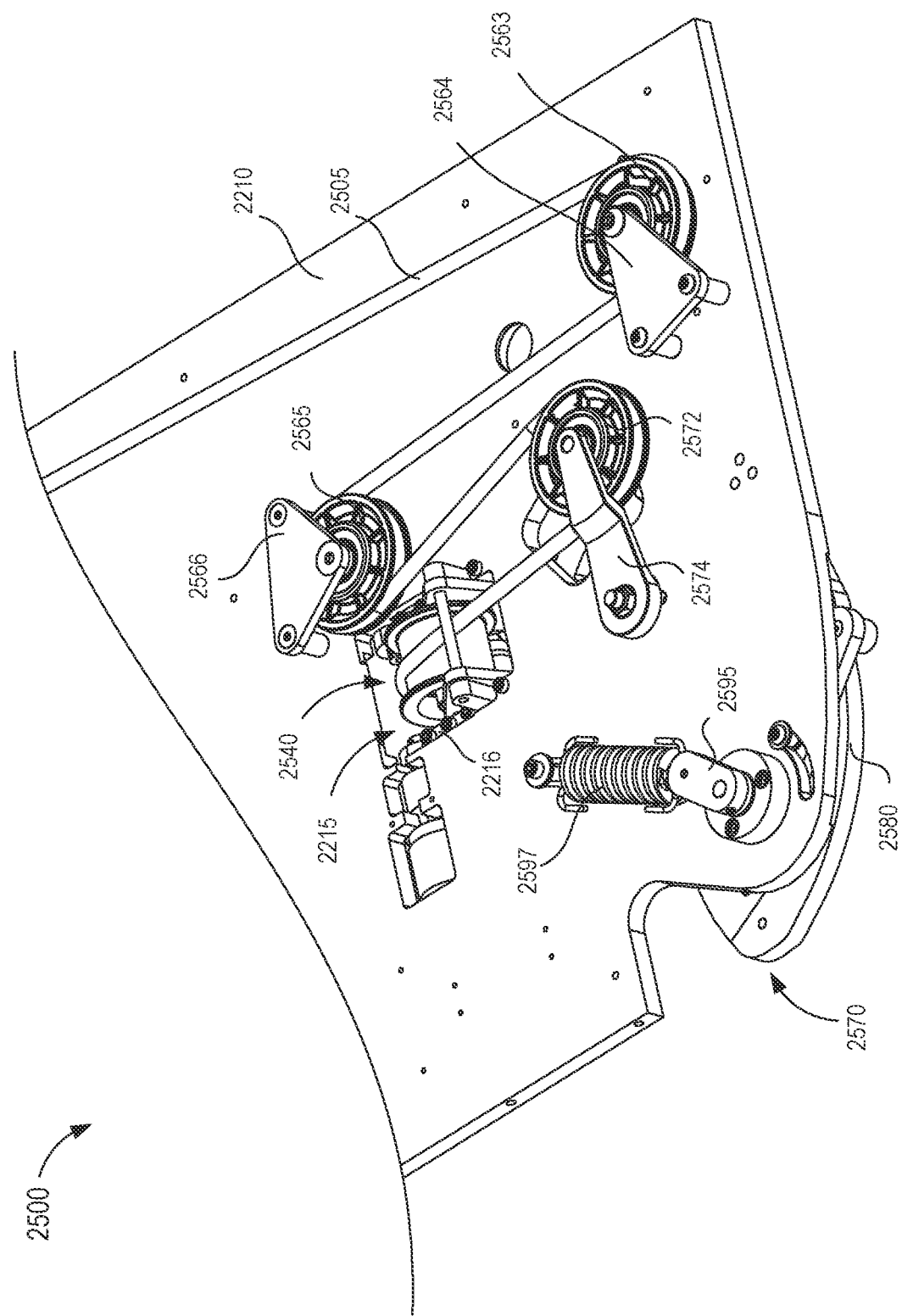
FIG. 32 is a perspective view the support mechanism of FIG. 27 shown without the winch assembly of FIG. 28.

As shown in FIG. 32, the first pulley 2563 and the second pulley 2565 are rotatably coupled to a first pulley bracket 2564 and a second pulley bracket 2565, respectively. The first pulley bracket 2564 and the second pulley bracket 2565 are further coupled to the base 2210 of the housing 2200. In this manner, the first pulley 2563, the second pulley 2565, and at least a portion of the cam mechanism 2570 can be engage the tether 2505 to provide a mechanical advantage to the winch assembly 2510, as described in further detail herein.

Figure 33:
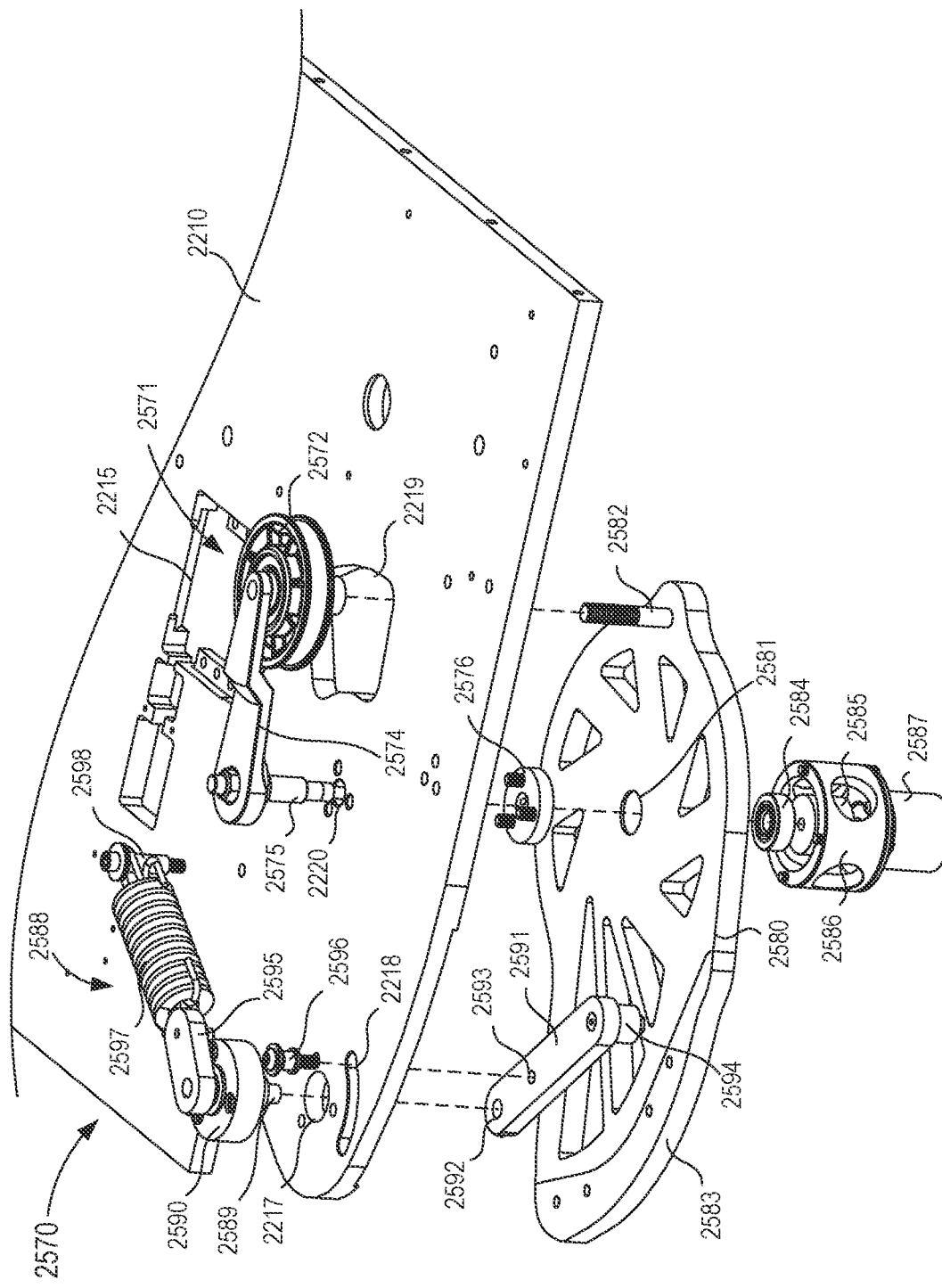
FIG. 33 is an exploded view of a cam assembly included in the support mechanism of FIG. 27.

As shown in FIGS. 32 and 33, the cam mechanism 2570 includes a cam pulley assembly 2571, a cam 2580, a coupler 2585, a coupler housing 2586, an encoder 2587, and a bias mechanism 2588. The cam pulley assembly 2571 includes a cam pulley 2572, a cam arm 2574, a cam axle 2575, and a spacer 2576. The cam arm 2574 includes a first end portion that is rotatably coupled to the cam pulley 2572 and a second end portion that is rotatably coupled to the cam axle 2575. The cam axle 2575 extends through the cam pivot opening 2220 (defined by the base 2210), the spacer 2576, and the cam 2580 to be coupled to the coupler 2585. The spacer 2576 is coupled to the base 2210 and is disposed between the second side 2212 of the base 2210 and a surface of the cam 2580. The spacer 2576 can be formed from a material having a relatively low friction coefficient such as, for example, polyethylene, nylon, or the like to allow the cam 2580 to move relatively easily along a surface of the spacer 2576. In this manner, the cam 2580 is spaced a sufficient distance from the second side 2212 of the base 2210 to allow a portion of the bias mechanism 2588 to be disposed therebetween, as described in further detail herein.

The cam 2580 of the cam assembly 2570 defines an opening 2581, and includes a mounting portion 2582 and an engagement surface 2583. The engagement surface 2583 of the cam 2580 is in contact with a portion of the bias mechanism 2588, as described in further detail herein. The opening 2581 defined by the cam 2580 receives a bearing 2584. When disposed within the opening 2581, the bearing 2584 allows the cam 2580 to rotate about the cam axle 2575. The mounting portion 2582 of the cam 2580 is at least partially disposed within the cam pulley opening 2219 and is coupled to the cam pulley 2572. For example, as shown in FIG. 33, the mounting portion 2582 is a threaded rod extending from a surface of the cam 2580 that can be received by a threaded opening (not shown) defined by the cam pulley 2572. In this manner, movement of the cam pulley assembly 2571, in response to a change in force exerted on the tether 2505 (e.g., an increase or a decrease of force), rotates the cam 2580 about the cam axle 2575 (as described above).

The coupler housing 2586 is coupled to a surface of the cam 2580 that is opposite the side adjacent to the spacer 2576. In other words, the coupler housing 2586 extends away from the base 2210 when coupled to the cam 2580. The coupler housing 2586 is further coupled to the encoder 2587. Thus, when the cam 2580 is rotated about the cam axle 2575, the coupler housing 2586 and the encoder 2587 are also rotated about the cam axle 2575. The coupler 2585 is disposed within the coupler housing 2586 and is coupled to both the cam axle 2575 and an input portion (not shown) of the encoder 2575. Therefore, with the coupler 2585 coupled the to the cam axle 2575 and the input portion of the encoder 2587, the rotation of the cam 2580 and the coupler housing 2586 rotates the encoder 2587 about its input portion. In this manner, the encoder 2587 can receive and/or determine information associated with the pivoting motion of the cam 2580 and/or the cam pulley assembly 2571 relative to the cam axle 2575. For example, the encoder 2587 can determine position, rotational velocity, rotational acceleration, feed rate of the tether 2505, or the like. Furthermore, the encoder 2587 can be in electrical communication (e.g., via a wired communication or a wireless communication) with a portion of the electronic system 2700 and can send information associated with the cam mechanism 2570 to the portion of the electronic system 2700. Upon receiving the information from the encoder 2587, a portion of the electronic system 2700 can send a signal to any other suitable system associated with performing an action (e.g., increasing or decreasing the power of one or more motors 2311 and 2511, changing the direction of one or more of the motors 2311 and 2511, or the like).

The bias mechanism 2588 includes an axle 2589, a mounting flange 2590, a first pivot arm 2591, a second pivot arm 2595, a guide member 2596, a bias member 2597, and a mounting post 2598. The axle 2589 is movably disposed within the mounting flange 2588 and is configured to extend through the bias mechanism opening 2217 defined by the base 2210 to be fixedly disposed within an axle opening 2592 defined by the second pivot arm 2591. Expanding further, a portion of the mounting flange 2589 extends through the bias mechanism opening 2217 and beyond the second side 2212 of the base 2210 to be in contact with a surface of the second pivot arm 2591. In this manner, the surface of the second pivot arm 2591 is offset from the second side 2212 of the base 2210. Moreover, the arrangement of the spacer 2576 (described above) is such that when the axle 2589 is disposed within the axle opening 2592, a second surface of the first pivot arm 2591 is offset from a surface of the cam 2580. Thus, the first pivot arm 2591 can pivot relative to the base 2210 with a relatively low amount of friction. In some embodiments, at least the portion of the mounting flange 2590 that extends through the bias mechanism opening 2217 can be made from a material having a relatively low coefficient of friction such as, for example, polyethylene, nylon, or the like.

The first pivot arm 2591 defines the axle opening 2592 and a guide member opening 2593, and includes an engagement member 2594. The guide member opening 2593 is configured to receive a portion of the guide member 2596 to couple the guide member 2596 to the first pivot arm 2591. The guide member 2596 extends from a surface of the first pivot arm 2591 toward the base 2210 such that a portion of the guide member 2596 extends through the guide member opening 2218 defined by the base 2210. In some embodiments, the guide member 2596 can include a sleeve or the like configured to engage the base 2210. In such embodiments, the sleeve can be formed from a material having a relatively low friction coefficient such as, for example, polyethylene, nylon, or the like. Thus, the guide member 2596 can move within the guide member track 2218 when the first pivot arm 2591 is moved relative to the base 2210.

The engagement member 2594 of the first pivot arm 2591 extends from a surface of the first pivot arm 2591 toward the cam 2580. In this manner, the engagement member 2594 can be moved along the engagement surface 2583 of the cam 2580 when the cam 2580 is moved relative to the base 2210, as described in further detail herein. In some embodiments, the engagement member 2594 can be rotatably coupled to the first pivot arm 2591 and can be configured to roll along the engagement surface 2583. In other embodiments, the engagement member 2594 and/or the engagement surface 2583 can be formed from a material having a relatively low friction coefficient. In such embodiments, the engagement member 2594 can be slid along the engagement surface 2583.

The second pivot arm 2595 of the bias mechanism 2588 has a first end portion that is fixedly coupled to the axle 2589 and a second end portion that is coupled to a first end portion of the bias member 2597. The mounting post 2598 is fixedly coupled to the base 2210 and is further coupled to a second end portion of the bias member 2597. Therefore, the second pivot arm 2595 can pivot relative to the mounting flange 2590 between a first position, where the bias member 2597 is in a first configuration (undeformed configuration), and a second position, where the bias member 2597 is in a second configuration (deformed configuration). For example, in some embodiments, the bias member 2597 can be a spring that can be moved between an uncompressed configuration (e.g., the first configuration) and a compressed configuration (e.g., the second configuration). In other embodiments, the bias member 2597 can be a spring that can be moved between an unexpanded and an expanded configuration. In other words, the bias member 2597 can be either a compression spring or an expansion spring, respectively. In still other embodiments, the bias member 2597 can be any other suitable biasing mechanism and/or energy storage device such as, for example, a gas strut or the like.

When the cam 2580 is rotated from a first position to a second position in response to a force exerted on the tether 2505 (as described above), the bias member 2597 can exert a reaction force that resists the rotation of the cam 2580. More specifically, with the engagement member 2594 in contact with the engagement surface 2583 of the cam 2580, the bias member 2587 exerts the reaction force that resists the movement of the engagement member 2594 along the engagement surface 2583. Therefore, in some instances, relatively small changes in the force exerted on the tether 2505 may not be sufficiently large to rotate the cam 2580 and the cam pulley assembly 2571. This arrangement can reduce undesirable changes in the amount of body weight supported by the support system 2000 in response to minor fluctuations of force exerted on the tether 2505.

Figure 34:
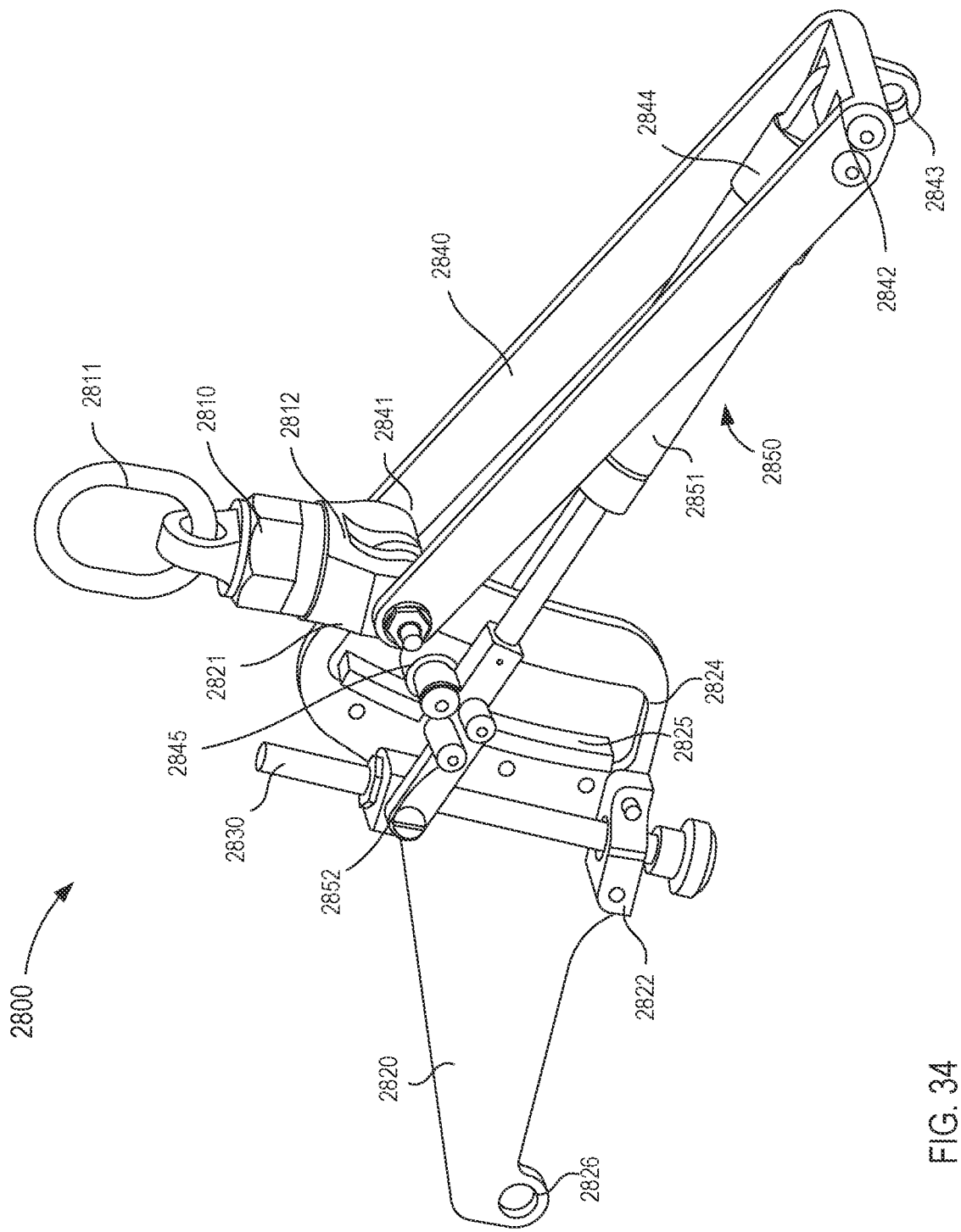
FIG. 34 is a perspective view of a patient attachment mechanism according to an embodiment.

FIG. 34 illustrates the patient attachment mechanism 2800. The patient attachment mechanism 2800 can be mated with the second end portion 2507 of the tether 2505 to couple the patient attachment mechanism 2800 to the trolley 2100. Moreover, the patient attachment mechanism 2800 can be coupled to a harness or the like, worn by the patient, to couple the patient to the support system 2000, as described below.

The patient attachment mechanism 2800 has a first coupling portion 2810 and a second coupling portion 2812. The first coupling portion 2810 includes a coupling mechanism 2811 configured to couple to the second end portion 2507 of the tether, as described above. For example, the coupling mechanism 2811 can be a loop or hook configured to couple to an attachment device of the tether 2505 (not shown in FIGS. 2-34). The second coupling portion 2821 is movably coupled to a first arm 2820 and a second arm 2840. As described in further detail herein, the first 2820 and the second arm 2840 can pivot relative to each other to absorb at least a portion of a force exerted by the weight of a patient coupled to the patient attachment mechanism 2800.

The first arm 2820 of the patient attachment mechanism 2800 includes a pivot portion 2821 and a mount portion 2822. The pivot portion 2821 is movably coupled to the second coupling portion 2812. The mount portion 2822 receives a guide rod 2830, as described in further detail herein. The first arm 2820 defines a slot 2824 that receives a portion of the second arm 2840 and an opening 2826 that receives a portion of a harness worn by the patient.

The second arm 2840 has a pivot portion 2841 and a coupling portion 2842. The pivot portion 2841 is movably coupled to the second coupling portion 2812. In this manner, both the first arm 2820 and the second arm 2840 can pivot relative to the coupling portion 2812 and relative to each other, as described in further detail herein. The coupling portion 2842 defines an opening 2843 that receives a portion of the harness worn by the patient. The coupling portion 2842 is also movably coupled to a first end portion of a first energy storage member 2844 and a first end portion of a second energy storage member 2851 (collectively referred to as energy storage member 2850). The energy storage members 2850 can be, for example, gas struts or the like.

As shown in FIG. 34, the energy storage members 2850 are configured to extend towards the first arm 2820. More specifically, the second energy storage member 2851 includes a coupling portion 2852 that is movably coupled to the guide rod 2830 of the first arm 2820. The first energy storage member 2844 also includes a coupling portion (not shown in FIG. 34) that is movably coupled to an engagement member 2845 and further coupled to the coupling portion 2852 of the second energy storage member 2851. Similarly stated, the coupling portion of the first energy storage member 2844 extends in a substantially perpendicular direction relative to a longitudinal centerline (not shown) of the first energy storage member 2844.

The engagement member 2845 is movably coupled to the coupling portion of the first energy storage member 2844 and the coupling portion 2852 of the second coupling portion 2851. The engagement member 2845 is configured to be placed in contact with an engagement surface 2825 of the first arm 2820 that at least partially defines the slot 2825. Similarly stated, the engagement member 2845 is disposed within the slot 2824 defined by the first arm 2820 and in contact 2825 with the engagement surface 2825. Moreover, the arrangement of the engagement member 2845 and the energy storage members 2850 allows the engagement member 2845 to roll along the engagement surface 2825.

When a force is exerted on the first arm 2820 the second arm 2840 by the patient, the first arm 2820 and the second arm 2840 pivot about the second coupling portion 2812 towards one another. The pivoting of the first arm 2820 and the second arm 2840 moves the engagement member 2845 along the engagement surface 2825 and further moves the energy storage members 2850 for a configuration of lower potential energy to a configuration of higher potential energy (e.g., compresses a gas strut). Thus, the energy storage members 2850 can absorb at least a portion of a force exerted of the patient attachment mechanism 2800. Moreover, when the force exerted on the patient attachment mechanism 2800 is less than the potential energy of the energy storage members 2850 in the second configuration, the energy storage members 2850 can move towards their first position to pivot the first arm 2820 and the second arm 2840 away from one another.

In use, the patient support system 2000 can be used to actively support at least a portion of the body weight of a patient that is coupled thereto. For example, in some instances, a patient is coupled to the patient attachment mechanism 2800, which, in turn, is coupled to the second end portion 2507 of the tether 2505, as described above. In this manner, the support system 2000 (e.g., the tether 2505, the trolley 2100, and the support rail 2050) can support at least a portion of the body weight of the patient.

In some instances, a user (e.g., a technician, a therapist, a doctor, a physician, or the like) can input a set of system parameters associated with the patient and the support system 2000. For example, in some embodiments, the user can input a set of system parameters via a remote control device such as, for example, a personal computer, a mobile device, a smart phone, or the like. In other embodiments, the user can input system parameters on, for example, a control panel included in or on the trolley 2100. The system parameters can include, for example, the body weight of the patient, the height of the patient, a desired amount of body weight to be supported by the support system 2000, a desired speed of the patient walking during gait therapy, a desired path or distance along the length of the support track 2050, or the like.

With the system parameters entered, the patient can begin, for example, a gait therapy session. In some instances, the trolley 2100 can move along the support structure 2050 (as described above with reference to FIGS. 23 and 26) in response to the movement of the patient. Similarly stated, the trolley 2100 can move along the support structure 2050 as the patient walks. In some instances, the trolley 2100 can be configured to remain substantially over-head of the patient. In such instances, the electronic system 2700 can execute a set of instructions associated with controlling the motor 2311 of the drive system 2300 based on information received from, for example, the encoder 2470 of the drive system 2300, the encoder 2561 of the guide mechanism 2540, and/or the encoder 2587 of the cam assembly 2570. For example, the electronic system 2700 can send a signal to the motor 2311 of the drive system 2300 operative in changing the rotational velocity of the drive wheels 2385 based at least in part on information associated with the encoder 2561 of the guide mechanism 2540. Expanding further, in some instances, the patient may walk faster than the trolley 2100, thereby changing the angle of the tether 2505 and the guide mechanism 2540 relative to the base 2210. Thus, the encoder 2561 of the guide mechanism 2540 can send a signal associated with the angle of the guide mechanism 2540 relative to the base 2210 and upon receiving the signal, the electronic system 2700 can send a signal to the motor 2311 of the drive system 2300 to increase the rotational velocity of the drive wheels 2385. In this manner, the position of the trolley 2100 relative to the patient can be actively controlled based at least in part on a user defined parameter and further based at least in part on information received from the encoder 2470 of the drive system 2300, the encoder 2561 of the guide mechanism 2540, and/or the encoder 2587 of the cam assembly 2570. Although described as being actively controlled to be over-head of the patient, in other instances, the user can define a parameter associated with the trolley 2100 trailing the patient by a desired distance or leading the patient by a desired distance.

In some instances, the amount of force exerted on the tether 2505 by the patient may increase or decrease. By way of example, a patient may stumble, thereby increasing the amount of force exerted on the tether 2505. In such instances, the increase of force exerted on the tether 2505 can pivot the guide mechanism 2540 and can move the cam pivot arm 2571 in response to the increase in force. The movement of the cam pivot arm 2571 moves the cam assembly 2570 (as described above with reference to FIG. 33). In this manner, the encoder 2561 of the guide mechanism 2540 and the encoder 2587 of the cam assembly 2570 can send a signal to the electronic system 2700 associated with the changes in the state of the guide mechanism 2540 and the cam assembly 2570, respectively.

Upon receiving the signals from the encoders 2561 and 2587, the processor can execute a set of instructions included in the memory associated the cam assembly 2570. For example, the processor can determine the position of the cam 2580 or the guide mechanism 2540, the velocity and the acceleration of the cam 2580 or the guide mechanism 2540, or the like. Based on the determining of the changes in the guide mechanism 2540 and the cam assembly 2570 configurations, the processor can send a signal to the motor 2311 of the first drive assembly 2310 and/or the motor 2511 of the winch assembly 2510 to change the current state of the drive system 2300 and/or the patient support mechanism 2500. In some instances, the magnitude of change in the state of the drive system and/or the patient support mechanism 2500 is based at least in part on a proportional-integral-derivative (PID) control. In such instances, the electronic system 2700 (e.g., the processor or any other electronic device in communication with the processor) can determine the changes of the patient support mechanism 2500 and model the changes based on the PID control. Based on the result of the modeling the processor can determine the suitable magnitude of change in the drive system 2300 and/or the patient support mechanism 2500.

After a relatively short time period (e.g., much less than a second, for example, after one or a few clock cycles of the processor) the processor can receive a signal from the encoder 2470 of the drive system 2300, the encoder 2537 of the winch assembly 2510, the encoder 2561 of the guide mechanism 2540, and/or the encoder 2587 of the cam assembly 2570 associated with a change in configuration of the drive system 2300, the winch assembly 2510, the guide mechanism 2540, and/or the cam assembly 2570, respectively. In this manner, one or more of the electronic devices included in the electronic system 2700, including but not limited to the processor, execute a set of instructions stored in the memory associated with the feedback associated with the encoders 2470, 2537, 2561, and 2587. Thus, the drive system 2300 and the patient support mechanism 2500 of the trolley 2100 can be actively controlled in response to a change in force exerted on the tether 2505 and based at least in part on the current and/or previous states of the drive system 2300 and the patient support system 2500. Similarly stated, the support system 2000 can actively reduce the amount a patient falls after stumbling or falling for other reasons.

Figure 35:
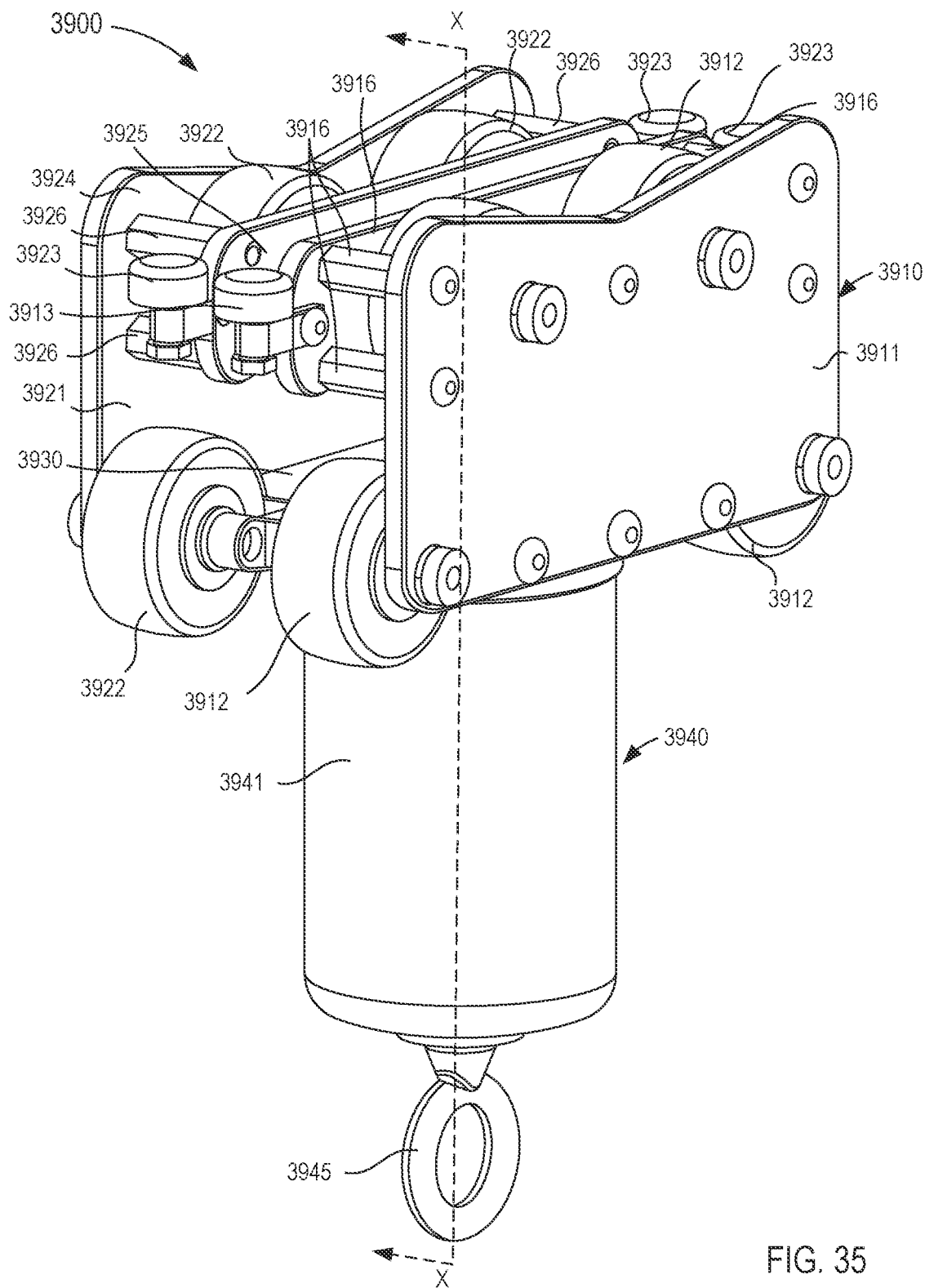
FIG. 35 is a perspective view of a body weight support system according to an embodiment.
Figure 36:
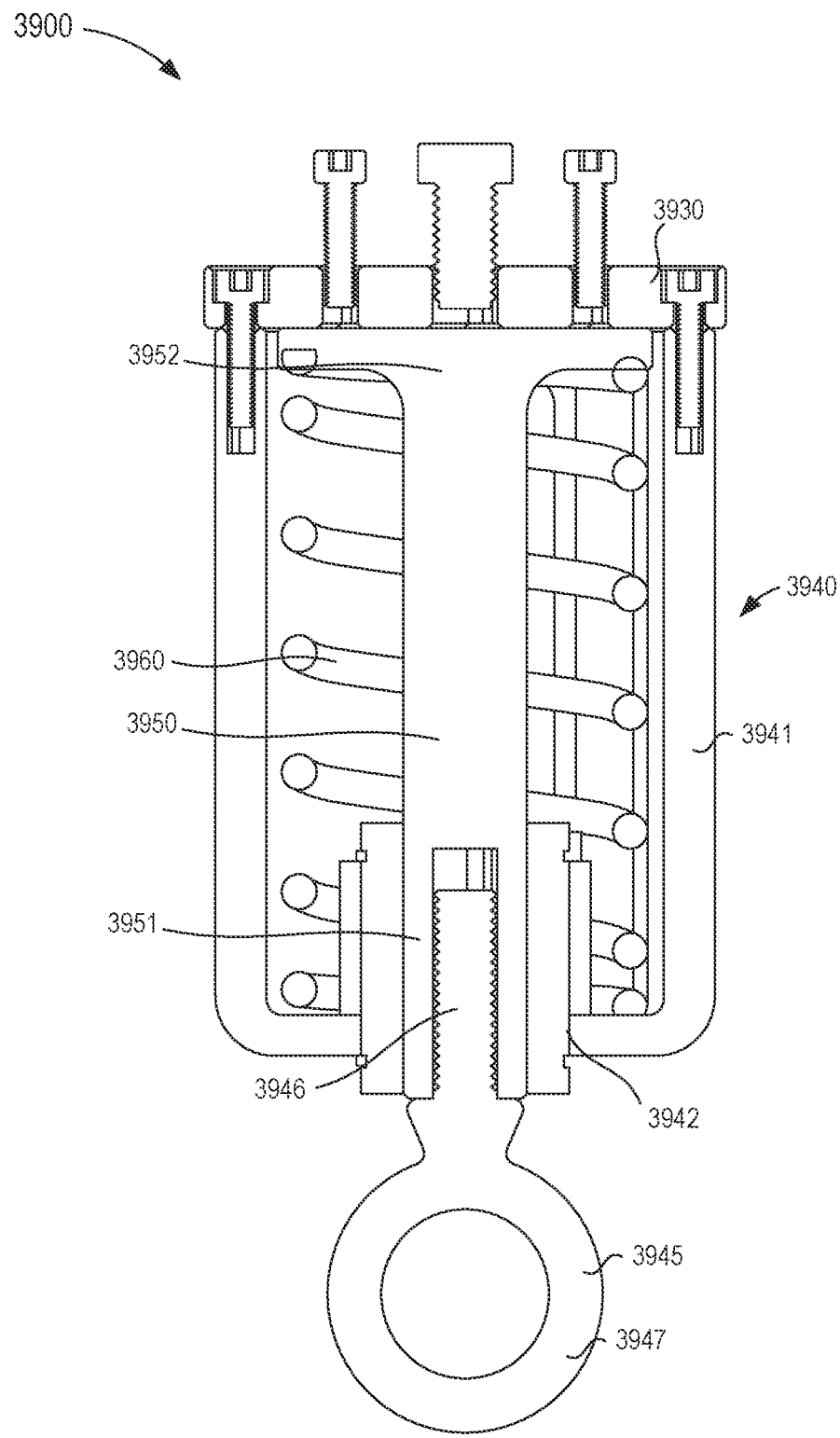
FIG. 36 is a cross sectional view of the body weight support system of FIG. 35 taken along the line X-X.

While the patient support system 2000 is described above with reference to FIGS. 2-34 as actively supporting a portion of the body weight of the patient, in some embodiments, a patient support system can passively (i.e., not actively) support a portion of the body weight of a patient. For example, FIGS. 35 and 36 illustrate a body weight support system 3900 according to an embodiment. The body weight support system 3900 (also referred to herein as "support system") can be used to support a portion of a patient's body weight, for example, during gait therapy, gait training, or the like. The support system 3900 can be movably coupled to a support track (not shown) that is configured to support the weight of the support system 3900 and the weight of the patient utilizing the support system 3900. The support track can be, for example, similar to or the same as the support track 2050 described above.

The support system 3900 includes a first coupling portion 3910 and a second coupling portion 3940. The first coupling portion 3910 is configured to movably couple to the support track, as described above. The first coupling portion 3910 includes a first side assembly 3911, a second side assembly 3921, and a base 3930. The first side assembly 3911 includes a set of drive wheels 3912, a set of guide wheels 3913, an outer wall 3914, an inner wall 3915, and a set of couplers 3916. The couplers 3916 are configured to extend between the outer wall 3914 and the inner wall 3915 to couple the outer wall 3914 and the inner wall 3915 together. The outer wall 3914 is further coupled to the base 3930. The drive wheels 3912 are arranged into an upper set of drive wheels 3912 configured to be disposed on a top surface of the support track, and a lower set of drive wheels 3912 configured to be disposed on a bottom surface of the support track. In this manner, the drive wheels 3912 roll along a horizontal portion of the support track (not shown in FIGS. 35 and 36). The guide wheels 3913 are arranged in a perpendicular orientation relative to the drive wheels 3912 and are configured to roll along a vertical portion of the support track (e.g., as similarly described above with reference to FIG. 23.

The second side assembly 3921 includes a set of drive wheels 3922, a set of guide wheels 3923, an outer wall 3924, an inner wall 3925, and a set of couplers 3916. The first side assembly 3911 and the second side assembly 3921 are substantially the same and arranged in a mirrored configuration. Therefore, the second side assembly 3921 is not described in further detail herein and should be considered the same as the first side assembly 3921 unless explicitly described.

As shown in FIG. 36, the second coupling portion 3940 includes a cylinder 3941, an attachment member 3945, a piston 3950, and an energy storage member 3960. The cylinder 3941 is coupled to the base 3930 and is configured to house the spring 3960 and at least a portion of the piston 3950. More specifically, the cylinder 3941 defines an opening 3942 at an end portion, opposite the base 3930, through which at least a first end portion 3951 of the piston 3950 can move. The piston 3950 further has a second end portion 3952 that is in contact with a portion of the energy storage member 3960. The energy storage member 3960 can be any suitable device configured to move between a first configuration having lower potential energy and a second configuration having a higher potential energy. For example, as shown in FIG. 36, the energy storage member 3960 can be a spring that is compressed when moved to its second configuration.

The attachment mechanism 3945 includes a first coupling portion 3946 that is coupled to the first end portion 3951 of the piston 3950, and a second coupling portion 3947 that can be coupled to, for example, a harness worn by a patient. As shown in FIGS. 35 and 36, the second end portion 3952 can be an annular protrusion. In this manner, a portion of the harness such as a hook or the like can be at least partially disposed within the opening defined by the second coupling portion 3947 to couple the patient to the support system 3900.

In use, the patient can be coupled to the support system 3900 (as described above) such that the support system 3900 supports at least a portion of the body weight of the patient. In this manner, the patient can walk along a path associated with the support track (not shown). With the support system 3900 coupled to the patient, the movement of the patient moves the support system 3900 along the support track. Similarly stated, the patient pulls the support system 3900 along the support track. In some instances, a patient may stumble while walking, thereby increasing the amount of force exerted on the support system 3900. In such instances, the increase in force exerted on the support system 3900 can be sufficient to cause the energy storage member 3960 to move from its first configuration towards its second configuration (e.g., compress). In this manner, the piston 3950 can move relative to the cylinder 3941 and the energy storage member 3960 can absorb at least a portion of the increase in the force exerted on the support structure 3900. Thus, if the patient stumbles the support system 3900 can dampen the impulse experienced by the patient that would otherwise result in known passive support systems 3900.

Although the support system 3900 is described as including an energy storage member, in other embodiments, the support system 3900 need not include the energy storage member. For example, in some embodiments, the support system 3900 can be coupled to, for example, the attachment mechanism 2800 described above with reference to FIG. 34. In this manner, the attachment mechanism 2800 can be used to dampen at least a portion of a change in force exerted on the support system 3900. For example, in some instances a patient coupled to the support system 3900 may stumble, thereby increasing the force exerted on the support system 3900. In such instances, the increase in force can move the first arm 2820 towards the second arm 2840 (see e.g., FIG. 34), thereby moving the energy storage member 2850 towards their second configuration. Thus, at least a portion of the increase in force can be absorbed by the attachment mechanism 2800.

Figure 37:
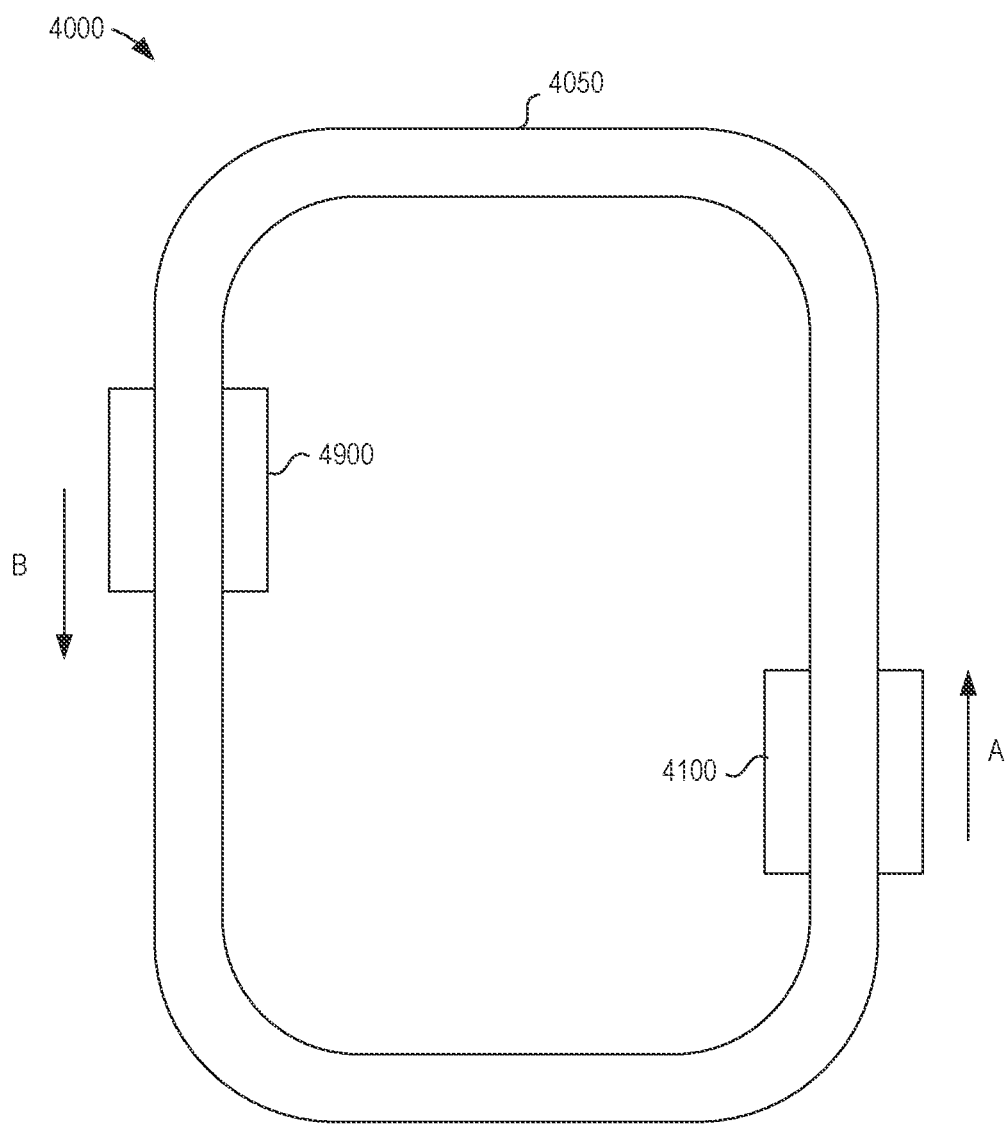
FIG. 37 is a schematic illustration of a support system according to an embodiment.

Although not shown in FIG. 2-36, one or more active support system (e.g., the support system 2000) and/or one or more passive support system (e.g., the support system 3900) can be disposed about a similar support track and can be utilized at the same time. For example, FIG. 37 is a schematic illustration of a support system 4000 according to an embodiment. The support system 4000 includes a support track 4050, a first support member 4100, and a second support member 4900. The support system 4000 can be used to support at least a portion of the body weight of one or more patients during, for example, gait therapy (e.g., after injury), gait training (e.g., low gravity simulation), and/or the like. The support track 4050 is configured to support the weight of the first support member 4100 and the second support member 4900 and the weight of the patient utilizing the first support member 4100 and/or the second support member 4900.

As shown in FIG. 37, the support track 4050 can form a closed loop track. The support track 4050 can be similar to or the same as the support track 2050, described above with reference to FIGS. 2 and 3; the first support member 4100 can be similar to or the same as the trolley 2100, described above with reference to FIGS. 2-33; and the second support member 4900 can be similar to or the same as the support system 3900, described above with reference to FIGS. 35 and 36. In this manner, the first support member 4100 and the second support member 4900 can be hung from the support track 4050, as described in detail above.

In some embodiments, a first patient (not shown in FIG. 37) can be coupled to the first support member 4100 and a second patient (not shown in FIG. 37) can be coupled to the second support member 4900 with both being suspended from the support tack 4050. As shown in FIG. 37, the first support member 4100 can move in the direction of the arrow A in response to a movement of the first patient coupled thereto. Similarly, the second support member 4900 can be moved in the direction of the arrow B in response to a movement of the second patient coupled thereto. Expanding further, the first support member 4100 can be an active support member and can be configured to move in accordance with the movement of the first patient, as described in detail above. Conversely, the second support member 4900 can be a passive support member and can be moved by the second patient coupled thereto, as described in detail above.

Although the support system 4000 is shown and described as including the first support member 4100 and the second support member 4900, in other embodiments, the support system 4000 can include any suitable number of support members movably coupled to the support track 4050. Moreover, any combination of active support members and passive support members can be included in the support system 4000. For example, while shown as including an active support member (e.g., the first support member 4100) and a passive support member (e.g., the second support member 4900), in other embodiments, the support system 4000 can include two active support members, two passive support members, two active support members and two passive support members, or any other suitable combination thereof.

Although not shown in FIG. 37 the support system 4000 (i.e., the first support member 4100 and/or the second support member 4900) can include a collision management system that is configured to prevent and/or mitigate the impact, force, or effect of a collision between the first support member 4100 and the second support member 4900. For example, in some embodiments, the first support member 4100 can include a sensor (e.g., an ultrasonic proximity sensor or the like) configured to sense the position of the first support member 4100 relative to the second support member 4900. Thus, when the distance between the first support member 4100 and the second support member 4900 approaches a predetermined threshold (e.g., a minimum distance), an electronic system (e.g., similar to or the same as the electronic system 2700 described above) included in the first support member 4100 can send a signal to a drive system (not shown) to increase or decrease a rotational velocity of one or more drive wheels. Thus, a collision of the first support member 4100 and the second support member 4900 can be avoided. In other embodiments, the collision management system can increase or decrease the velocity of one or more drive wheels to substantially reduce a force associated with a collision between the first support member 4100 and the second support member 4900.

Figure 38:
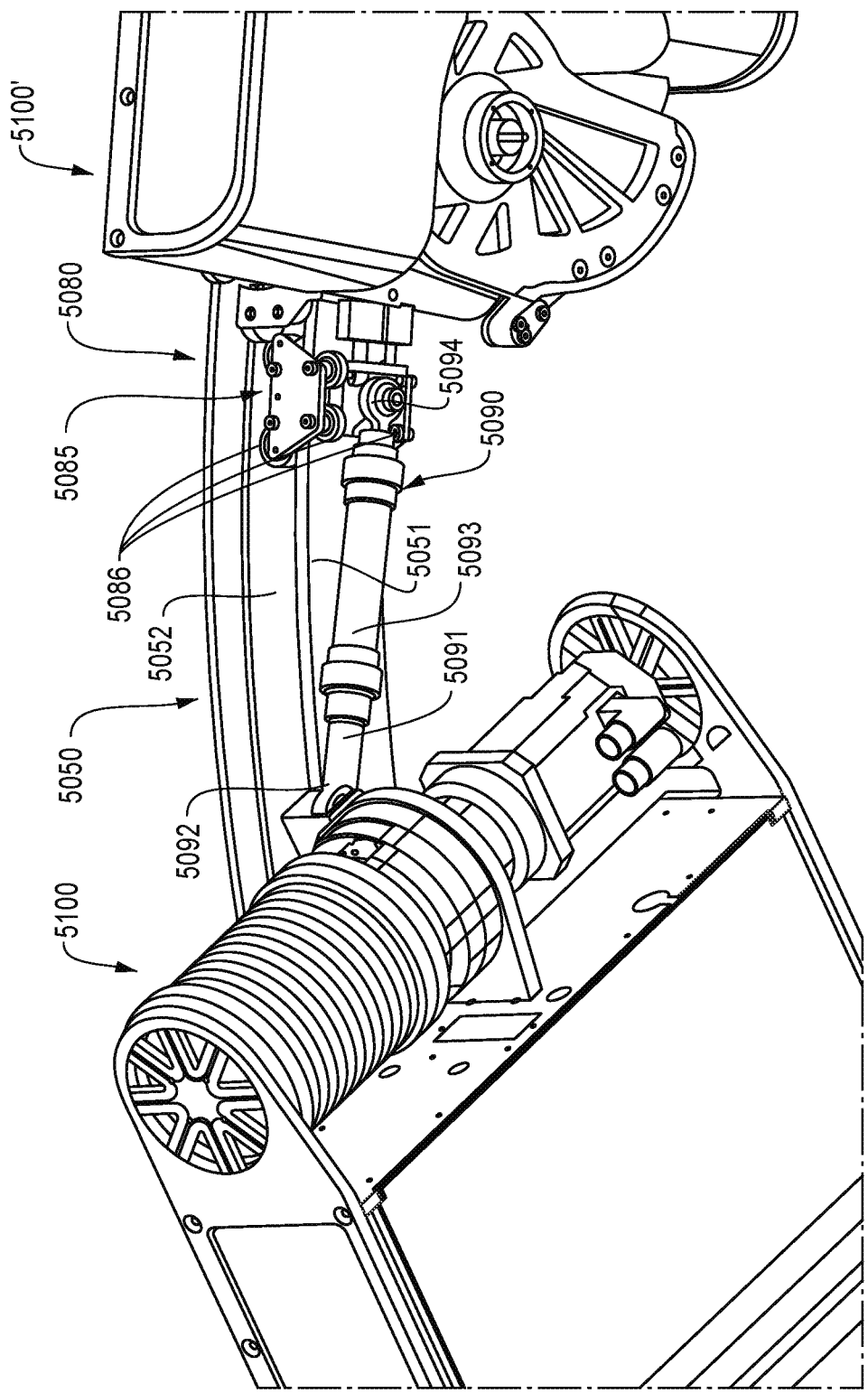
FIG. 38 is a perspective view of a portion of a support system according to an embodiment.

While the first support member 4100 is described above as including a sensor and/or the like that is configured to sense the position of the first support member 4100 relative to the second support member 4900, in other embodiments, a support system can include any suitable member, device, mechanism, assembly, and/or the like that is configured to substantially maintain a distance between a first support member and a second support member included therein and/or otherwise reduce a force associated with or a likelihood of a collision. In other embodiments, a support system can include and/or can be coupled to any suitable member, device, mechanism, assembly, and/or the like that is configured to prevent direct contact between a first support member and a second support member (e.g., is disposed and/or coupled therebetween). For example, FIGS. 38-40 illustrate a support system 5000 according to an embodiment. The support system 5000 includes a first support member 5100, a second support member 5100', a collision management assembly 5080, and a support track 5050. The support track 5050 can be similar to or the same as the support track 2050 (described above with reference to FIGS. 2 and 3) and/or the support track 4050 (described above with reference to FIG. 37). The first support member 5100 and the second support member 5100' can be substantially similar to each other and can each be substantially similar to or the same as the trolley 2100, described above with reference to FIGS. 2-33. As such, the first support member 5100 (e.g., a first trolley) and the second support member 5100' (e.g., a second trolley) can each be active support systems that are hung from the support track 5050. More specifically, as shown in FIG. 38, the support track 5050 includes a horizontal portion 5051 and a vertical portion 5052 about which a drive mechanism of the support members 5100 and 5100' can be disposed, thereby allowing the support members 5100 and 5100' to move along a length of the support track 5050 in response to a motion of a supported patient, as described in detail above. Thus, the form and function of the support members 5100 and 5100' are not described in further detail herein.

The collision management assembly 5080 of the support system 5000 can be coupled to and/or otherwise disposed between the first support member 5100 and the second support member 5100'. In some embodiments, the collision management assembly 5080 can be coupled to the first support member 5100 or the second support member 5100'. For example, as shown in FIG. 38, the collision management assembly 5080 includes a coupling portion 5090 that is coupled to the first support member 5100 and a trolley portion 5085 that is movably disposed about the support track 5050. The trolley portion 5085 can be substantially similar in form and/or function as the first coupling portion 3910 of the support system 3900 described above with reference to FIG. 35. As such, the trolley portion 5085 includes a set of wheels 5086 that are configured to roll along the horizontal portion 5051 or the vertical portion 5082 of the support track 5050, as described in detail above.

The trolley portion 5085 also includes a set of bumpers 5087 that extend from a surface of the trolley portion 5085. In some embodiments, the bumpers 5087 can be formed from a relatively elastic material (e.g., rubber, silicone, polyethylene, polypropylene, polyurethane, and/or the like including copolymers and combinations thereof) that can be configured to absorb at least a portion of a force when placed in contact with an object. More specifically, in some instances, a force can be exerted that can move the trolley portion 5085 along the support track 5085 to place the bumpers 5087 in contact with an object (e.g., the second support member 5100'). The arrangement of the bumpers 5087 can be such that when the bumpers are placed in contact with the object, at least a portion of the force exerted to move the trolley portion 5085 along the support track 5050 is absorbed by the bumpers 5087, resulting in a deformation (e.g., an elastic or non-permanent deformation) thereof. In some instances, the deformation of the bumpers 5087 can be such that a portion of the force transmitted through the bumpers 5087 and onto the object (e.g., the second support member 5100') is reduced, which can reduce damage to and/or fatigue of a portion of the object. Similarly stated, the bumpers 5087 can be formed from and/or can otherwise include a material that can absorb at least a portion of an impact force between the trolley portion 5085 and an object (e.g., a wall, a support member, and/or the like).

As described above, the coupling portion 5090 is coupled to a portion of the first support member 5100. More particularly, a first end portion 5092 of the coupling portion 5090 is rotatably coupled to the portion of the first support member 5100. For example, the first end portion 5092 can include a rotatable eyelet or the like that can be coupled to the portion of the first support member 5100 via, for example, a bolt, pin, post, and/or the like, thereby defining an axis about which the first eyelet can rotate. Similarly, a second end portion 5094 of the coupling portion 5090 can be rotatably coupled to a portion of the trolley portion 5085. Thus, the coupling portion 5090 can couple or otherwise form a linkage between the first support member 5100 and the trolley portion 5085 such that movement of the first support member 5100 along the support track 5050 moves the trolley portion 5085 along the support track 5050. For example, the coupling portion 5090 can be configured to transmit, transfer, and/or otherwise exert at least a portion of a force, associated with movement of the first support member 5100 along the support track 5050, on the trolley portion 5085. Moreover, the rotatable coupling of the coupling portion 5090 to the first support member 5100 and the trolley portion 5085 can be such that the first support member 5100 can push the trolley portion 5085 along a support track that is substantially nonlinear, as shown in FIG. 38.

The coupling portion 5090 can be any suitable member, device, and/or mechanism. For example, in some embodiments, the coupling portion 5090 can be a substantially rigid rod or the like that is configured to maintain a substantially fixed distance between the trolley portion 5085 and the first support member 5100. In other embodiments, the coupling portion 5090 can be substantially non-rigid wherein a distance between the first support member 5100 and the trolley portion 5085 can be varied (i.e., non-fixed). For example, in some embodiments, a first portion 5091 of the coupling portion 5090 can be configured to move relative to a second portion 5092 of the coupling portion 5090. Moreover, in some embodiments, the coupling portion 5090 can be configured to absorb at least a portion of a force (associated with movement of the first support member 5100 along the support track 5050) that would otherwise be exerted on the trolley portion 5085. For example, as shown in FIGS. 38-40, the coupling portion 5090 can be a piston-cylinder configuration, wherein a region of the first portion 5091 (e.g., a piston) is movably disposed in the second portion 5093 (e.g., a cylinder). Furthermore, an energy storage member 5095 (e.g., a spring or the like) can be disposed in the second portion 5093 of the coupling portion 5090, as shown in FIG. 40. In this manner, movement of the first portion 5091 relative to the second portion 5093 can increase a potential energy of the energy storage member 5095. For example, in some embodiments, the energy storage member 5095 can be a spring that can be transitioned from a substantially non-compressed configuration (i.e., a relatively lower potential energy) to a substantially compressed configuration (i.e., a relatively higher potential energy) when the first portion 5091 is moved relative to the second portion 5093. The energy storage member 5095 can be configured to allow the first portion 5091 to move relative to the second portion 5093, for example, up to about 0.5 inches (0.5"), about 1", about 1.5", about 2", about 2.5", about 3", about 4", about 5", about 7", about 10", or any suitable distance or fraction therebetween. Thus, the coupling portion 5090 can be configured to absorb at least a portion of energy and/or force that would otherwise be transferred and/or transmitted between the first support member 5100 and the trolley portion 5085. Although the energy storage member 5095 is shown and described as being a spring, in other embodiments, the energy storage member 5095 can be any suitable device, member, and/or volume such as, for example, a volume of a compressible gas and/or the like.

In use, the collision management assembly 5080 can be included in the support system 5000 to substantially prevent a collision between the first support member 5100 and the second support member 5100' (see e.g., FIG. 38). Similarly stated, the collision management assembly 5080 can be included in the support system to substantially prevent direct contact between the first support member 5100 and the second support member 5100'. For example, in some instances, it can be desirable to maintain a distance between the first support member 5100 and the second support member 5100' that is greater than a predetermined minimum distance and/or a distance threshold. In this manner, the collision management assembly 5080 can be coupled to the first support member 5100 such that when the first support member 5100 and the second support member 5100' move along the support track 5050 substantially independent from one another, a distance therebetween is maintained that is greater than the predetermined minimum distance and/or distances threshold. For example, in some instances, the first support member 5100 can move relative to the second support member 5100' such that a distance therebetween is reduced to an extent that places the bumpers 5087 of the trolley portion 5085 in contact with a portion of the second support member 5100'. Thus, the collision management assembly 5080 can maintain the first support member 5100 and the second support member 5100' at a distance that is greater than the minimal distance, thereby preventing direct contact (i.e., a direct collision) therebetween. Moreover, the arrangement of the bumpers 5087 and the coupling portion 5090 is such that as the collision management assembly 5080 is brought into contact with the portion of the second support member 5100' at least a portion of a force associated with the impact is absorbed (e.g., the bumpers 5087 can be transitioned from a non-deformed to a deformed configuration and/or the energy storage member 5095 can be transitioned from a lower potential energy configuration to a higher potential energy configuration). In this manner, an acceleration and/or a jerk (e.g., the rate of change in the acceleration) of the first support member 5100 and/or the second support member 5100' is not rapidly changed as the collision management assembly 5080 is brought into contact with the second support member 5100'. In some instances, once the collision management assembly 5080 is placed in contact with the second support member 5100', the first support member 5100 and the second support member 5100' can move along the support track 5050 substantially congruently. In other words, when the collision management assembly 5080 is placed in contact with the second support member 5100', the collision management assembly 5080 can push the second support member 5100' such that the first support member 5100, the second support member 5100', and the collision management assembly 5080 collectively move along the support track 5050 at substantially the same speed.

In some embodiments, the collision management assembly 5080 and/or a portion of the support members 5100 and/or 5100' can include, for example, one or more sensors or the like that can sense and/or detect one or more parameters associated with the collision management assembly 5080. For example, in some embodiments, the trolley portion 5085 of the collision management assembly 5080 can include a sensor such as, for example, an accelerometer or the like that can sense and/or otherwise detect and acceleration of the trolley portion 5085 when the bumper 5087 is placed in contact with the second support member 5100'. In some instances, the sensor can send a signal associated with the acceleration of the trolley portion 5085 to, for example, the electronic system of the first support member 5100. As such, the electronic system can be configured to control one or more systems (e.g., a drive system or the like) of the first support member 5100 based at least in part on the signal received from the sensor. For example, in some instances, the electronic system can reduce a velocity of the first support member 5100 based at least in part on information received from the sensor of the collision management assembly 5080.

Although the collision management assembly 5080 is shown and described as being coupled to the first support member 5100 and placed in contact the second support member 5100' (see e.g., FIG. 38), in other embodiments, the collision management assembly 5080 can be rotatably coupled to the second support member 5100' and placed in contact with the first support member 5100 in a similar manner as described above. In addition, while the second support member 5100' is shown and described as being substantially similar to the first support member 5100 (i.e., an active support member), in other embodiments, the second support member 5100 can be a passive support member such as, for example, the support system 3900 described above with reference to FIGS. 35 and 36.

Figure 41:
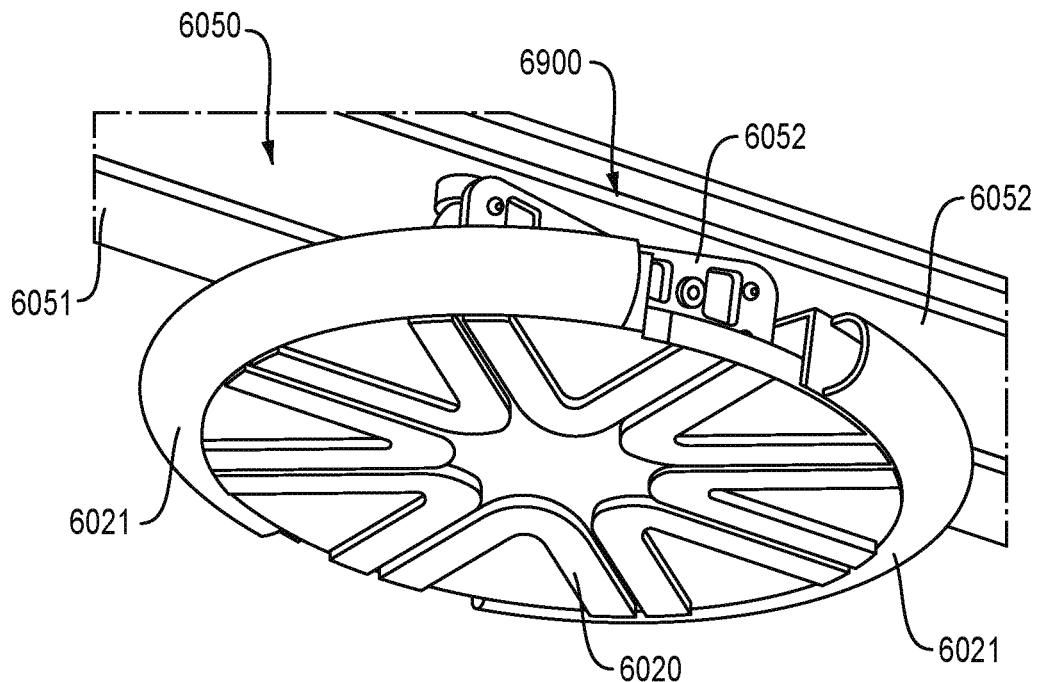
FIGS. 41 and 42 are a top perspective view and a bottom perspective view of a portion of a support system according to an embodiment.
Figure 42:
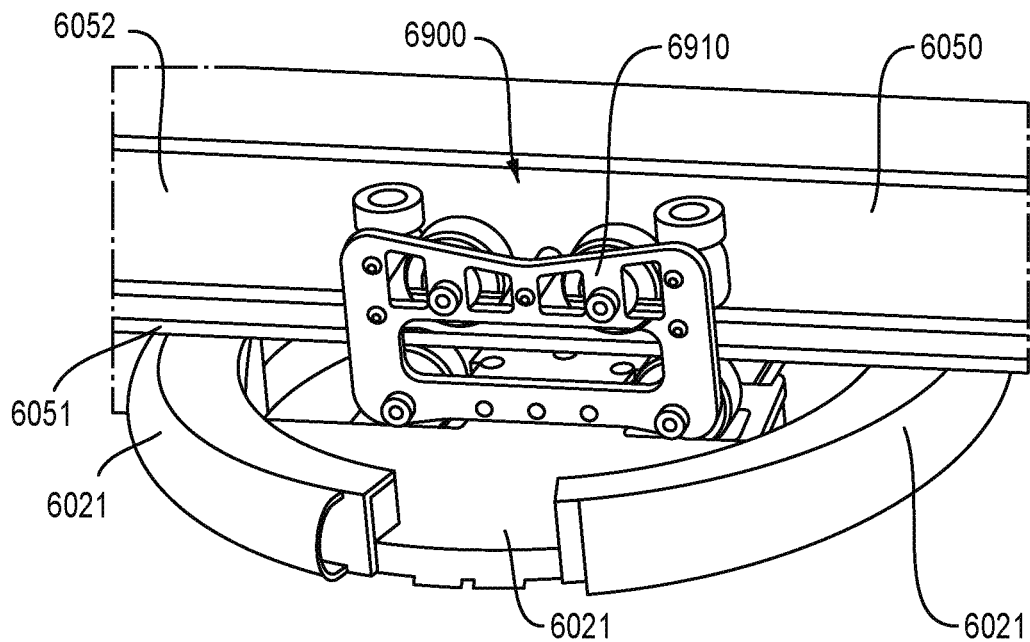

While the support system 5000 is described above as including the collision management assembly 5080 to substantially maintain a distance between the first support member 5100 and the second support member 5100, in other embodiments, a support system can include any suitable member, device, mechanism, assembly, and/or the like that is configured to absorb at least a portion of energy that is associated with a collision between a support member and another object (e.g., a second support member, a wall, and/or any other obstruction). For example, FIGS. 41-42 illustrate a support system 6000 according to an embodiment. The support system 6000 includes a support member 6900 movably disposed about a support track 6050. The support track 6050 can be similar to or the same as the support track 2050 (described above with reference to FIGS. 2 and 3) and/or the support track 4050 (described above with reference to FIG. 37). The support member 6900 can be substantially similar to the support system 3900, described above with reference to FIGS. 35-36. As such, the support member 6900 can be, for example, a passive support system that is hung from the support track 6050. More specifically, as shown in FIGS. 41 and 42, the support track 6050 includes a horizontal portion 6051 and a vertical portion 6052 about which a drive mechanism 6910 (e.g., similar to or the same as the first coupling portion 3910 of the support system 3900 described above) of the support member 6900 can be disposed, thereby allowing the support member 6900 to move along a length of the support track 6050 in response to a motion of a supported patient, as described in detail above. Thus, the form and function of the support member 6900 is not described in further detail herein.

As shown in FIGS. 41 and 42, the support member 6900 can be coupled to and/or can otherwise include a collision plate 6020. The collision plate 6020 (e.g., a collision management assembly or member) can be any suitable shape, size, or configuration. For example, although the collision plate 6020 is shown as having a substantially circular perimeter, in other embodiments, a collision plate can be any suitable shape such as, square, rectangular, oblong, elliptical, and/or the like. As shown in FIG. 42, the collision plate 6020 can be coupled to a portion of the support member 6900 such that a surface of the collision plate 6020 in contact with the support member 6900 is substantially parallel to the horizontal portion 6051 of the support track 6050. Moreover, although not shown in FIGS. 41 and 42, the arrangement of the support member 6900 can be such that the collision plate 6020 is disposed between the drive portion 6910 and a coupling portion (e.g., such as the second coupling portion 3940 included in the support system 3900 described above with reference to FIG. 36).

As shown, the collision plate 6020 is configured to extend beyond a perimeter of the support member 6900. The collision plate 6020 can be formed from and/or can include any suitable material that can be substantially rigid such as, for example, wood, medium density fiber (MDF), plywood, and/or a metal or alloy thereof (e.g., aluminum, aluminum alloy, steel, steel alloy, etc.). In other embodiments, the collision plate 6020 can be formed from and/or can include any suitable material that can be substantially elastic such as, for example, rubber, silicone, polyethylene, polypropylene, polyurethane, nylon, and/or the like including copolymers and/or combinations thereof. The collision plate 6020 includes a bumper 6021 that is coupled to and/or that is otherwise configured to extend from a peripheral surface, as shown in FIGS. 41 and 42. The bumper 6021 can be any suitable shape, size, and/or configuration. For example, in some embodiments, the bumper 6021 can be formed from and/or can include, for example, expanded foam neoprene, ethylene propylene diene monomer (EPDM) rubber, ethylene-vinyl acetate (EVA) foam, polypropylene (PP) foam, high-density polyethylene (HDPE) foam, low-density polyethylene (LDPE) foam, linear-low-density polyethylene (LLPDE) foam, and/or any other suitable thermoplastic elastomer (TPE) foam, and/or the like. In this manner, the bumper 6021 can be configured to absorb at least a portion of energy that is associated with, for example, an impact. By way of example, in some instances, the support member 6900 can move along the support track 6050 relative to another support member and/or other object until the bumper 6021 of the collision plate 6020 is placed in contact with the other support member and/or other object. More specifically, the support member 6900 can be moved along the support track 6050 with a force resulting from a patient, coupled thereto, dragging or towing the support member 6900 (as described above). In some instances, the support member 6900 can be moved relative to another object on or supported by the support track 6050 in such a manner that the support member 6900 and the other object (e.g., a second support member or the like) collide. Thus, with the collision plate 6020 coupled to the support member 6900 and the bumper 6021 extending beyond the support member 6900, the bumper 6021 is placed in contact with the other object, resulting in an elastic deformation of the bumper 6021 in response to at least a portion of a force associated with the collision. As such, the bumper 6021 can absorb at least a portion of the energy associated with the collision to, for example, protect and/or otherwise minimize damage to the support member 6900 and/or other object that can otherwise result from the collision.

Figure 43:
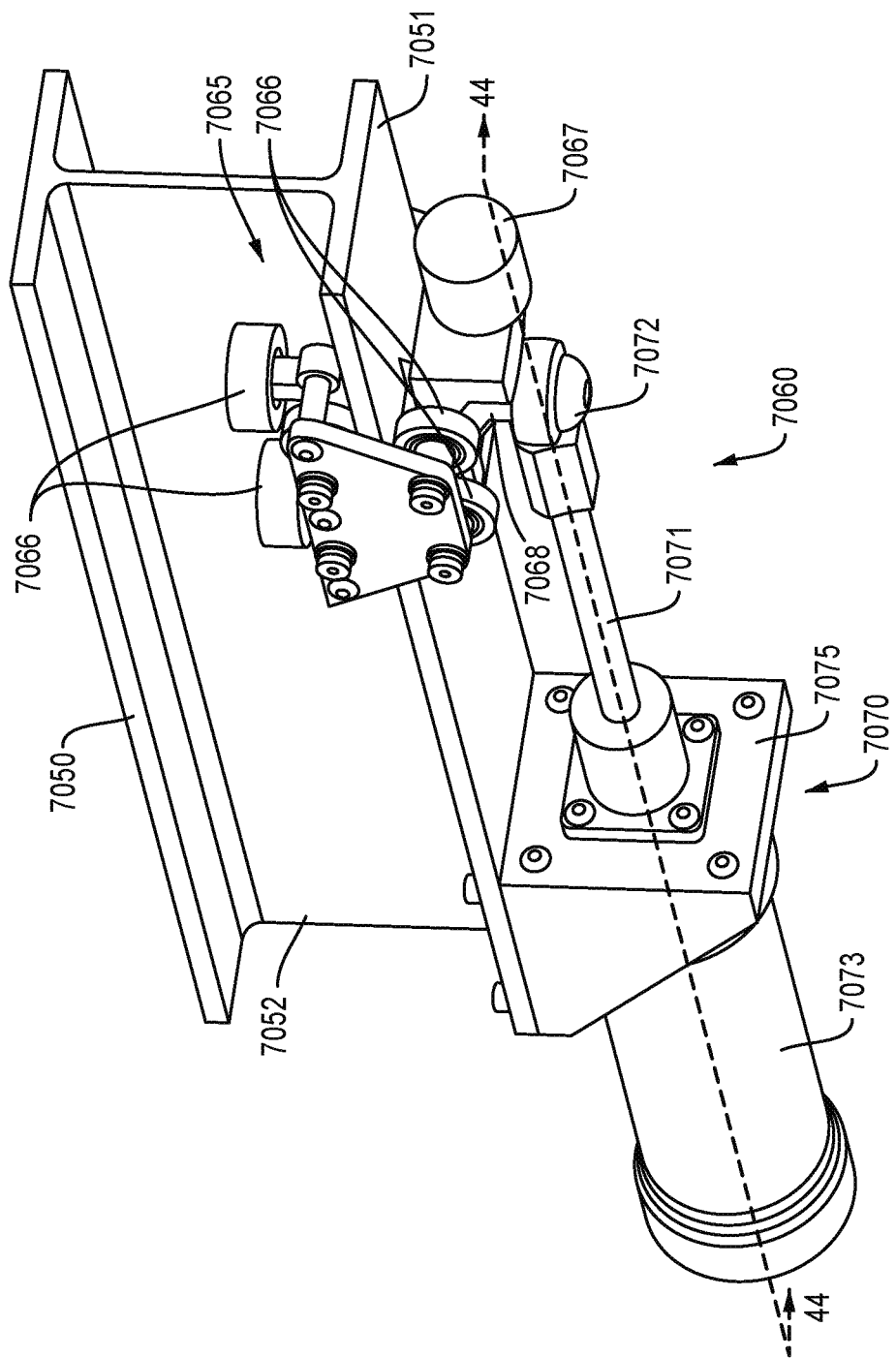
FIG. 43 is a perspective view of a portion of a support system according to an embodiment.
Figure 44:
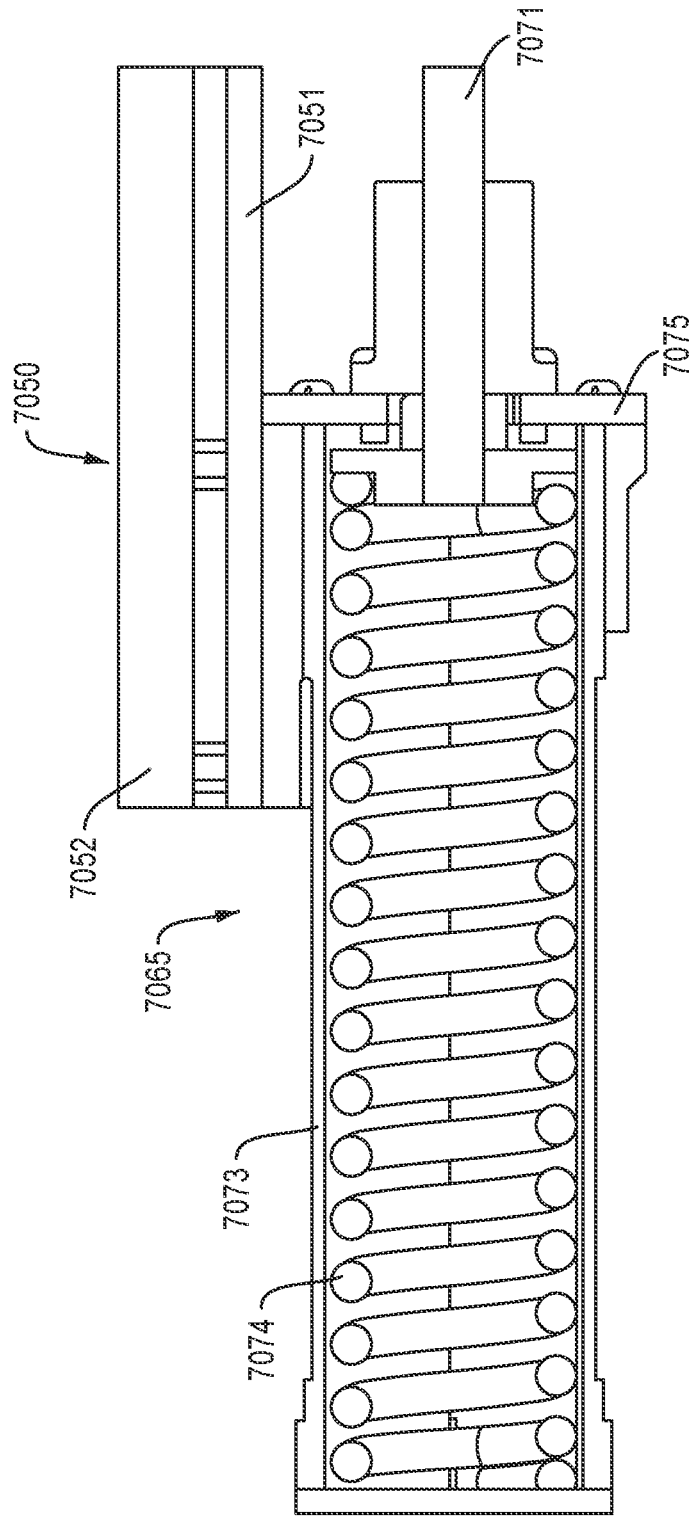
FIG. 44 is a cross-sectional view of a stopping mechanism included in the support system of FIG. 43, taken along the line 44-44.

Although the support track 4050 is shown and described above as being a substantially closed-loop track, in other embodiments, a support track can be an open-loop track. By way of example, in some embodiments, a support track can have a first end portion that is substantially discrete from a second end portion (i.e., an open-loop configuration). In some embodiments, such a support track can include, for example, an end stop or the like that can be configured to substantially limit movement of a support member, support system, trolley, etc., prior to reaching the end of the support track. For example, FIGS. 43 and 44 illustrate a support track 7050 including a track stop 7060, according to an embodiment. The support track 7050 can be substantially similar to the support track 2050 described above. As such, the support track 7050 can include a horizontal portion 7051 and a vertical portion 7052 and can be configured to support a support system such as, for example, the trolley 2100 and/or the support system 3900.

The track stop 7060 includes a trolley portion 7065 and a coupling portion 7070. The trolley portion 7065 can be substantially similar in form and/or function as the trolley portion 5085 included in the collision management assembly 5080 described above with reference to FIGS. 38-40. As such, the trolley portion 7065 includes a set of wheels 7066 that are configured to roll along the horizontal portion 7051 or the vertical portion 7062 of the support track 7050, as described in detail above. The trolley portion 7065 also include at least one bumper 7067 that extends from a surface of the trolley portion 7065 (e.g., away from an end surface of the support track 7050). In some embodiments, the bumper 7067 can be formed from a relatively elastic material (e.g., rubber, silicone, polyethylene, polypropylene, polyurethane, and/or the like including copolymers and combinations thereof) that can be configured to absorb at least a portion of a force when placed in contact with an object, as described in detail above. The arrangement of the bumper 7067 can be such that when placed in contact with, for example, a support member, at least a portion of the force exerted to move the support member along the support track 7050 is absorbed by the bumper 7067, resulting in a deformation (e.g., an elastic or non-permanent deformation) thereof, which can reduce damage to and/or fatigue of a portion of the support member, as described in detail above.

The coupling portion 7070 is coupled to the end portion of the support track 750 and a portion of the trolley portion 7065, as shown in FIG. 43. More particularly, a mounting bracket 7075 is coupled to the end portion of the support track 7050 and is configured to couple and/or otherwise mount the coupling portion 7070 to the support track 7050. The coupling portion 7070 can be any suitable member, device, and/or mechanism. For example, in some embodiments, the coupling portion 7070 can be a piston-cylinder device, a strut, and/or the like. As such, the coupling portion 7070 includes a first member 7071 (e.g., a piston) that can be moved relative to a second member 7073 (e.g., a cylinder). For example, at least a portion of the first member 7071 can be movably disposed in the second member 7073. More particularly, an attachment member 7072 of the first member 7071 is rotatably coupled to the trolley portion 7065 (as described above) and in turn, the first member 7071 is configured to move substantially concurrently with the trolley portion 7065. Similarly stated, the attachment member 7072 rotatably couples the first member 7071 to the trolley portion 7065 such that as the trolley portion 7065 is moved along the support track 7050, the first member 7071 is moved in an axial direction. The second member 7073 of the coupling portion 7070 is fixedly coupled to the mounting bracket 7075, which is configured to maintain the second portion 7073 in a substantially fixed position relative to the support track 7050. Thus, movement of the trolley portion 7065 along the support track 7050 moves the first member 7071 of the coupling portion 7070 relative to the second member 7073, as described in further detail herein.

As shown in FIG. 44, an energy storage member 7074 (e.g., a spring or the like) is disposed in the second portion 7093 of the coupling portion 7070 and is configured to engage and/or be in contact with at least a surface of the first member 7071. In this manner, movement of the first member 7071 relative to the second member 7073 can increase a potential energy of the energy storage member 7074. For example, in some embodiments, the energy storage member 7074 can be a spring (as shown in FIG. 44) that can be transitioned from a substantially non-compressed configuration (i.e., a relatively lower potential energy) to a substantially compressed configuration (i.e., a relatively higher potential energy) when the first member 7071 is moved relative to the second member 7073. The energy storage member 7074 can be configured to allow the first member 7071 to move relative to the second member 7073, for example, up to about 0.5 inches (0.5"), about 1", about 1.5", about 2", about 2.5", about 3", about 4", about 5", about 7", about 10", or any suitable distance or fraction therebetween. Thus, the coupling portion 7070 can be configured to absorb at least a portion of energy and/or force, as described in further detail herein. Although the energy storage member 7074 is shown and described as being a spring, in other embodiments, the energy storage member 7074 can be any suitable device, member, and/or volume such as, for example, a volume of a compressible gas and/or the like.

In use, the track stop 7060 can be included in the support system 7000 to substantially prevent a support member and/or trolley (not shown in FIGS. 43 and 44) from reaching an end of a support track 7050 when moving along a length thereof. For example, a support member can move along the support track 7050 and towards the end portion to a position in which a portion of the support member is placed in contact with the bumper 7067 of the trolley portion 7065. Thus, the support member exerts a force on the bumper 7067 that can transition the bumper 7067 from a non-deformed configuration to a deformed configuration, thereby absorbing at least a portion of the force and/or kinetic energy. Moreover, the force exerted by the support member can move the trolley portion 7065 along the support track 7050, which in turn, moves the first member 7071 of the coupling portion 7070 relative to the second member 7073 of the coupling portion 7070. Accordingly, with the first member 7071 in contact with the energy storage member 7074, the movement of the first member 7071 relative to the second portion 7072 can transition the energy storage member 7074 from a lower potential energy configuration to a higher potential energy configuration. In this manner, an acceleration and/or a jerk (e.g., the rate of change in the acceleration) of the support member is not rapidly changed as the track stop 7060 limits further movement of the support member along the support track 7050. Furthermore, by absorbing at least a portion of the kinetic energy and/or force exerted by the support member, damage to the support member that can otherwise result from the support member hitting a "hard stop" (e.g., a stop mechanism with little or no energy absorption).

Figure 45:
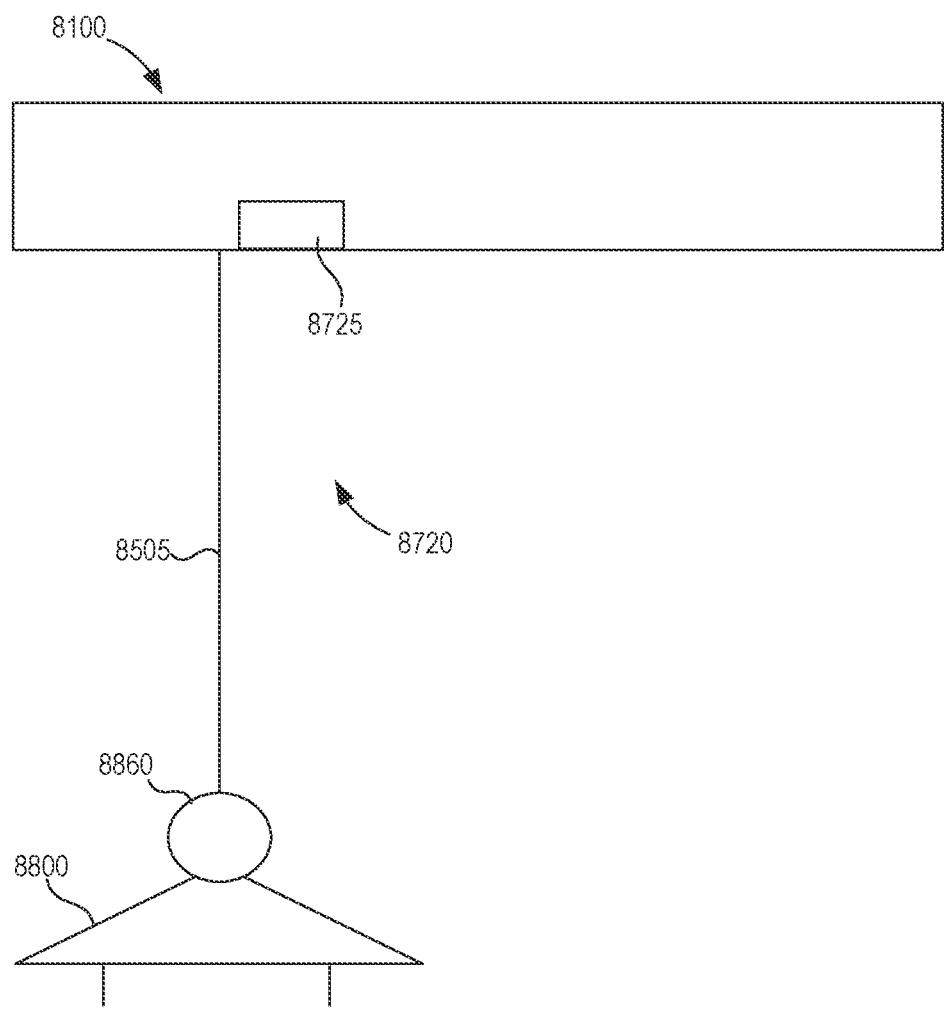
FIGS. 45-47 are schematic illustrations of an optical tracking system included in a support system according to an embodiment.
Figure 46:
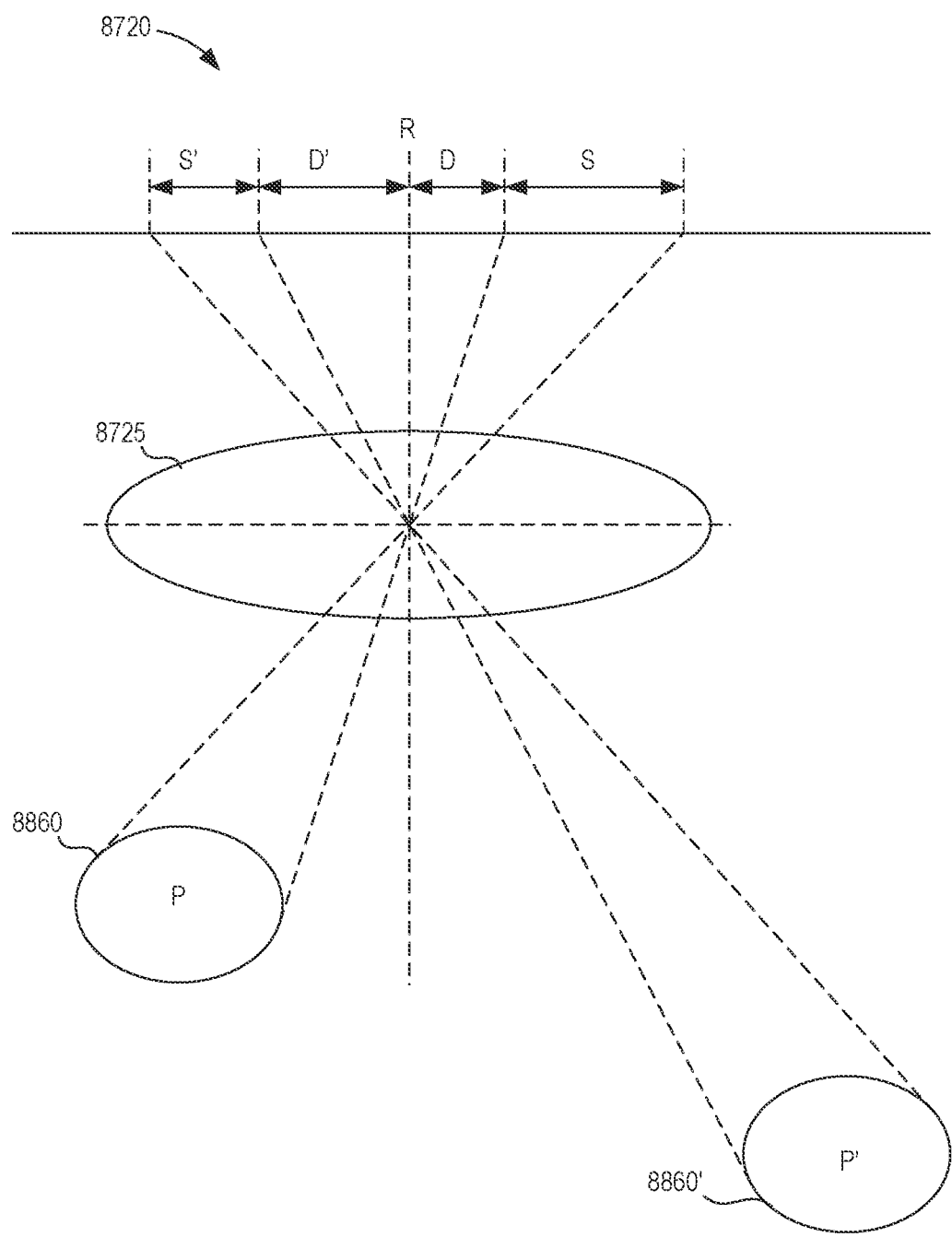
Figure 47:
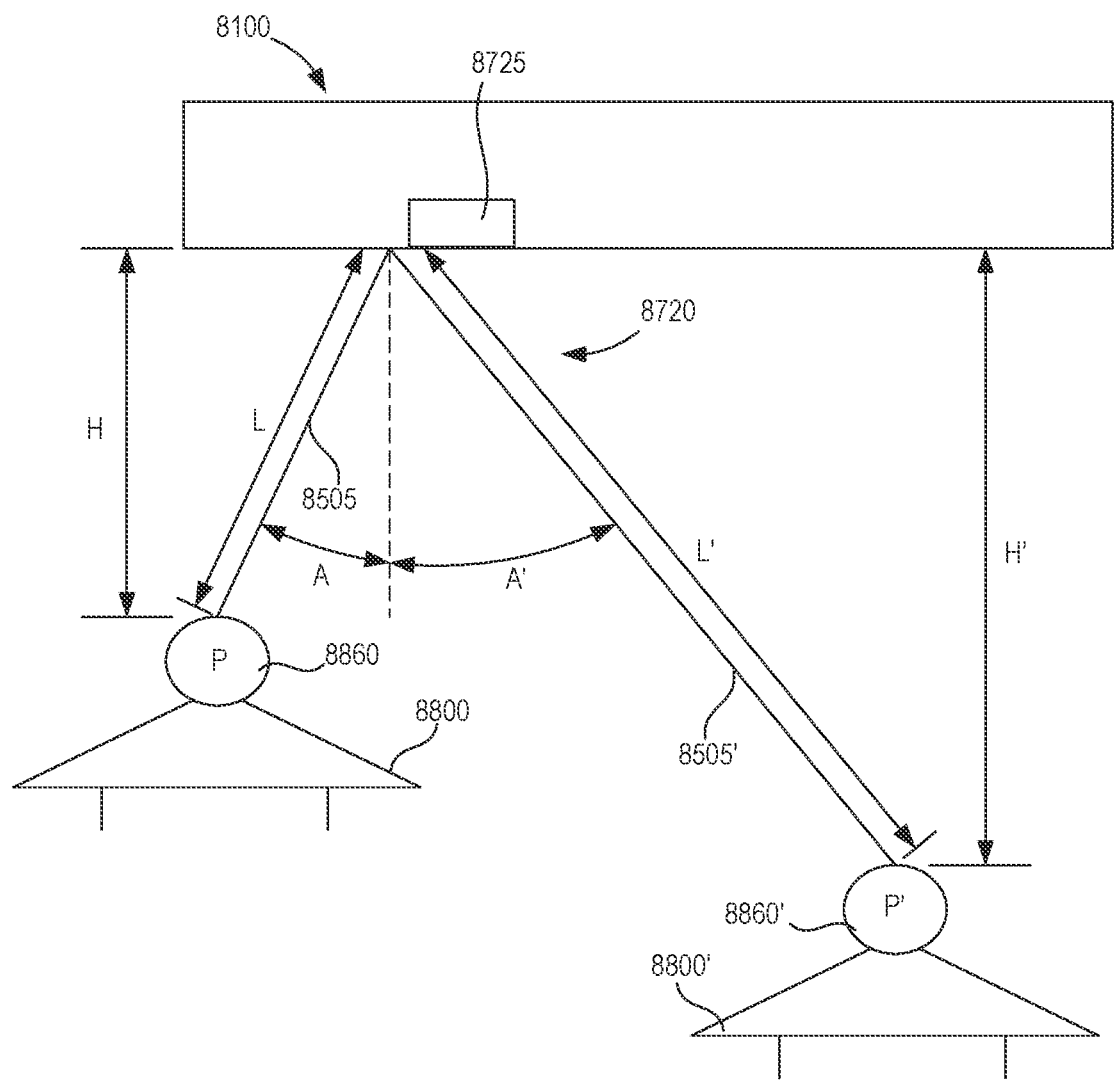

Although the trolley 2100 is described above as including the encoder 2470 of the drive system 2300, the encoder 2561 of the guide mechanism 2540, and the encoder 2587 of the cam assembly 2570, which are collectively used to determine one or more system parameters (e.g., position, velocity, acceleration, etc.), in other embodiments, a trolley and/or the like can include any suitable device, mechanism, and/or system configured to determine one or more system parameters. For example, FIGS. 45-47 are schematic illustrations of a trolley 8100 including an optical tracking system 8720, according to an embodiment. The trolley 8100 (e.g., a support member) can be substantially similar to or the same as the trolley 2100, described above with reference to FIGS. 2-33. As such, the trolley 8100 is an active support system that is hung from a support track (not shown in FIGS. 45-47). The trolley 8100 can differ from the trolley 2100, however, with the inclusion of the optical tracking system 8720, as described in further detail herein.

The optical tracking system 8720 includes at least an imaging device 8725 and a tracking member 8860. As shown in FIG. 45, the tracking member 8860 can be coupled to and/or included in a patient attachment mechanism 8800, which can otherwise be substantially similar to the patient attachment mechanism 2800 described above with reference to FIG. 34. The patient attachment mechanism 8800 is operably coupled to the trolley 8100 by a tether 8505. The tether 8505 can be substantially similar to or the same as the tether 2505 included in the support system 2500 described above with reference to FIGS. 27-33. The tracking member 8860 can be any suitable shape, size, and/or configuration. For example, in some embodiments, the tracking member 8860 can be a substantially spherical or oblong ball. Although not shown in FIGS. 45-47, the tracking member 8860 can include a surface finish that can facilitate an optical tracking. For example, in some embodiments, the tracking member 8860 can include a surface having a color and/or pattern that can be used to identify, for example, position information such as relative linear position, relative angular position, absolute position, etc. Moreover, information associated with the color, the pattern, the size, the shape, and/or the like of the tracking member 8860 can be stored, for example, in a memory included in an electronic system (e.g., substantially similar to the electronic system 2700 of the trolley 2100 (not shown in FIGS. 45-47)) of the trolley 8100.

The imaging device 8725 of the optical tracking system 8720 can be any suitable imaging device. For example, in some embodiments, the imaging device 8725 can be a camera and/or the like that can capture discrete pictures and/or can continuously record a video stream. The imaging device 8725 is coupled to the trolley 8100 and is maintained in a fixed position relative thereto. Although not shown in FIGS. 45-47, the imaging device 8725 is operably coupled to the electronic system of the trolley 8100. Thus, the imaging device 8725 can be configured to send a signal representing data associated with captured images and/or video streams and, upon receipt, the electronic system can store the data in, for example, the memory and/or the like. Furthermore, the memory of the electronic system can store data associated with the position of the imaging device 8725 or a portion of the imaging device 8725 (e.g., a lens, aperture, focal point, charge-coupled device (CCD) sensor, a complementary metal-oxide-semiconductor (CMOS) sensor, and/or the like), relative to a portion of the trolley 8100. As such, the electronic system of the trolley 8100, and more specifically, a processor and/or module can determine, for example, a reference coordinate system relative to the imaging device 8725 and/or a portion of the trolley 8100.

In some instances, the imaging device 8725 can be used to capture one or more images and/or video streams of the tracking member 8860 while in use during, for example, gait training and/or the like. For example, as shown in FIGS. 46 and 47, the optical tracking system 8720 can be used to determine a first position P and a second position P' of the tracking member 8860 and thus, the patient attachment mechanism 8800. More specifically, in some instances, a patient (not shown) can be coupled to the patient attachment mechanism 8800 (e.g., via a harness or the like, as described above) and can perform a gait training therapy session, thereby moving the patient attachment mechanism 8800 relative to the trolley 8100 and the trolley along the support track (not shown in FIGS. 45-47). During use, the imaging device 8725 can capture one or more images and/or video streams of the tracking member 8860 to determine, for example, the first position P and the second position P' of the tracking member 8860. More specifically, as shown in FIG. 46, the imaging device 8725 can capture one or more images and/or video streams and can send a signal representing data associated with the one or more images and/or video streams to the processor and/or to a module (e.g., a processing module) included in the electronic system. The processor and/or module can, for example, analyze the image and can calculate a distance D of the image of the tracking member 8860 from a reference plane R and a size S of the image of the tracking member 8860. Based at least in part on the calculated distance D and the calculated size S, the processor and/or module can determine and/or calculate an angle A of the tether 8505, a length L of the tether 8505, and a distance H of the tracking member 8860 from the trolley 8100 (FIG. 47), thereby determining the first position P of the tracking member 8860 and the patient attachment mechanism 8800. Similarly, when the patient moves from the first position P, the imaging device 8725 can capture one or more images and/or video streams and can send a signal representing data associated with the new images and/or video streams to the processor and/or module. As such the processor and/or module can, for example, analyze the image and can calculate a second distance D' of the image of the tracking member 8860' from the reference plane R and a second size S' of the image of the tracking member 8860'. Based at least in part on the calculated second distance D' and the calculated second size S', the processor and/or module can determine and/or calculate a second angle A' of the tether 8505', a second length L' of the tether' 8505, and a second distance H' of the tracking member 8860' from the trolley 8100 (FIG. 47), thereby determining the second position P' of the tracking member 8860' and the patient attachment mechanism 8800'.

Although the trolley 2100 is described above as including the encoder 2470 of the drive system 2300, the encoder 2561 of the guide mechanism 2540, and the encoder 2587 of the cam assembly 2570, which are collectively used to determine one or more system parameters (e.g., position, velocity, acceleration, etc.), and the trolley 8100 is described above as including the optical tracking system 8720 to determine the one or more system parameters, in other embodiments, a trolley and/or support system can use any suitable combination of an encoder system and an optical tracking system. For example, in some embodiments, a trolley can use data from any number of encoders (e.g., of a drive system, guide mechanism, and/or cam assembly) and an optical tracking system.

While the trolleys 2100 and 8100 are described above as including an electronic system (e.g., the electronic system 2700) that actively controls the operating condition of the trolleys 2100 and 8100 to support at least a portion of the weight of the patient, in some embodiments, a trolley can include an electronic system, which, in addition to controlling the operating condition of the trolley, can determine one or more characteristics associated with the patient's gait during use. By way of example, a trolley such as the trolley 2100 and/or 8100 can include a set of encoders, sensors, and/or the like that can determine a set of operating conditions associated with a portion of the trolley. Specifically, in some embodiments, the trolley can include a drive system similar to the drive system 2300 in FIGS. 12-26, a patient support mechanism similar to the patient support mechanism 2500 in FIGS. 27-33, and an electronic system similar to the electronic system 2700 in FIGS. 10 and 11, which can be used collectively to determine the set of operating conditions associated with the trolley. In turn, the electronic system can determine, based on the set of operating conditions, the one or more characteristics associated with the patient's gait during use.

By way of example, in some embodiments, the patient support mechanism can include, inter alia, a winch assembly coupled to a tether, a guide mechanism, and a cam assembly. The winch assembly can have an encoder (e.g., similar to the encoder 2537), the guide mechanism can have an encoder (e.g., similar to the encoder 2561), and the cam assembly can have an encoder (e.g., similar to the encoder 2587). Similarly, the drive system can have an encoder (e.g., similar to the encoder 2470). The electronic system can include at least a processor and a memory configured to receive one or more signals from the encoders of the drive mechanism and the patient support mechanism. In some embodiments, the electronic system can also include an imaging device (e.g., similar to the imaging device 8725 in FIGS. 46 and 47) configured to capture and image or video stream of a tracking member (e.g., similar to the tracking member 8860).

As described in detail above, when a patient using the patient support system begins to walk, the drive mechanism can move the trolley along the support track in response to his or her movement. The encoder of the drive mechanism can, in turn, sense one or more characteristics associated with the operation of the drive mechanism. For example, the encoder can sense a position of the drive mechanism relative to the support track, a translational velocity of the drive mechanism along the support track, a translational acceleration of the drive mechanism along the support track, a rotational velocity of one or more wheels, a rotational acceleration of one or more wheels, an angular orientation of one or more wheels, a motor speed and/or direction, a voltage associated with at least a portion of the motor, and/or the like. The encoder can then send a signal associated with the one or more characteristics of the drive mechanism to the electronic system, which in response, can cause the processor to determine and/or or update an operating condition of the drive mechanism based at least in part on a change in the one or more characteristics of the drive mechanism relative to a previously defined operating condition of the drive mechanism (e.g., stored in a memory or the like), as described in detail above with reference to the trolley 2100.

Similarly, in response to the walking of the patient, the encoder of the winch assembly, the guide mechanism, and/or the cam assembly (as well as the imaging device if included therein) can sense and/or determine one or more characteristics associated with the operation of the patient support mechanism. For example, in some instances, the patient may walk faster than the trolley, thereby changing the angle of the tether and the guide mechanism relative to the trolley. The encoder of the guide mechanism can sense the angular deflection of the guide mechanism and can send a signal associated with the angle of the guide mechanism to the electronic system. Upon receipt, the electronic system can cause the processor to determine and/or update an operating condition of the guide mechanism.

In some instances, the movement of the patient may, for example, increase a length of a portion of the tether. As such, a portion of the tether can be unspooled from a drum or the like included in the winch assembly. More specifically, at least a portion of a force exerted by the patient on the tether can rotate the drum or the like, which in turn, results in an unspooling of the tether (i.e., an increase in a length of a portion of the tether between the patient and the winch assembly). The encoder of the winch assembly can sense one or more characteristics associated with the operation of the winch assembly. For example, the encoder can sense an angular position of the drum, a rotational velocity of the drum, an acceleration of the drum, a speed and/or direction of a motor included in the winch assembly, a voltage associated with at least a portion of the motor of the winch assembly, and/or the like. The encoder can then send a signal associated with the one or more characteristics of the winch assembly to the electronic system, which in response, can cause the processor to determine and/or or update an operating condition of the winch assembly based at least in part on a change in the one or more characteristics of the winch assembly relative to a previously defined operating condition of the winch assembly (e.g., stored in a memory or the like), as described in detail above with reference to the trolley 2100. In some instances, based at least in part on the updated operating condition of the winch assembly, the processor can determine a length of the portion of the tether disposed between the patient and the winch assembly. In some embodiments, the tether can be coupled to a load cell or the like configured to sense a force exerted by the patient on the tether (e.g., by measuring a stress, tension, strain, and/or the like along and/or within a portion of the tether). The load cell can be configured to send a signal to the electronic system associated with a load (e.g., force) exerted on the tether, which in turn, can cause the processor to determine a force exerted by the patient.

In some instances, an amount of force exerted on the tether by the patient may increase or decrease in a substantially sudden manner. For example, if a patient stumbles, an amount of force exerted on the tether may increase relatively suddenly. In such instances, the increase of force exerted on the tether may pivot the guide mechanism and/or increase a length of a portion of the tether (as described above), as well as rotate a cam and/or cam arm included in the cam assembly (e.g., as described with reference to the cam assembly 2570 in FIGS. 32 and 33). In other words, at least a portion of the cam assembly can be configured to rotate in response to a relatively fast movement and/or deflection of the tether. The encoder of the cam assembly can sense one or more characteristics associated with a movement of the cam and/or cam arm such as, for example, position, velocity, acceleration, jerk, orientation, alignment, force, and/or the like. The encoder of the cam assembly can then send a signal associated with the one or more characteristics of the cam assembly to the electronic system, which in response, can cause the processor to determine and/or update an operating condition of the cam assembly based at least in part on a change in the one or more characteristics of the cam assembly relative to a previously defined operating condition of the cam assembly (e.g., stored in memory), as described above with reference to the trolley 2100.

By defining, determining, and/or updating one or more operating conditions of the drive mechanism and/or the patient support mechanism, the electronic system (e.g., at least the processor of the electronic system) can actively control the trolley to support at least a portion of a weight of the patient using the patient support system. As described above, in some instances, the magnitude of change in the operating condition of the drive system and/or the patient support mechanism is based at least in part on a proportional-integral-derivative (PID) control. In such instances, the electronic system (e.g., the processor or any other electronic device in communication with the processor) can determine the changes of the patient support mechanism and model the changes based on the PID control. Based on the result of the modeling the processor can determine the suitable magnitude of change in the operating condition of the drive system and/or the patient support mechanism.

Figure 48:
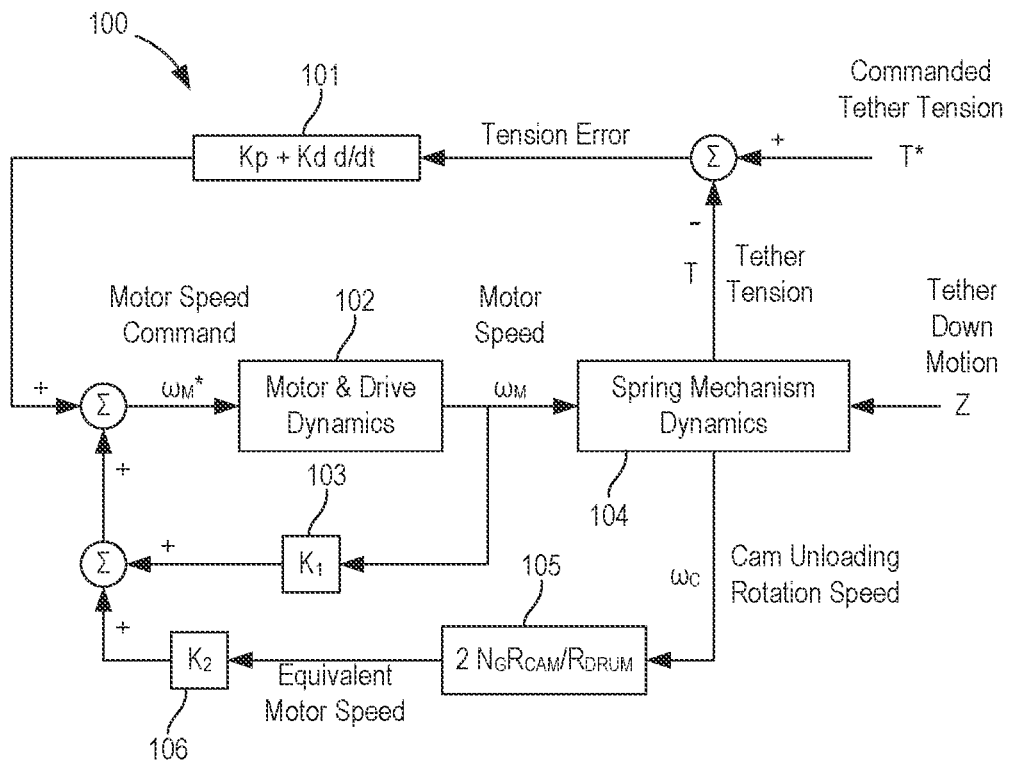
FIG. 48 is a schematic illustration of a control diagram according to an embodiment.

For example, FIG. 48 is a schematic illustration of a control diagram according to an embodiment. In this embodiment, the electronic system (described above) can be configured to control the drive system and/or the patient support mechanism based at least in part on a tension within and/or along a portion of the tether. Specifically, a nurse, technician, therapist, doctor, physician, etc. can define a predetermined value associated with a target tether tension T* (e.g., commanded tether tension). With the commanded tether tension T* stored, for example, in memory, the processor of the electronic system can compare an actual tension T within and/or along the portion of the tether against the commanded tether tension T* to determine a tension error. In some instances, the processor can then perform a derivative control operation 101 on the tension error, the output of which can be added to one or more proportional control operation outputs (described in further detail below) to determine, for example, a motor speed command $\omega_M^*$ for controlling motor and drive dynamics 102 associated with a motor included in the drive system and/or the patient support mechanism.

As shown in FIG. 48, a proportional control operation 103 can be performed on a value associated with an actual motor speed $\omega_M$ of the motor included in the drive system and/or patient support mechanism. In addition, the actual motor speed WM can be evaluated with a value Z associated with a downward motion of the tether (e.g., in response to a force exerted by a patient) for controlling spring mechanism dynamics 104 associated with, for example, the cam assembly of the patient support mechanism. As a result, the processor can define (1) an updated value of the actual tension T within and/or along the portion of the tether, and (2) a cam unloading rotation speed $\omega_C$. An equivalent motor speed can be determined by evaluating a rotational speed associated with a portion of the cam and a rotational speed associated with, for example, the drum of the winch assembly (represented in FIG. 48 by the reference numeral 105). A proportional control operation 106 can be performed on the equivalent motor speed, an output of which can then be added to an output of the proportional control operation 103. As described above, the sum of the proportional control operations 103 and 106 can be added to the output of the derivative control operation 101 to define the motor speed command $\omega_M^*$. Thus, in this embodiment and as described above, the electronic system (e.g., or at least the processor included therein) can control the trolley, in response to movement of a patient, based at least in part on a PID control feedback loop and/or the like.

Figure 49:
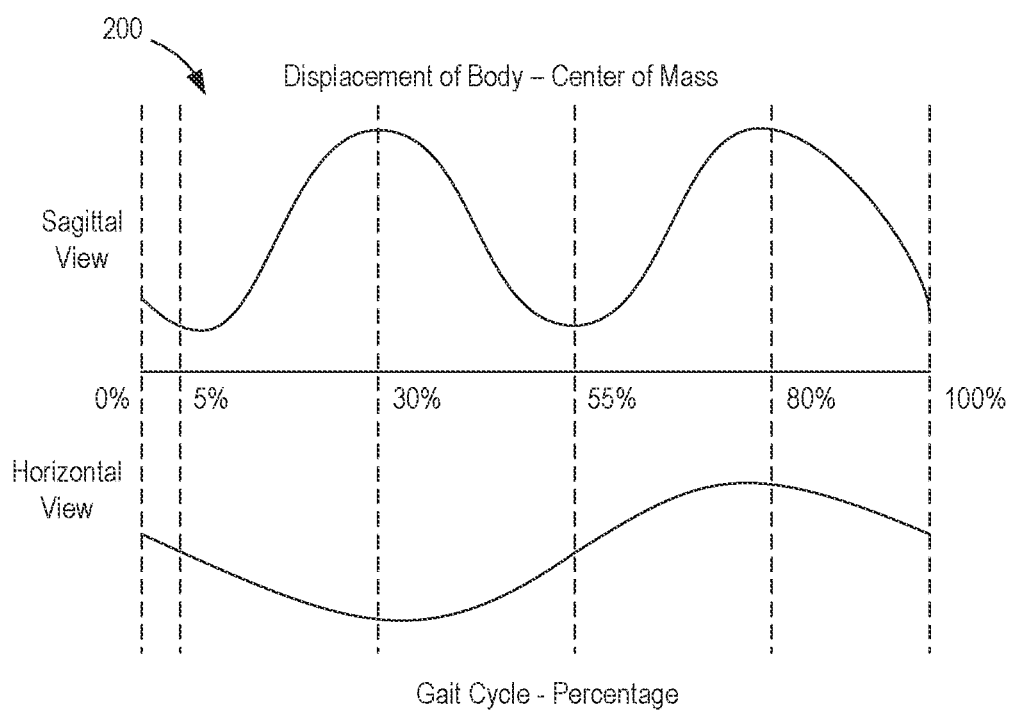
FIG. 49 is a graph illustrating a displacement of a center of mass of a patient according to an embodiment.

In some instances, the electronic system can determine one or more characteristic associated with a patient's gait based at least in part on an operating condition and/or a change in operating condition of the drive mechanism and/or the patient support mechanism. For example, FIG. 49 is a graph 200 illustrating a displacement of a center of mass of a patient according to an embodiment. As shown, a patient's center of mass shifts during a gait cycle (e.g., up to about 5 centimeters (cm)), which in turn, results in a shifting and/or changing force exerted on the tether when the patient is using the patient support system. For example, the center of mass of the patient can be at a lowest point (i.e., closest to a surface on which the patient is walking) at about 5% and about 55% of the gait cycle, which corresponds to a termination of a swing phase of the gait cycle. The center of mass of the patient can be at a highest point (i.e., furthest away from the surface on which the patient is walking) at about 30% and about 80% of the gait cycle, which corresponds to the patient's center of mass passing over his or her weight bearing leg. Similarly, the center of mass of the patient can shift in a lateral direction during the gait cycle, as shown in FIG. 49. With at least a portion of the weight of the patient supported by the patient support mechanism, the shifting of the center of mass of the patient results in a corresponding shift and/or change in the force exerted on the tether by the weight of the patient. Therefore, based on one or more operating conditions associated with the drive system and/or the patient support mechanism, the processor can determine a set of characteristics associated with the patient's gait.

By way of example, FIGS. 50-53 are graphs illustrating operating conditions associated with the patient support mechanism in response to a patient's movement. In this instance, the operating conditions associated with the patient support mechanism relate to a tether position and a cam angle of the cam included in the cam assembly, which in turn, can be used to determine one or more characteristics associated with the patient's gait. More specifically, the processor of the electronic system can determine the tether position based on a signal received from one or more encoders (e.g., the encoder of the winch assembly, the guide member, and/or any other suitable encoder) and can determine the cam angle based on, for example, the encoder of the cam assembly.

Figure 50:
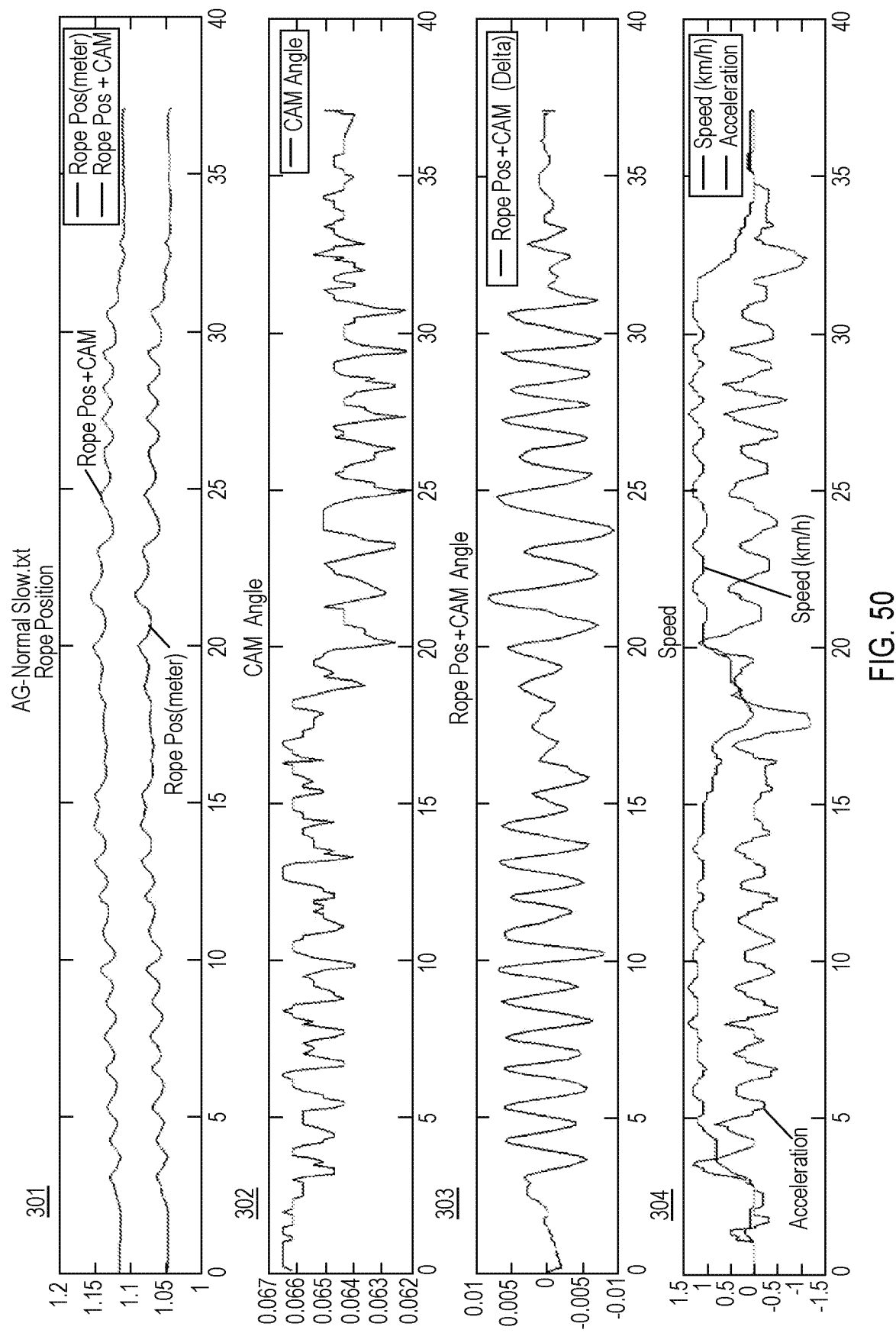
FIGS. 50-53 are graphs illustrating operating conditions associated with a patient support mechanism in response to a patient's movement, according to an embodiment.

As shown in FIG. 50, the tether position and cam angle are graphed in response to a relatively slow movement of a normal or healthy patient's gait. Specifically, graph 301 illustrates a position of a portion of the tether, with and without factoring in a position associated with the cam, in response to the patient's gait; graph 302 illustrates a cam angle of the cam in response to the patient's gait; graph 303 illustrates a change in the tether position plus a change in the cam angle in response to the patient's gait; and graph 304 illustrates the speed and acceleration associated with the tether in response to the patient's gait. In some instances, the position of the portion of the tether, as shown in graph 301, can change in response to a relatively slow, gradual, and/or substantial change in the patient's movement, while the cam angle of the cam, as shown in graph 302, can change in response to a relatively fast, sudden, and/or abrupt movement of the tether. In some instances, the change in cam angle in response to the relatively fast movement of the tether can, for example, reduce noise or the like that might otherwise alter a determination of the tether position. As shown in graph 303, the change in the tether position and the change in the cam angle can be determined, which in turn, can be used to determine a speed and acceleration associated with the tether position, as shown in graph 304. Moreover, by determining the tether position, velocity, and acceleration, the processor of the electronic system can determine one or more characteristics associated with the patient's gait. For example, in some instances, the gait of a healthy patient may have and/or define a substantially symmetric characteristic when comparing movement of the patient's left leg to movement of the patient's right leg. Thus, by determining the position, velocity, and acceleration of the tether, the processor can determine gait characteristics such as, for example, a number of steps, a distance traveled, a stride length, a velocity, a difference between gait characteristics associated with the left leg and the right leg, and/or any other suitable characteristic.

Figure 51:
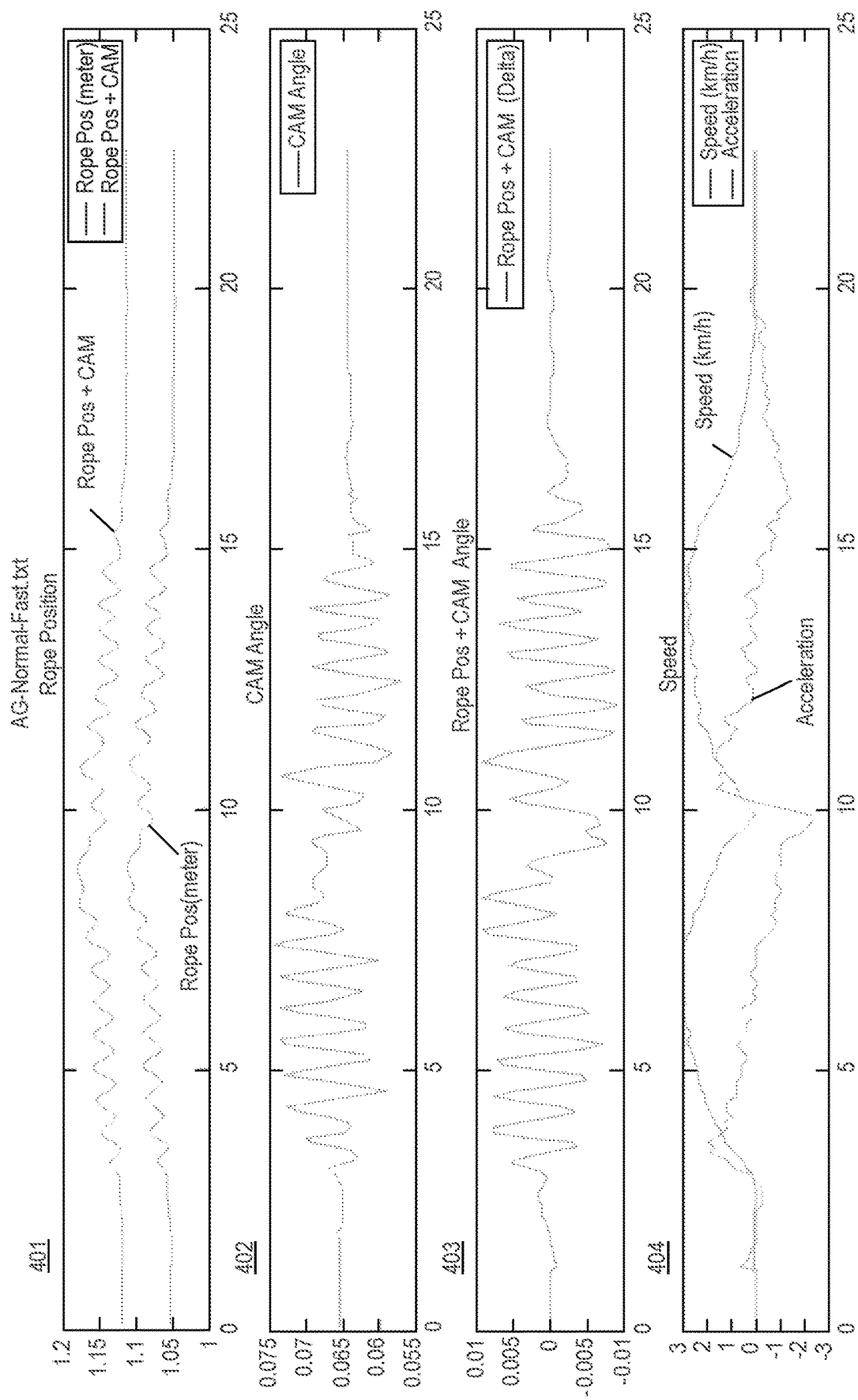

In a similar manner, FIG. 51 illustrates graphs showing the tether position and cam angle in response to a relatively fast movement of the normal or healthy patient's gait. Specifically, graph 401 illustrates a position of a portion of the tether, with and without factoring in a position associated with the cam, in response to the patient's gait; graph 402 illustrates a cam angle of the cam in response to the patient's gait; graph 403 illustrates a change in the tether position plus a change in the cam angle in response to the patient's gait; and graph 404 illustrates the speed and acceleration associated with the tether in response to the patient's gait. As can be seen in FIGS. 50 and 51, the speed associated with the patient's movement can result in a different response of the tether position and the cam angle. Thus, the processor of the electronic system can determine any suitable gait characteristic associated with the patient's relatively fast gait, which can be different from a corresponding gait characteristics associated with the patient's relatively slow gait.

Figure 52:
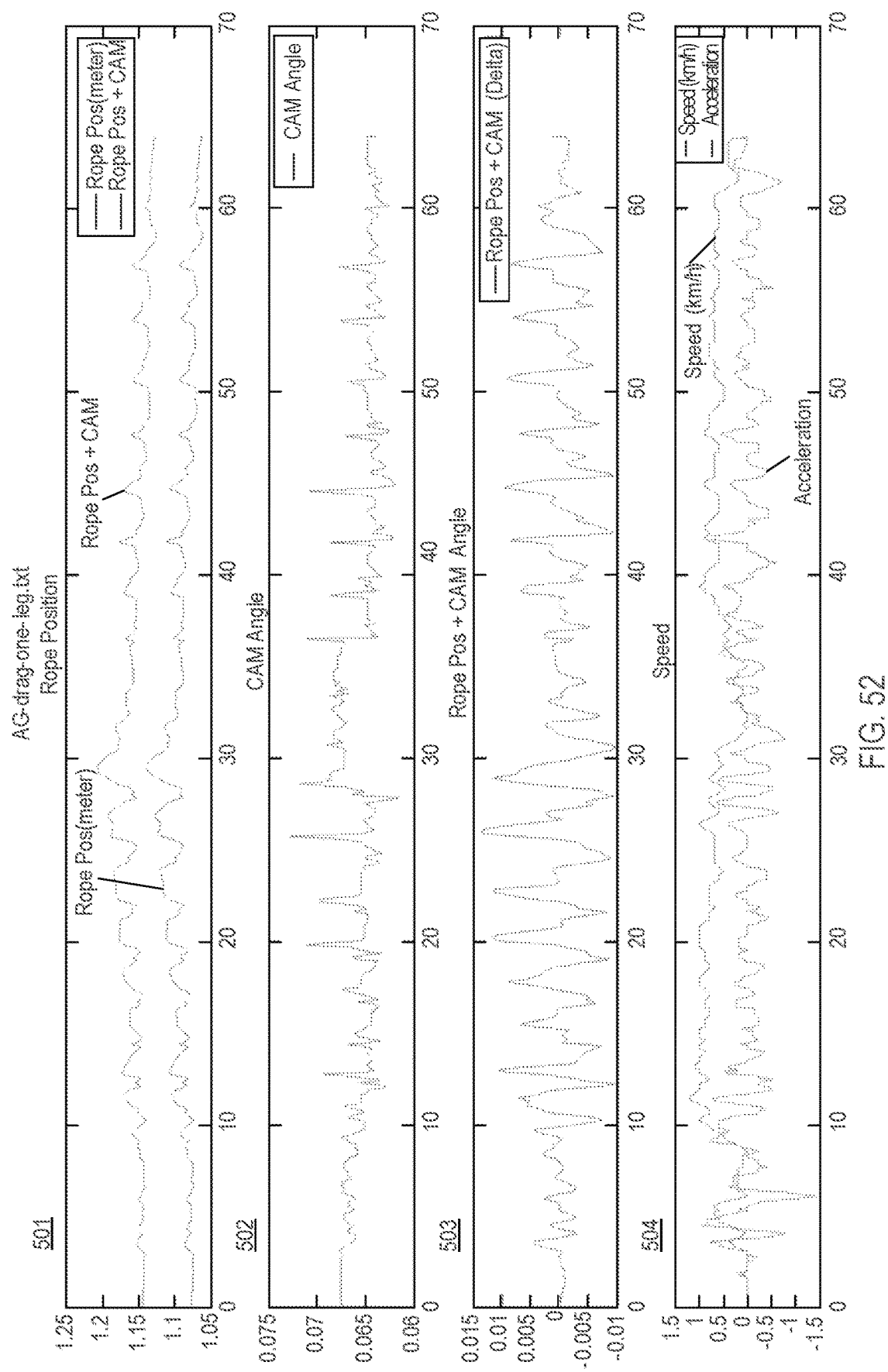
Figure 53:
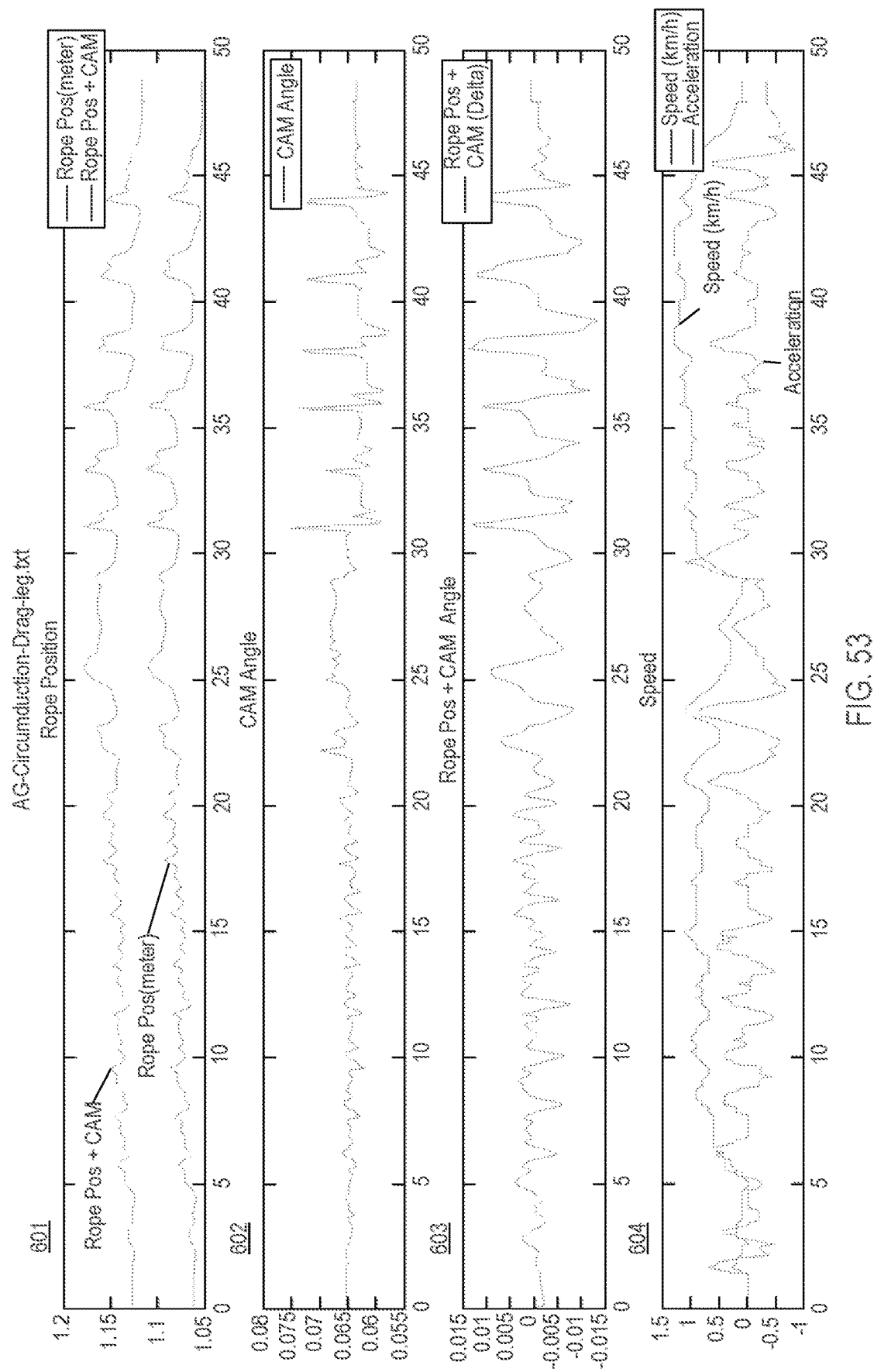

While the graphs in FIGS. 50 and 51 illustrate the tether position and the cam angle relative to a normal or healthy patient's gait, FIGS. 52 and 53 illustrate a tether position and cam angle relative to an impaired patient's gait and more specifically, to the gait of a patient with an impairment resulting in a dragging of one of his or her legs. For example, in FIG. 52, graph 501 illustrates a position of a portion of the tether, with and without factoring in a position associated with the cam relative to the impaired patient's gait; graph 502 illustrates a cam angle of the cam relative to the impaired patient's gait; graph 503 illustrates a change in the tether position plus a change in the cam angle relative to the impaired patient's gait; and graph 404 illustrates the speed and acceleration associated with the tether relative to the impaired patient's gait. Similarly, in FIG. 53, graph 601 illustrates a position of a portion of the tether, with and without factoring in a position associated with the cam relative to circumduction movement of the impaired patient's gait; graph 602 illustrates a cam angle of the cam relative to circumduction movement of the impaired patient's gait; graph 603 illustrates a change in the tether position plus a change in the cam angle relative to circumduction movement of the impaired patient's gait; and graph 604 illustrates the speed and acceleration associated with the tether relative to circumduction movement of the impaired patient's gait.

As can be seen in FIGS. 52 and 53, the impairment causing the patient to drag one leg during his or her gait results in a response of the tether position and the cam angle that is more erratic, abrupt, and/or otherwise more irregular relative to the response of the tether position and the cam angle resulting from a non-impaired patient's gait. In some instances, the position, velocity, and/or acceleration of the tether position resulting from the impaired patient's gait can be compared to the position, velocity, and/or acceleration of the tether position resulting from the non-impaired patient's gait. As such, the processor of the electronic system can determine, predict, and/or otherwise analyze the characteristics of the impaired patient's gait, which in turn, can be used to define a therapeutic treatment plan, a therapeutic progress report, a diagnostic method, and/or the like.

Figure 54:
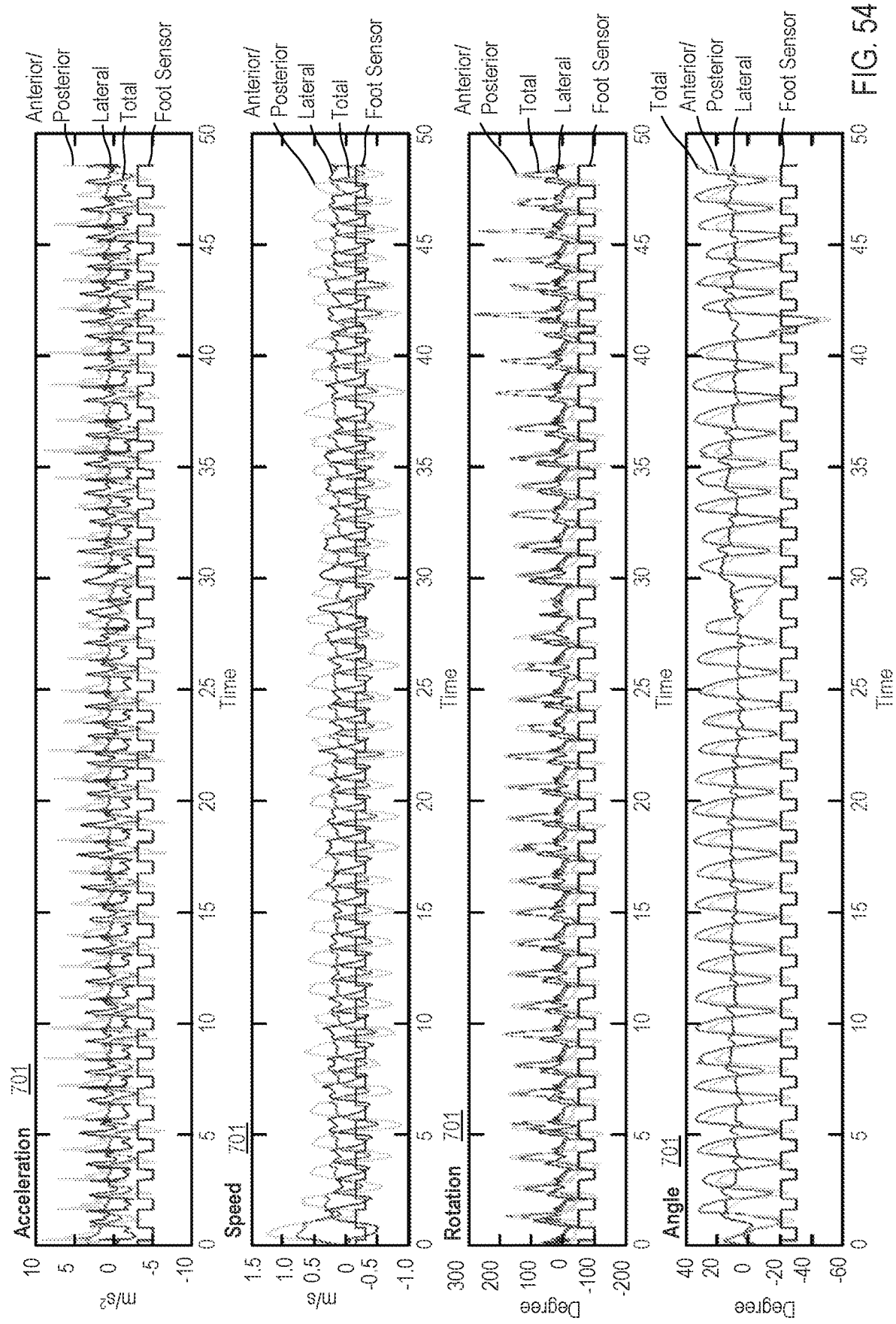
FIG. 54 illustrates graphical representations of one or more operating conditions associated with an electric stimulator and/or an impaired patient's gait while using a body weight support system, according to an embodiment.

In some instances, the patient support system (and/or any of the patient support systems described herein) can be used in conjunction with any other suitable device configured to determine, provide, and/or define characteristics associated with a patient's gait. In some instances, the analysis of the one or more operating conditions of the drive mechanism and/or patient support mechanism can be used in conjunction with an analysis of data associated with an electric stimulator configured, for example, to improve an impaired patient's gait. For example, the patient support system can be used to support a patient donning an electric stimulator, configured to facilitate the gait of a patient experiencing drop foot or the like, such as those described in U.S. Pat. No. 10,080,885 entitled, "Orthosis for a Gait Modulation System," filed Apr. 4, 2014, the disclosure of which is incorporated herein by reference in its entirety. As shown in FIG. 54, the electric stimulator can define one or more operating conditions associated with the electric stimulator and/or the impaired patient's gait. For example, the electric stimulator can sense and/or determine an anterior or posterior motion, a lateral motion, a total motion (e.g., a combination of the lateral motion and the anterior or posterior motion), and/or a pressure associated with a heel on or heel off event, as shown in FIG. 54. In this instance, graph 701 illustrates an acceleration associated with the operation of the electric stimulator; graph 702 illustrates a speed associated with the operation of the electric stimulator; graph 703 illustrates a rotation associated with the operation of the electric stimulator; and graph 704 illustrates an angle associated with the operation of the electric stimulator.

Figure 55:
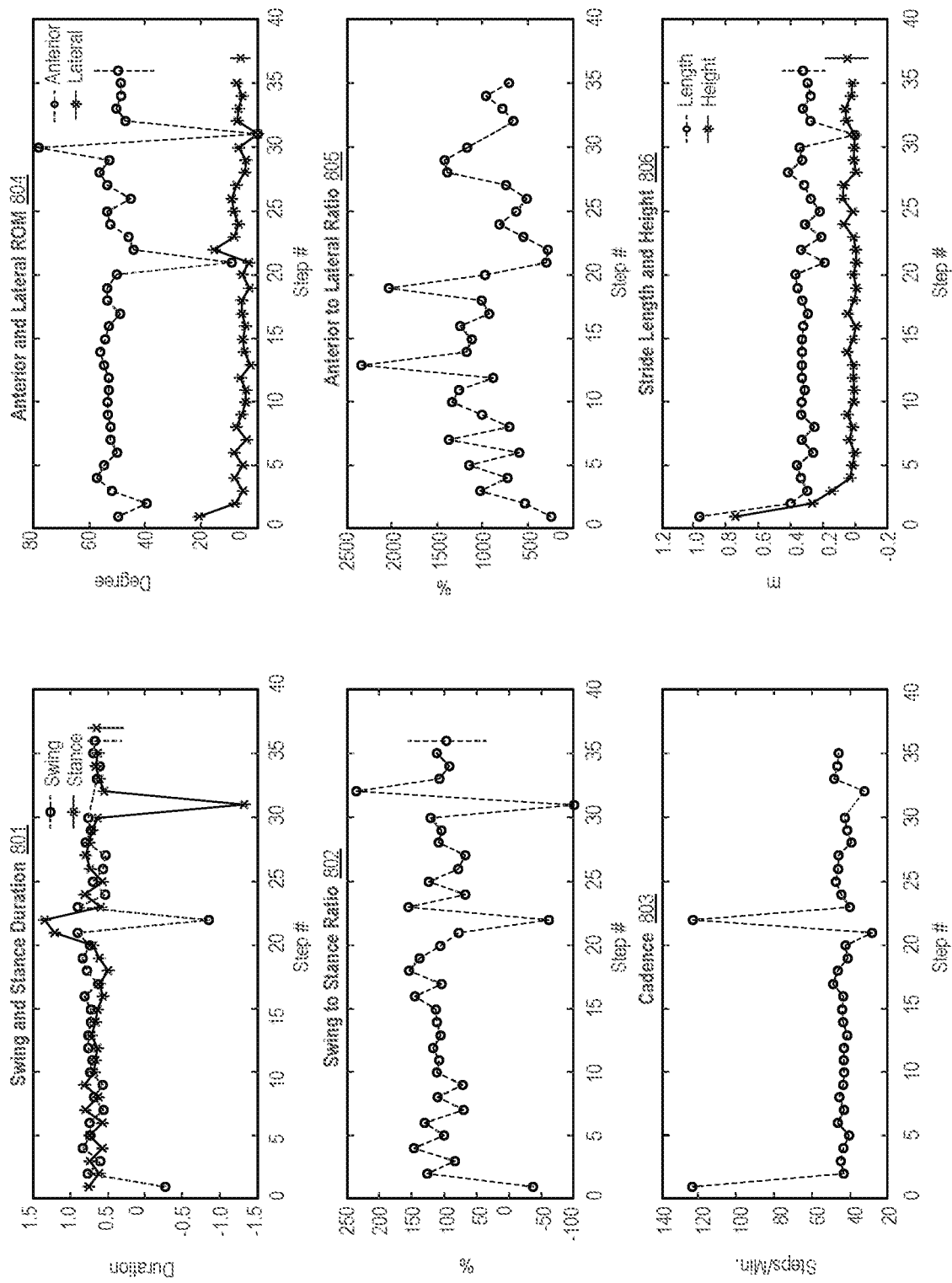
FIG. 55 illustrates graphical representations of a set of gait characteristics of a patient, which were determined based at least in part on data associated with a body weight support system and, for example, an electric stimulator, according to an embodiment.

In some embodiments, the electric stimulator can send a signal associated with one or more of its operating conditions to the electronic system of the patient support system. As such, the processor can determine one or more gait characteristics of the impaired patient based on data received from the drive system and/or patient support mechanism as well as the electric stimulator. By way of example, FIG. 55 illustrates graphical representations of a set of gait characteristics of a patient, which were determined based at least in part on data associated with the patient support system and the electric stimulator (as described in detail above). Specifically, graph 801 illustrates a swing and stance duration of the patient's gait; graph 802 illustrates a swing to stance ratio of the patient's gait; graph 803 illustrates a cadence of the patient's gait; graph 804 illustrates an anterior and lateral range of motion (ROM) associated with one or both of the patient's legs; graph 805 illustrates an anterior to lateral ratio associated with one or both of the patient's legs; and graph 806 illustrates a stride length and height of the patient's gait. Thus, the operating conditions associated with the patient support system and any other suitable device can be used to determine one or more characteristics of the patient's gait. Moreover, the electronic system can be configured to send a signal to any suitable output device (e.g., a monitor, a laptop, a personal computer, a hand held controller, a smartphone, and/or the like) that is indicative of an instruction to output data associated with the one or more characteristics of the patient's gait.

As described above, any of the patient support systems and/or body weight support systems described herein can be used to and/or can otherwise facilitate an analysis of a patient's gait while using that system. For example, in some embodiments, the patient support systems can be used with an electronic device (e.g., a personal computer, laptop, tablet, smartphone, controller, remote display, workstation, server, and/or the like) to determine data associated with the patient's gait and graphically and/or alpha-numerically represent that data on a display. The patient support system can include, for example, a trolley tracking and dynamic body weight engine, module, processor, compute device, etc. to determine data such as trolley speed, travelled distance, tether length, cam angle, body weight unloading, elapsed time, and/or any other suitable data set.

In addition, when a patient support system such as those described herein is used with, for example, an electric stimulator system or with any other suitable electric and/or electronic data collection system, the patient support system can be configured to receive signals from and/or send signals to such electric or electronic systems associated with, for example, heel on or off events and/or other gait phases. Thus, in some instances, the patient support systems described herein can calculate and/or determine a step duration, a step length, a walking speed, a symmetry level of gait patterns (left/right), and/or any other suitable gait characteristic. Moreover, the patient support systems described herein can send one or more signals (e.g., via a wired or wireless connection) to, for example, the electronic device to cause a graphical representation, a numeric representation, and/or an alpha-numeric representation of the calculated and/or determined gait characteristics to be presented on a display. In other instances, the patient support system can send data associated with one or more operating conditions of the patient support system to the electronic device. In such instances, the electronic device can calculate and/or define the gait characteristics, based at least in part on the data received from the patient support system. In addition, the electric stimulator can send data associated with the patient's gait, substantially concurrently with the patient support system, to the electric device. In other instances, the electric stimulator can send data associated with the patient's gait to the patient support system and the patient support system (e.g., a processor, module, or compute device included therein) can aggregate the data associated with the patient support system and the data associated with the electric stimulator and, in turn, can send an aggregated data set to the electronic device.

In some embodiments, the patient support system and/or an electronic device in communication therewith can include memory and/or at least one module that stores data associated with one or more predetermined exercises, routines, tests, and/or the like. For example, the memory and/or module can include data associated with a set of exercises to analyze the patient's current and/or previous gait tests or analysis to track and help improve the patient's ability to walk. In some instances, the patient support system and/or the electronic device in communication therewith can graphically represent data associated with the exercises, routines, tests, and/or the like.

Figure 56:
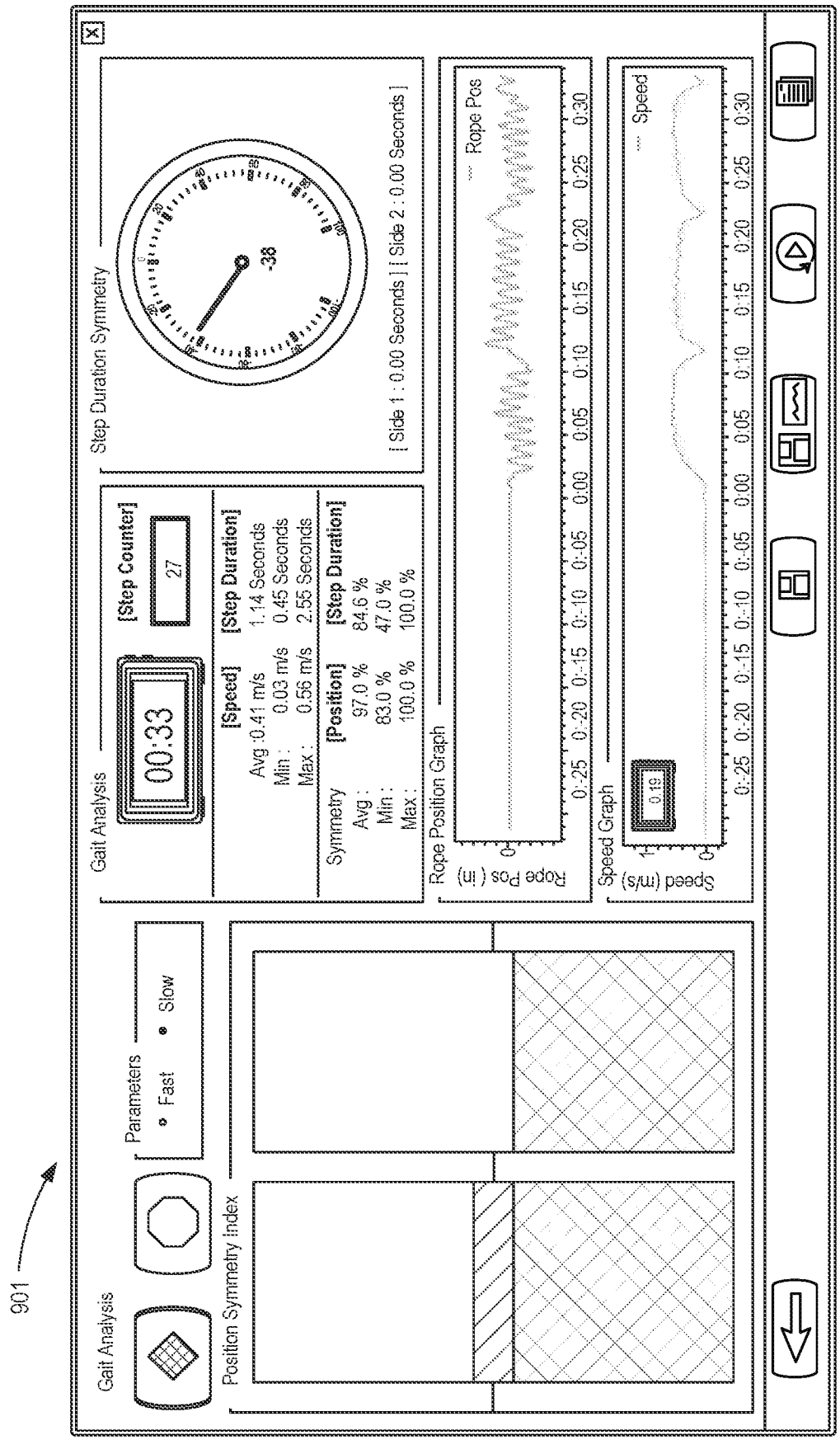
FIG. 56 is a screen shot of a display showing a graphical representation of data associated with a symmetry analysis of a patient's gait determined, at least in part by a body weight support system, according to an embodiment.

For example, FIG. 56 is a screenshot 901 illustrating a graphical representation of data associated with an asymmetry exercise. The screenshot 901 of the asymmetry exercise visually shows a patient's vertical asymmetry (leaning more on one side than on the other side) and his or her horizontal asymmetry (difference between step durations). As shown, the symmetry can be displayed in position symmetry bar graphs as well as radio dials, which can be complemented by real time graphs showing a history of, for example, changing tether positions and walking speeds. During and after the asymmetry test, the patient support system and/or the electronic device can send a signal or instruction such that data associated with an average, minimum, and/or maximum walking speed, a vertical and/or horizontal symmetry, and/or the like is graphically represented on the display.

Figure 57:
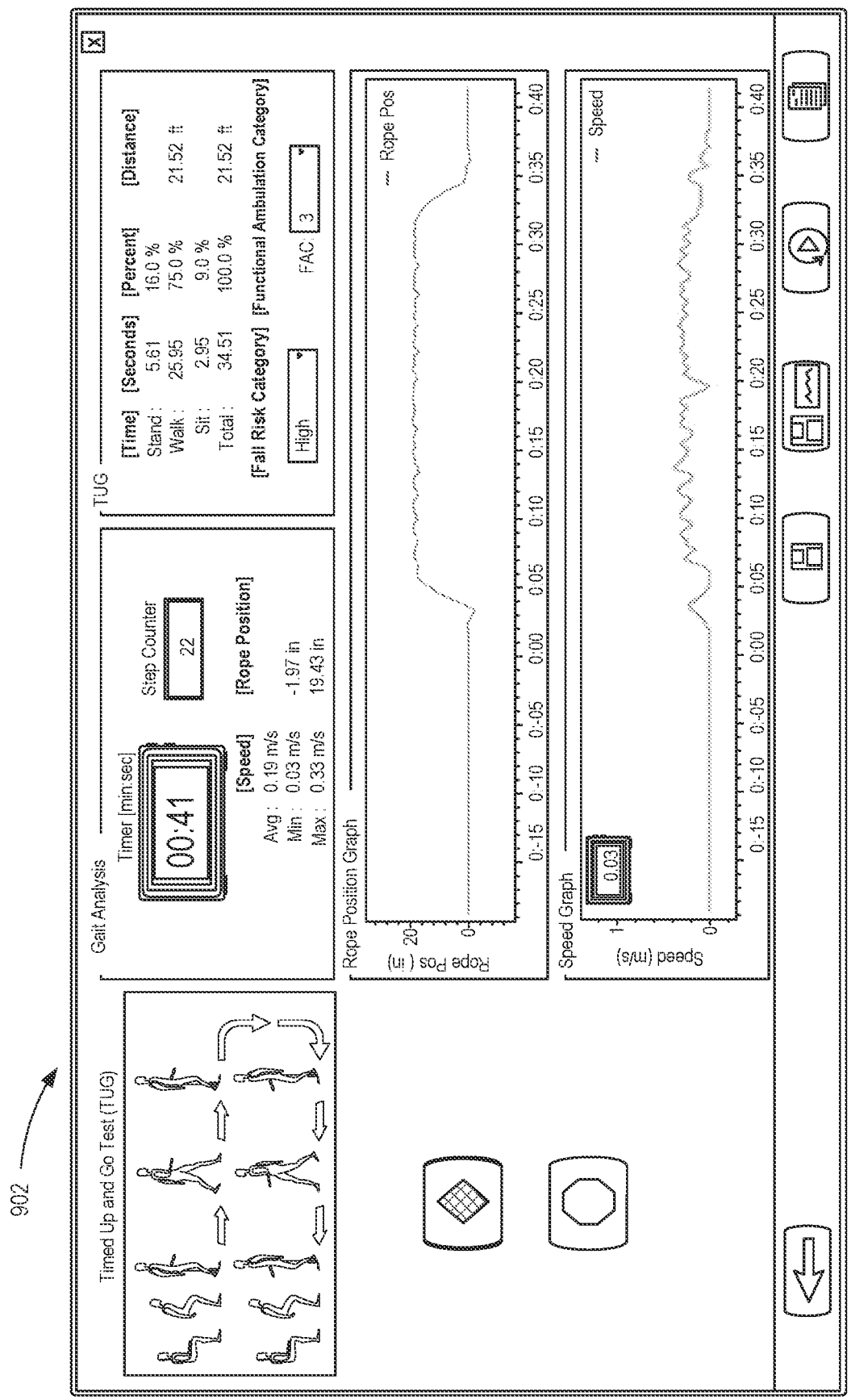
FIG. 57 is a screen shot of a display showing a graphical representation of data associated with a timed-up-and-go test of a patient determined, at least in part by a body weight support system, according to an embodiment.

By way of another example, FIG. 57 is a screenshot 902 illustrating a graphical representation of data associated with a timed-up-and-go (TUG) exercise. The screenshot 902 of the TUG exercise can graphically represent data defined by the patient support system and/or the electronic device associated with the time it takes a patient to stand up from a seated position, walk a predetermined distance, and then sit down. During and after the TUG exercise, the patient support system and/or the electronic device can send a signal or instruction such that data associated with an average, minimum, and/or maximum speed during the TUG training exercises is graphically represented on the display. In addition, the patient support system and/or the electronic device can cause data to be graphically represented on the display such as real time graphs showing the history of the stand-up, walking, and sit down process, tether positions (included in a patient support mechanism of the patient support system, as described in detail above), and/or time durations, as well as the walking speeds during the exercise. Based at least in part on the time duration results, a fall risk (e.g., high or low) can be determined for the patient. Moreover, the data associated with the TUG exercise can be compared to historical data (e.g., stored in memory) from that patient's previous TUG exercises, thereby allowing a clinician or therapist to keep track of improvements in patient's gait.

Figure 58:
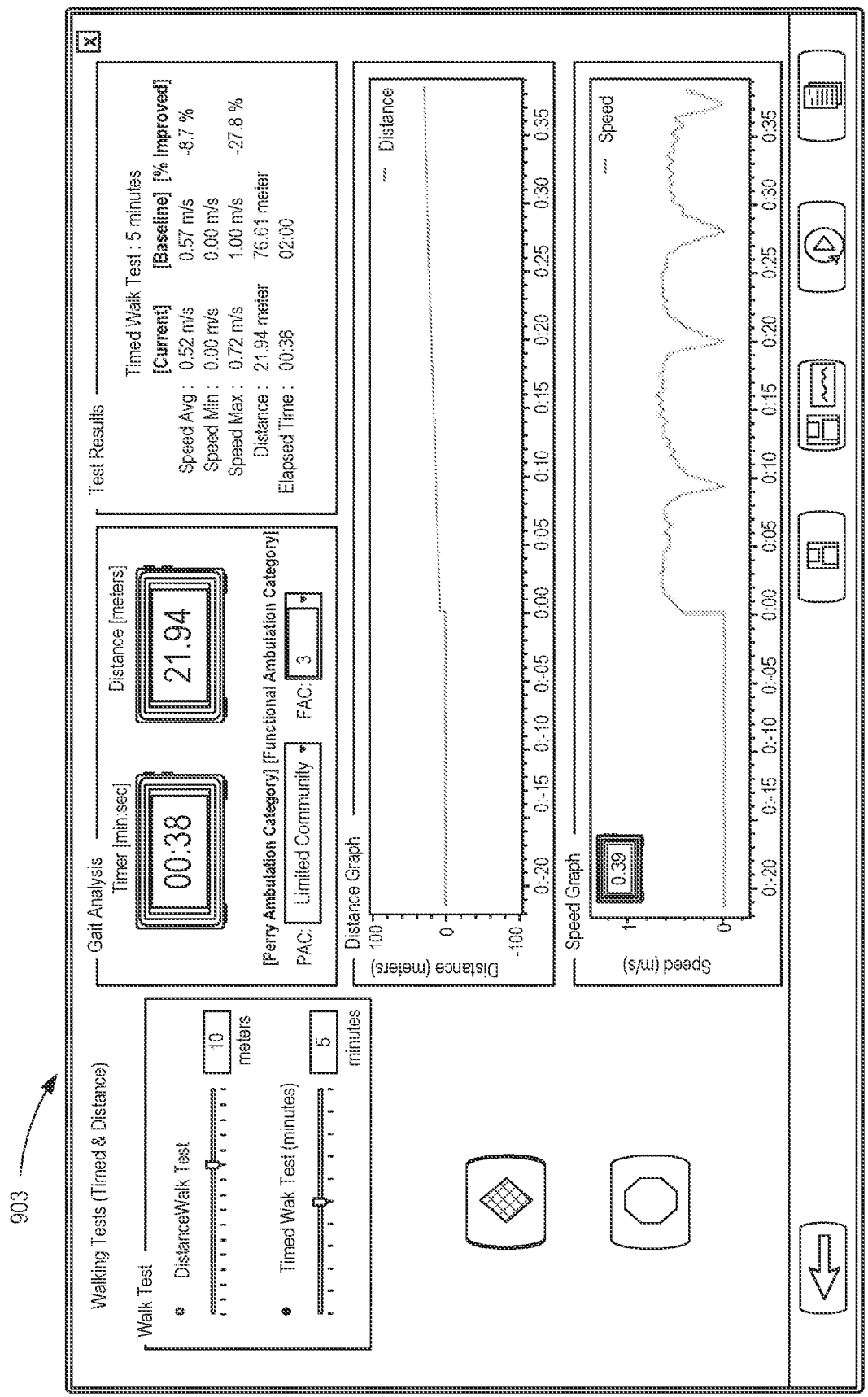
FIG. 58 is a screen shot of a display showing a graphical representation of data associated with a timed-distance test of a patient determined, at least in part by a body weight support system, according to an embodiment.

As another example, FIG. 58 is a screenshot 903 illustrating a graphical representation of data associated with a timed-distance exercise. For example, a user (e.g., clinician and/or patient) can select either a fixed distance (e.g., 10 meters) or a fixed time (e.g., 2 minutes). The patient then walks for that distance or that time and the patient support system and/or the electronic device can determine and/or define the patient's performance. For a fixed distance, the timed-distance exercise can determine a gait speed and duration. For a fixed time, the timed-distance exercise can determine a total travelled distance and/or a gait speed. The patient support system and/or the electronic device can cause data to be graphically represented on the display such as real time graphs showing the distance travelled and the walking speed, an average, minimum, and/or maximum walking speed, and/or the like.

As described above, any data associated with the exercises, routines, tests, etc. can be saved, for example, in memory, and can be replayed and/or otherwise presented for post exercise analysis. In addition, data associated with any given exercise can be saved as a baseline so it can be used to compare against future exercises to show the improvements in patient's gait. In some instances, a report can be defined (e.g., by the patient support system and/or the electronic device) and graphically represented on the display to provide details of a given exercise, including the gait speed, distance, time, time to stand, time to sit, cadence, symmetry indexes, or the like, as well as a Perry Ambulatory Category, a Functional Ambulation Category, and/or fall risk.

The patient support mechanism and/or the electronic device (or a processor, module, compute device, etc. included therein) can be configured to perform the exercises, routines, test, or the like, based on data associated with, for example, a tether position, a cam angle, a walking speed, a motor speed, a heel on or off event (and/or other gait phases), and/or the like. In some instances, the patient support mechanism and/or the electronic device can determine, for example, a change in the position of the tether (i.e., included in a patient support mechanism, as described in detail above) between two heel events to determine a vertical symmetry of the patient's gait. In some instances, the data can be based on both linear tether positions and/or cam angles (e.g., a linear graph) and a derivative thereof (e.g., slope or rate of change) of the tether position and/or cam angles (converted to linear length) to determine a gait pattern and/or characteristic.

Based on a determined gait pattern, the patient support mechanism and/or the electronic device can determine peaks and/or valleys associated with the gait events, which can be graphically represented as a linear graph or a derivative graph. In some instances, the patient support mechanism and/or the electronic device can use, for example, a midpoint logic to normalize the linear graph and/or derivative graph (e.g., remove a graph offset, or the like). In some instances, the peaks and valleys of the graphs (e.g., local minima and/or local maxima of the data) can be used determine the heel on or off events. Based on different predetermined gait patterns (e.g., a first category for normal walkers and a second category for pathological walkers) the peaks and valleys can be defined and/or determined differently. For example, for a normal walker, a valley (e.g., locally the shortest tether position) can be about mid stance (double support) of the gait. Conversely, for a pathological walker, a valley can be during a step.

Once the peaks and valleys are associated with the respective heel on or off events, the difference between the previous and current step tether positions can be determined to define the changes in the tether positions (e.g., determine vertical symmetry difference between the right and the left steps or the difference between the two subsequent steps). The previous and current step elapsed times can also be determined to define changes in the step duration (e.g., determine horizontal symmetry).

While the patient support system is described above as using one or more operating conditions to determine gait patterns and/or gait characteristics, in other instances, one or more operating conditions of the patient support system can be used to determine a current level or current amount of body weight support relative to a predetermined level or predetermined amount of body weight support. In some embodiments, a patient support system ("support system") can be programmed and/or set to provide a predetermined amount of body weight support (or to provide body weight support in a predetermined and/or preprogrammed manner) based on characteristics associated with the tether. For example, in some embodiments, the support system can be configured and/or programmed to provide support to a patient after, for example, a predetermined and/or predefined lengthening of the tether (e.g., in response to a patient falling or partially falling). In other words, the support system can be configured and/or programmed to support at least a portion of the patient's body weight after the patient has fallen beyond a predetermined threshold.

Figure 59:
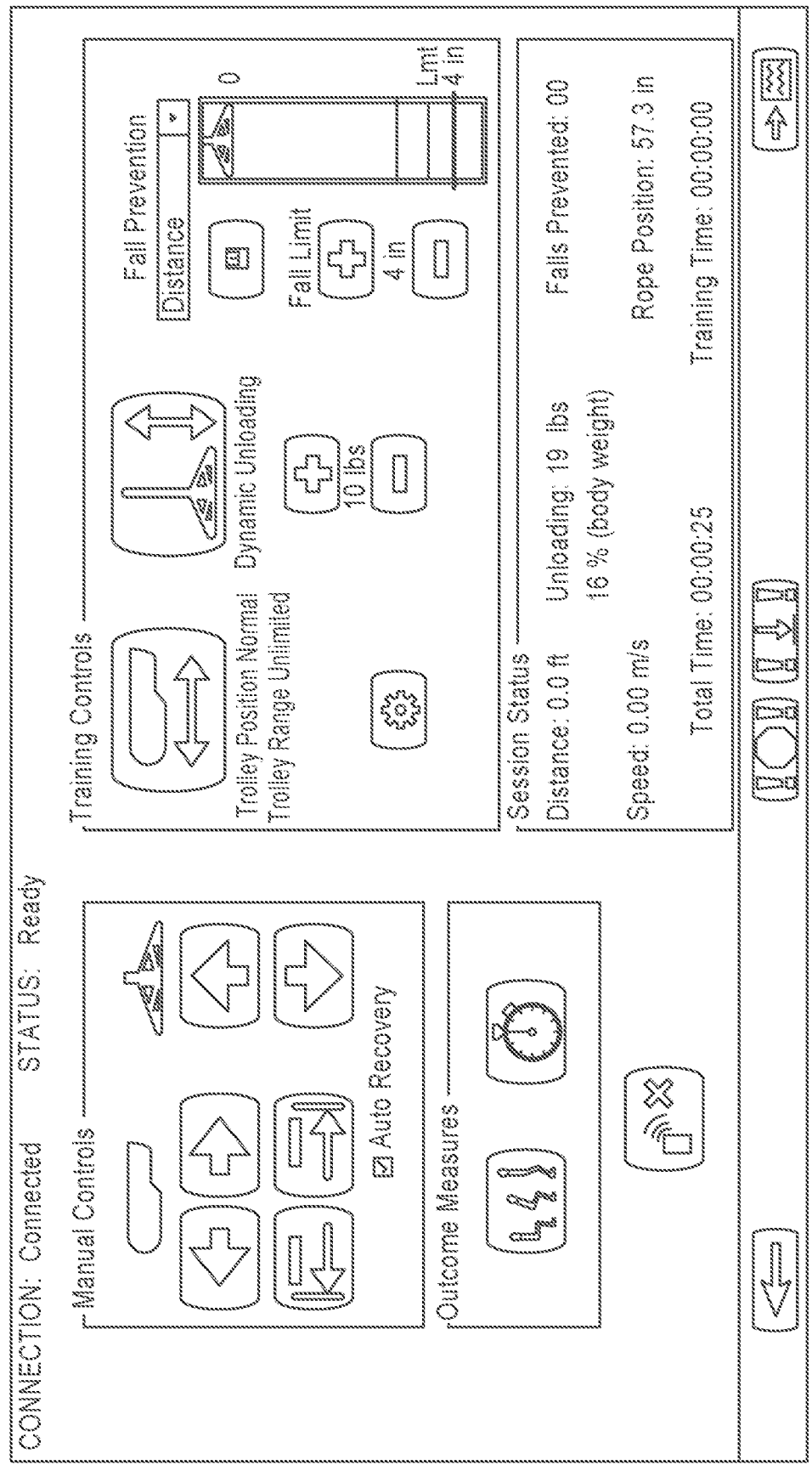
FIG. 59 is a screen shot of a display showing a graphical representation of data associated with a fall prevention system included in and/or implemented by a body weight support system according to an embodiment.
Figure 60:
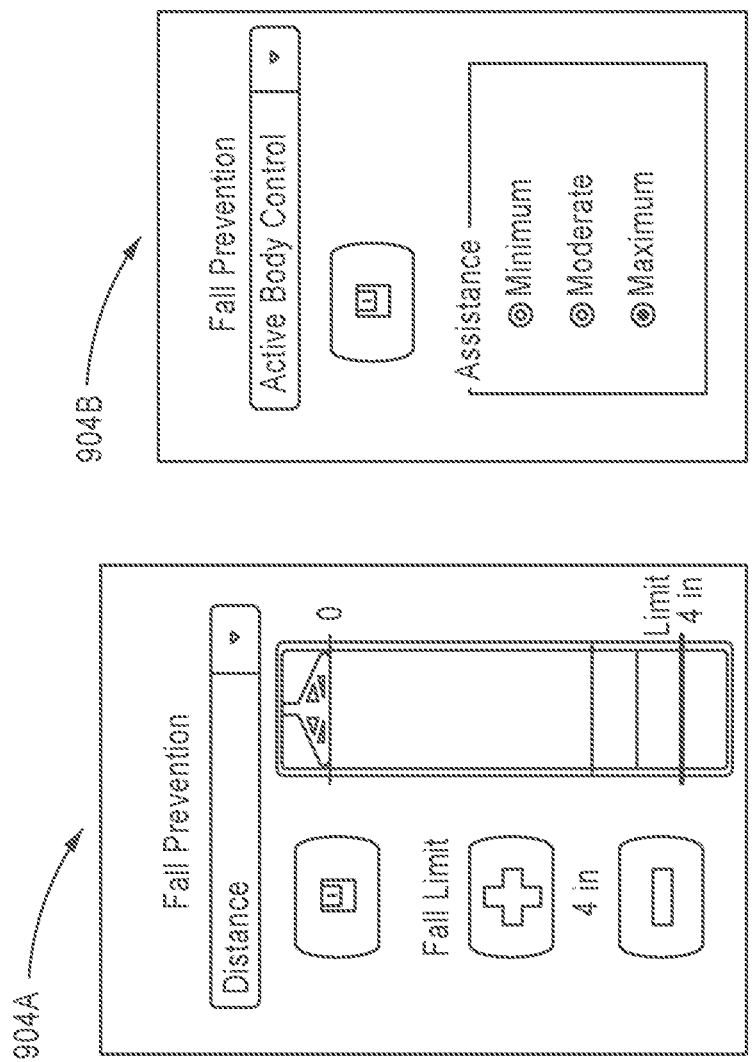

For example, FIGS. 59 and 60 are screenshots 904 and 904A, respectively, illustrating a graphical representation of data associated with a support system and more particularly, with a "fall prevention" configuration, setting, interface, and/or the like. As described above, in some instances, a support system can be configured to provide support of at least a portion of a patient's body weight based on a lengthening of the tether in response to the patient falling or beginning to fall. In some embodiments, for example the support system and/or an electronics assembly included therein can be configured to determine, define, and/or calculate an initial length of the tether (e.g., when the patient and/or user is stationary and/or not falling). As the patient and/or user begins to walk, the electronics assembly can receive data from one or more sensors, encoders, and/or the like that is associated with a current tether length. In some instances, the patient, user, therapist, and/or trainer can set a fall limit (e.g., a criterion or threshold) that corresponds to a threshold amount a length of the tether can be increased prior to the support system providing support for the patient. In other words, a user, therapist, trainer, etc. can set a fall tolerance and/or maximum distance that a user can fall prior to the support system providing support.

As shown in FIGS. 59 and 60, in some embodiments, the default fall limit and/or the default threshold amount of lengthening of the tether can be, for example, about 4 inches (in.). After a length of the tether has been increased beyond the threshold (e.g., after a patient and/or user has descended (fallen) beyond the fall limit), the support system can transition to a support configuration in which the tether can be locked and/or a tracking system or drive system is deactivated (e.g., a support configuration or fall prevention configuration). In some instances, the patient, user, and/or clinician can adjust the fall limit and/or threshold by engaging the graphical interface shown, for example, in the screenshot 904A of FIG. 60 (e.g., by pressing one or more on-screen buttons and/or otherwise by selecting a predetermined fall limit, threshold, and/or criterion). As shown, the adjusted value, limit, and/or threshold can be presented on the graphical interface (e.g., in text or via one or more images).

In some embodiments, for example, the fall limit and/or threshold can be between about 1.0 in. and about 36.0 in. In such embodiments, setting the fall limit to 1.0 in. can be such that the support system provides the highest level of support (e.g., allows the least amount of falling prior to initiating support of the patient), and setting the fall limit to 36.0 in. can be such that the support system provides the lowest level of support (e.g., allows the most amount of falling prior to initiating support of the patient). In some embodiments, the fall limit and/or threshold can be adjusted by increments of about 1.0 in. In other embodiments, the adjustment increments can be greater than 1.0 in. or less than 1.0 in. In some instances, the fall limit and/or threshold can be adjusted and/or changed while the support system is in use or between uses. Moreover, in some instances, the support system and/or electronics assembly can be configured to calculate and/or determine a height of, for example, a patient attachment mechanism and data associated with the height can be graphically represented on a display. For example, as shown in FIGS. 59 and 60, a height of the tether, patient, and/or patient attachment mechanism can be graphically represented on a bar graph or the like relative to the fall limit and/or threshold, which can allow for substantially real time visualization of a user's performance or the like.

In some embodiments, an administrator or user can program and/or set an initial tether length or the like corresponding to a predetermined and/or desired height of a patient attachment mechanism (e.g., the patient attachment mechanism 2800 described above with reference to FIG. 34). More specifically, the user and/or administrator can input and/or can provide patient information such as, for example, height, weight, etc. Based on the user's height, the support system can be configured to calculate a predetermined and/or desired height or position (e.g., in the y-direction) of the patient attachment mechanism when attached to the tether and a harness worn by the user. In this manner, the predetermined and/or desired position of the patient attachment mechanism (e.g., a neutral position or "zero point") can be, for example, a reference point or the like against which a current position of the patient attachment mechanism can be compared. If, for example, the patient attachment mechanism is higher than the zero point, a level or amount of support may be reduced (e.g., to reduce an amount of tension in the tether and/or to otherwise allow for more "slack" in the tether) and/or the patient support system may be reset to define a new zero point. Conversely, if the patient attachment mechanism is below the zero point, a level or amount of support may be increased (e.g., to increase an amount of tension in the tether and/or to otherwise reduce an amount of slack in the tether).

In some instances, the support system can be configured to adjust and/or update the zero point during use. For example, in some instances, evaluating the amount of change in the tether length (or height of the patient attachment mechanism), the rate of change in the tether length, and/or a total duration of the change relative to the zero point can allow a patient to walk along a surface having a change in elevation or the like. For example, in some instances, the support system (or the electronic system thereof) can adjust and/or update the zero point or reference point in response to a relatively slow rate of change in the height and/or when the change is height is over a relatively long duration of time. In such instances, for example, the support system can determine that the patient is walking along a surface having a change in elevation and thus, can dynamically or actively adjust and/or update the "zero point" or reference point. Under such conditions, the support system can be configured to adjust and/or update the zero point prior to the amount of change in the tether length reaching and/or exceeding the fall limit or can adjust and/or update the zero point after the amount of change reaches and/or exceeds the fall limit. In other instances, the support system can provide support and/or can transition to a support configuration in response to an amount of change in the tether length reaching and/or exceeding the fall limit when the change in the height is at a relatively fast rate and/or when the change in height is over a relatively short time. In other words, the support system can provide support and/or can transition to the support configuration when the support system determines that the patient is falling rather than traveling along a surface having a change in elevation.

While the support system is described above as including and/or implementing a fall prevention system and/or method based on a distance or length of a portion of the tether (e.g., a fall limit or tolerance), in other embodiments, the support system can include and/or can implement a fall prevention system and/or method based on any suitable characteristic and/or parameter of the support system. For example, in some instances, the support system can be configured to receive an input from a user and/or clinician that is operable in placing the support system in an "active body control mode." In some instances, for example, the support system and/or the electronics assembly can receive an input operable in switching the support system from a "distance" or "fall limit mode" (see e.g., FIG. 60) to the "active body control mode" (see e.g., FIG. 61). That is to say, in some embodiments, a processor of the electronics assembly can be configured to execute a set of instructions and/or code (e.g., stored in the memory) to place the support system in the "fall limit mode" or in the "active body control mode."

In some embodiments, the active body control mode can be configured to dynamically support a portion of the patient's body weight based on, for example, a rate of change in the length of the tether (e.g., a velocity of the tether). In some instances, determining an amount of body weight to support based on a rate of change in the length of the tether can allow for a greater range of motion than when basing the amount of support on a length of the tether alone. Moreover, as described above with reference to the "distance" mode, the support system can be configured to evaluate a duration of the change in velocity to improve and/or tune a response of the support system.

Figure 61:
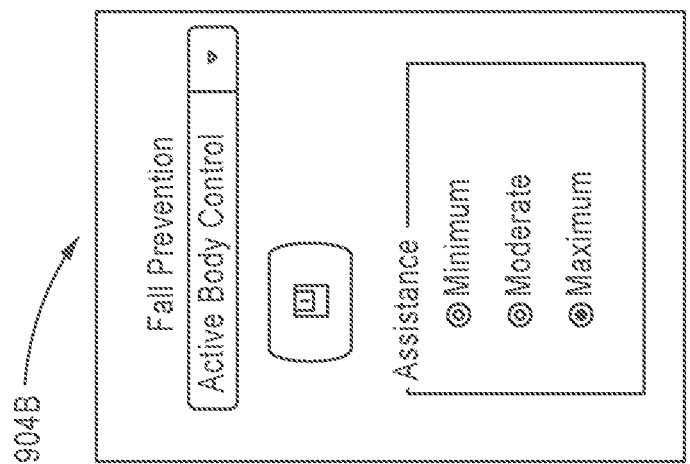

As shown in FIG. 61, in some embodiments, the support system can be programmed and/or set to provide a "Minimum" level of support (configured to provide the lowest level of fall prevention), a "Moderate" level of support (configured to provide a moderate amount or mid-level of fall prevention, greater than the minimum level), or a "Maximum" level of support (configured to provide the highest level of fall prevention, greater than the moderate level). In other embodiments, a support system can be configured to provide more than three levels of support (e.g., four, five, six, seven, eight, nine, ten, or more levels of support).

As described above, the level of support can be based on a rate of change in tether length over a predetermined time. That is to say, the level of support can be a function of the rate of change in tether length (or height of the patient attachment mechanism) and the overall duration (time) of the change in tether length. In some instances, the patient support system can be configured to determine a rate of change in a length of the tether based on, for example, an operating condition associated with the cam assembly and/or the winch assembly. In some instances, a relatively fast rate of change in tether length (as determined by an operating condition of the cam assembly, winch assembly, and/or any other suitable portion of the support system) can be indicative of a patient falling and thus, can result in the support system updating one or more operating conditions of the support system (e.g., trolley) to actively support a portion of the patient's body weight.

In some instances, setting the fall prevention system and/or method to the "Maximum" amount of support can be such that the support system provides support in response to a relatively low rate of change in the length of the tether (e.g., a relatively low velocity criterion and/or threshold). In some instances, setting the fall prevention system and/or method to the "Moderate" amount of support can be such that the support system provides support in response to a rate of change in the length of the tether that is greater than the rate of change when the system is set to the "Maximum" amount of support. In other instances, setting the fall prevention system and/or method to a "Minimum" amount of support can be such that the support system provides support in response to a rate of change in the length of the tether that is greater than the rate of change when the system is set to the "Moderate" amount of support. Moreover, by evaluating and/or determining a duration of the change in tether length, the support system can be configured to determine, for example, if a rate of change in the tether length is the result of a user changing his or her rate of walking or running, a result of the user rising to a standing position from a sitting position, a result of the user falling, etc.

In some instances, the fall prevention and/or level of support can be at least partially based on the duration of the rate of change. For example, in some instances, when a rate of change in the tether length reaches and/or exceeds a predetermined threshold the support system can be configured to determine a duration of the change in the tether length. In some instances, setting the fall prevention system to the "Maximum" support level can be such that a tolerance and/or threshold associated with the duration is less than a tolerance and/or threshold associated with the duration when the fall prevention system is set to the "Minimum" support level. As such, the support system can be configured to provide support and/or can be configured to transition to a support configuration in response to an increase in the rate of change in tether length (or height of the patient attachment mechanism) over a predetermined duration.

In some embodiments, the support system can be configured to update the level of support based on a patient's and/or user's performance against a predetermined program and/or metric (e.g., a timed-up-and-go test, a sit-to-stand test, a predetermined minimum walking speed, a predetermined number of falls within a given time, etc.). The level of support can be manually updated by a therapist, administrator, and/or user. In other instances, a user or administrator can define a set of criteria or the like (e.g., a number of falls, etc.), which if satisfied, results in the support system automatically updating the amount of support (e.g., increasing or decreasing the amount or level of support). Moreover, in some instances, the support system and/or the fall prevention system can have a default mode or the like associated with each test. For example, in some instances, it may be desirable to automatically place the fall prevention system in the "Active Body Control" mode such that support is based on a rate of change in the length of the tether rather than the "Distance" mode.

Figure 63:
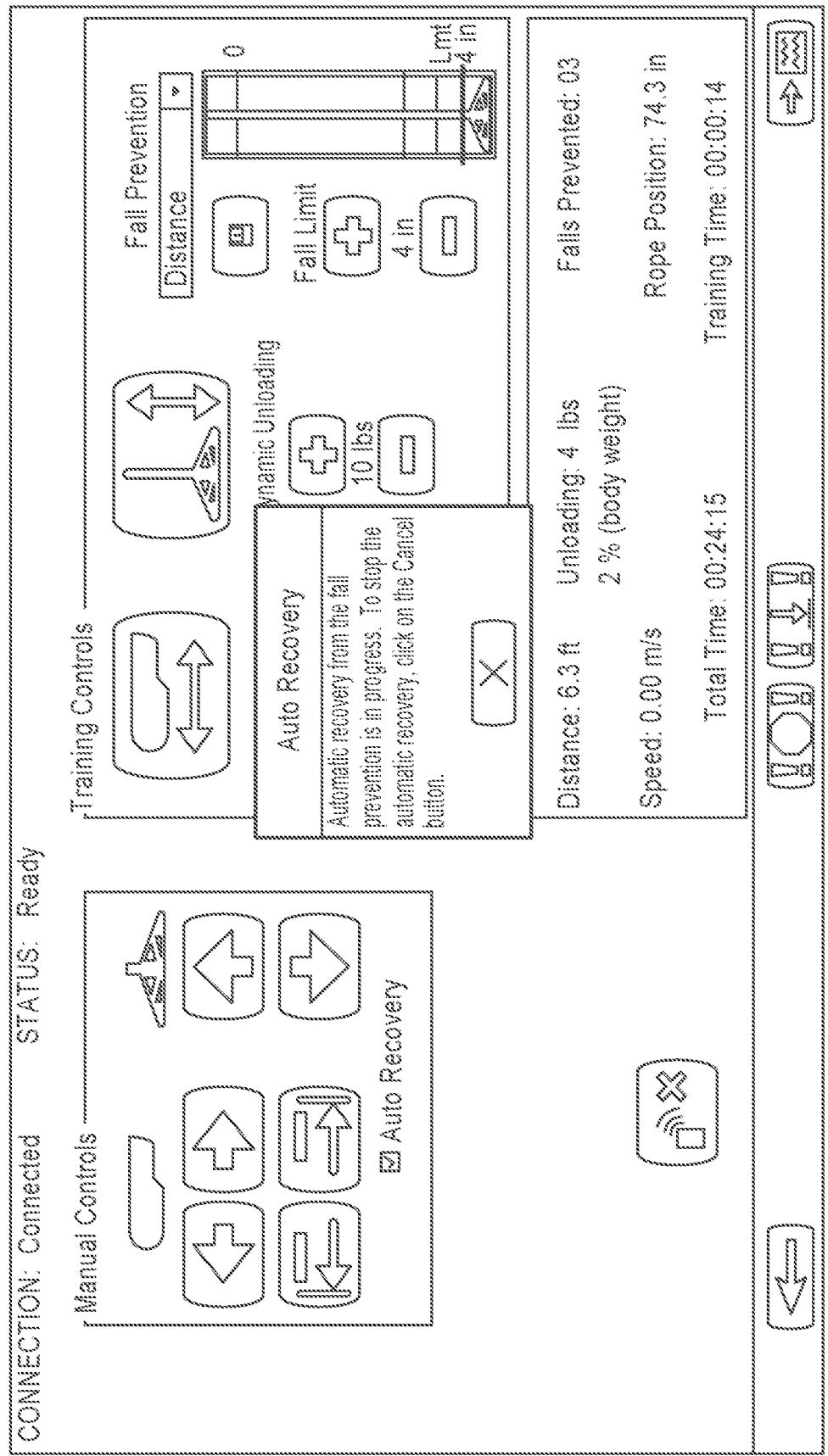
FIG. 63 is a screen shot of the display graphically representing a portion of the fall prevention system illustrated in FIG. 59.

In some embodiments, the support system can be configured to "reset" the system after a fall or the like to place the patient attachment mechanism at the zero point. For example, in some instances, the support system and/or the fall prevention system can include and/or can perform an "Auto Recovery" as shown by the screen shot 905 in FIG. 63. In such instances, the system can be configured to reset to a default and/or previous setting (e.g., to predetermined and/or default tether length) after a user falls. In addition, in some instances, the support system can provide support as the user recovers (e.g., stands up) after falling or the like.

Figure 62:
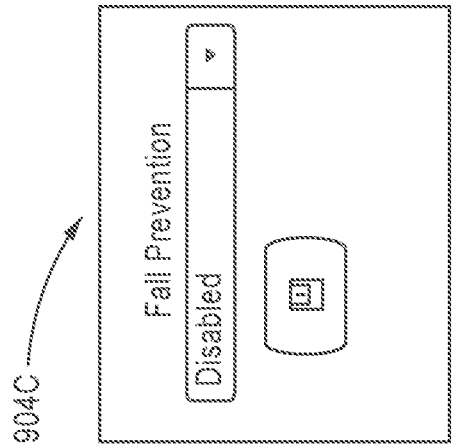
FIGS. 60-62 are screen shots of the display graphically representing a portion of the fall prevention system illustrated in FIG. 59 in a first mode and/or configuration, a second mode and/or configuration, and a third mode and/or configuration, respectively.

While the fall prevention system is described above as being based on an amount of change in the tether length, a rate of change in the tether length, and a duration of the change in tether length, in other instances, the fall prevention system can be disabled, suspended, turned off, etc. For example, referring back to FIG. 62, a screen shot 904C illustrates the fall prevention system in a "Disabled" mode. In such instances, it may be desirable to place the fall prevention system in the "Disabled" mode when preforming, for example, pre-gait and/or pre-use activities.

As described in detail above, the support system and/or the trolley can be configured to adjust one or more system parameters and/or operating conditions such that the trolley is maintained in a position substantially over-head of the user or patient. In some instances, the drive system of the trolley can be configured to move the trolley along the support track to maintain the trolley substantially over-head of the user or patient based on, for example, an angle of the tether or guide mechanism (e.g., the guide mechanism 2540). In some embodiments, the support system can also account for patient movement in a direction perpendicular to an axis of the support track. That is to say, the support system can be configured to account for lateral patient movement and/or sway during gait.

In some embodiments, the trolley and/or at least a portion thereof can be configured to move in a side-to-side motion (lateral motion) in addition to moving along a length of the support track. For example, in some embodiments, the trolley and/or the guide mechanism can have one or more slides, suspension members, and/or the like configured to allow the trolley and/or the guide mechanism, respectively, to move in the lateral direction (as the trolley moves along the axis of the support track or when the trolley is in a stationary position in along the axis of the support track). In this manner, the trolley or a portion thereof, can move with 2-degrees of freedom to maintain the tether in a position substantially over-head of the patient and/or patient attachment mechanism (e.g., extending at a 90° angle or substantially vertically from the trolley).

In other embodiments, the trolley and/or a portion thereof can include one or more sensors, encoders, gyroscopes, etc. configured to sense and/or determine an amount of side-to-side motion (lateral motion). For example, in some instances, the guide mechanism or the like can be configured to pivot about two axes and can include one or more sensors, gyroscopes, encoders, etc. configured to sense and/or determine a pivot position, velocity, and/or acceleration about each axis. In other words, the guide mechanism can allow for forward and aft movement (pivoting) as well as side-to-side movement (pivoting) and can include and/or can be operably coupled to one or more sensors or the like configured to sense and/or detect movement in each direction (e.g., a 2-degree of freedom sensor or the like). Thus, the angular position, velocity, and/or acceleration of the tether and/or guide mechanism in each direction can be determined and/or sensed and data received from the sensor or the like can be used along with data from the other sensors and/or encoders (described above) to determine and/or update one or more operating conditions of the patient support system.

As described above, the support system can include any suitable number of sensors, encoders, gyroscopes, transducers (e.g., force transducers), and/or the like (collectively referred to herein as "sensors"). The electronic system of the support system can receive data from the sensors and can determine and/or update one or more operating conditions of the support system to provide a predetermined and/or desired level or amount of support for the user or patient. In some instances, the data received from the sensors can be compared against predetermined and/or standard values or levels and errors therebetween can be used to determine an amount of dynamic and/or active body weight support.

Any of the patient support systems and/or body weight support systems can be used in conjunction with and/or can include any other suitable device configured to be used during a patient's gait or gait training. In some embodiments, such a device can be a secondary training device, an electronic device or computer, an orthosis or gait assist device, a moving platform, surface, or walkway (e.g., treadmill or the like), and/or any other suitable device. For example, a patient support system can include camera, infrared emitter and receiver, a visual light source and sensor, magnetic sensor, a force and/or pressure plate and sensor, and/or the like. In some embodiments, a patient support system can include, for example, a projector configured to project a graphical representation of data associated with a predetermined track or path along which the patient is to walk. In some instances, such a projector can project images such as stop signs, turn signs, obstacles to walk around, etc.). Moreover, in some instances, a patient reaching a target location projected onto a surface by the projector can be associated with a value or the like (e.g., a relatively high value) used to determine a patient performance score. On the other hand, failing to avoid an obstacle and/or failing to follow a predetermined path projected onto a surface by the projector can be associated with a value, score, and/or the like (e.g., a relatively low value). In some instances, such a projector can project a hologram of the patient walking so that they may see themselves walking either from the front or behind.

In some embodiments, the patient support systems and/or the body weight support systems can be used while a user (or patient) walks along and/or otherwise moves relative to any suitable surface. In some instances, for example, the user can walk along and/or move relative to a surface that is stationary beneath the user's feet as the user stands, walks, runs, etc. Such a stationary surface can be, for example, the floor, the ground, a platform, and/or any other suitable surface. Moreover, the stationary surface can be substantially flat or can be inclined or declined (e.g., a set of steps, a ramp, etc.). In other instances, the user can walk along and/or move relative to a surface that is not stationary beneath the user's feet as the user stands, walks, runs, etc. Said another way, the patient support systems and/or body weight support systems described herein can be used to support at least a portion of a user's weight as the user moves relative to and/or walks on a surface, which in turn, moves beneath the user's feet as the user moves, walks, runs, etc. The moving surface can be any surface such as, for example, a moving surface (belt) of a treadmill, a moving balance platform, and/or the like.

In embodiments in which a support system supports a user as the user is on or moves relative to the moving surface of a treadmill, an electronic device of the patient support system can receive data associated with one or more operating conditions of the treadmill and can use the data associated with the treadmill and data associated with the operating conditions of the patient support system to provide gait training for the user utilizing the treadmill, define one or more gait characteristics of the user, provide an analysis of data and/or information associated with the gait training or one or more training sessions, and/or the like. Moreover, the patient support system and/or any suitable electronic device can be configured to graphically represent data and/or information associated with the treadmill, the patient support system, and/or one or more gait training sessions on a display of the device.

Figure 64:
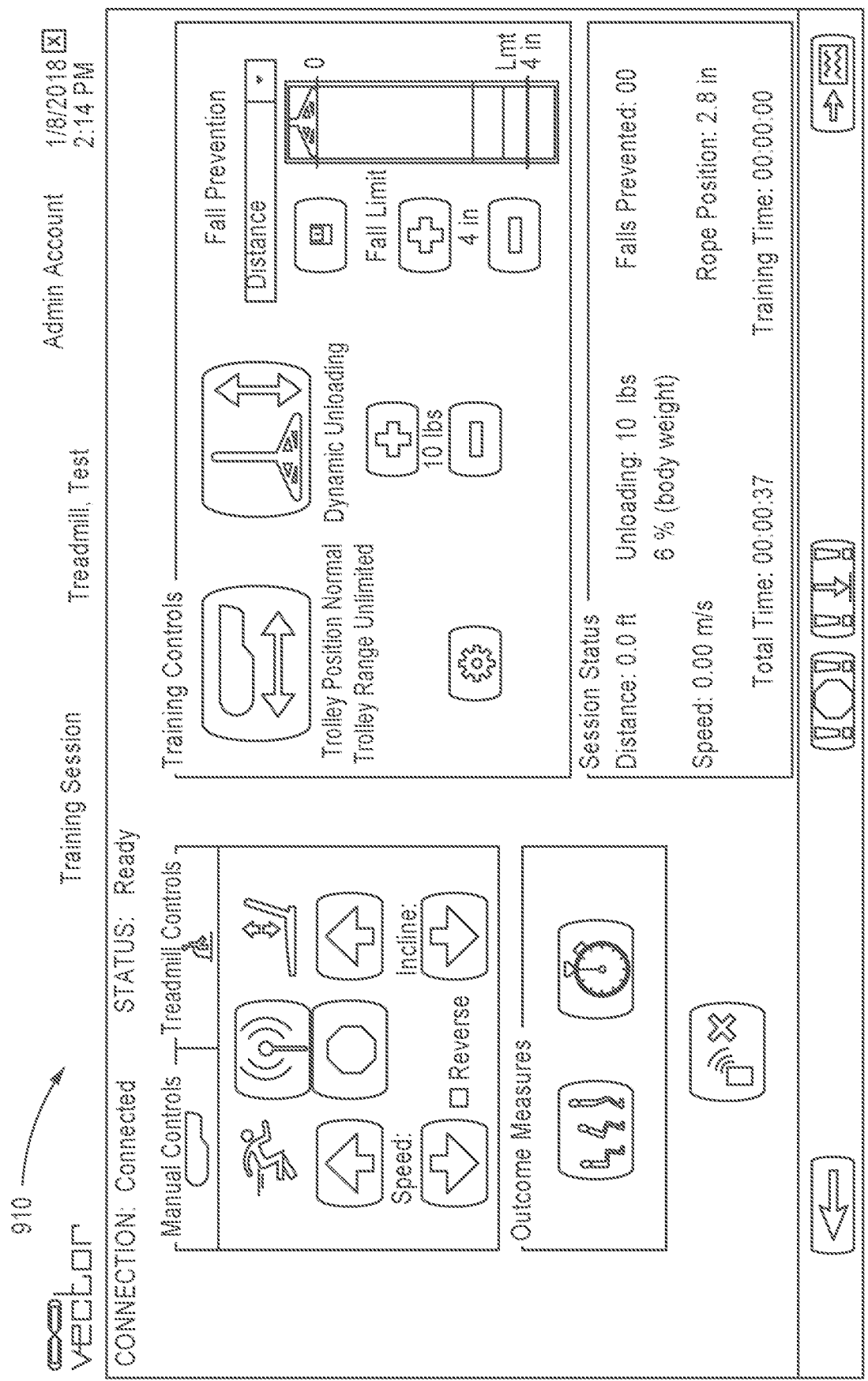
Figure 65:
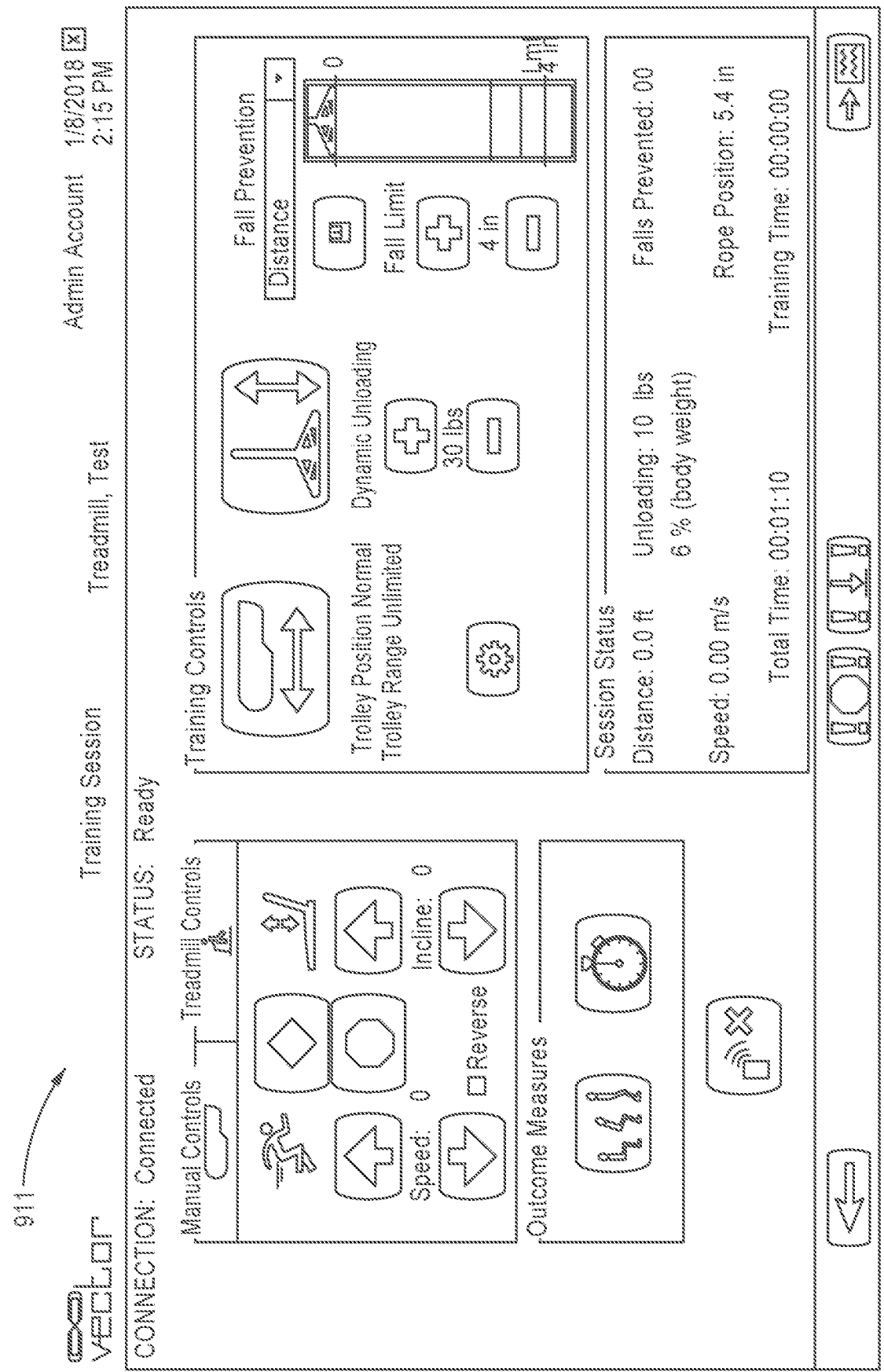
Figure 66:
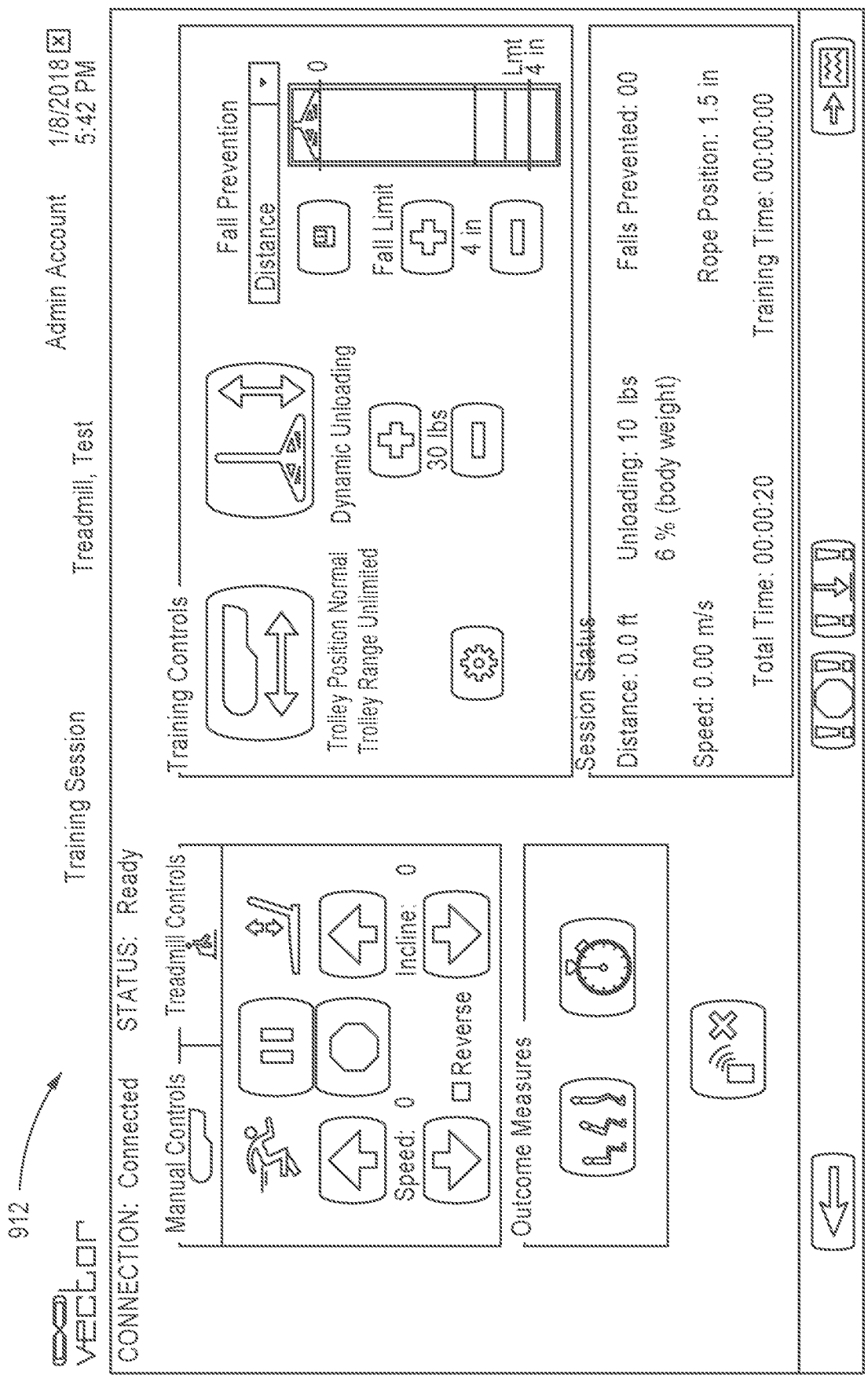
Figure 67:
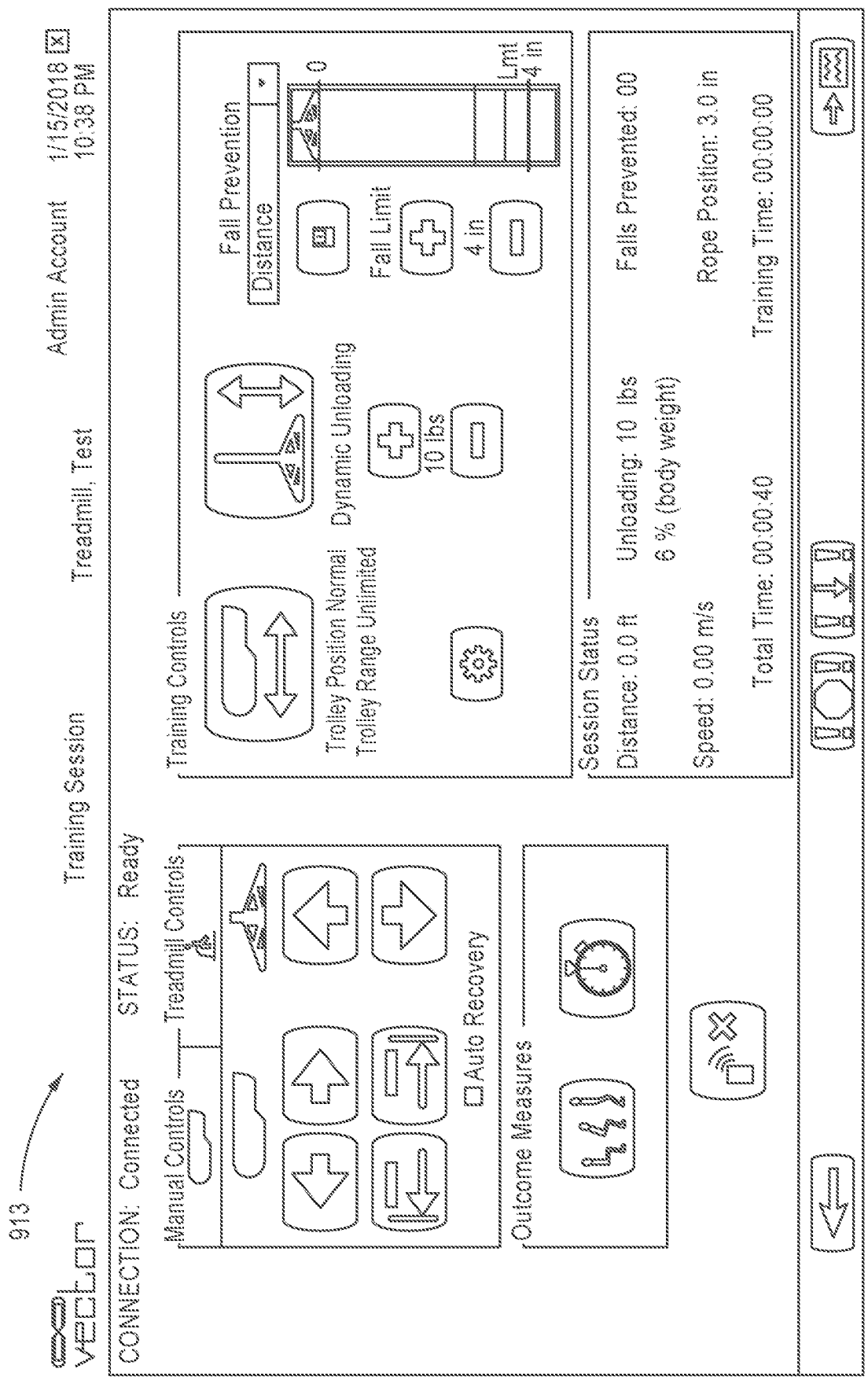

For example, FIGS. 64-69 are screenshots 910-915, respectively, illustrating graphical representations of data associated with a support system being used in conjunction with a treadmill. As shown in FIGS. 64-66, the patient support system and/or the electronic device can present data associated with the trolley such as, for example, operating mode, an amount or level of dynamic unloading, a maximum change in tether length prior to providing support, any suitable session data or information (e.g., total running time, distance travel, walking speed, number of falls or number of falls prevented, tether position, etc.), and/or any other suitable data. In some instances, for example, the patient support system and/or the electronic device can graphically represent data similar to the data represented by the screenshots 904 and 904A, shown in FIGS. 59 and 60, respectively.

In addition to data associated with the trolley, the support system and/or electronic device can be configured to graphically represent data associated with the treadmill. For example, as shown in the screenshots 910 (FIG. 64), 911 (FIG. 65), 912 (FIG. 66), and 913 (FIG. 67), the support system and/or the electronic device can graphically represent data and/or controls associated with the treadmill. In some instances, the data graphically represented on the display can provide a user interface allowing a user to select and/or control one or more operating settings of the treadmill such as, for example, belt speed, incline, and/or the like. In other instances, the user can, for example, initiate a pairing or syncing of the treadmill with the trolley; start, stop, or pause operation of the treadmill (including an emergency stop); change the direction of the belt; change an incline or decline of the belt or treadmill; and/or the like. In some instances, the support system and/or the electronic device can be configured to control one or more operating conditions of the trolley based on data associated with one or more operating conditions of the treadmill and vice versa. For example, in some instances, the support system and/or the electronic device can be configured to stop the treadmill (e.g., stop the movement of the belt) in response to determining the user has fallen based on data associated with one or more operating conditions of the trolley. For example, in some instances, the trolley (and/or an electronic device in communication with the trolley) can determine a user has fallen based at least in part on a rapid or sudden change in a force exerted by the user on the tether and/or a rapid or sudden increase in a length of at least a portion of the tether. Thus, in some such instances, the support system, electronic device, and/or controller can be configured to stop or pause the operation of the treadmill based on determining that the user has fallen. Moreover, the system can resume the operation or movement of the trolley in response to determining that the user has recovered from the fall (e.g., is in a desired standing, walking, or neutral position).

In some embodiments, the electronic device configured to graphically represent data associated with the trolley and the treadmill can be the same electronic device that controls both the trolley and the treadmill. In such embodiments, the electronic device can receive signals from one or more sensors, motors, controllers, etc. and can perform one or more processes on data received via such signals. In other embodiments, an electronic device can be configured to graphically represent data and/or information associated with the trolley and the treadmill based on one or more signals received from an electronic device or a controller of the trolley and/or based on one or more signals received from an electronic device or a controller of the treadmill. In other words, in some embodiments, an electronic device can be configured to receive and aggregate one or more analyzed or at least partially processed data sets from one or more components of the support system and can graphically represented the aggregated data on a display. Said another way, any of the support systems described herein can include a centralized electronic device and/or controller configured to control one or more components of the support system or can include a decentralized or distributed network of electronic devices and/or controllers. Moreover, in embodiments in which the support system includes a decentralized or distributed network of electronic device and/or controllers, the support system can include at least one electronic device and/or controller configured to compile and/or aggregate data received from one or more components of the support system and to graphically represent such compiled or aggregated data on a display.

Figure 68:
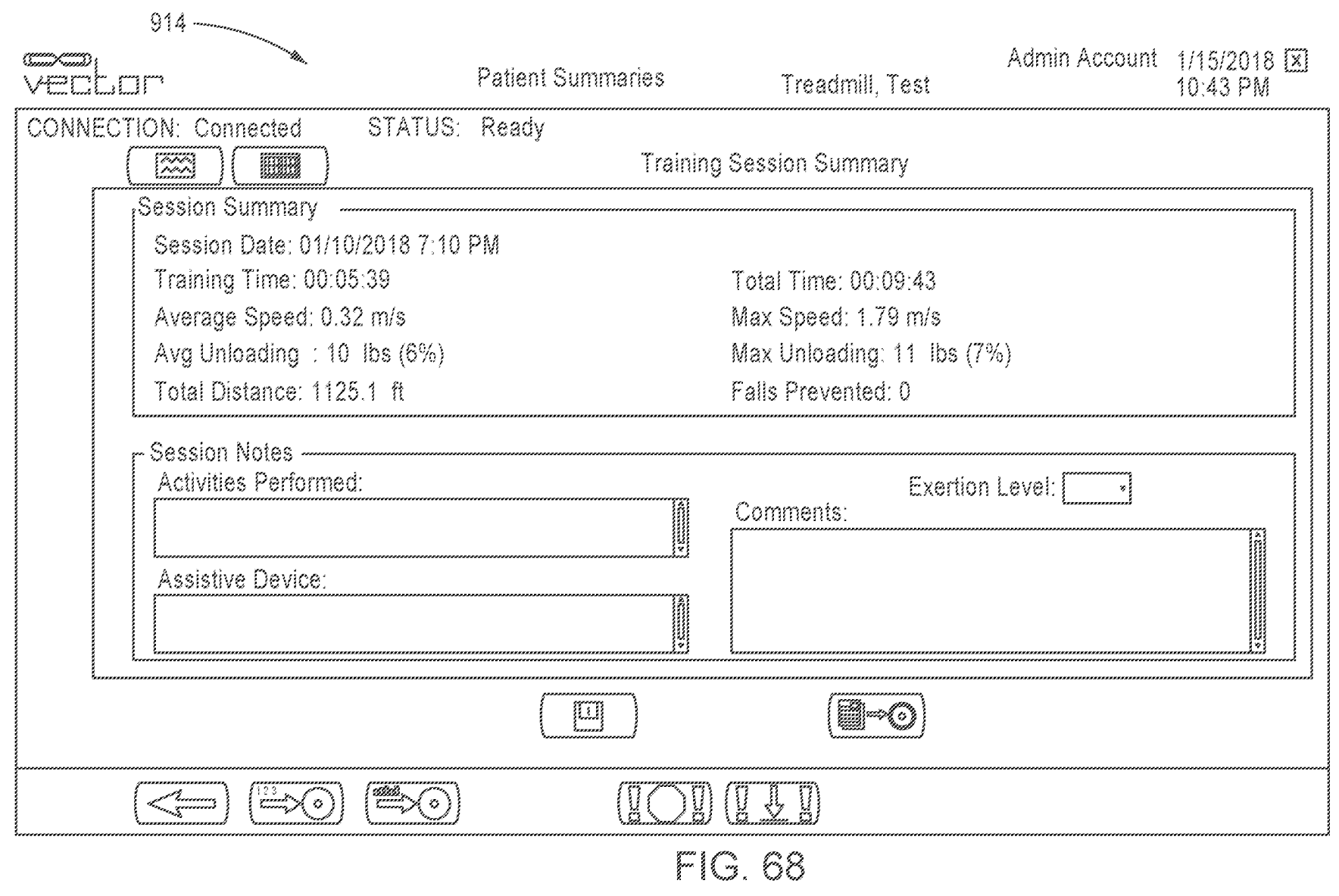
Figure 69:
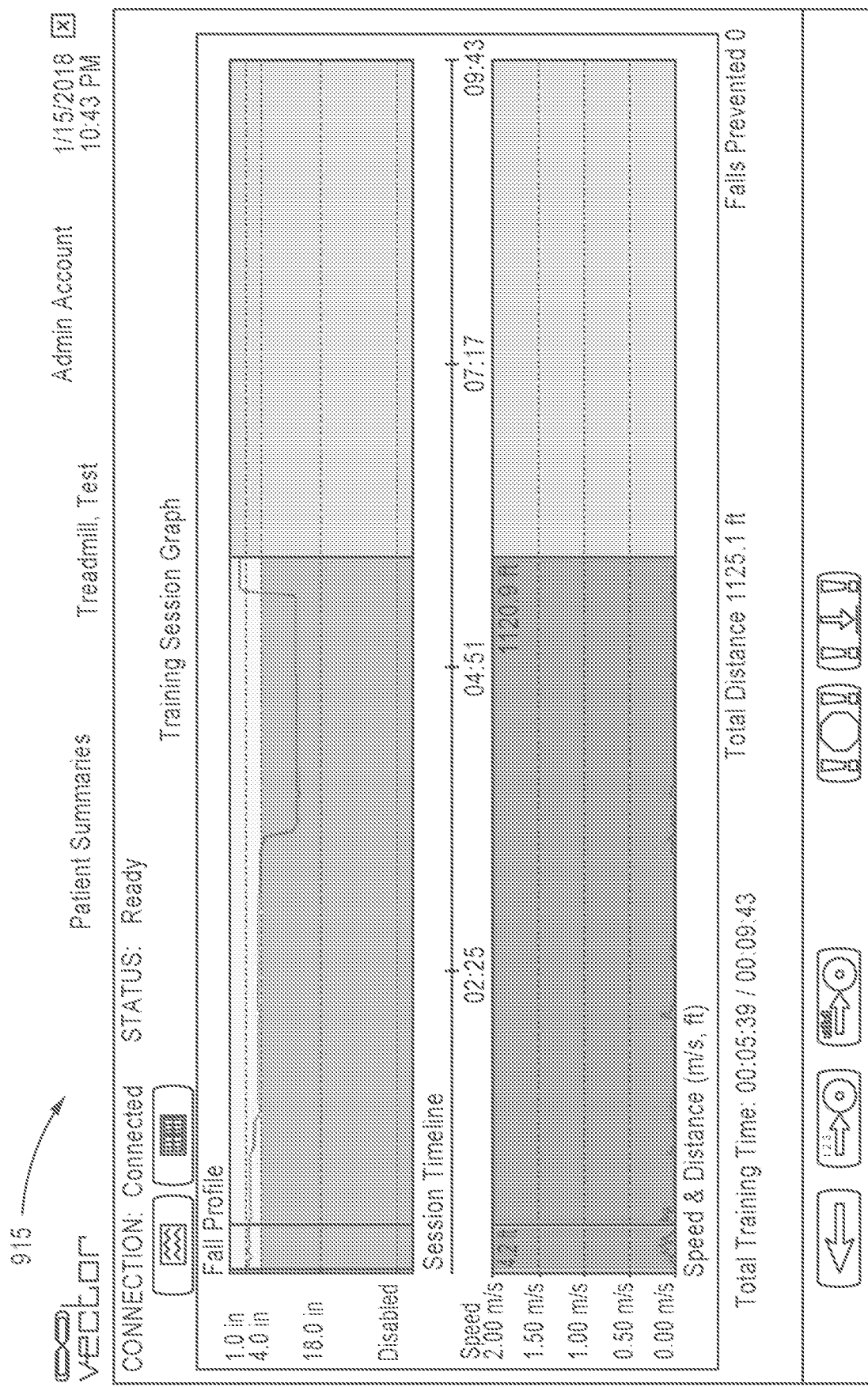

As described above, the support system and/or electronic device in communication therewith can be configured to determine and/or define one or more characteristics associated with the user's gait based on data associated with the support system (e.g., the trolley) and any suitable device being used with the support system (e.g., the treadmill). For example, the screenshot 914 shown in FIG. 68 is an example of a session summary that can provide data and/or information associated with a user session or the like. Such data and/or information can include, for example, the date and time of the session; the total training time; a minimum, maximum, and/or average walking speed; a minimum, maximum, and/or average amount of unloading or support; a total distance traveled; a total number of falls or a total number of falls prevented; and/or any other suitable data and/or information. Moreover, the user or clinician can provide notes, information, data, and/or input that can be associated and/or stored with the session data. As illustrated by the screenshot 915 of FIG. 69, the support system and/or electronic device can also be configured to define and display one or more graphs, plots, charts, etc. representing data associated with one or more user sessions. For example, as shown in FIG. 69, the support system and/or electronic device can define and display a graph illustrating a user fall profile during one or more sessions, a user speed and distance graph, and/or any other suitable graph, chart, and/or representation of data associated with one or more user sessions.

Figure 70:
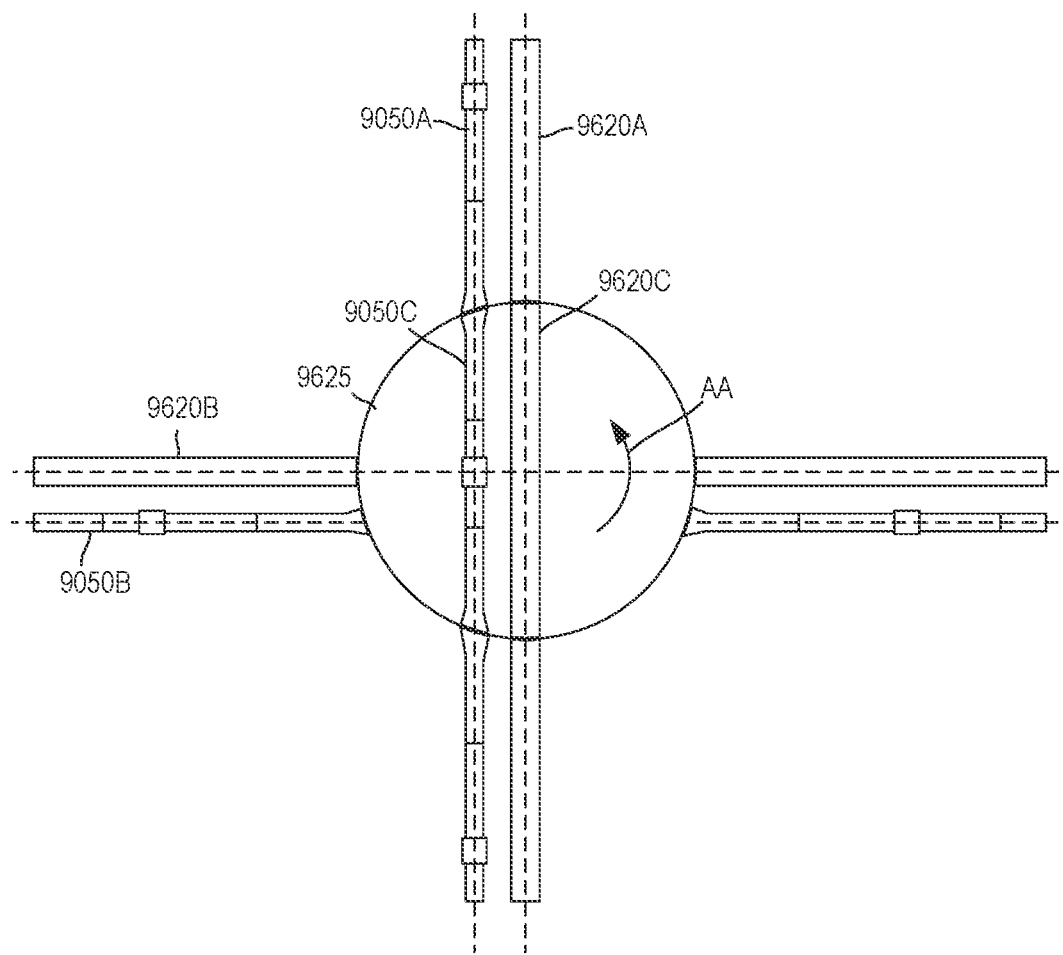
FIG. 70 is a schematic illustration of a portion of a support track, a portion of a power rail, and a turntable according to an embodiment.

Any of the patient support systems and/or body weight support systems can be used with any suitable track and/or power rail such as those described herein. In some embodiments, a patient support system can include a track and/or power rail configured to allow for switching, diverting, and/or redirecting of a trolley movably coupled thereto. For example, FIG. 70 illustrates a first track portion 9620A and a second track portion 9620B, and a first power rail portion 9050A and a second power rail portion 9050A. In this embodiment, the first track portion 9620A and the second track portion 9620B are disposed perpendicular to each other. Similarly, the first power rail portion 9050A and the second power rail portion 9050B are disposed perpendicular to each other.

As shown in FIG. 70, a turntable 9625 includes a third track portion 9620C and a third power rail portion 9050C. The turntable 9625 is configured to be rotated relative to the track portions 9620A and 9620B and the power rails 9050A and 9050B, as indicated by the arrow AA. For example, in some embodiments, the turntable 9625 can be manually turned (e.g., a user exerts a force on a portion of the turntable 9625 such as a handle or the like (not shown in FIG. 70)). In other embodiments, the turntable 9625 can include a motor or the like (not shown in FIG. 70) that can receive a signal from a controller or the like and based on that signal, can rotate the turntable 9625. Therefore, in use, the turntable 9625 can rotate to a position relative to the track portions 9620A and 9620B and the power rails 9050A and 9050B to place the third track portion 9620C in line with the first track portion 9620A, and to place the third power rail portion 9050C in line with the first power rail portion 9050A, as shown in FIG. 70. More particularly, when the third track portion 9620C is placed in line with the first track portion 9620A, the first track portion 9620A and the third track portion 9620C collectively form a substantially continuous track along which a trolley can move.

Similarly, the first power rail portion 9050A and the third power rail portion 9050B can collectively form a substantially continuous power rail configured to power the trolley suspended from the track, collectively formed by the first track portion 9620A and the third track portion 9620C. Specifically, in this embodiment, the turntable 9625 can be disposed in a position such that the first power rail portion 9050A and the third power rail 9050C are in electric communication. Thus, an electric current can flow from a power source (not shown), along a first length of the first power rail portion 9050A, along the third power rail portion 9050C, and along a second length of the first power rail portion 9050A. Moreover, in some embodiments, the ends of the power rail portions 9050A, 9050B, and 9050C can include a transfer section or the like (e.g., a flared or flanged end) that can allow for a given amount of misalignment between the first power rail portion 9050A or the second power rail portion 9050B and the third power rail portion 9050C.

In use, a user (e.g., a patient, a therapist, a technician, a doctor, etc.) may want to redirect a trolley disposed along, for example, a length of the first track portion 9620A. As such, the user can cause the trolley to move from a position along the first track portion 9620A to a position along the third track portion 9620C. With the trolley suspended from the third track portion 9620C and with the trolley in electrical communication with the third power rail 9050C, the user can rotate (e.g., either manually or electrically) the turntable 9625 to a position in which the third track portion 9620C is substantially in line with the second track portion 9620B and in which the third power rail portion 9050C is in line with the second power rail portion 9050B. When the third track portion 9620C is substantially aligned with the second track portion 9620B and the third power rail portion 9050C is substantially aligned with the second power rail portion 9050B, the user can cause the trolley to move from the position along the third track portion 9620C to a position along the second track portion 9620B. In this manner, the trolley can be turned, switched, rotated, and/or otherwise redirected. Similarly stated, the turntable can be rotated from a first position to a second position to rotate, switch, turn, and/or otherwise redirect the trolley.

Figure 71:
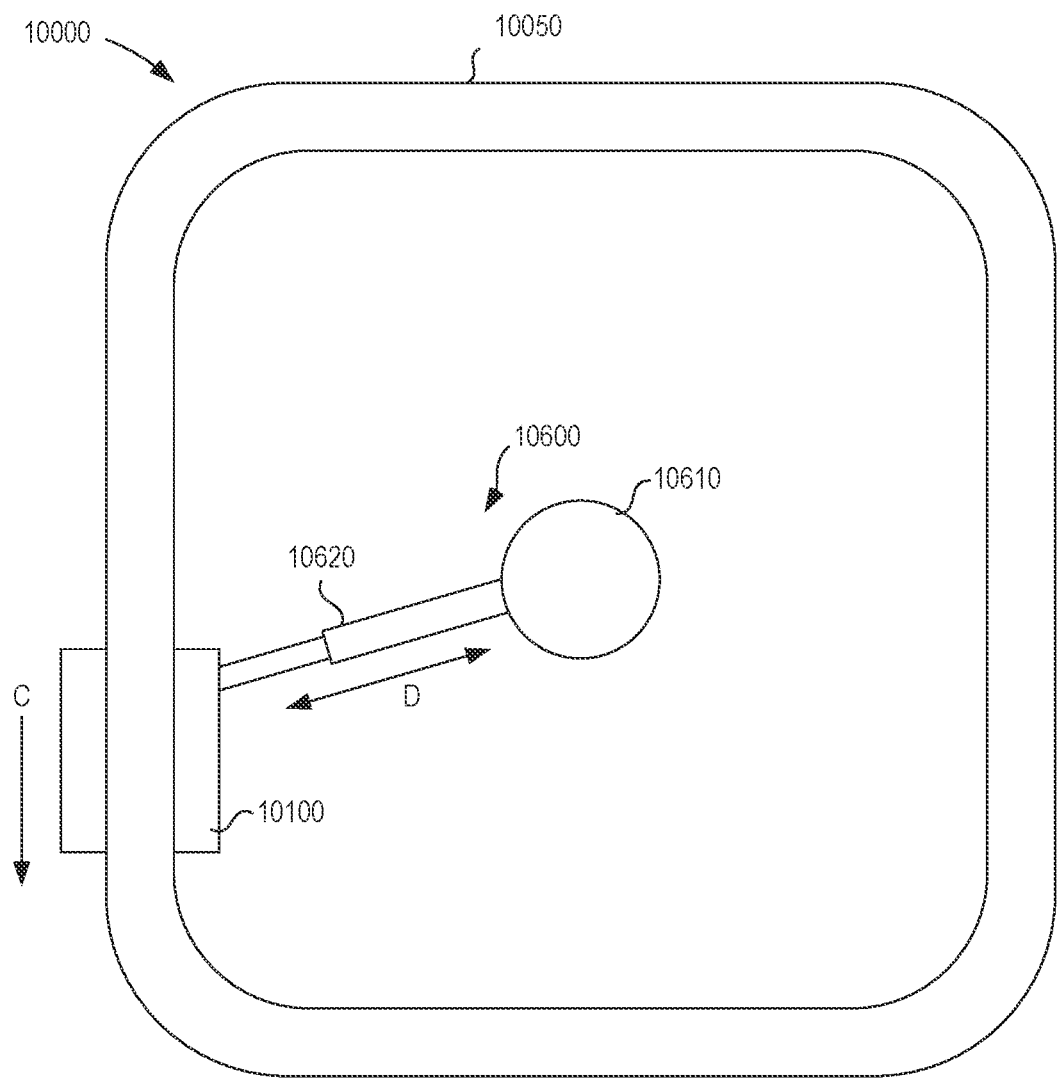
FIG. 71 is a schematic illustration of a support system according to an embodiment.

While the patient support system 2000 is described above as including the power rail 2620 configured to provide electrical power to the trolley 2100, in other embodiments, a patient support system can include any suitable power system. For example, FIG. 71 is a schematic illustration of a body weight support system 10000 according to an embodiment. The body weight support system 10000 (also referred to herein as "support system") can be substantially similar in form and/or function to any of the support systems described herein. For example, the support system 10000 includes a trolley 10100 movably suspended from a support track 10050. The support track 10050 and the trolley 10100 can be substantially similar to the support track 2050 and trolley 2100, respectively, described above with reference to FIGS. 2-34. Thus, the support track 10050 and the trolley 10100 are not described in further detail herein.

The support system 10000 can differ from the support system 2000, however, in the arrangement of the power system 10600. For example, the support system 2000 includes a power rail 2620 that is substantially parallel to the support track 2050 and that is in electrical communication with the trolley 2100 to provide electric power thereto, as described above. In the embodiment shown in FIG. 71, however, the power system 10600 includes a central power source and/or supply 10610 and a power rail 10620 configured to rotate relative to the power source 10610 in response to a movement of the trolley 10100 along the support track 10050, as indicated by the arrow C in FIG. 71. For example, in some embodiments, the power rail 10620 can be a telescoping power rail or the like having a length that is configured to extend or retract (as indicated by the arrow D in FIG. 71) as the trolley 10100 moves along the support track 10050. In other embodiments, the power rail 10620 can be a flexible and/or extendable cable or the like. In this manner, the power rail 10620 can pivot about the power source 10610, to provide substantially continuous electrical power as the trolley 10100 moves along the support track 10050. While the support track 10050 is particularly shown in FIG. 71, it should be understood that the power system 10600 can be used with a support track 10050 having any suitable shape. For example, the power system 10600 can be used with a linear or straight support track, an oval or circular support track, and/or a support track having an irregular shape. That is to say, the rotatable and telescoping arrangement of the power rail 10620 can allow the power system 10600 to be used with any suitable support track having any suitable shape.

Figure 72:
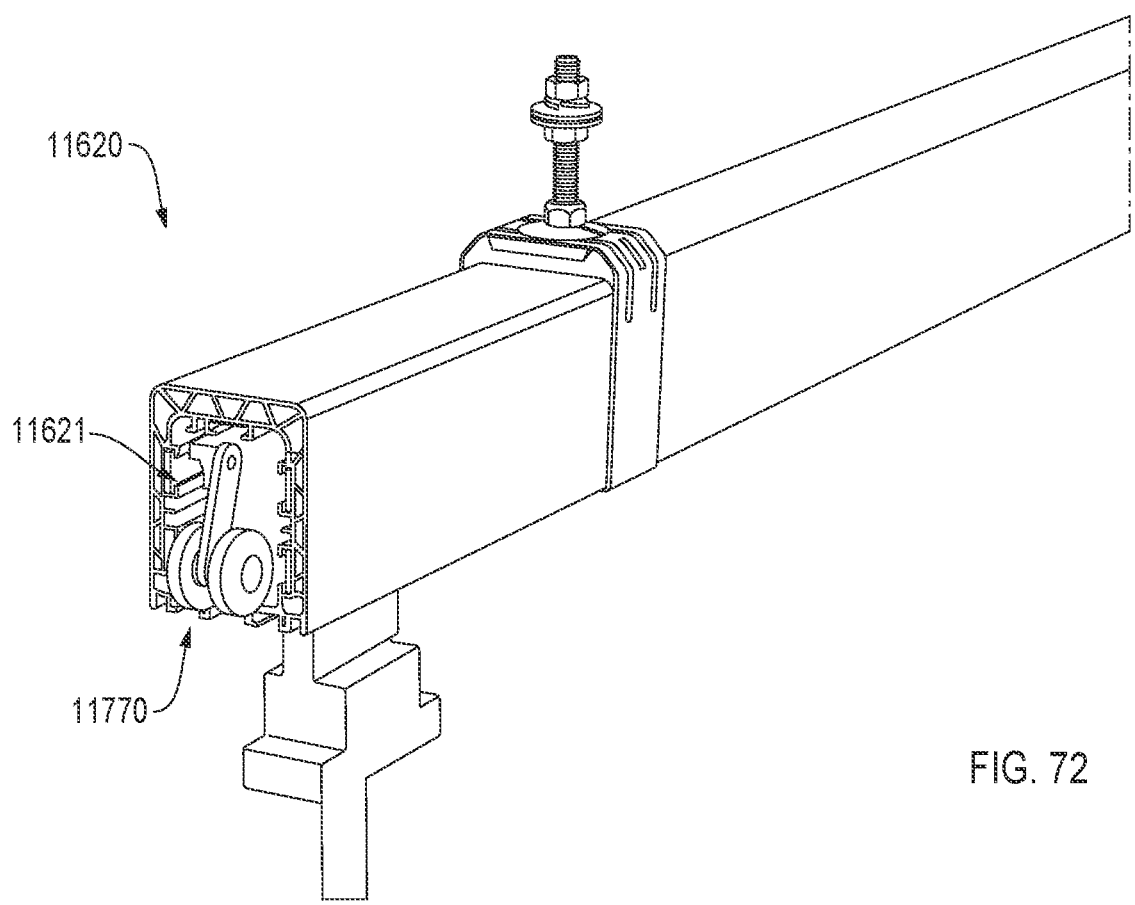
FIGS. 72 and 73 are each a perspective view of a portion of a power system according to different embodiments.

The power rail 10620 can include any suitable power conductor, surface, wire, and/or the like. For example, in some embodiments, the power rail 10620 can include one or more inner conductive surfaces similar to the power rail 2620. In other embodiments, the power rail 10620 can be a conduit or the like configured to house a power cable or wire (and/or any suitable electronic communication cable or wire). In still other embodiments, the power rail 10620 can be any suitable tether or the like configured to conduct and/or transmit electric power. By way of example, FIG. 72 illustrates a power rail 11620 according to an embodiment. In such embodiments, the power rail 11620 is a substantially hollow tube including and/or having at least one conductive inner surface 11621. As such, a collector 11770 and/or any other suitable conductive portion of a trolley or support system can be at least partially disposed within the power rail 11620 to place the collector 11770 (or conductor of the trolley) in electric contact with the conductive inner surface 11621 of the power rail 11620, as described in detail above with reference to the support system 2000.

Figure 73:
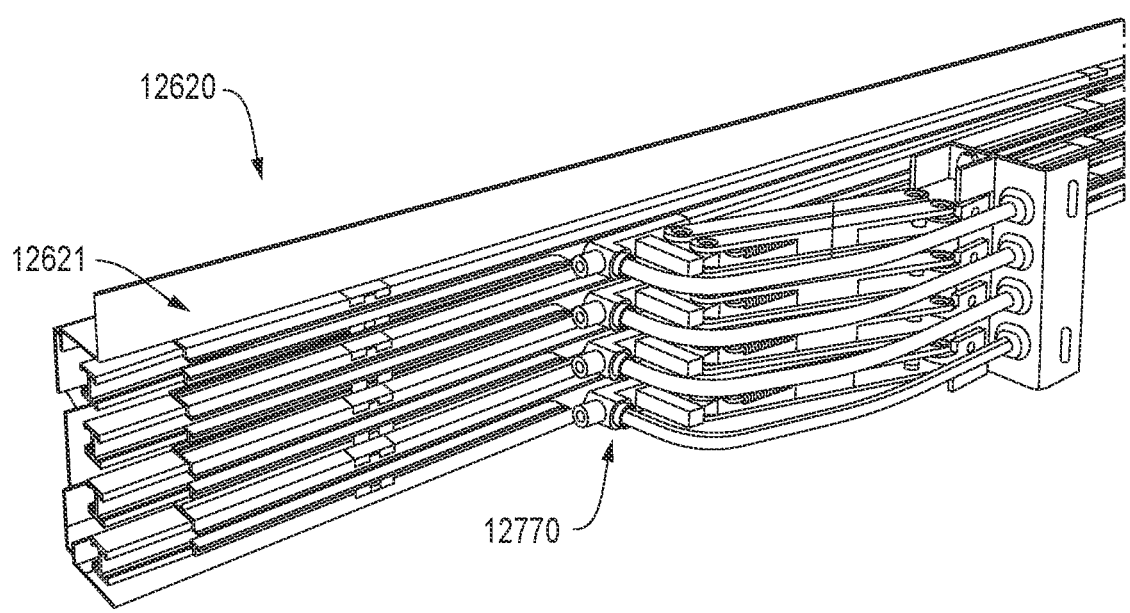

Alternatively, FIG. 73 illustrates a power rail 12620 according to a different embodiment. As shown, the power rail 1620 is a substantially flat or otherwise unenclosed power rail 1620 having at least one conductive surface 12621 that is substantially open or exposed. In such embodiments, a collector 12770 and/or any suitable conductive portion of a trolley or support system can be disposed adjacent to and/or otherwise can be positioned such that the collector 12770 (or conductor of the trolley) is in electric contact with the exposed and/or otherwise available conductive surface 12621 of the power rail 12620. In some embodiments, such an arrangement can allow, for example, the power rail 12620 to be coupled to and/or integrated with a support track (not shown in FIG. 73) along which the trolley moves. In other embodiments, the power rail 12620 can be offset from a support track as described, for example, with reference to the support system 2000.

While the power rails 2620, 10620, 11620, and/or 12620 are specifically described above as being independent of a corresponding support track, in other embodiments, a support track can include one or more conductive surfaces and/or members configured to supply electric power to a portion of a trolley suspended therefrom. Moreover, while the power rails 2620, 10620, 11620, and 12620 are described above as providing electric power to the respective support systems, in some embodiments, a support system can include one or more batteries, battery systems, capacitors, energy storage devices, uninterruptible power supplies (UPS), and/or the like configured to store and/or provide electric power to one or more components or devices of the support system. For example, as described above, a support system can include a UPS electrically connected in any suitable position and/or configuration within the support system to provide a primary or a backup flow of electric power to one or more components or devices (e.g., a power supply, a trolley, a compute device, a controller, a secondary training device such as a treadmill, etc.). Thus, such a UPS (or any other suitable form of energy storage or backup device) can be configured to provide uninterrupted electric power to the support system and/or at least a portion thereof.

Figure 74:
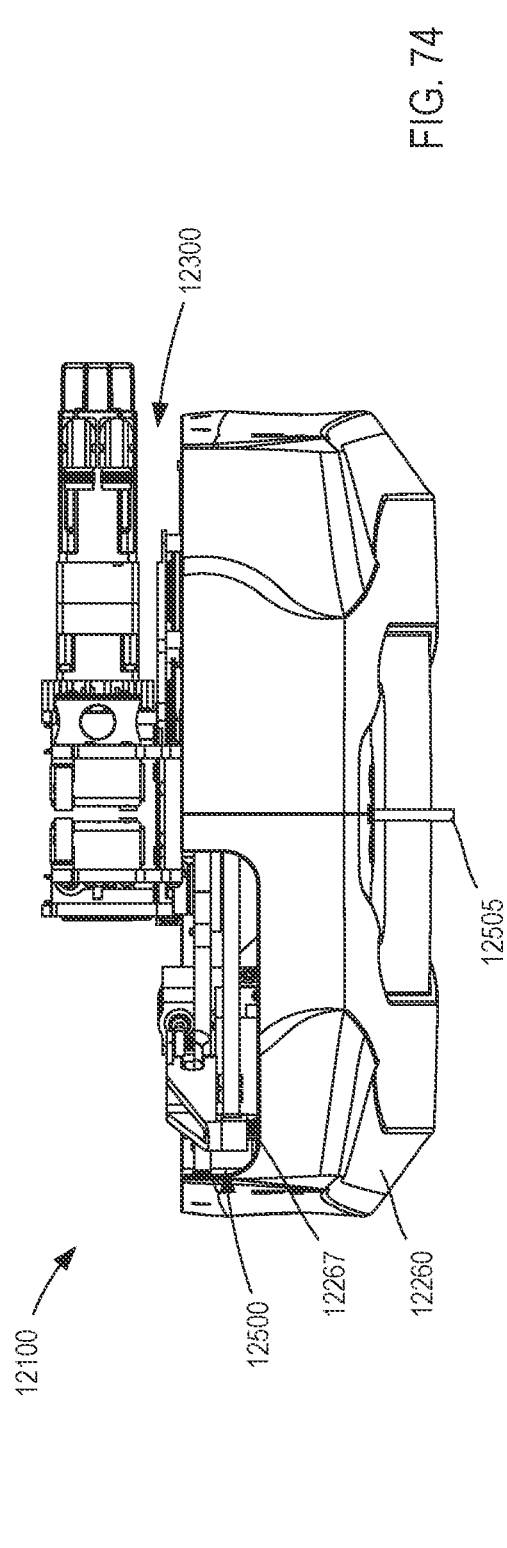
FIGS. 74-76 are a front, side, and bottom view, respectively, of a body weight support system according to an embodiment.
Figure 75:
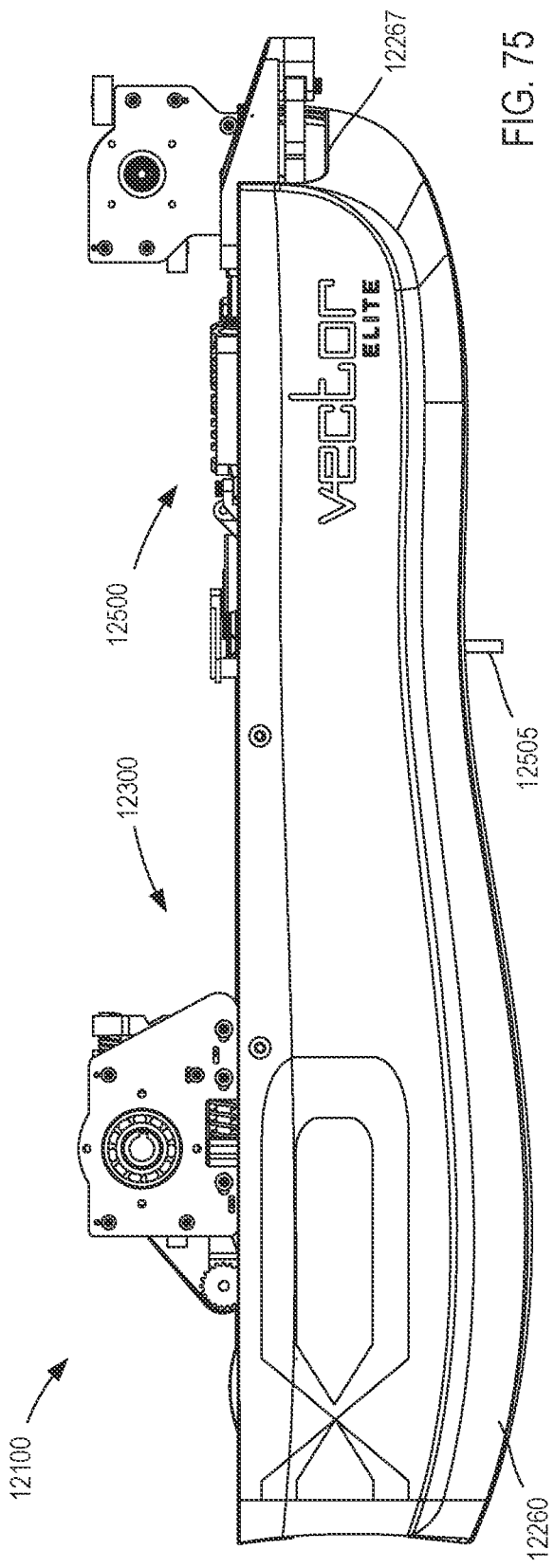
Figure 76:
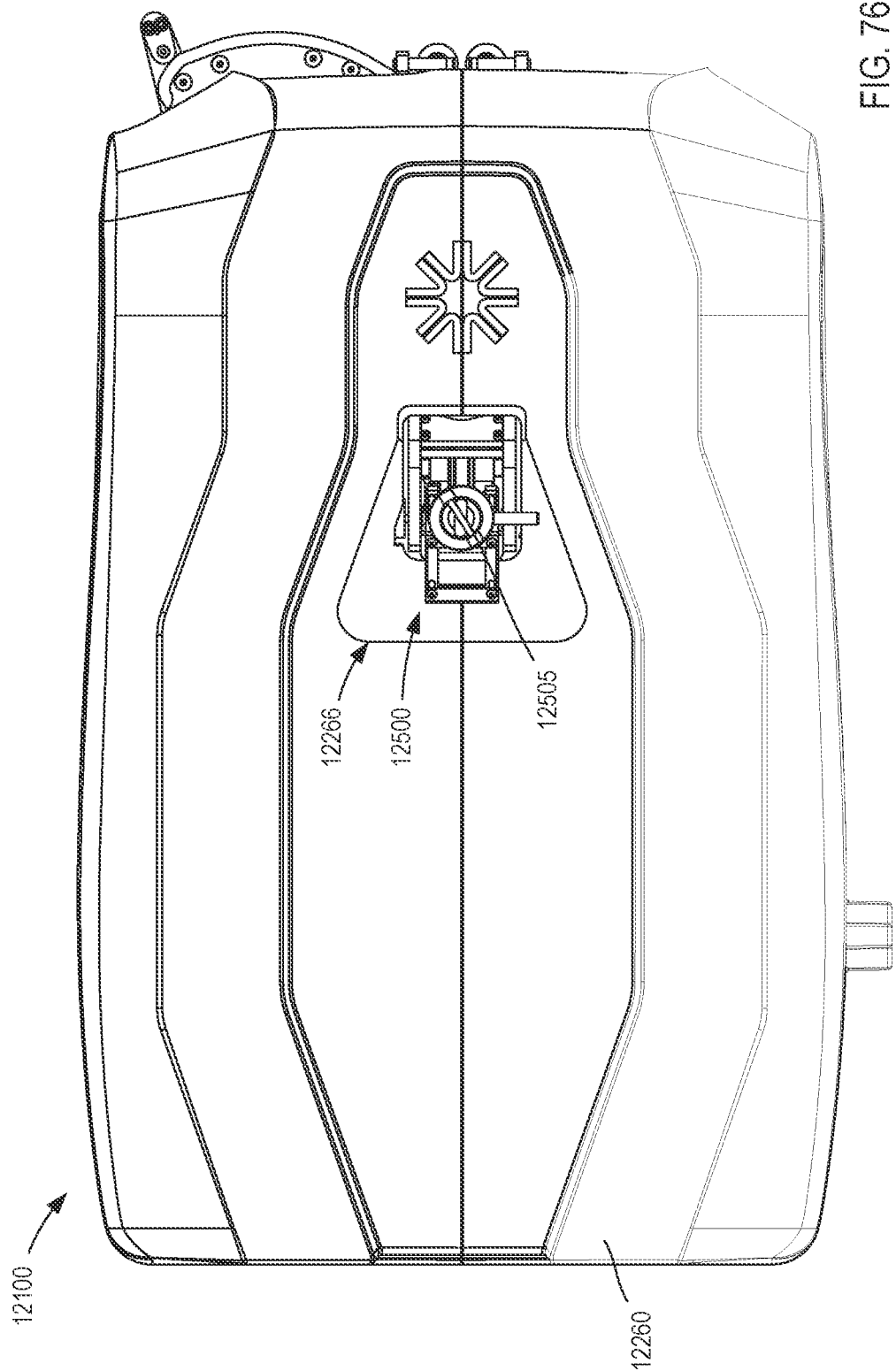

While various embodiments have been described above, it should be understood that they have been presented by way of example only, and not limitation, and as such, various changes in form and/or detail may be made. For example, while the trolley 2100 is described above with reference to FIGS. 2-33 as having a particular shape, size, and/or configuration, it should be understood that changes in size, shape, configuration, and/or arrangement of one or more components can be made without altering the functionality thereof. By way of example, FIGS. 74-76 illustrate a trolley 12100 according to an embodiment. The trolley 12100 can be substantially similar in form and/or function to the trolley 2100 described above with reference to FIGS. 2-33. For example, the trolley 2100 includes a drive system 12300 configured to movably suspend the trolley 12100 from a support track (not shown in FIGS. 74-76) and a support mechanism 12500 that includes a tether 12505 configured to attach to a harness or the like worn by a user to couple the user to the support mechanism 12500. In this embodiment, the drive system 12300 and the support mechanism 12500 can be substantially similar in at least form and/or function to the drive system 2300 and support mechanism 2500, respectively, of the trolley 2100.

The trolley 12100 shown in FIGS. 74-76 can differ from the trolley 2100 shown in FIGS. 2-33, however, by including a cover 12260 having a size, shape, and/or configuration that is different from the cover 2260 of the trolley 2100. For example, the cover 12260 defines a notch 12267 configured to receive a portion of the support mechanism 12500 (e.g., a portion of a cam assembly or the like), as shown in FIGS. 74 and 75. In addition, the cover 12260 defines an opening 12266 through which at least a portion of the tether 12505 can extend to allow an end portion of the tether 12505 to be coupled to a patient attachment mechanism and/or harness worn by the user and/or patient, as shown in FIG. 76. Accordingly, while the cover 12260 shown in FIGS. 74-76 varies in shape, size, and/or configuration from the cover 2260 (see e.g., FIGS. 4-9), the covers 2260 and 12260 can function in a substantially similar manner to enclose, cover, and/or house at least a portion of the trollies 2100 and 12100, respectively.

As another example, while the attachment mechanism 2800 is described above with reference to FIG. 34 as including energy storage members 2850, in other embodiments, an attachment mechanism need not include an energy storage member. In such embodiments, the attachment mechanism can be coupled to, for example, the trolley 2100 and the further coupled to a harness or the like worn by a patient. In such embodiments, the trolley 2100 can function in a substantially similar manner as described above.

Although the trolley 2100 is described above with reference to FIGS. 2-33 as including a motorized drive system 2300 and an active support mechanism 2500, in other embodiments, a trolley can include either a motorized drive system or an active support mechanism. Similarly stated, the drive system 2300 and the support mechanism 2500 can be mutually exclusive and can independently function in a similar manner to those described above.

Any portion of the apparatus and/or methods described herein may be combined in any suitable combination, unless explicitly expressed otherwise. For example, in some embodiments, the patient support mechanism 2500 of the trolley 2100 included in the support system 2000 can be replaced with a system similar to the support system 3900. In such embodiments, a cylinder, a piston, and an energy storage member can extend, for example, from the base 2210 of the housing 2200 of the trolley 2100. Expanding further, the kinetic and potential energy of the energy storage member (e.g., storage member 3960) could be actively controlled via a feedback system similar to the system described above with reference to the trolley 2100. For example, the energy storage member 3960 could be compressed air, the pressure of which could be controlled in response to a force exerted on the piston.

Figure 77:
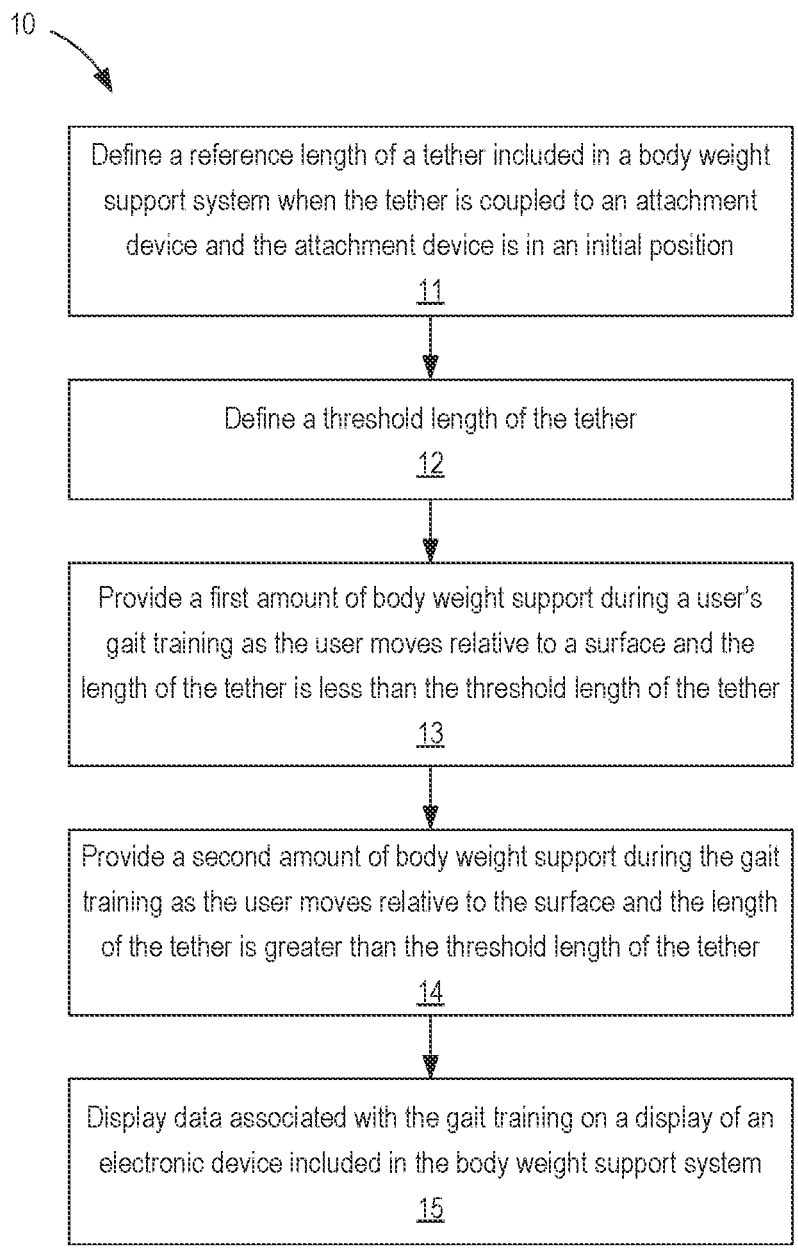
FIGS. 77-79 are each a flowchart illustrating a method of providing body weight support, each according to a different embodiment.

Any of the systems and/or devices described herein can be used in any suitable method to provide support to a user, for example, during gait training and/or the like. For example, FIG. 77 is a flowchart illustrating a method 10 of using a body weight support system according to an embodiment. The body weight support system can be similar to any of the support systems described herein. In some embodiments, for example, the support system can be substantially similar to the support system 2000 described in detail above with reference to FIGS. 2-33. As such, the support system can include a trolley (e.g., similar to the trolley 2100) or the like configured to be movably suspended from a support track. The support system can include a patient support mechanism (e.g., similar to the support mechanism 2500) that has a tether configured to be coupled to an attachment device worn by or otherwise coupled to a user. As such, coupling the tether to the attachment device, in turn, can couple the user to the body weight support system and/or at least the trolley included therein.

The method 10 includes defining a reference length of the tether when the tether is coupled to the attachment device and the attachment device is in an initial position, at 11. For example, as described above with reference to FIGS. 59 and 60, a user, therapist, trainer, etc. can input, provide, and/or otherwise define a "zero point" or reference point associated with a neutral position of the attachment device, which in turn, is associated with and/or corresponds to a determined or determinable length of the tether. In addition, the user, therapist, trainer, etc. can provide an input, selection, instruction, etc. operable to cause the support system to define a threshold length of the tether, at 12.

As described in detail above, the body weight support system is configured to support at least a portion of the user's weight during use (e.g., gait training). As shown in FIG. 77, the method 10 includes providing a first amount of body weight support during the gait training as the user moves relative to and/or on a surface (e.g., the floor or ground, or along or on a training device such as a treadmill) and the length of the tether is less than the threshold length of the tether, at 13. For example, as described above, the first amount of body weight support can be an amount of support provided to the user when the user is standing, walking, running, and/or otherwise not actively falling. In some embodiments, the first amount of body weight support can be, for example, zero support. That is to say, the tether can couple the user to the body weight support system but, in some instances, the body weight support system may not provide support unless the user is falling and/or unless the system is otherwise engaged to do so. In other embodiments, the first amount of support can be a non-zero portion of the user's weight including, for example, some or substantially all of the user's weight.

A second amount of body weight support is provided during the gait training as the user moves relative to and/or on the surface and the length of the tether is greater than the threshold length of the tether, at 14. For example, as described above, the body weight support system can be configured to respond, react, and/or otherwise support a user in response to a change in force applied by the user on the tether, in response to the user moving relative to the body weight support system, in response to the user falling, and/or the like. More particularly, in this example, the body weight support system can be configured to provide the second amount of body weight support in response to a change (e.g., an increase) in the length of the tether such that the length is greater than the threshold length. That is to say, the body weight support system can be configured to provide the second amount of body weight support in response to the user falling.

The method 10 further includes displaying data associated with the gait training on a display of an electronic device included in the body weight support system, at 15. For example, as described above with reference to FIGS. 50-69, the body weight support system can be configured present data in the form of graphs, charts, user interfaces, etc. that can provide a user and/or a therapist or trainer with information regarding one or more training sessions (as described in detail above). Accordingly, the user, therapist, trainer, etc. can review the data to determine, for example, one or more characteristics associated with the user's gait and/or his or her performance, improvement, deficits, strengths, etc. during the gait training.

Figure 78:
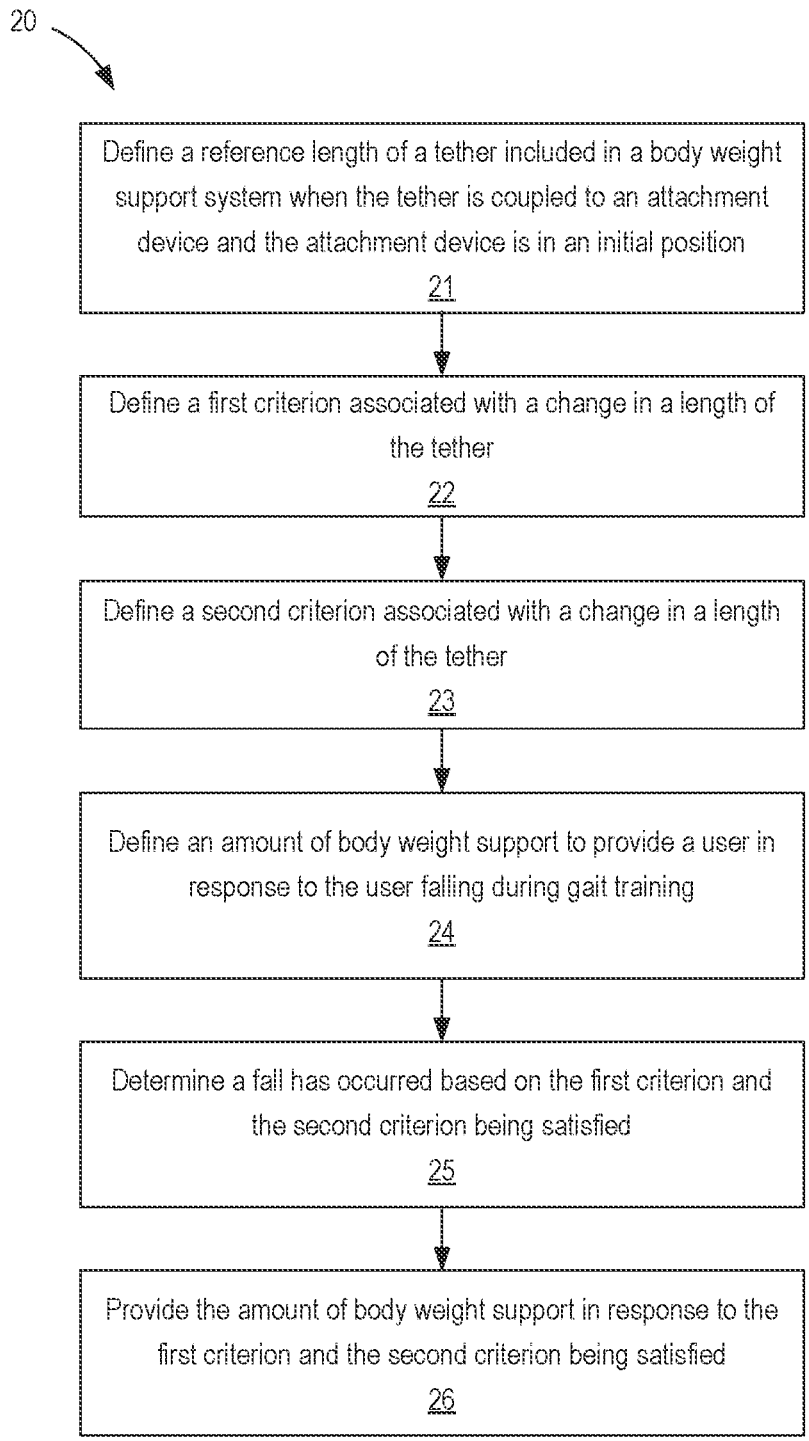

FIG. 78 is a flowchart illustrating a method 20 of using a body weight support system according to another embodiment. The body weight support system can be similar to any of the support systems described herein (e.g., the support system 2000 described in detail above with reference to FIGS. 2-33). As such, the support system can include a trolley (e.g., similar to the trolley 2100) or the like configured to be movably suspended from a support track. The support system can include a patient support mechanism (e.g., similar to the support mechanism 2500) that has a tether configured to be coupled to an attachment device worn by or otherwise coupled to a user. As such, coupling the tether to the attachment device, in turn, can couple the user to the body weight support system and/or at least the trolley included therein.

The method 20 includes defining a reference length of the tether when the tether is coupled to the attachment device and the attachment device is in an initial position, at 21. For example, as described above with reference to FIGS. 59 and 60, a user, therapist, trainer, etc. can input, provide, and/or otherwise define a "zero point" or reference point associated with a neutral position of the attachment device, which in turn, is associated with and/or corresponds to a determined or determinable length of the tether. In addition, the user, therapist, trainer, etc. can provide an input, selection, instruction, etc. operable to cause the support system to define a first criterion associated with a change in a length of the tether, at 22; can provide an input, selection, instruction, etc. operable to cause the support system to define a second criterion associated with a change in a length of the tether, at 23; and can provide an input, selection, instruction, etc. operable to cause the support system to define an amount of bodyweight support to provide in response to the user falling during the gait training, at 24. For example, in some embodiments, the first criterion can be a rate of change in the length of the tether and the second criterion can be a duration of the change in the length of the tether. In other embodiments, the first criterion and the second criterion can be any suitable criteria(ion). The amount of body weight to support can be any suitable portion of the user's body weight. In some instances, for example, the amount of body weight support can be expressed as a percentage of the user's weight (e.g., 0%, 10%, 20%, 30%, etc.). In other instances, the amount of the body weight support can be expressed as a weight term (e.g., in pounds or kilograms).

The method 20 includes determining whether a fall has occurred based on the first criterion and the second criterion being satisfied, at 25. For example, during gait training, the user may move relative to and/or walk on a surface, which in turn, can result in a change in force exerted on the tether (as described in detail above). In some instances, the user falling during gait training can result in an increase in the force exerted by the user on the tether that results in a relatively high rate of change in a length of at least a portion of the tether, which in turn, can be sufficient to satisfy the first criterion. In some instances, however, a similar rate of change in the length of the tether may result from the user's movement when not falling (e.g., if the user sits down or stands up, bends down, ascends or descends a ramp, stairs, or platform, and/or the like). Thus, to avoid falsely defining or falsely determining the occurrence of a fall, the support system can be configured such that a fall is defined and/or determined in response to satisfying both the first criterion (e.g., the rate of change in the length of the tether) and the second criterion (e.g., a duration of the change in the length of the tether or the amount of time it takes for the change in the length of the tether). Furthermore, the amount of body weight support can be provided when the first criterion and the second criterion are satisfied, at 26.

Figure 79:
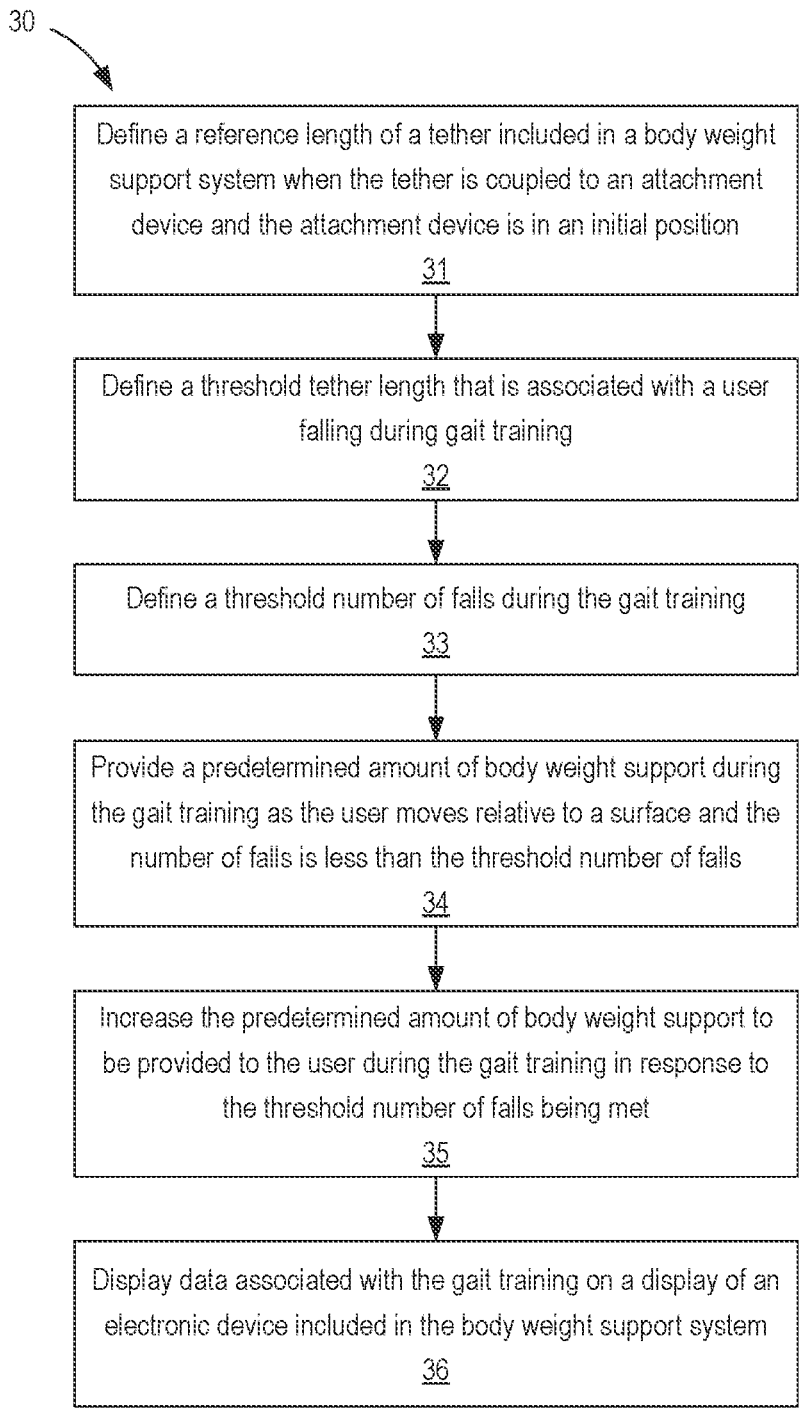

FIG. 79 is a flowchart illustrating a method 30 of using a body weight support system according to another embodiment. The body weight support system can be similar to any of the support systems described herein (e.g., the support system 2000 described in detail above with reference to FIGS. 2-33). As such, the support system can include a trolley (e.g., similar to the trolley 2100) or the like configured to be movably suspended from a support track. The support system can include a patient support mechanism (e.g., similar to the support mechanism 2500) that has a tether configured to be coupled to an attachment device worn by or otherwise coupled to a user. As such, coupling the tether to the attachment device, in turn, can couple the user to the body weight support system and/or at least the trolley included therein.

The method 30 includes defining a reference length of the tether when the tether is coupled to the attachment device and the attachment device is in an initial position, at 31. For example, as described above with reference to FIGS. 59 and 60, a user, therapist, trainer, etc. can input, provide, and/or otherwise define a "zero point" or reference point associated with a neutral position of the attachment device, which in turn, is associated with and/or corresponds to a determined or determinable length of the tether. In addition, the user, therapist, trainer, etc. can provide an input, selection, instruction, etc. operable to cause the support system to define a threshold length of the tether that is associated with and/or otherwise is indicative of the user falling during the gait training, at 32; and can provide an input, selection, instruction, etc. operable to cause the support system to define a threshold number of falls during the gait therapy, at 33.

The method 30 includes providing a predetermined amount of body weight support during the gait training as the user moves relative to and/or on a surface (e.g., the floor or ground, or relative to or on a training device such as a treadmill) and the number of falls is less than the threshold number of falls, at 34. For example, as described above, the predetermined amount of body weight support can be an amount of support provided to the user when the user is standing, walking, running, and/or otherwise not actively falling. In some embodiments, the first amount of body weight support can be, for example, zero support. That is to say, the tether can couple the user to the body weight support system but, in some instances, the body weight support system may not provide support unless the user is falling and/or unless the system is otherwise engaged to do so. In other embodiments, the first amount of support can be a non-zero portion of the user's weight including, for example, some or substantially all of the user's weight (e.g., expressed or represented as a percentage of the user's weight or as a weight value in pounds or kilograms).

In some instances, the predetermined amount of body weight support provided to the user during the gait training is increased in response to the threshold number of falls being met, at 35. For example, in some instances, repeated falls by the user may indicate that the user would benefit from more body weight support. Thus, the body weight support system can increase the amount of support provided to the user. In some instances, the amount of increase can be predetermined increase in the amount of support (e.g., a 1% increase, a 5% increase, a 10% increase, a 20% increase, etc.). In other instances, the amount of increase can be calculated based on characteristics associated with the user's performance during the gait training. In sill other instances, the amount of increase can be input by the user, therapist, trainer, etc.

The method 30 further includes displaying data associated with the gait training on a display of an electronic device included in the body weight support system, at 35. For example, as described above with reference to FIGS. 50-69, the body weight support system can be configured present data in the form of graphs, charts, user interfaces, etc. that can provide a user and/or a therapist or trainer with information regarding one or more training sessions (as described in detail above). Accordingly, the user, therapist, trainer, etc. can review the data to determine, for example, one or more characteristics associated with the user's gait and/or his or her performance, improvement, deficits, strengths, etc. during the gait training.

Where methods and/or schematics described above indicate certain events and/or flow patterns occurring in certain order, the ordering of certain events and/or flow patterns may be modified. Additionally, certain events may be performed concurrently in parallel processes when possible, as well as performed sequentially.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals (e.g., propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.), or other programming languages and/or other development tools. Additional examples of computer code include, but are not limited to, control signals, encrypted code, and compressed code.

What is claimed is:

1. A system for providing body weight support, the system comprising:
a trolley movably suspended from a support track, the trolley including a winch assembly and a motor;
a tether having a first end portion coupled to a portion of the trolley, a second end portion of the tether configured to be coupled to an attachment device worn by a user to couple the user to the trolley; and
an electronics assembly at least partially disposed in the trolley, the electronics assembly including at least a memory and a processor in communication with the memory, the processor configured to define (1) a reference length of the tether when the attachment device is in an initial position, (2) a first criterion associated with a change in a length of the tether, (3) a second criterion associated with a duration of a change in a length of the tether, and (4) an amount of the body weight support to provide in response to the user falling when the user is coupled to the trolley, the trolley configured to drive the motor to provide the amount of body weight support in response to the processor determining a fall has occurred based on the first criterion and the second criterion being satisfied.

2. The system of claim 1, wherein the length of the tether is increased in response to an increase in force exerted by the user on the tether, the increase in the force being associated with the user falling.

3. The system of claim 1, wherein the first criterion is a rate of change in the length of the tether, and the second criterion is a minimum duration during which the length of the tether is changed.

4. The system of claim 1, wherein the processor is configured to redefine the reference length of the tether in response to a change in the length of the tether that does not satisfy at least one of the first criterion or the second criterion.

5. The system of claim 1, wherein the amount of body weight support is a first amount of body weight support, and wherein the trolley is configured to provide a second amount of body weight support when at least one of the first criterion or the second criterion is not satisfied, the second amount of body weight support being less than the first amount of body weight support.

6. The system of claim 1, wherein the reference length of the tether is a first reference length of the tether, the processor is configured to define a third criterion associated with a threshold number of falls, and wherein the processor is configured to define a second reference length of the tether when the third criterion is satisfied, the second reference length of the tether being shorter than the first reference length of the tether.

7. The system of claim 6, wherein the amount of body weight support is a first amount of body weight support, and wherein the trolley is configured to provide a second amount of body weight support when the third criterion is not satisfied and at least one of the first criterion or the second criterion is not satisfied, the second amount of body weight support being less than the first amount of body weight support.

8. The system of claim 7, wherein the trolley is configured to provide a third amount of body weight support when the third criterion is satisfied and at least one of the first criterion or the second criterion is not satisfied, the third amount of body weight support is greater than the second amount of body weight support and less than the first amount of body weight support.

9. The system of claim 1, wherein the trolley includes a drive assembly configured to movably suspend the trolley from the support track, the drive assembly configured to move the trolley relative to the support track in response to the user moving relative to a surface such that the trolley is maintained in a position overhead of the user.

10. The system of claim 1, wherein the electronics assembly is in communication with an electronic device, and the processor is configured to send to the electronic device a signal indicative of an instruction to represent data on a display of the electronic device, the data being associated with at least one of (1) the reference length, (2) the first criterion, (3) the second criterion, or (4) the amount of body weight support provided by the trolley.

11. The system of claim 10, further comprising:

an electric stimulator configured to be donned by the user to facilitate gait, the electric stimulator configured to send to the electronic device a signal indicative of an instruction to represent on the display of the electronic device data associated with an operating condition of the electric stimulator.

\* \* \* \* \*